US009037631B2

(12) United States Patent
Dietrich et al.

(10) Patent No.: US 9,037,631 B2
(45) Date of Patent: May 19, 2015

(54) NETWORK COMMUNICATIONS

(71) Applicants: David Dietrich, Newport Beach, CA (US); Jon Barton Shields, Escondido, CA (US)

(72) Inventors: David Dietrich, Newport Beach, CA (US); Jon Barton Shields, Escondido, CA (US)

(73) Assignee: Ether-2 Corp., Los Angeles, CA (US)

( * ) Notice: Subject to any disclaimer, the term of this patent is extended or adjusted under 35 U.S.C. 154(b) by 139 days.

(21) Appl. No.: 13/767,557

(22) Filed: Feb. 14, 2013

(65) Prior Publication Data

US 2014/0229519 A1 Aug. 14, 2014

Related U.S. Application Data

(60) Provisional application No. 61/602,056, filed on Feb. 22, 2012.

(51) Int. Cl.
*H04L 29/08* (2006.01)

(52) U.S. Cl.
CPC .................................... *H04L 67/10* (2013.01)

(58) Field of Classification Search
IPC ........................................................ H04L 67/10
See application file for complete search history.

(56) References Cited

U.S. PATENT DOCUMENTS

| | | | | |
|---|---|---|---|---|
| 5,390,181 | A * | 2/1995 | Campbell et al. | 370/444 |
| 5,953,344 | A * | 9/1999 | Dail et al. | 370/443 |
| 6,014,545 | A * | 1/2000 | Wu et al. | 725/118 |
| 6,278,713 | B1 * | 8/2001 | Campbell et al. | 370/417 |
| 6,292,493 | B1 * | 9/2001 | Campbell et al. | 370/445 |
| 6,408,009 | B1 * | 6/2002 | Campbell et al. | 370/461 |

* cited by examiner

*Primary Examiner* — Kenny Lin

(57) ABSTRACT

The Distributed Queue Switch Architecture (DQSA) family of protocols has previously focused upon fundamental research and computer-aided simulations. Distributed Queue Wireless Arbiter (DQWA), however, is the first member of the protocol family presented as a fully-drawn Medium Access Control protocol specification with cross-layering for reporting Physical layer characteristics, such as channel and state information, which can then be shared among nodes for security, quality and energy performance. DQWA has been designed for the implementation of fully interoperable DQSA networks, where disparate network types such as Cable TV and Internet Service Provider can now share a common platform for a data transmission and receiving network with a plurality of nodal apparatus for sending and receiving digital data across a cable or wireless physical network, or the logical equivalent, and where nodes can interact directly or via other nodes, and demonstrating a throughput which can achieve circuit-switched performance within a packet-switched environment.

6 Claims, 35 Drawing Sheets

NETWORK COMMUNICATIONS

CROSS REFERENCE TO RELATED APPLICATIONS

This application is related to U.S. Pat. No. 5,390,181, granted on Feb. 14, 1995, which is incorporated herein by reference in its entirety. This application is also related to U.S. Pat. No. 6,278,713, granted on Aug. 21, 2001, which is incorporated herein by reference in its entirety. This application is also related to U.S. Pat. No. 6,292,493, granted on Sep. 18, 2001, which is incorporated herein by reference in its entirety. This application is related to U.S. Pat. No. 6,408,009, granted on Jun. 18, 2002, which is incorporated herein by reference in its entirety.

FIELD

The present application relates to network communication.

BACKGROUND

Traditional Controller Area Network (CAN) protocol utilizes a Carrier Sense Multiple Access/Collision Avoidance (CSMA/CA) technique similar to that of Ethernet but with frames that are relatively small by networking standards in that the largest possible frame may be around 128-bits (i.e. 16-Bytes, including the maximum of 8-bytes for the payload), whereas the Ethernet Frame varies between 64-bytes and 1,536-bytes. Unlike Ethernet however, there is no loss of data as a result of collisions. This is because of CAN's unique non-destructive message arbitration methodology that guarantees high priority messages access to the CAN bus with no fear of collision or loss of data; hence, no need for retransmission.

However, the same feature that is CAN's strength (its non-destructive collision resolution methodology) is also its weakness in that as a CAN bus approaches its utilization capacity so does its propensity for indefinite starvation of lower priority messages. Given that a CAN message cannot arbitrarily change its priority; the CAN protocol is completely inflexible under heavy loads for successfully ensuring that lower-priority messages reach their destination. The traditional methodology as known in the art for resolving this problem has been in the separation of CAN nodes into multiple CAN sub-networks. However, such delineation can often be the source of frustration when attempting to discern the most efficient means for dividing the devices into disparate CAN networks while still affording cross network communication through various backhaul communication technologies. Embodiments presently disclosed provide security and reliability within a network, while maintaining CAN's distributed network communication methodology and implicit avoidance of single points of failure within the network.

Figure 1:
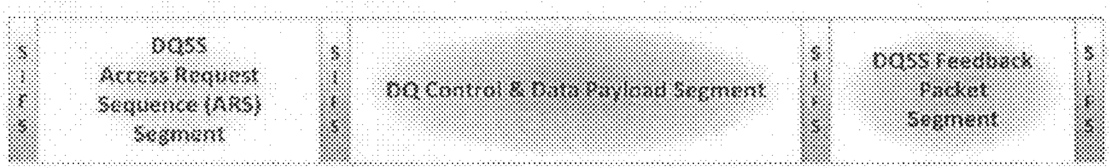
FIG. 1 depicts an exemplary DQ Transmission Sequence.

In the following description, like reference numbers are used to identify like elements. Furthermore, the drawings are intended to illustrate major features of exemplary embodiments in a diagrammatic manner. The drawings are not intended to depict every feature of every implementation nor relative dimensions of the depicted elements, and are not drawn to scale.

DETAILED DESCRIPTION

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention. In addition, it should be understood that embodiments of the invention include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software-based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible.

A Distributed Queuing Wireless Arbiter (DQWA) Protocol is based on the Distributed Queue Switch Architecture (DQSA) developed at the Illinois Institute of Technology. The DQSA was originally designed as Layers One (1) and Two (2) broadcast network architecture for cable TV networks that provided deterministic access to the transmission queue while simultaneously limiting collisions to a finite window within the DQ Transmission Frame. The DQSA may be extended into the wireless arena by focusing mostly on the Link Layer (i.e. Layer Two (2)) with only minimal direction regarding the Physical Layer (i.e. layer two (2)). The wireless nature of DQ may be defined in Distributed Queuing Wireless Arbiter (DQWA) with most of the specification dealing with the Link Layer while also providing only minimal direction for the Physical Layer.

The DQWA is a hybrid of a traditional "hub and spoke" network architecture with that of a peer-to-peer MESH network architecture. The primary area of focus of the DQWA specification is that of the Link Layer, although a key and critical aspect of it successful implementation, the Contention Window and associated Min-Slots, is heavily dependent upon the Physical Layer in that successful implementation of a unique Collision Detection mechanism may be implemented.

The heart of DQWA technology is a Medium Access Control (MAC) layer that allows an arbitrary number of stations to share a common communications channel over any distance and operating at any data rate. DQSA can operate over virtually any topology and will also provide a Quality of Service (QoS) at the MAC layer that includes the ability to temporarily elevate priorities in order to prevent starvation (as can occur in traditional CAN).

DQWA may be a distributed architecture with respect to communication. However, for control, DQWA is static for a given point in time; specifically, it is static for the duration of a DQ Transmission Frame. The designated central control point may transition to other nodes upon completion of the current DQ Transition Frame; which is why DQWA can be viewed as a hybrid between a pure MESH ad-hoc architecture and that of a traditional Hub-and-Spoke architecture.

The hybrid nature of the DQWA network architecture provides flexibility for adaptation to a CAN Wireless Extension in that communication is distributed while enabling a central authority to elevate priorities of messages as needed providing a QoS aspect to DQWA that CAN severely lacks. Also, because the central authority may shift from DQ node to DQ node if desired (i.e. enabled to do so), traffic patterns may be localized with respect to control. Thus, reducing latency when and where needed; according to the traffic pattern. Because all communication can be encrypted at the MAC layer, including the headers; security may be maintained at all times in spite of the fact that all traffic is broadcast wirelessly.

Figure 35:
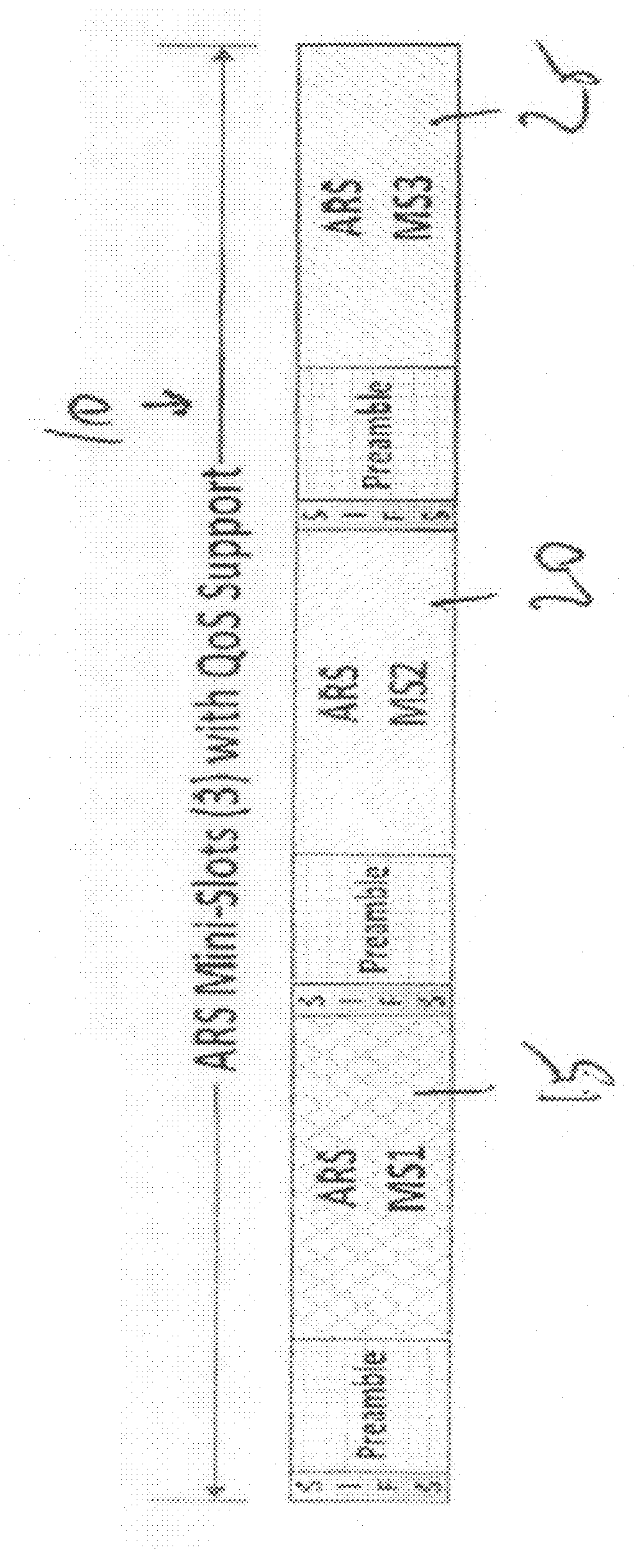
FIG. 35 depicts an exemplary embodiment according to the present application.

The key feature of DQSA is that all control resides in the stations, no central control is required. The network state is maintained at all times by each station in just two (2) binary counters per DQSS, providing it with all the information necessary to make decisions as to when to transmit for that specific DQSS. A DQ Transmission Frame may be divided into three separate time periods/segments listed below:

1) Referring to FIG. 35, Contention Window (CW), utilized as part of the Access Request Sequence (ARS) 10 to the Transmission Queue with three (3) control mini-slots 15, 20 and 25 acting as a finite sized Contention Queue;
2) Data and Control Window consisting of a single DQ Data and Control Frame; and,
3) Feedback Window, consisting of the DQ Feedback Frame with Synchronization Beacon.

A synchronization beacon may be transmitted to all stations prior to the start of each segment from which all stations must synchronize with for every transmission frame so that they may participate in the DQSS. The DQ Feedback Frame and associated Synchronization Beacon can come from any node within the DQSS, but is always sent by a single node at any given time and from which the node is typically chosen as one of a set of nodes designated for accessing gateways beyond the DQSS. Within a wireless environment, this central point would normally be referred to as the Base Station, Access Point, or Hub; the DQWA nomenclature for this central authority may be Cluster Head.

Variable length DQ Messages may be segmented into multiple data slots without requiring any further overhead. Qualities of Service (QoS) Priorities are available and it may be possible for a higher priority DQ Data & Control Frame to preempt a lower priority DQ Data & Control Frame during transmission within a period of one DQ Message. Segments may be allocated to a specific station thus providing time-division-multiplex (TDM) channels, commingled with normal DQ Frame traffic. The overall utilization within a wireless environment, i.e., ratio of data content to the channel capacity ranges from over 95% down to 80%; depending upon frame size and overall network utilization.

As mentioned in above, because access to communication within a DQSS consists solely of member nodes, the entire contents within a MAC layer frame, including the header, may be encrypted; thus ensuring the both security and privacy. The purpose of the CW's ARS is twofold:

1. To afford current members of the DQSS with an opportunity to request communication privileges with one or more of the other nodes (including the Cluster Head) within the network; and
2. To simultaneously mitigate the potential for MAC & Data Payload collisions and hence, dropped frames resulting from corruption.

The latter is achieved by limiting the contention for access to the channel to a finite and predictable period of time. With the exception of the Cluster Head, all nodes may utilize this mechanism in order to access the MAC & Data Payload segment of the DQ Transmission Sequence. The ARS Segment 10 may be divided into three (3) sub-parts, termed, Mini-Slots (MS) 15, 20 and 25 as shown in FIG. 35.

The collision resolution process referenced above may utilize unique patterns transmitted by each soliciting device and a summation of those patterns in the event of a collision as a means for detecting collisions. The operation of DQWA is based on the m-ternary feedback information on the state of each of the mini-slots 15, 20 and 25. The Cluster Head may be able to distinguish between the three states: Idle, Success, and, Collision, for each mini-slot; as this information may provide protocol rules at the end of each frame. Each node may be assigned a unique bit pattern that has the property that when two or more ARS 10 collide, the pattern of the overlapping signal is distinguishable from the original pattern of any single ARS 10; hence, the Cluster Head can detect the collision.

Figure 36:
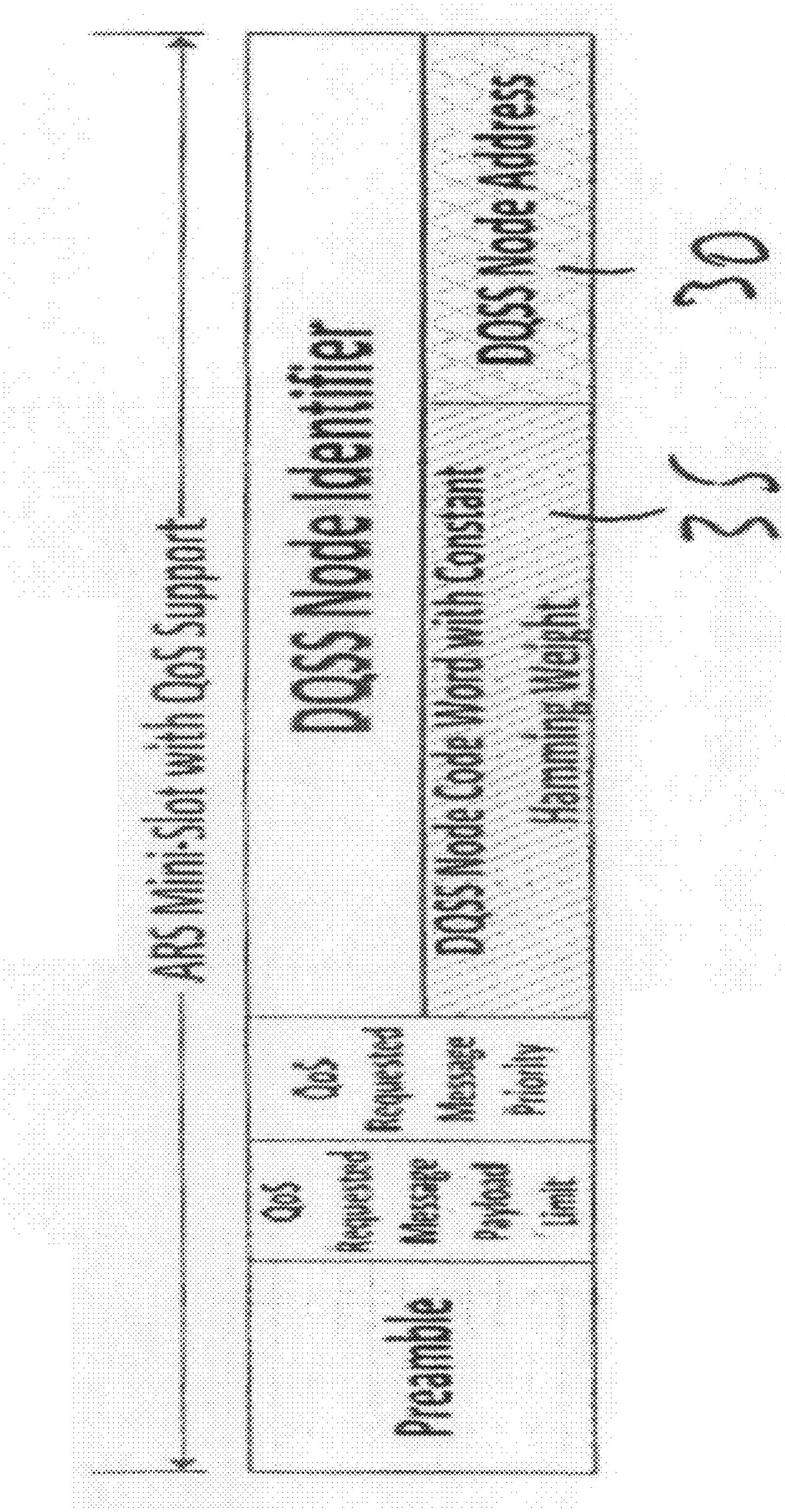
FIG. 36 depicts an exemplary embodiment according to the present application.

In one exemplary embodiment, patterns are binomial coefficients; however, this number may be modified to meet the requirements of the targeted environment. Each node accepted into the network is assigned both a Node Address 30 and a constant size Code Word 35 of constant Hamming Weight as shown in FIG. 36.

When a collision does occur, and particularly within an RF environment, it may be possible to determine that a collision has occurred since the collision may make the interpretation of the combined signal unintelligible. Further, even if the resultant collided signal does result in an intelligible result, the resulting Hamming Weight may be something other than the selected constant value. When taking into account that the correct associated DQSS node address must accompany the code word of constant hamming weight, the detection of a collision is possible.

DQWA may have an additional validation mechanism within the DQ Feedback Frame that protects against the unlikely occurrence of an illegitimate, but valid Code Word and DQSS Node Address combination resulting from a collision.

The aforementioned ternary decision described above may be subsequently determined as follows: Idle (i.e. no signal in ARS Mini-Slot)—Received Signal is below the RSSI (Noise) Threshold; Success—A demodulation resulting in the correct hamming weight and correct code word value and node address combination and again validated within the DQ Feedback Frame; Collision—Any signal detected above the noise (RSSI) threshold not resulting in a translation into the digital domain of a code word with the correct hamming weight and correct code word value and node address combination.

Figure 37:
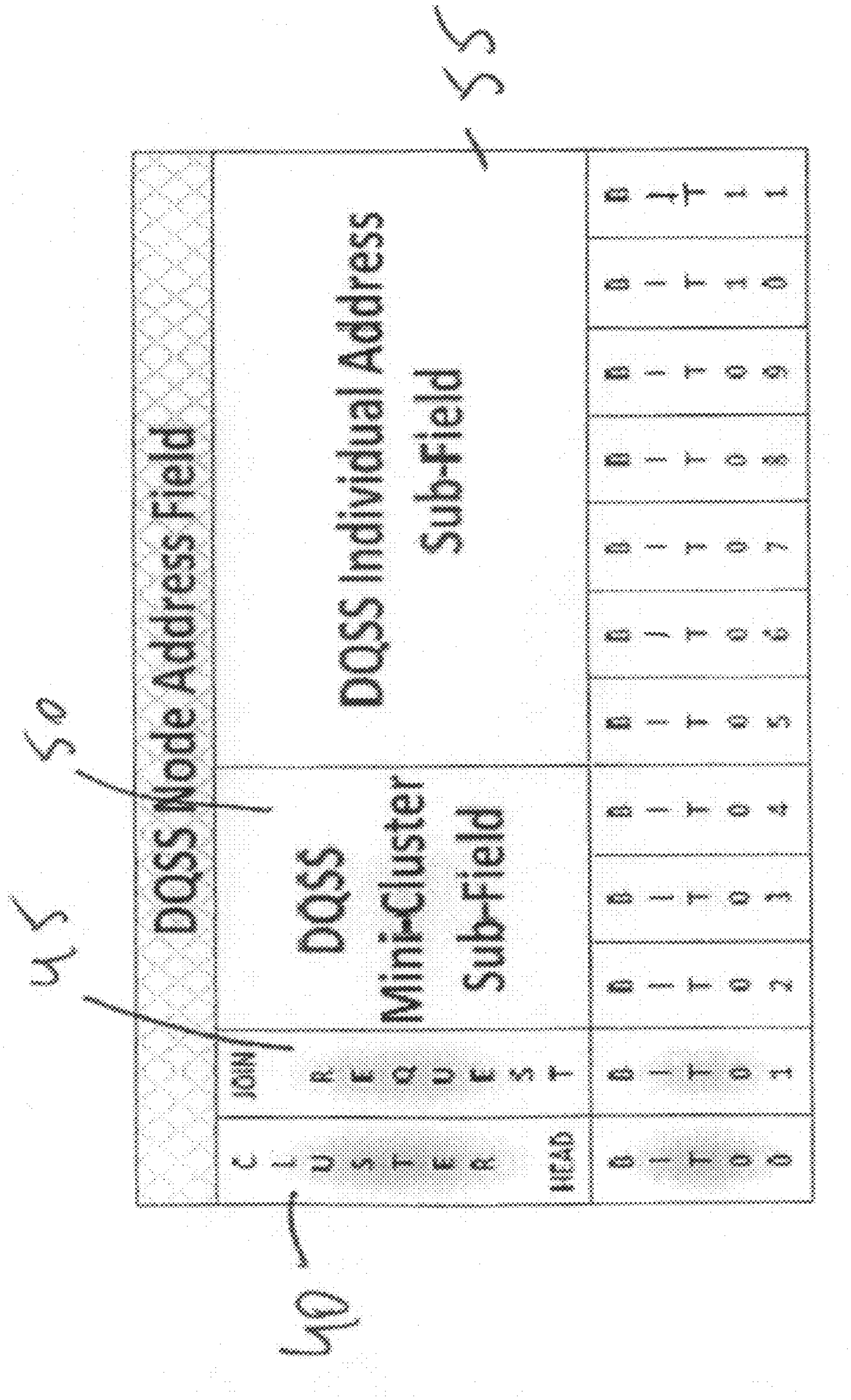
FIG. 37 depicts an exemplary embodiment according to the present application.

The Cluster Head may respond with the collision results as part of the DQSS Management Segment in order to clarify any potential ambiguities. Standard DQSS Network addresses may be 12-bits in length, with the lower 10-bits assigned for the dynamic portion of a valid address; as the upper two bits have special meaning. Both bits along with the rest of the DQSS Network Address are shown in FIG. 37. Referring to FIG. 37, a DQSS Node Cluster Bit 45 may be set to zero during the ARS.

The Most Significant Bit (MSB) of the address is reserved for the Cluster Head. This is particularly helpful if the Network Topology moves and the Cluster Head moves with it. Thus, allowing any node to maintain its original identity both before and after assuming the duties of the Cluster Head. In this way, the DQSS table maintains consistency regardless of which node is currently in charge of the network.

A DQSS Node Join Request Bit 45 may be used by nodes wishing to join the network. In order for an unknown node to be considered for admittance to the DQSS, it may be configured to satisfy the following two conditions:

1) The "Join Request" Bit 45 as shown in FIG. 37 must be set within the DQSS Node Address Field. The Join Request Bit 45 allows for parts to be installed within a particular network architecture with little to any actual configuration in that "newly" installed parts can automatically request for inclusion in the desired vehicle's DQSS.
2) The "DQSS Mini-Cluster" Sub-Field 50 must set '7' (i.e. "111 b").

The "DQSS Individual Address" Sub-Field 55 may be a value between '0' and "127" (i.e. a span of 128-values). The DQSS Mini-Cluster Sub-Field 50, this is an important field in that it explicitly affords specific portions of a DQSS to be segmented into individual address spaces for the purpose of multi-cast addressing as well as enabling CAN sub-networks within a specific DQSS. The addition of a Message Bit to the DQSS Node Address Field (as alluded to in the previous section) would enable further enforcement of messages being restricted to specific CAN sub-networks.

The DQSS Individual Address Sub-Field 55, these seven bits are used for assigning individual addresses, with any value between '0' and "126" assignable for an individual DQSS Network Address. The only time "127" may be used during the ARS is during a "Join Request." As "127" is otherwise set aside for "Directed Broadcasts" and regular "Broadcasts" for all Mini-Cluster Sub-Field values except for '7' (i.e."111b").

A key component of the DQ Service Set concept is network security and the rules by which nodes may become members of a specific DQ Service Set. A DQSS can operate in one of three operational modes listed below the operational modes listed in decreasing order of centralized membership control: Static Association Mode; Semi-Manual Association Mode; Promiscuous Mode. Each of the modes will now be individually discussed in detail.

In Static Association Mode, the DQSS is completely preconfigured. New nodes may not request to join and can only become part of the DQSS either by directly adding nodes to an existing DQSS Configuration Database or by installing a completely new DQSS Configuration Database containing the desired nodes. In response to the fact that a DQSS configured in Static Association Mode cannot add nodes in real time (doing so only through configuration); any attempt to submit a DQSS Membership Request Code Word during the ARS segment will be ignored.

A DQSS configured to be in Semi-Manual Mode has all of the capabilities of a Static Association Mode DQSS as well as the additional ability to add nodes in real time. There are two methods for which a node may acquire inclusion within a DQSS configured in DQ Semi-Manual Association Mode. The first method for acceptance for a given node into a DQSS while in DQSS Semi-Manual Association Mode is via manual configuration as part of a DQSS Configuration Database. The second method utilizes a two-step process for any node outside of the current DQSS membership and described below:

1) First, the Candidate Node must issue a request for DQSS Inclusion.
2) Second, an external confirmation of the request from either an operator (i.e. service technician or factory installation personnel) or configuration robot utility must explicitly accept the Candidate Node into the DQSS; presumably based upon some criteria established for admission.

It is the latter act that serves as the basis for the moniker, "DQSS Semi-Manual Association Mode" since confirmation of inclusion requires an explicit action from an external source.

A DQSS configured to be in Promiscuous Association Mode has two methods for DQSS membership inclusion. As with all modes, the first method for inclusion into a DQSS is through configuration. The second method for inclusion into an existing DQSS is similar to the second inclusion method listed for DQSS Semi-Manual Association Mode; however, no operator intervention is required except for the case of an operator explicitly desiring to exclude a node from the DQSS.

Thus, the only time external intervention occurs during a DQSS operating in Promiscuous Association Mode is when an operator wishes to explicitly "blacklist" a candidate node; adding it to either a permanent blacklist or a blacklist that can be aged out. An example of a situation in which permanent blacklisting may be desired would be if a paid subscriber for XM Radio or other paid electronic subscription service was delinquent in paying their subscriber fees and/or had exceeded their usage. The subscriber could then be explicitly blacklisted until they brought their account current again and/or purchases additional time. An example of temporary blacklisting could occur as a result of a background task monitoring network usage. If there was a limit as to the daily network activity for a particular subscriber and that subscriber had exceeded their limit, the Candidate Node of the subscriber could be placed on a blacklist that expired whenever their "lease" renewed again. While there are certainly other, potentially more cogent examples, each of the above examples sufficiently illustrates the viability of the blacklist exclusion capability.

Encryption may be used in any mode and can be implemented such that there is little, if any affect, as to how each Association Mode operates. There are two different types of encryption used within DQWA: Encrypted Private Key Mode; and Encrypted Public Key Mode. Both of these encryption methodologies will now be discussed in relation to their effects on operating modes. A DQSS configured to be in Encrypted Private Key Mode utilizes a symmetric encryption methodology with respect to both encrypting outgoing messages and decrypting incoming messages. Because both sides know what the decryption algorithm is, both sides may transmit the entire message encrypted, including the header. The clear implication with this mode is that the encryption/decryption algorithms must be done within the PHY in hardware in order for the three operating modes (Static, Semi-Manual, and Promiscuous) to operate oblivious to the effects of encryption performed on the encapsulated data.

A DQSS configured to be in Encrypted Public Key Mode utilizes an asymmetric encryption methodology with respect to the encryption of outgoing messages and decrypting incoming messages. Specifically, the shared (i.e. private) key is used for decrypting messages, but the public key must be utilized for encrypting messages. In this way, the entire message may be encrypted (as is done with Private (Shared) Key Mode), but the public key must be known in order to encrypt an outgoing message. Thus, nodes wishing to "join" the network, regardless of the configuration must "listen" to the Feedback Packet in order to get the Public Key before they can transmit. The cogent point here is that although the public key is broadcast, it is done so in encrypted form using the "Private" key; thus adding an additional layer of security to this process.

One of the advantages to this encryption mode to the automotive industry is that the public key could be provided to all legitimate parts vendors without sacrifice of security. The designated Cluster Head within a specific vehicle could then validate the part as valid or invalid according to the default configuration within the vehicle database. Not only would this serve the purpose of providing security to the vehicle insofar as normal traffic is concerned, it also ensures that only authorized parts may be used for a given vehicle type.

DQ supports Dynamic Clustering for the Control Point of DQ Network Topology. If Dynamic Clustering is disabled, the Cluster Head serves as the static control point of the vehicle DQSS network. Thus, if the static DQSS Cluster Head goes down, so does the DQ Network. However, if Dynamic Clustering is enabled, the Dynamic Cluster Head Designation Order will be included within the DQSS and updated separately on a periodic basis. There are multiple events that may trigger a Cluster Head Transition including traffic loading, hardware and/or power failures, energy consumption fairness criteria, or simply user discretion are a few of the more prominent events. Therefore, in order to support the various types of event triggers, there are multiple selections for the type of Cluster Topology configuration. The different Cluster Topology configuration types are listed below:

Clustering Disabled—The network is complete static, with one and only one node designated as the central control and arbitration point. Thus, if the Cluster Head fails, then the overall network connectivity also fails.

Clustering Enabled for Backup Only—So long as the network is operating normally, the network is completely static; with a single node designated as the Cluster Head. However, in the event the designated Cluster Head fails, a succession of backup Cluster Heads have been previously identified within the DQSS Table and thus assume the role of the Cluster Head according to their priority order and online status (i.e. the node that is both "online" and has the highest designated priority status becomes the Cluster Head if the current Cluster Head fails; if the highest designated priority status node is not online then the duty falls to the next lower designated priority status node). In the event there are no nodes that are online and have been designated as a backup Cluster Head, the network connectivity fails.

Limited Clustering Enabled—Normal Clustering is enabled for the network with this setting; however, only a limited set of designated nodes may participate as Cluster Heads.

Clustering Enabled—Normal Clustering is enabled for the network, with all nodes eligible for Cluster Head designation.

As alluded to above, for clustering to occur within a DQSS not only must the overall Cluster Topology be specified, but so must the Clustering Methodology.

At present there are three distinct Clustering Methodologies: 1. Static Clustering; 2. Traffic Flow Clustering; and 3. Traffic Flow with Topology Coverage Clustering.

1) Static Clustering

Regardless of the setting of the Cluster Topology for a given DQSS, if the Cluster Methodology is set to "Static Clustering", then Dynamic Cluster is completely disabled. This is the only setting allowed for the "Clustering Disabled" and "Clustering Enabled for Backup Only" Cluster Topologies. If this setting is used for either the "Limited Clustering Enabled" or "Clustering Enabled" topologies, then the net effect is to force the overall network topology into that of "Clustering Enabled for Backup Only".

2) Traffic Flow Clustering

Traffic Flow Clustering enables the Cluster Head to be located at the node providing the most efficiency with respect to being a "gate keeper" of the traffic flow. Because all communication and control is distributed and is not routed through a central spoke in order to communicate with other nodes within the DQSS, the only real advantage to the Cluster Head moving as the flow moves would be if the gateway can move with it. Meaning, the Cluster Head nodes have dual functionality with one port servicing the DQSS and other ports servicing one or more gateways.

3) Traffic Flow with Topology Coverage Clustering

Traffic Flow with Topology Coverage Clustering enables the Cluster Head to be located at the node providing the greatest coverage for the current traffic flow. The distinction between this mode and standard "Traffic Flow Clustering" is that the former does not take into account the overall range of coverage of the client nodes within the DQSS.

Similar to standard "Traffic Flow Clustering", because all communication and control is distributed and is not routed through a central spoke in order to communicate with other nodes within the DQSS, the only real advantage to the Cluster Head moving as the flow moves would be if the gateway can move with it. Thus, as above, in order for this mode to be effective, Cluster Head nodes must have dual functionality with one port servicing the DQSS and other ports servicing one or more gateways. The Cluster Head distributes the DQSS table on a periodic basis. No node may communicate with another node unless both nodes are contained within the same DQSS.

Because of the strict adherence to this policy, in order for a node to join and subsequently communicate with other nodes, including the Cluster Head, within the DQSS, the following sequence of events may occur:

a) The Cluster Head may explicitly acknowledge and admit a node for inclusion into the DQSS;

b) The Cluster Head may then add it to the DQSS and perform either a complete or partial DQSS update of the DQSS Table to the nodes within the DQSS.

The Cluster Head may first admit the node in the network and then secondarily inform the other nodes in the DQSS of the joining node's admission into the DQSS. The format of the DQSS Table includes the following:

1) DQSS Configuration Data; providing information specifying the functional and operational makeup of the DQSS. Information included would be the DQSS Mode (i.e. Static, Manual, Promiscuous, Promiscuous-Shared Key), Encryption Indication, DQ Gateway Information, Maximum DQ Frame and DQ Packet Sizes;

2) 48-Bit MAC Address of every Node within the DQSS;

3) 12-Bit DQSS Address; this address is assigned by the Cluster Head to the individual nodes within the DQSS as a means of reducing the amount of overhead within the transmission stream;

4) Static Sized Code Word, assigned by the Cluster Head, and used for Access Requests to the Transmission Queue. This value is coupled with the DQSS Address on all access requests;

5) Active or Inactive Indicators for Every DQ Member.

Given that the primary purpose of the DQSS Table is to maintain the integrity of the network, a DQSS Table should be viewed as an Object Oriented Encapsulation of a specific DQ Network.

The bandwidth in DQWA may be divided into fixed-size segments and groups of contiguous segments are allocated to each DQ Frame but many applications, such as a fuel injection module would be better served with the equivalent of a TDM channel. DQWA supports this feature; a node requests that a segment be allocated on a recurring basis resulting in an isochronous (TDM) channel of the desired bandwidth. This feature is of true significance since it means that DQWA can satisfy with equal facility both packet and fixed-bandwidth requirements.

Each DQ Data & Control Frame contains the total number of bytes within the frame at the beginning of the header; thus non-essential devices may go into a power save sleep mode for the period of the DQ Data & Control Frame transmission; awaking in time for the DQ Feedback Frame and inclusive DQ Transmission Beacon.

There is no congestion in a DQSA network thus networks may be designed for average loading of 90%. The surges over 100% that cause chaos in conventional routers just mean that the distributed queues get longer, temporarily.

There are no lost packets except for those lost due to Line Error. If only a single node has packets to send, that node can utilize 100% of the available capacity, when a second node desires to transmit, the available capacity is split automatically without any central control input, evenly between the two stations. And so on for an arbitrary number of stations. Priorities can be utilized to negate this inherent fairness.

The distributive and non-static control aspect of DQWA affords DQWA to be used "As Is" within environments requiring mission critical and/or fail-safe architectures and without any additional redundancies in the network. Unlike conventional Hub-and-Spoke architectures, the current DQWA control node within a given DQWA network may fail without affecting the communication abilities of the remaining nodes within the DQSA network. In short, DQWA eliminates the single point of failure, which is common in all commercial network architectures deployed today. This is huge benefit that Mission and Safety Critical applications a built-in mechanism within the network architecture for supporting their specific application. A DQWA network becomes part of the Mission and/or Safety Critical Solution and not another problem for which a work-around must be found (usually involving duplicate and/or alternative hardware and communication paths).

The distributive and non-static (i.e. transitional) control aspect of DQWA affords DQWA to be used "As Is" within environments requiring mission critical and/or fail-safe architectures (like that necessitated within the automotive domain) and without any additional redundancies in the network. Further, given the increasing security needs of automotive onboard network devices and the ubiquitous and pervasive nature of CAN; DQWA would be an excellent complimentary technology for wireless CAN networks; particularly as a wireless CAN backhaul topology.

Distributed Queuing Wireless Arbiter (DQWA)

Figure 38:
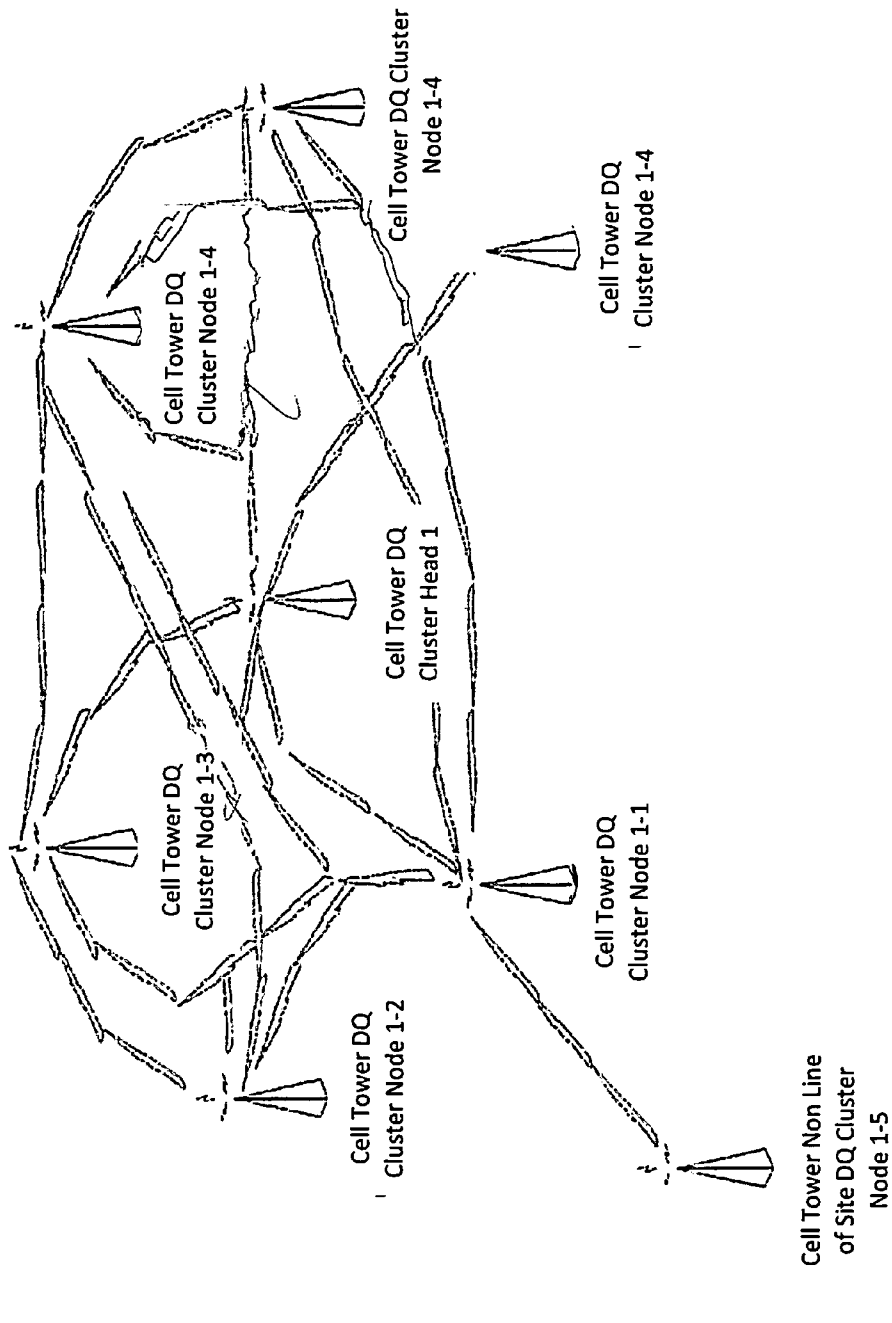
FIG. 38 depicts an exemplary embodiment according to the present application.
Figure 39:
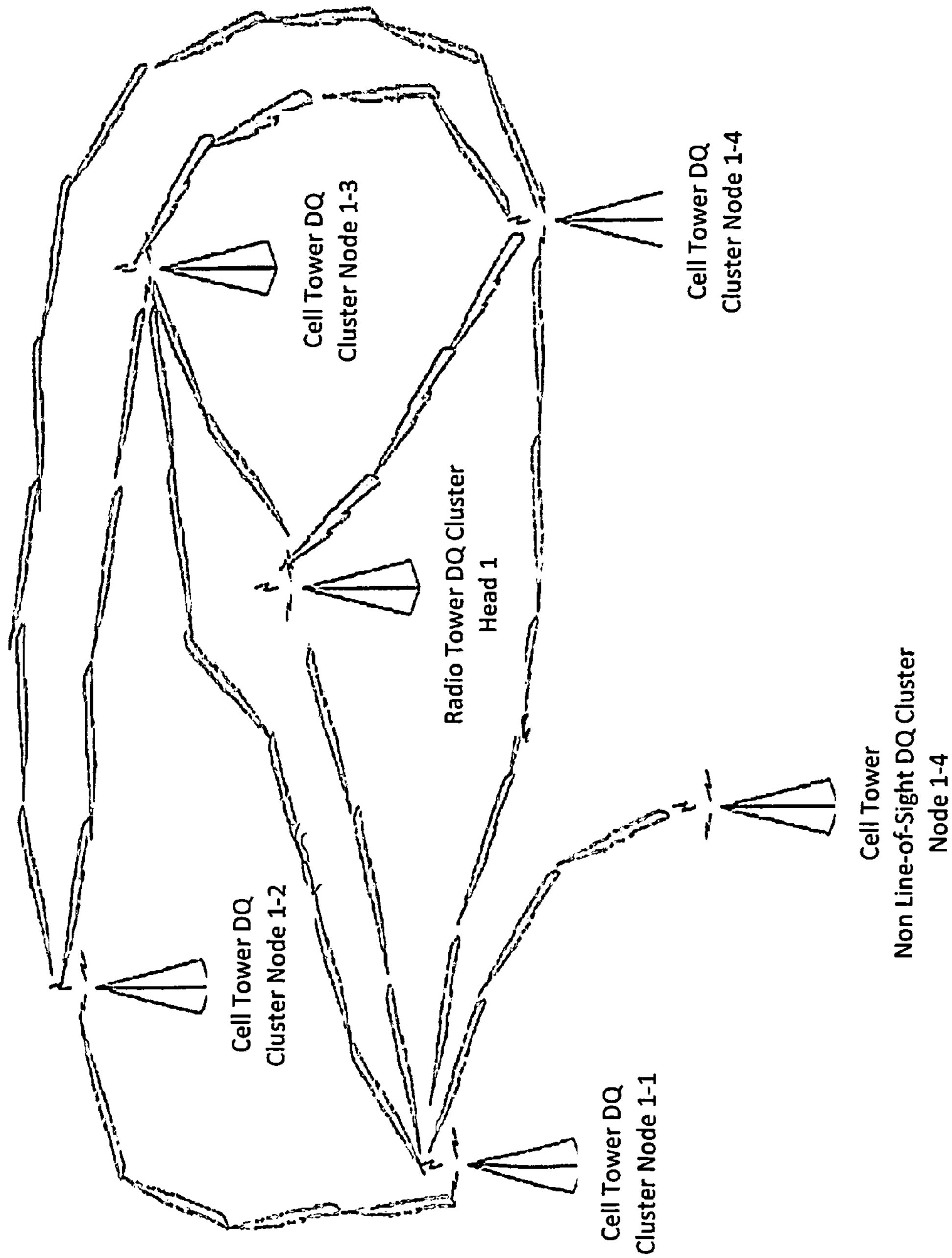
FIG. 39 depicts an exemplary embodiment according to the present application.

Referring to FIGS. 38 and 39, DQWA is a broadcast medium MAC Layer Protocol and PHY Interface that is carrier independent and is specifically designed to be a wireless back-haul solution for the transportation of both mobile telephony data and TCP/IP network data.

DQWA may provide the following advantages over the systems known in the art:

1) Non-LoS Support (requires Dual Antenna)
2) Increased Bandwidth Utilization—bandwidth efficiency up to 95%.
3) Organic Network Organization (capability to assemble and grow automatically)
4) Built-in Redundancy of Network Control Mechanisms
5) Direct Peer-to-Peer communication for nodes within same service set (i.e. local network); meaning no retransmission by central control required.
6) Built-in capability for energy efficiency.
7) No physical network size restriction (can be adapted for any number of nodes).
8) Carrier and Modulation independent—designed for adaptation to virtually any carrier, modulation, and data rate.

Figure 40:
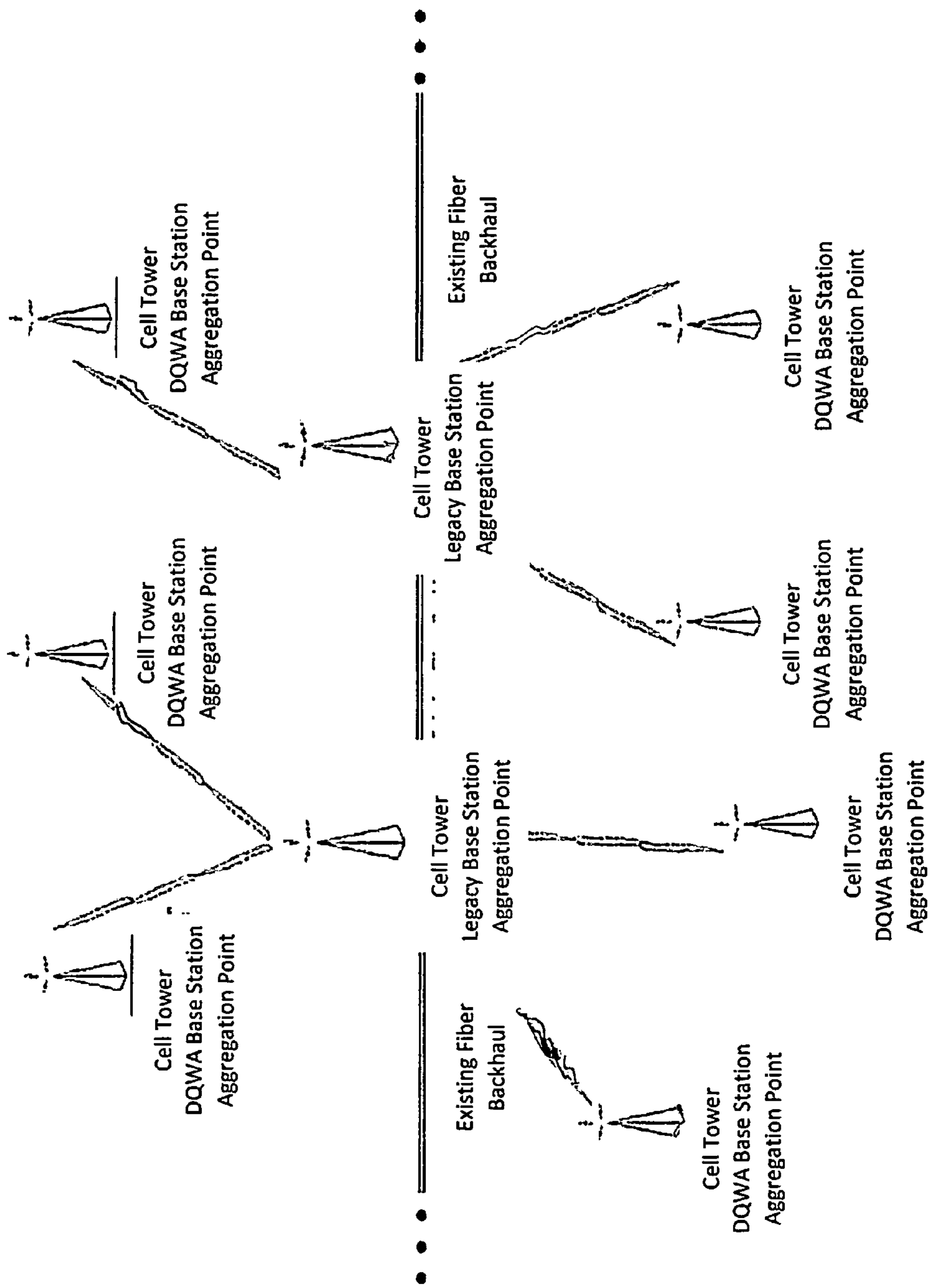
FIG. 40 depicts an exemplary embodiment according to the present application.
Figure 41:
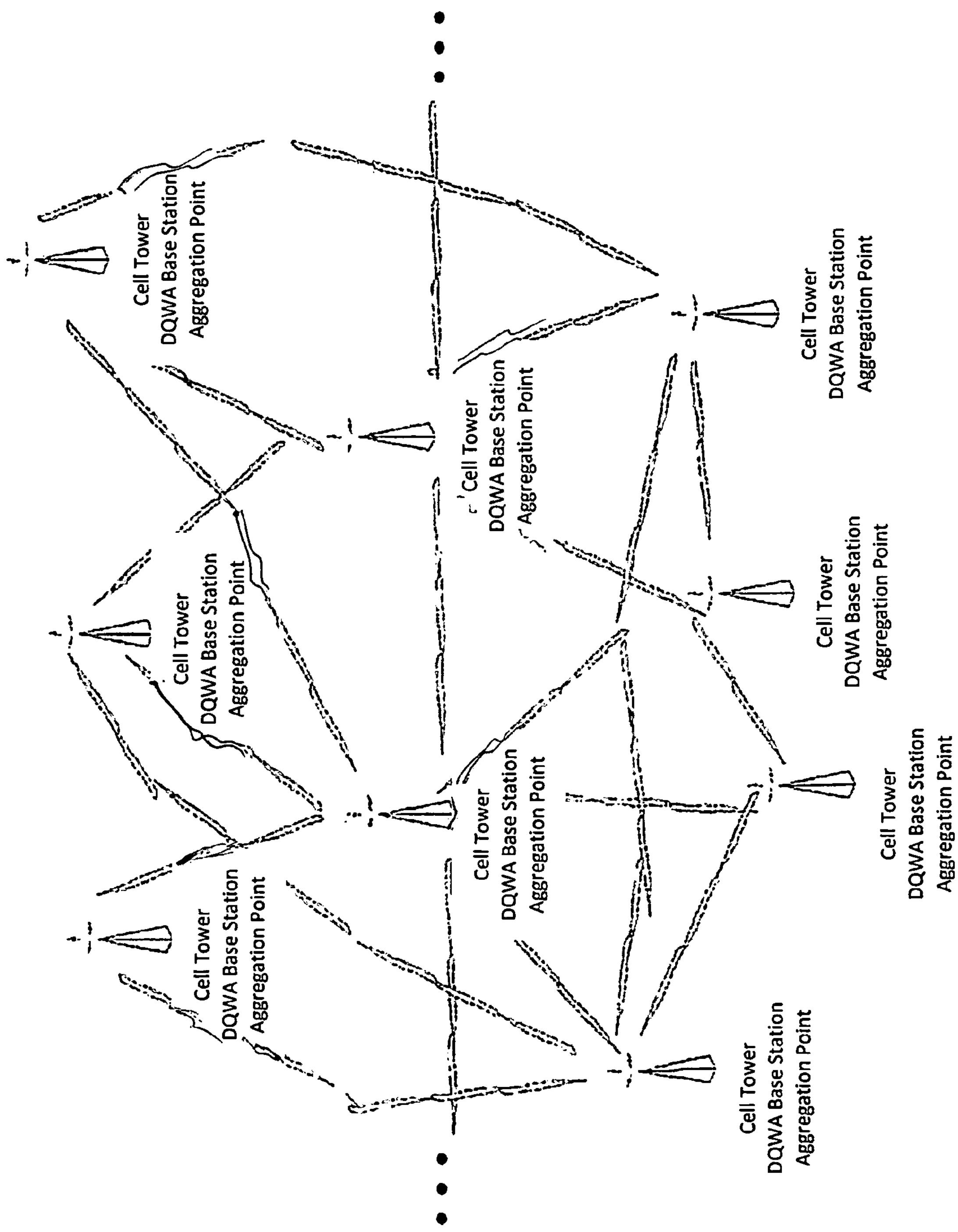
FIG. 41 depicts an exemplary embodiment according to the present application.

Referring to FIGS. 40 and 41, DQWA may allow backhaul providers to quickly augment existing infrastructure with equipment that is easy to install and configure (self-configuring if enabled) while being more efficient than other comparable solutions (such as Wi-Max).

DQWA Backhaul Technology may be an alternative to both traditional Point-to-Point (P2P) backhaul and Star Topology solutions. With a DQWA system, the data moving between a Micro-cell Aggregation Point (termed, Cluster Node) and the Macro Cell Aggregation Point (termed, Cluster Head Node) may pass through a neighbor Micro-cell Aggregation Point before reaching the Macro Cell Aggregation Point. This 'multi-hop' function provides an extended array of data routing options to overcome LoS restrictions from that of a traditional P2P or even Star Topology Solution.

The advantages of a DQWA backhaul solution are numerous and sizable. Of primary importance is the potential ability to deploy Pico-cells wherever and however the carrier desires without concern for LoS limitations or fiber/copper run cost considerations. With Siting and backhaul comprising the large majority of pico-cell deployment costs, DQWA may bring a key CAPEX reduction to the operator. DQWA systems may reduce the average RF link distances; hence reducing the radio & antenna costs and further reducing backhaul CAPEX. And as DQWA systems select the 'best-path' route, network reliability is increased and OPEX is reduced. Reliability may also be gained through the flexible nature of DQWA as a result of the fact that the Micro Cell Base Station does not need to be a single fixed node and may in fact transition from node to node within the Pico-Cell. Thus, allowing automatic recovery if the primary Micro Cell Base station should fail.

Figure 42:
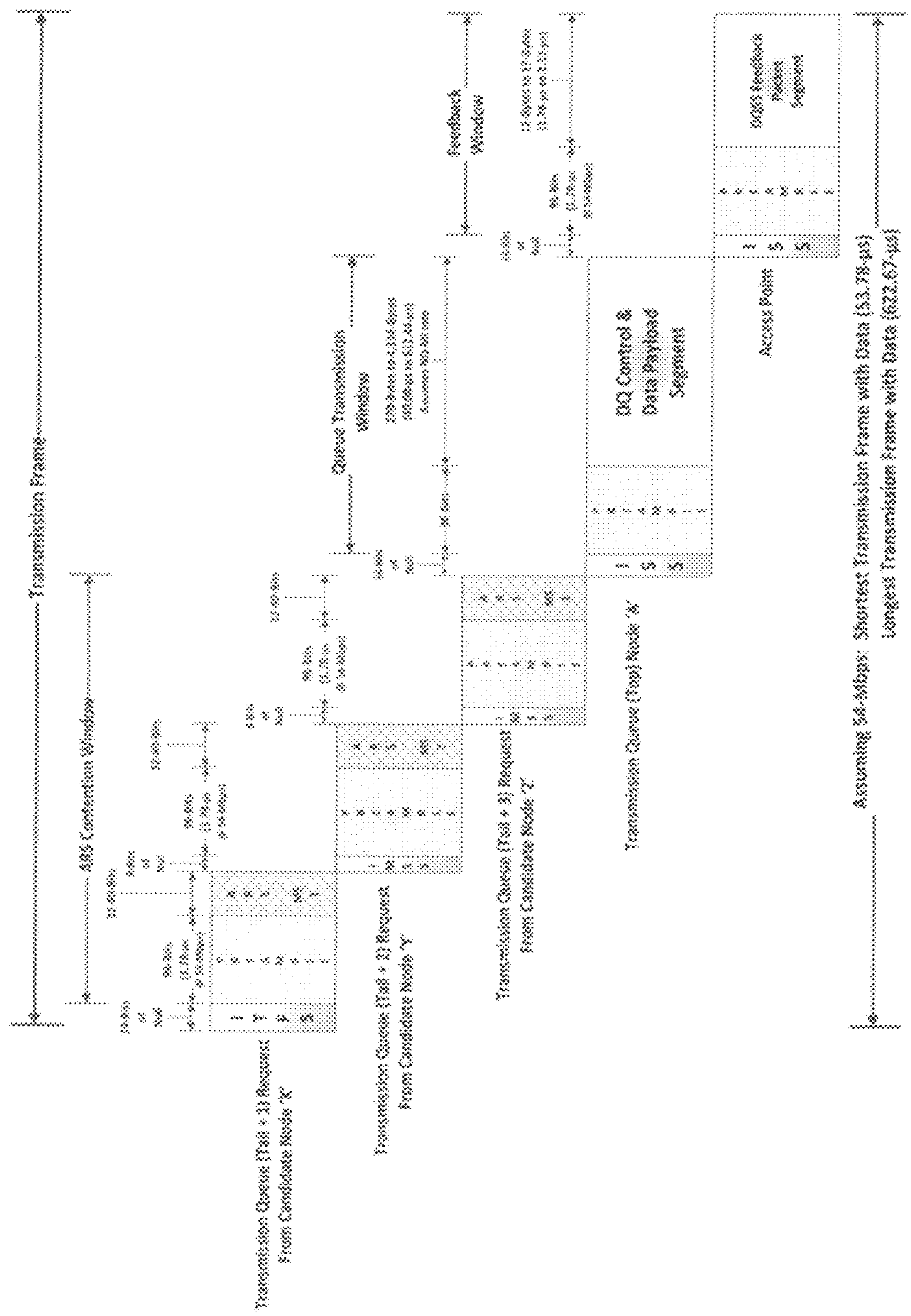
FIG. 42 is amended and replaced by FIGS. 42*a*, 42*b*, 42*c* and 42*d* depicting an exemplary embodiment according to the present application.
Figure 42A:
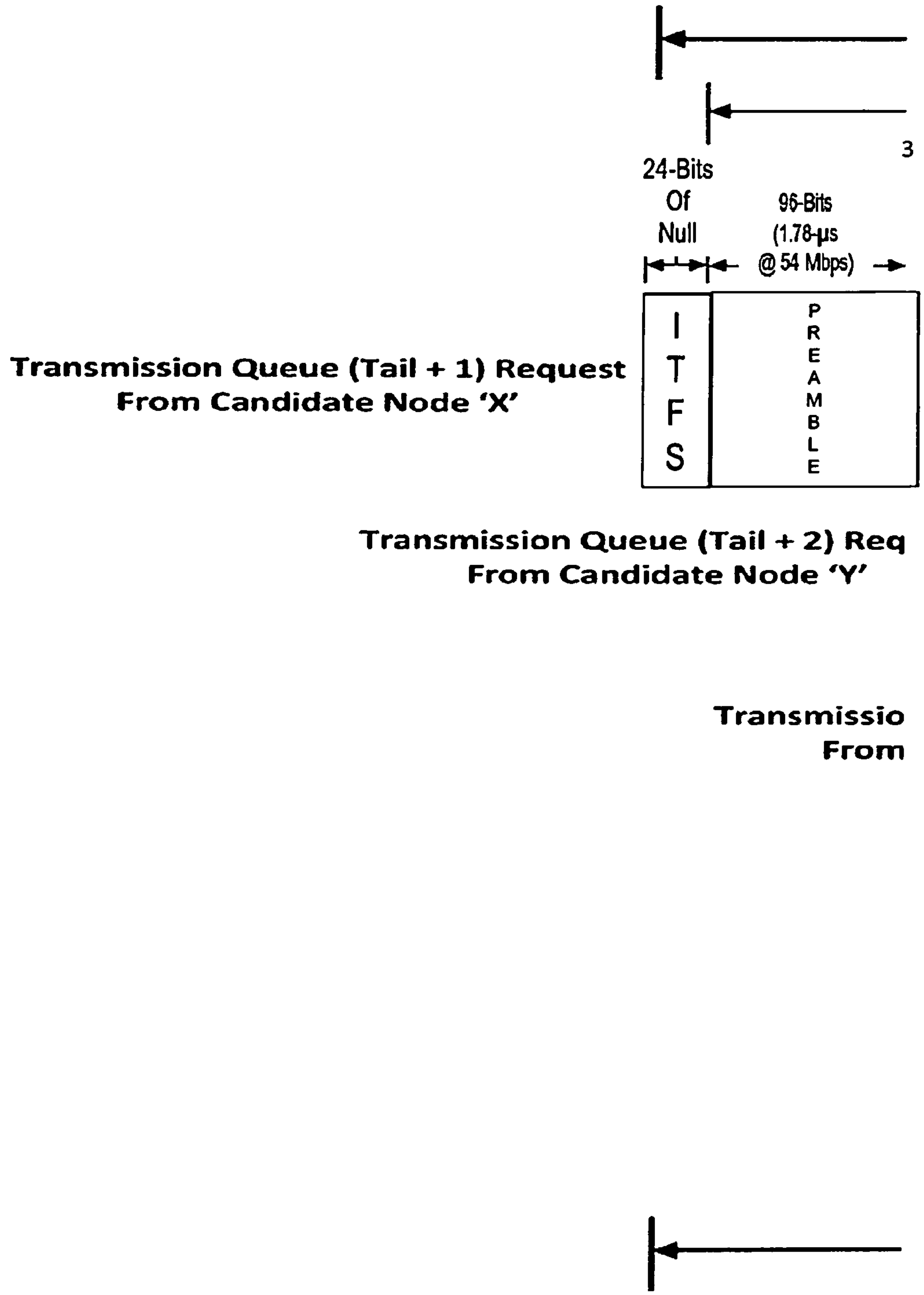
Figure 42B:
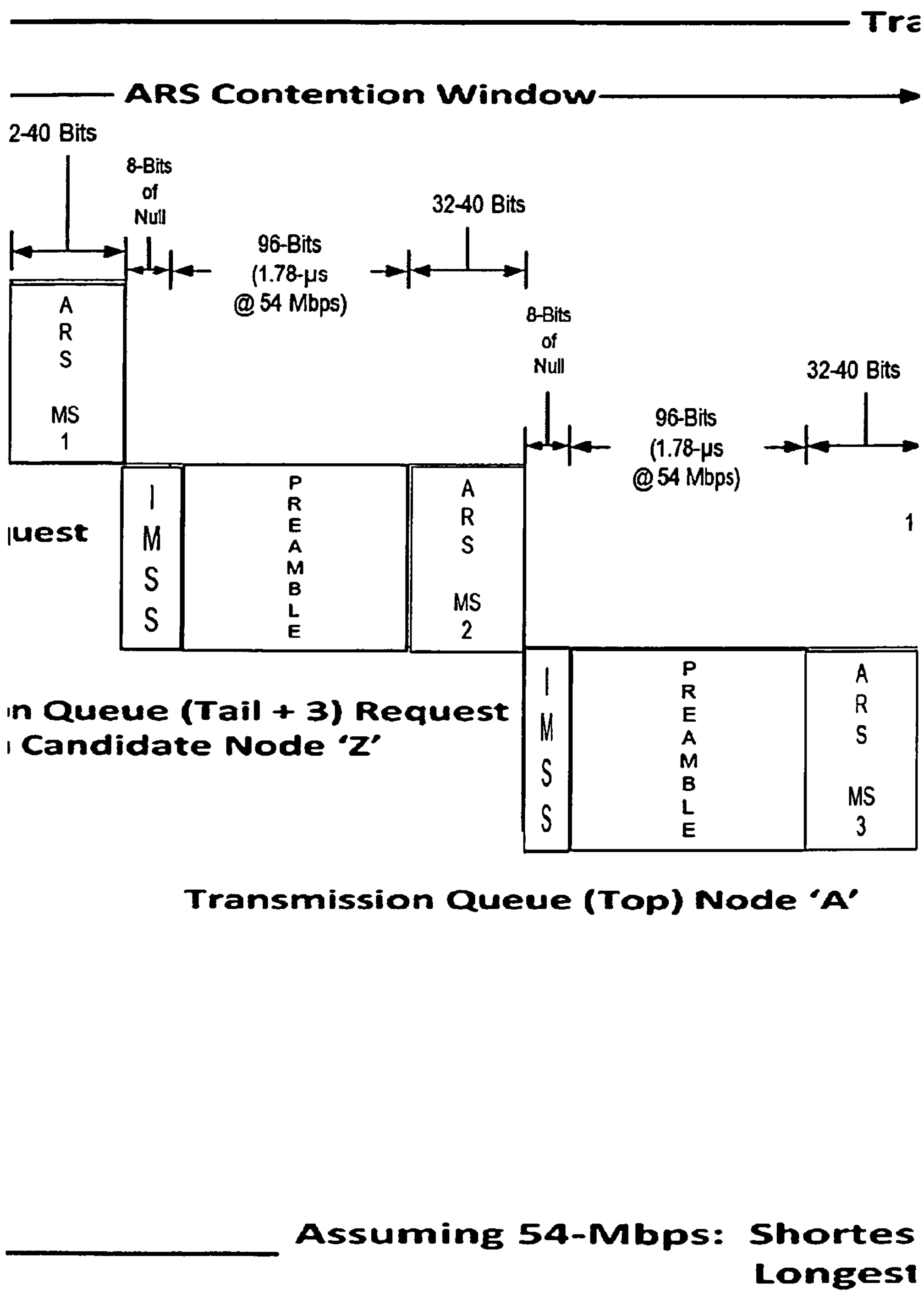
Figure 42C:
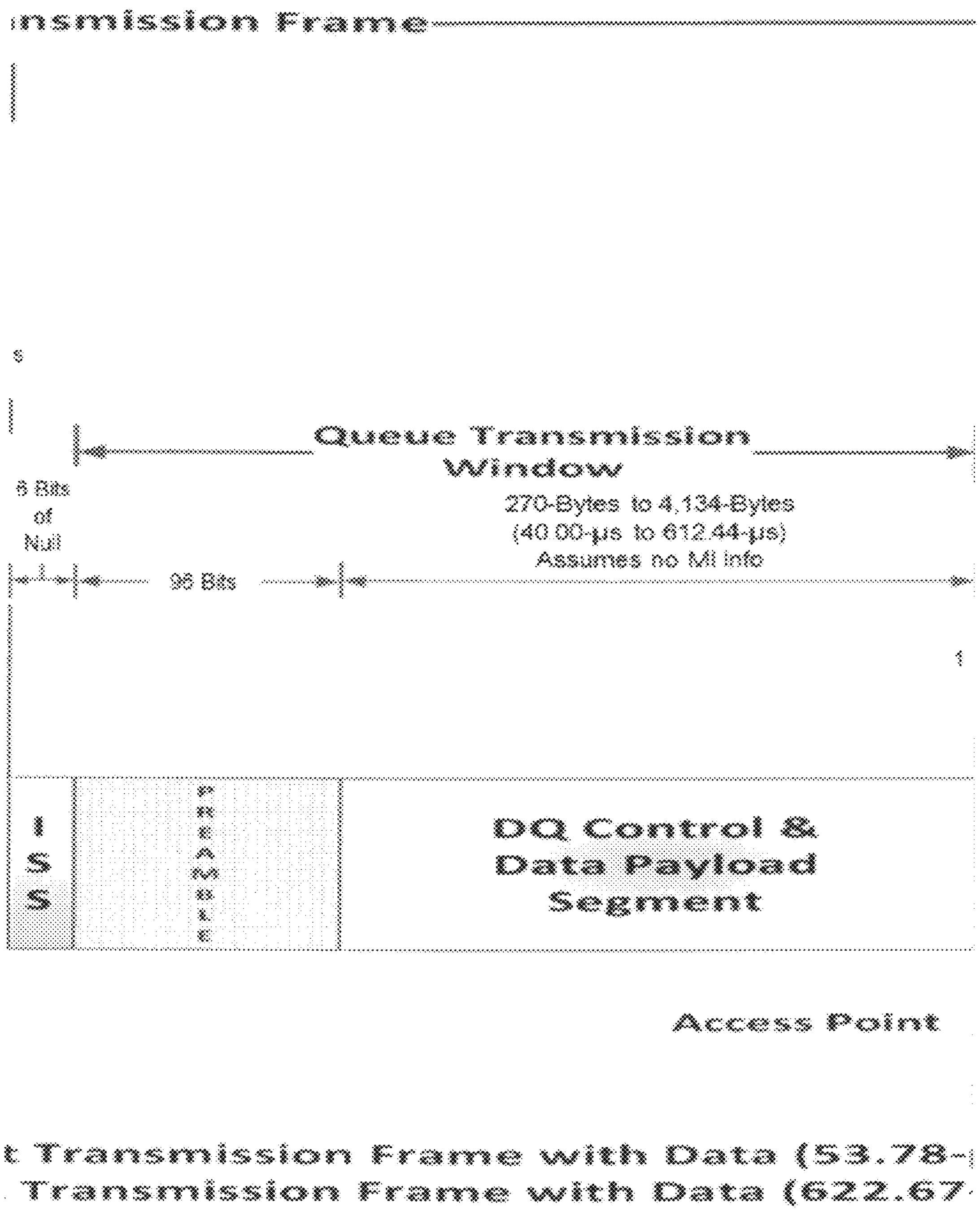
Figure 42D:
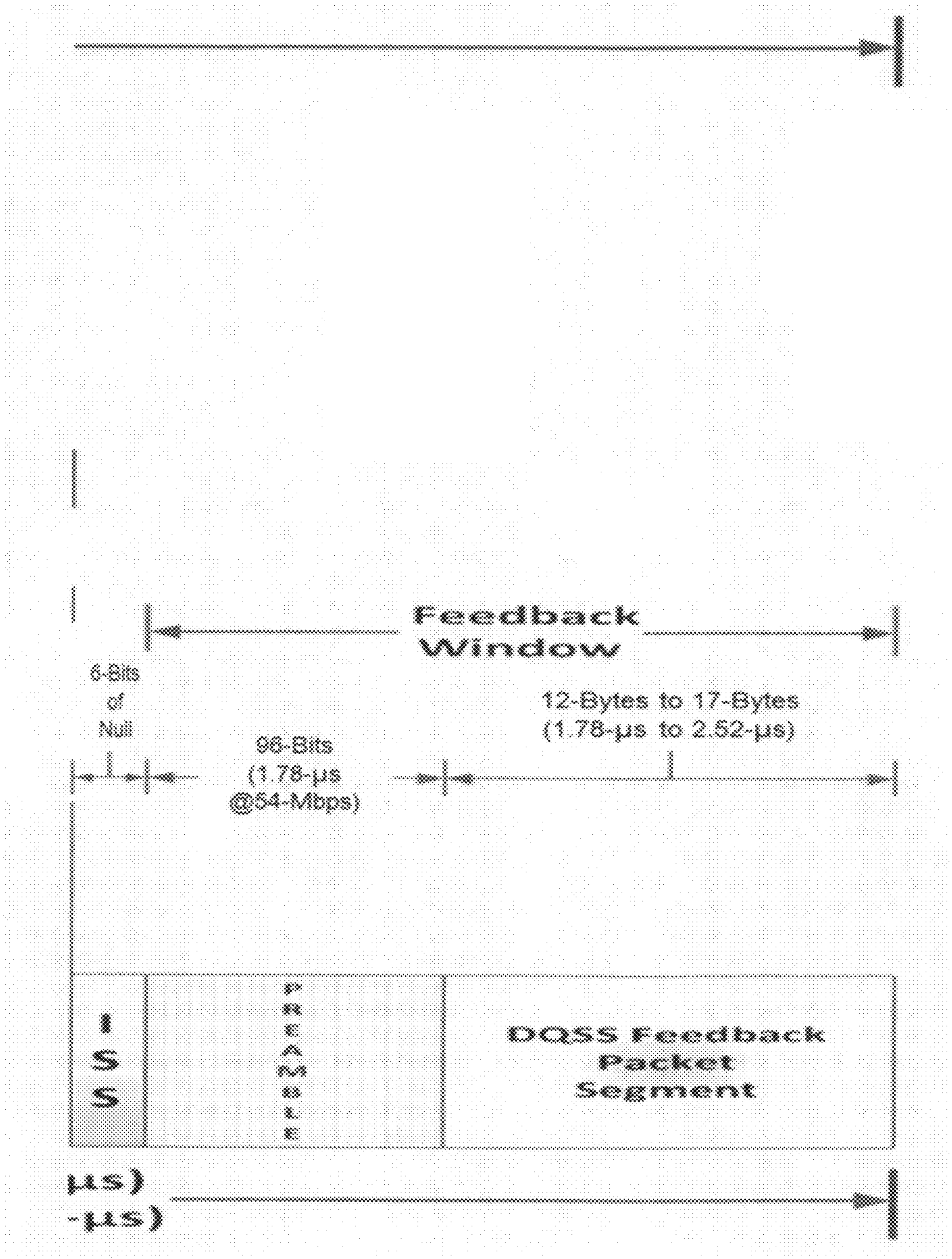

FIG. 42 depicts an exemplary embodiment of DQ Transmission sequence according to the present application.

DQWA—Common Terms:

Access Request Sequence (ARS)—The ARS occurs within the Contention Window Segment and consists of three mini-slots within the segment acting as elements of the Contention Queue.

Cluster Head—The Cluster Head is the central and only arbiter for a specific DQSS.

Cluster Head Master—The preferred Cluster Head within a given DQSS.

Cluster Head Priority—The predefined priority of nodes that may assume the role as Cluster Head.

Cluster Node—Any node within the DQSS that is NOT the Cluster Head.

Contention Queue—FIFO Queue used by DQSS for candidacy into Transmission Queue.

Contention Window Segment—The Cluster Head is the central and only arbiter for a specific DQSS.

Distributed Queuing Service Set (DQSS)—Collection of nodes that are defined to be within a specific DQ Network.

DQ Payload & Control Packet Segment—This segment encapsulates Data and optional Control Information.

Feedback Packet (FBP) Segment—This segment encapsulates Data and optional Control Information from the Cluster Head and serves as a Transmission Beacon for the DQSS.

Transmission Queue—FIFO Queue with Optional Priorities used by DQSS to maintain order of scheduled transmissions.

Transmission Sequence—Term describing the complete sequence of the standard periodic transmission that occurs within a DQSS network. The Transmission Sequence is delineated into three separate and contiguous segments (listed below in the order of their appearance):

Contention Window Segment
Payload & Control Packet Segment
Feedback Packet Segment ARS Contention Window—Refers to the period of time within the DQ Transmission Sequence in which nodes may contend for access to the DQ Transmission Queue.

ARS Mini-Slot—Refers to the period of time within the DQ Transmission Sequence in which nodes may contend for access to the DQ Transmission Queue.

DQSS ARS Segment—Refers to the first segment within the DQ Transmission Sequence, which is when nodes may request access to the DQSS' Transmission Queue.

DQSS Feedback Packet Segment—Refers to third and final segment within the Transmission Sequence, which is where the node acting as the Cluster Head provides feedback to the nodes within the DQSS. This is also where it may preempt both ongoing transmissions as well as upcoming and previously scheduled transmissions in favor of higher priority transmissions.

DQ Frame—Refers to collection of one or more DQ Control and Payload Packets; when application data is included within the collection of packets, the DQ Frame represents a single complete logical unit of encapsulated application data.

DQ Control and Data Payload Packet Segment—Refers to the middle segment within the DQWA Transmission Sequence. This segment can carry both control and payload information within.

DQ Segment—Refers to one of three logically distinct delineations within a DQ Transmission Sequence (listed as follows):

Access Request Sequence Segment;
DQ Control and Payload Packet Segment;
Feedback Packet Segment.

DQ Service Set (DQSS)—Refers to a set of nodes within a DQ Network that share a common peer-to-peer communication medium and are managed by a single authority that utilizes queues to control access to the DQ Network.

DQ Transmission Sequence—Refers the complete sequence of the three DQ Segments (i.e. ARS, Payload, Feedback) repeatedly, consistently, and always occurring in every DQWA transmission.

Feedback Window—Refers to the period of time within the DQ Transmission Sequence in which the Access Point or Cluster Head provides feedback to the nodes within the DQSS.

Queue Transmission Window—Refers to the period of time within the DQ Transmission Sequence in which the node at the top of the Transmission Queue is afforded the opportunity to transmit.

ACK Acknowledgment
ACK_AL Acknowledgment in Active Listening
AL Active Listening
AP Access Point
ARQ Automatic Retransmission/Repeat Request
ARS Access Request Sequence
BEB Binary Exponential Back-off
C-ARQ Cooperative ARQ
CCA Clear Channel Assessment
CDMA Code Division Multiple Access
CFC Call for Cooperation
CRC Cyclic Redundancy Code
CRQ Collision Resolution Queue
CSMA Carrier Sensing Multiple Access
CSMA/CA Carrier Sensing Multiple Access with Collision Avoidance
CTS Clear to Send
DBE Detailed Balance Equations
DCF Distributed Coordination Function
DIFS DCF Inter Frame Space
DPCF Distributed Point Coordination Function
DQ Distributed Queuing
DQCOOP DQMAN for Cooperative ARQ
DQMAN Distributed Queuing MAC protocol for Ad Hoc Networks
DQWA Distributed Queue Wireless Arbiter
DSSS Direct Sequence Spread Spectrum
DTQ Data Transmission Queue
ED Error Detection
FBP Feed-Back Packet
FCS Frame Check Sequence
FEC Forward Error Correction
GUI Graphic User Interface
IMSI Initial Master Sensing Interval
IEEE Institute of Electrical and Electronics Engineers
ISM Industrial, Scientific, and Medical free-license band
ISO International Standards Organization
LAN Local Area Network
MAC Medium Access Control
MACSWIN The MAC Simulator for Wireless Networks
MCR Master Cooperation Request
MCS Message Check Sequence
MIFS Maximum Inter Frame Space
MIMO Multiple Input Multiple Output
MRAC Multiple Relay Access Control
MSP Master Selection Phase
MSS Master Service Set
MSSI Master Sensing Selection Interval
MTO Master Time-Out
NAV Network Allocation Vector
OSI Open System Interconnection
PAN Personal Area Network
PCF Point Coordination Function
PDA Personal Digital Agenda
PLCP PHY Layer Convergence Procedure
PHY Physical Layer
PIFS PCF Inter Frame Space
QoS Quality of Service
RTS Request to Send
SIFS Short Inter Frame Space
SNIR Signal to Noise plus Interference Ratio
SNR Signal to Noise Ratio
STC Space-Time Codes
TDMA Time Division Multiple Access
WLAN Wireless LAN
WWRF Wireless World Research Forum Automotive Industry:

In one exemplary embodiment, the DQWA may be applied in the automotive industry. The DQWA is ideal for applications requiring distributed communication and control, of which the automotive world certainly falls into that category. In short, DQWA adds the ability to simplify intra-vehicle connectivity while expanding overall communication capabilities.

The CAN protocol has served the automotive and related industries well for over twenty-five (25) years; with the original CAN protocol officially released in 1986 followed by the release of CAN 2.0 in 1991. Since then many variants and improvements in CAN combined with the proliferation of automotive onboard microprocessor based sensors and controllers have resulted in CAN establishing itself as the dominant network architecture for automotive onboard communication in layers one (1) and two (2). Going forward however, the almost exponential growth of automotive onboard computing and the associated devices necessary for supporting said growth will unfortunately necessitate an equivalent growth in the already crowded wired physical infrastructure unless a suitable wireless alternative can be provided.

While a wireless implementation of CAN has been produced, it has never obtained real traction within the automotive world. Other alternative methodologies for providing wireless connectivity have been much more pervasive and accepted, but none of them provide anything more to CAN interfaces than a CAN-to-Wireless Bridge; with Wi-Fi, Blue Tooth, and GSM being the primary wireless network architectures bridging to CAN.

Contrary to prior art, present application provides more than simply a wireless extension of CAN in that it does more than extend CAN into the wireless domain (as was the case with CANRF). As pure wireless CAN with no accommodations for heavy utilization would only exacerbate CAN's primary deficiency of starving out lower priority messages; since there would be no way to isolate devices in sub-networks as could be done with a wired infrastructure.

Embodiment presently disclosed remove CAN's deficiency by modifying the newly defined wireless network protocol and architecture, DQWA (Distributed Queuing Wireless Arbiter) to not only extend CAN into the wireless domain, but also addresses CAN's more prominent shortcomings.

Recognizing the proliferation of devices with network connectivity within vehicles is going to continue escalating; it is logical to look for a means to facilitate this expansion without an equivalent expansion in wired infrastructure. Anyone who has looked under the hood of a vehicle from the 70's and then compared that to what is under the hood today must wonder where the space for any additional infrastructure is going to come from.

The same is true for under the dashboard and/or in the trunk with respect to entertainment systems. Consumers want more space, not less; they want their technologic advances without paying the price in either comfort or cost. The only foreseeable path to that end is a wireless one. It is this path that brings fewer wires; lower costs; easier installation; greater capabilities for expansion. DQWA is a solution that provides both security and reliability within a wireless framework, while maintaining CAN's distributed network communication methodology and implicit avoidance of single points of failure within the network.

Given the proliferation of network devices in people's daily lives, it is only logical to deduce a similar growth pattern within vehicles. As that growth pattern continues, it will become increasingly difficult to depend so heavily on a wired infrastructure for providing communication connectivity within the vehicle. Of greater significance will be the proliferation of automotive onboard devices that will be expected to communicate externally; particularly with respect to both personal data derived from the human passengers as well as vehicular data exchanged with vehicular traffic management technology both fixed and potentially with other vehicles. It is clear for many reasons, both because of the physical limitations, difficulty, and expense of installing and maintaining wired bus infrastructures that the necessity of a wireless alternative is inevitable.

The primary weakness in attempting to utilize CAN within a heavily utilized bus is the propensity for lower priority messages to be starved out and hence never sent; or sent too late to be of any use. Obviously, if CAN is to be deployed within a wireless environment then this weakness becomes a severe problem given that it will become difficult for CAN nodes to form a sub-network within the same vehicle; not to mention potential interference from external sources, including CAN nodes broadcasting on the same frequency in nearby vehicles. Even if adequate RF shielding and filtering techniques are utilized within the vehicle chassis to maintain successful RF communication; given the limited number of available frequencies, a methodology would still need to be employed that would facilitate coexistence with other nodes broadcasting on the same frequency within the vehicle; particularly with respect to access to the bus' transmission queue. Also, given the real-time, mission and safety critical nature of automotive communication, reliability and robustness must be key considerations in any deployed networking methodology supporting automotive communication.

Given that by definition wireless communication is ubiquitously broadcast, security becomes a crucial concern. Examples of such concern consists both of those from listening in violating both privacy and network security as well as those attempting to gain unwanted access over the network devices within the network (ex. either by either directly manipulation of the devices or by indirect manipulation via the spoofing of existing devices within the network). Additionally, as more and more automotive modules require intra-vehicle network connectivity, wireless becomes the only viable alternative. The challenge is to enable the transition to wireless connectivity, reliably, safely, and most of all securely. DQWA provides the answer to this increasingly important and difficult problem.

An exemplary Distributed Queuing Wireless Arbiter (DQWA) PHY and MAC Protocol Specification according to the present application is provided next.

"Distributed Queuing Wireless Arbiter (DQWA) PHY & MAC Protocol Specification"

1.0 Objective and Scope

The philosophical premise of this document is to take the DQ Protocol MAC & PHY beyond the theoretical realm and move it squarely into the application and development reality. Resulting from that directive, there are two stated primary objectives for this document.

1.1 Define the Distributed Queuing Wireless Arbiter (DQWA) Protocol

The first objective is to describe and specify the DQWA Protocol MAC & PHY in sufficient enough detail so that any two implementations resulting from the aforementioned specification are 100% interoperable. In fulfilling the first objective, much of this document is spent in fully defining the DQWA Protocol.

While DQWA is designed to outperform most, if not all, current wireless environments including 802.11 based technologies; particular attention is given to honing the DQWA protocol for its initial target market as a Wireless Mobil Backhaul Technology primarily servicing countries without significant copper and/or fiber communication infrastructure. It is with that in mind that the first full draft of DQWA has been designed.

Additionally, the reader will note that while Wireless Mobile Backhaul is the primary target, DQWA also has features specifically designed in to work with and as a replacement for mobile last mile solutions. The premise of such thinking is that deploying a technology that can be used across a broad spectrum of applications (i.e. mobile backbone, last mile, and even WLAN if desired) means lower cost, easier deployment, and greater bandwidth.

Lastly, so much of the world is moving towards automating environments that require mission and/or safety critical applications. It just so happens that the primary concern within these environments is eliminating single points of failure. Whenever a network is involved in such an environment, the only mechanism for achieving that is duplication. Fortunately, because the Cluster Head within a DQWA Network can move, with any node being capable of assuming Cluster Head responsibilities; very little needed to be added in order to take advantage and utilize the distributive nature of the DQWA network for this purpose.

1.2 Provide Technology Plan and Associated Implementation Outline

The first objective is to provide a Technology Plan and associated Implementation Schedule outline that:

- Specify the individual features to be implemented.
- Specify the implementation order of those features.
- Specify which features are not covered within the scope of this document.
- Specify the future direction of the DQWA MAC & PHY Technology.

1.3 Objective and Scope Conclusion

The second objective is to provide a Technology Plan and associated Implementation. The expectation of achieving both stated objectives (i.e. defining the protocol and Technology Plan) will enable consistency for both implementers and users alike.

2.0 Background and Related Information

The Distributed Queuing Wireless Arbiter (DQWA) Protocol is based on the Distributed Queue Switch Architecture (DQSA) developed at the Illinois Institute of Technology. The heart of this technology is a medium access control (MAC) that allows an arbitrary number of stations to share a common communications channel over any distance and operating at any data rate. DQSA can operate over virtually any topology and will also provide a Quality of Service (QoS) superior to any currently available.

The key feature of DQSA is that all control resides in the stations, no central control is required. The network state is maintained at all times by each station in just two (2) binary counters per DQ Service Set (DQSS), providing it with all the information necessary to make decisions as to when to transmit for that specific DQSS. A DQ Transmission Frame is divided into three separate time periods or segments; with the three segments listed below:

1) Contention Window, utilized as part of the Access Request Sequence (ARS) to the Transmission Queue with three (3) control mini-slots acting as a finite sized Contention Queue;

2) Data and Control Window consisting of a single DQ Data and Control Frame; and, 3) Feedback Window, consisting of the DQ Feedback Frame with Synchronization Beacon.

The only "central" control required is that a synchronization beacon must be transmitted to all stations prior to the start of each segment from which all stations must synchronize with for every transmission frame so that they may participate in the DQSS. The Feedback Packet and associated Synchronization Beacon can come from any node within the DQSS, but is always sent by a single node at any given time and from which the node is typically chosen as one of a set of nodes designated for accessing gateways beyond the DQSS. Within a wireless environment, this central point would normally be referred to as the Base Station, Access Point, or Hub.

Variable length packets may be segmented into multiple data slots without requiring any further overhead. Qualities of Service (QoS) Priorities are available and it is possible for a higher priority packet to preempt a lower priority packet during transmission within a period of one Transmission Sequence.

Segments can be allocated to a specific station thus providing time-division-multiplex (TDM) channels, commingled with packet traffic. The overall utilization within a wireless environment, i.e., ratio of data slot content to capacity of channel will range from over 95% down to 80%, depending upon frame size and overall network utilization.

Lastly, because access to communication within a DQSA service set consists solely of member nodes, the entire contents within a MAC layer frame, including the header, may be encrypted; thus ensuring the utmost of both security and privacy.

In addition to the original work done by Graham Campbell, Ph.D., as referenced in [1] and [2], acknowledgements and credit should be given to Luis Alonso, PhD, Jesús Alonso Zárate, PhD, and their research team at the Polytechnic University of Catalonia, Spain. In addition to heavy dependence on their many papers, many of which are published by the IEEE; they have also provided a significant amount of time, feedback, and guidance in defining the DQWA Protocol discussed and detailed within this document. Thus, while every instance is not cited, all relevant documents used as research material have been cited within the index section of this document; with much attention given to the documents directly focused on the protocol, Distributed Queuing with Collision Avoidance (DQCA) (i.e. [4], [5]).

3.0 Glossary of Terms and Acronyms

3.1 Acronyms

ACK Acknowledgment
ACK_AL Acknowledgment in Active Listening
AL Active Listening
AP Access Point
ARQ Automatic Retransmission/Repeat Request
ARS Access Request Sequence
BEB Binary Exponential Back-off
C-ARQ Cooperative ARQ
CCA Clear Channel Assessment
CDMA Code Division Multiple Access
CFC Call for Cooperation
CRC Cyclic Redundancy Code
CRQ Collision Resolution Queue
CSMA Carrier Sensing Multiple Access
CSMA/CA Carrier Sensing Multiple Access with Collision Avoidance
CTS Clear to Send
DBE Detailed Balance Equations
DCF Distributed Coordination Function
DIFS DCF Inter Frame Space
DPCF Distributed Point Coordination Function
DQ Distributed Queuing
DQCOOP DQMAN for Cooperative ARQ
DQMAN Distributed Queuing MAC protocol for Ad Hoc Networks
DQWA Distributed Queue Wireless Arbiter
DSSS Direct Sequence Spread Spectrum
DTQ Data Transmission Queue
ED Error Detection
FBP Feed-Back Packet
FCS Frame Check Sequence
FEC Forward Error Correction
GUI Graphic User Interface
IMSI Initial Master Sensing Interval
IEEE Institute of Electrical and Electronics Engineers
ISM Industrial, Scientific, and Medical free-license band
ISO International Standards Organization
LAN Local Area Network
MAC Medium Access Control
MACSWIN The MAC Simulator for Wireless Networks
MCR Master Cooperation Request
MCS Message Check Sequence
MIFS Maximum Inter Frame Space
MIMO Multiple Input Multiple Output
MRAC Multiple Relay Access Control
MSP Master Selection Phase
MSS Master Service Set
MSSI Master Sensing Selection Interval
MTO Master Time-Out
NAV Network Allocation Vector
OSI Open System Interconnection
PAN Personal Area Network
PCF Point Coordination Function
PDA Personal Digital Agenda
PLCP PHY Layer Convergence Procedure
PHY Physical Layer
PIFS PCF Inter Frame Space
QoS Quality of Service
RTS Request to Send
SIFS Short Inter Frame Space
SNIR Signal to Noise plus Interference Ratio
SNR Signal to Noise Ratio
STC S pace-Time Codes
TDMA Time Division Multiple Access
WLAN Wireless LAN
WWRF Wireless World Research Forum

3.2 Terms

ARS Contention Window—Refers to the period of time within the DQ Transmission Sequence in which nodes may contend for access to the DQ Transmission Queue.

ARS Mini-Slot—Refers to the period of time within the DQ Transmission Sequence in which nodes may contend for access to the DQ Transmission Queue.

DQSS ARS Segment—Refers to the first segment within the DQ Transmission Sequence, which is when nodes may request access to the DQSS' Transmission Queue.

DQSSFeedback Packet Segment—Refers to third and final segment within the Transmission Sequence, which is where the node acting as the Cluster Head provides feedback to the nodes within the DQSS. This is also where it may preempt both ongoing transmissions as well as upcoming and previously scheduled transmissions in favor of higher priority transmissions.

DQ Frame—Refers to collection of one or more DQ Control and Payload Packets; when application data is included within the collection of packets, the DQ Frame represents a single complete logical unit of encapsulated application data.

DQ Control and Data Payload Packet Segment—Refers to the middle segment within the DQWA Transmission Sequence. This segment can carry both control and payload information within it.

DQ Segment—Refers to one of three logically distinct delineations within a DQ Transmission Sequence (listed as follows):

Access Request Sequence Segment;

DQ Control and Payload Packet Segment;

Feedback Packet Segment.

DQ Service Set (DQSS)—Refers to a set of nodes within a DQ Network that share a common peer-to-peer communication medium and are managed by a single authority that utilizes queues to control access to the DQ Network.

DQ Transmission Sequence—Refers the complete sequence of the three DQ Segments (i.e. ARS, Payload, Feedback) repeatedly, consistently, and always occurring in every DQWA transmission.

Feedback Window—Refers to the period of time within the DQ Transmission Sequence in which the Access Point or Cluster Head provides feedback to the nodes within the DQSS.

Queue Transmission Window—Refers to the period of time within the DQ Transmission Sequence in which the node at the top of the Transmission Queue is afforded the opportunity to transmit.

4.0 Introduction to Distributed Queuing

Distributed Queuing as defined within this document describes a Layer 2 Protocol and PHY Transmission scheme that is agnostic to the underlying carrier. The initial and primary technology medium reaping the largest benefit from this technology is in the wireless realm; although there is no reason that it could not be equally applicable in a wire line based medium as well. The initial targeted benefit is as a Wireless Mobile Backhaul solution as well as a potential alternative to the entire series of wireless 802 based technologies, with specific attention to 802.11; while still being able to maintain coexistence with one of the very technology targets it is designed to replace.

Coexistence is not automatic; an implementer of DQ would have to design their product with coexistence explicitly set out as a goal. Essentially, some portion of the time would be spent processing DQ frames and the remainder of the time would be spent processing the 802.11 (or whatever other MAC it was replacing) for the remainder of the time.

The packet and frame formats have been specifically designed to take advantage of the relative collision free environment in the data content portion of the packet segment. Thus, there are two basic types of record keeping header formats:

Those that are sent during every transmission sequence, otherwise known as packet segments.

Those that are sent only for an entire frame, which can and often does span multiple packet segments.

The DQ Frame Header contains information normally found within an 802.11 type frame, but with one additional address in the event forwarding is necessary by either an address within the Distributed Queuing Service Set (DQSS) or to the greater network cloud beyond the Cluster Head.

The address types are listed below:

Immediate DestinationDQ Network Address;

Immediate SourceDQ Network Address;

Cluster HeadDQ MAC Address;

Actual Destination DQ MAC Address;

Original Source DQ MAC Address.

Only the first three addresses are required within normal DQ Frames; with the latter two addresses only necessary whenever forwarding is required beyond the current Distributed Queue Service Set (DQSS). A DQ Transmission Sequence, is depicted in FIG. 1.

The DQ Transmission Sequence is divided into three separate segments (not counting the interval spacing):

1) the DQSS Access Request Sequence (ARS) Segment (also known as the "ARS Contention Window);

2) the DQ Control & Payload Segment (also known as the Queue Transmission Window);

3) and, the DQSS Feedback Packet Segment (also known as the Feedback Window).

Below is a brief overview of each segment:

DQSS ARS Segment—This segment, which is actually divided into three (3) subsegments, enables nodes within the DQSS with the ability to request permission for exchanging data with other nodes, including the Cluster Head.

DQ Control& Payload Segment—This segment represents both the addressing of the affected nodes exchanging data as well as the actual data itself. DQ Management Commands, Replies, and Requests are also communicated within this segment.

DQSS Feedback Packet Segment—This segment provides feedback representing DQSS Management & Record Keeping that is almost always in direct response to information contained in the immediate prior two (2) segments. It also has the intended side-effect of serving as a beacon, as it is transmitted at the end of every frame and should be used for synchronization purposes.

Figure 2:
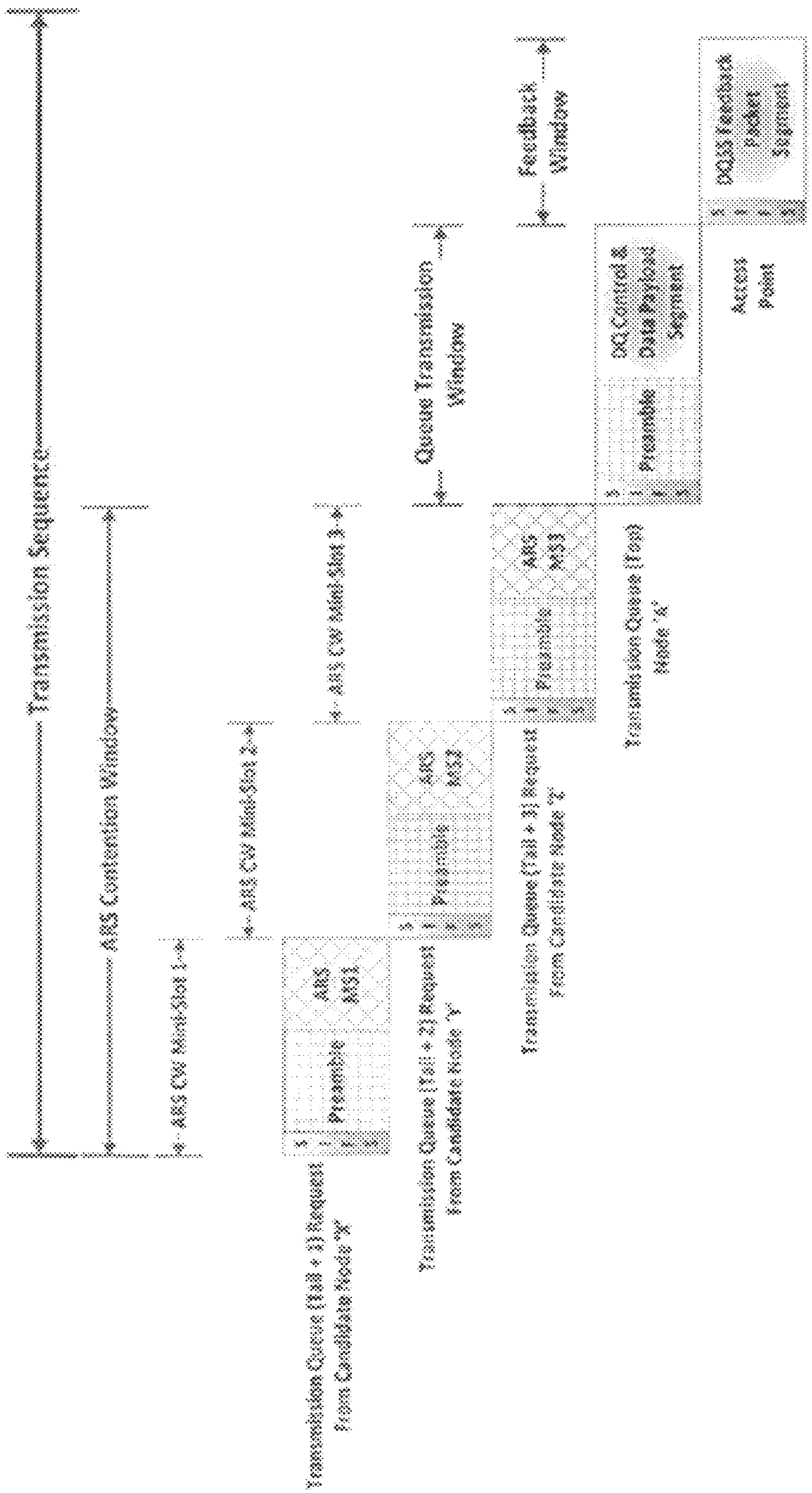
FIG. 2 is amended and replace by FIG. 2*a* and FIG. 2B depicting an example of a Fully Loaded, Successful Transmission Sequence.
Figure 2A:
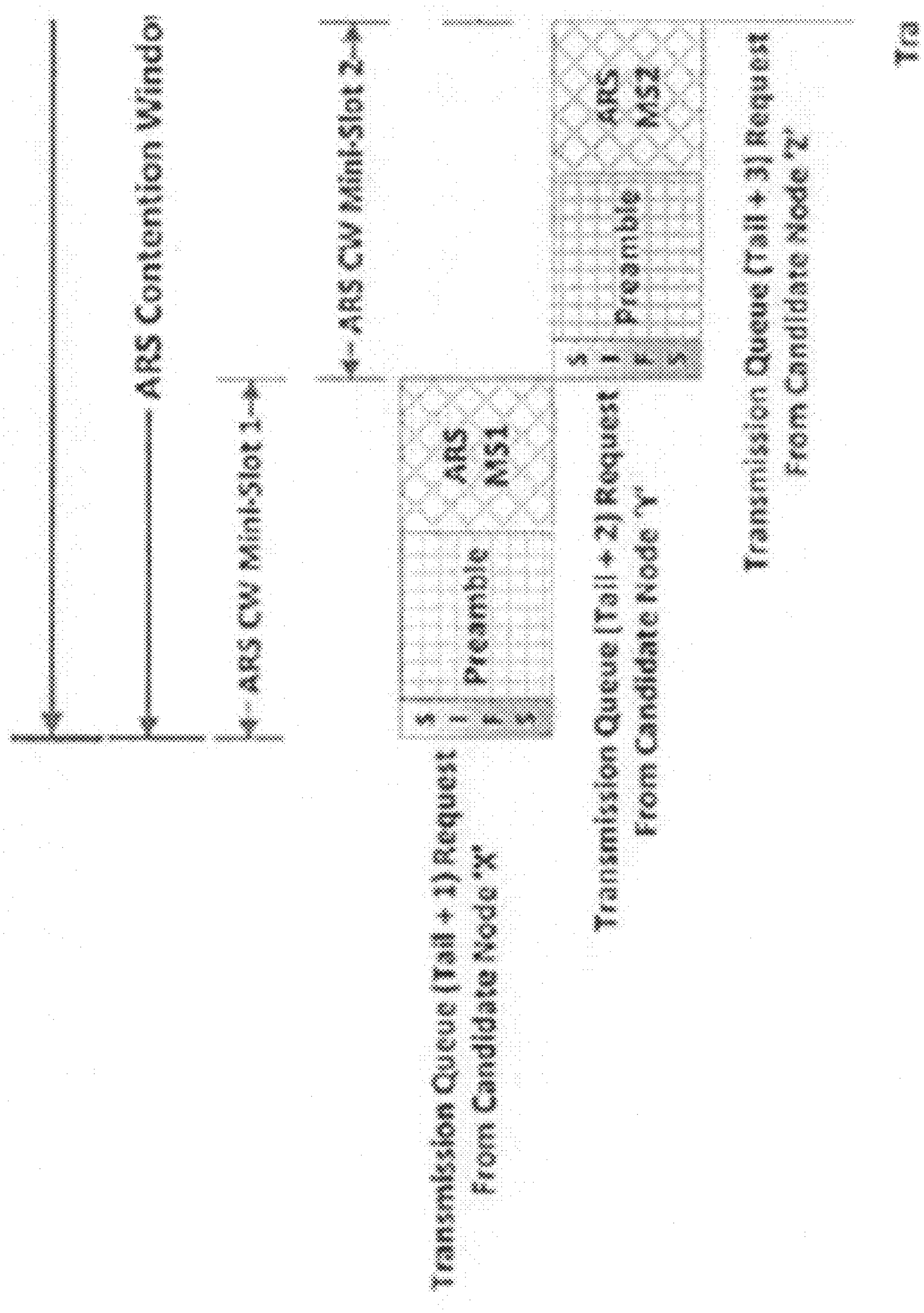
Figure 2B:
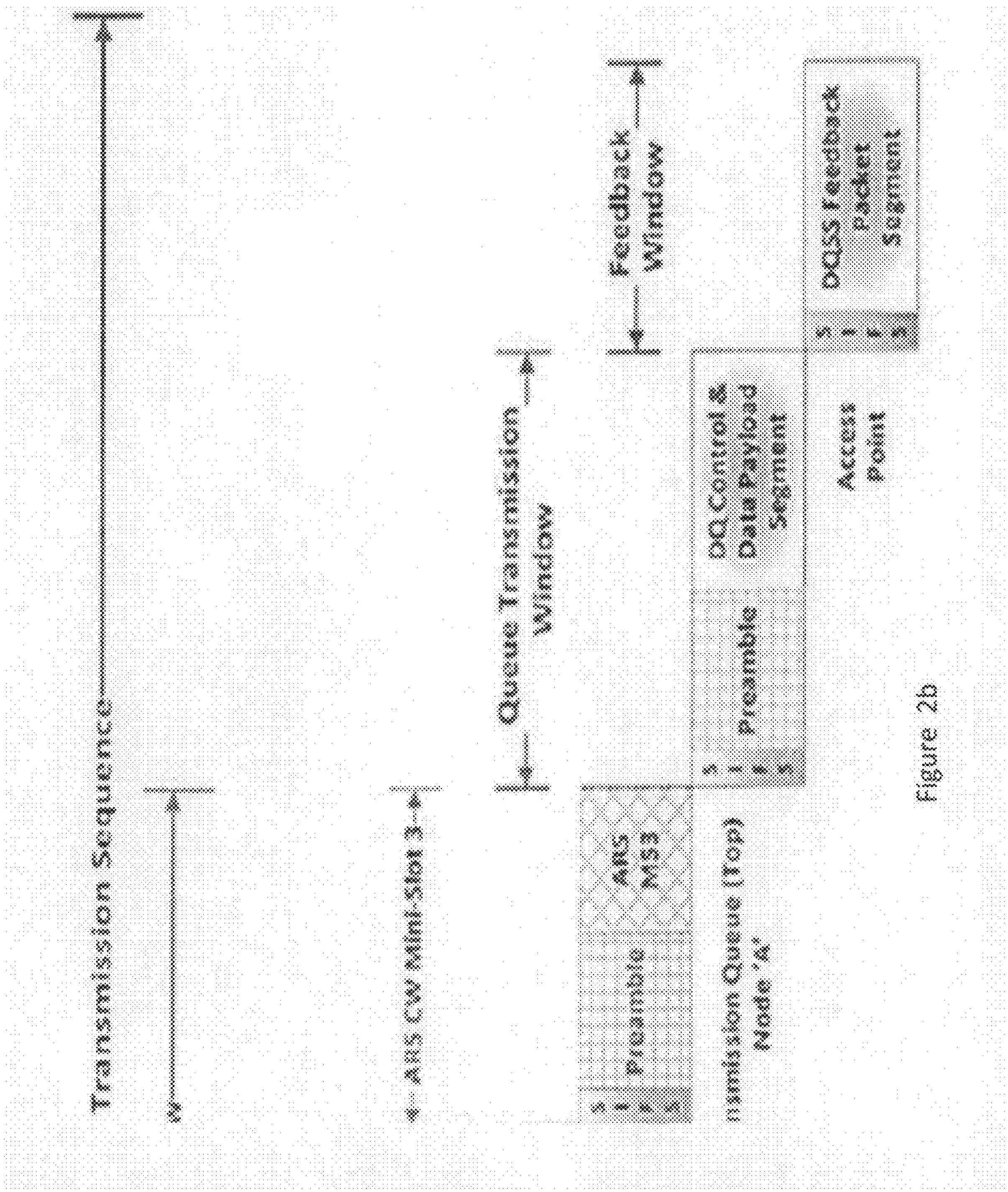

Up to five different nodes can successfully participate within a single transmission sequence; three within the ARS Segment with one per mini-slot, a fourth one within the DQ Control & Payload Segment, and finally a fifth from the Cluster Head within the Feedback Packet segment. FIG. 2 depicts an example of a successful Transmission Sequence with five disparate transmitters.

The Protocol, MAC, and other operational aspects will now be explained in more detail.

5.0 Distributed Queuing Operational Methodology

Like, the Basic Service Set in 802.11, DQ has a similar methodology in that a DQ Service Set can be viewed as a set of nodes within a network that communicate with each other while sharing a common distributed network that is managed by a central controlling authority, either an Access Point or a Cluster Head. NOTE: Because DQ is by definition a distributed architecture, communication is therefore peer-to-peer even though "control" is centralized. What this means in practice is that the Cluster Head dictates which nodes have access to the queue; but all communication within the network is peer-to-peer.

5.1 DQ Service Set Modes

A key component of the DQ Service Set concept is network security and the rules by which nodes may become members of a specific DQ Service Set. A DQSS can operate in one of three operational modes listed below the operational modes listed in decreasing order of centralized membership control:

Static Association Mode;

Semi-Manual Association Mode;

Promiscuous Mode;

Each of the modes will now be individually discussed in detail.

5.1.1 DQSS Static Association Mode

In Static Association Mode, the DQ Service Set is completely pre-configured. New nodes may not request to join and can only become part of the DQSS either by directly adding nodes to an existing DQSS Configuration Database or by installing a completely new DQSS Configuration Database containing the desired nodes.

In response to the fact that a DQSS configured in Static Association Mode cannot add nodes in real time (doing so only through configuration); any attempt to submit a DQSS Membership Request Code Word during the ARS segment will be ignored.

5.1.2 D CMS Semi-Manual Association Mode

A DQSS configured to be in Semi-Manual Association Mode has all of the capabilities of a Static Association Mode DQSS as well as the additional ability to add nodes in real time. There are two methods for which a node may acquire inclusion within a DQSS configured in DQ Semi-Manual Association Mode.

The first method for acceptance for a given node into a DQSS while in DQSS Semi-Manual Association Mode is via manual configuration as part of a DQSS Configuration Database. The second method utilizes a two-step process for any node outside of the current DQSS membership and described below:

1) First, the Candidate Node must issue a request for DQSS Inclusion.
2) Second, an external confirmation of the request from either an operator or configuration robot utility must explicitly accept the Candidate Node into the DQSS; presumably based upon some criteria established for admission. It is the latter act that serves as the basis for the moniker, "DQSS Semi-Manual Association Mode" since confirmation of inclusion requires an explicit action from an external source; presumably an operator or configuration robot utility.

5.1.3 DQSS Promiscuous Association Mode

A DQSS configured to be in Promiscuous Association Mode has two methods for DQSS membership inclusion. As with all modes, the first method for inclusion into a DQSS is through configuration.

The second method for inclusion into an existing DQSS is similar to the second inclusion method listed for DQSS Semi-Manual Association Mode; however, no operator intervention is required except for the case of an operator explicitly desiring to exclude a node from the DQSS.

Thus, the only time operator intervention occurs during a DQSS operating in Promiscuous Association Mode is when an operator wishes to explicitly "blacklist" a candidate node; adding it to either a permanent blacklist or a blacklist that can be aged out.

An example of a situation in which permanent blacklisting may be desired would be if a paid subscriber within a physical locality like an Internet Café was delinquent in paying their subscriber fees and/or had exceeded their usage. The subscriber could then be explicitly blacklisted until they brought their account current again and/or purchases additional time.

An example of temporary blacklisting could occur as a result of a background task monitoring network usage. If there was a limit as to the daily network activity for a particular subscriber and that subscriber had exceeded their limit, the Candidate Node of the subscriber could be placed on a blacklist that expired whenever their "lease" renewed again.

While there are certainly other, potentially more cogent examples, each of the above examples sufficiently illustrates the viability of the blacklist exclusion capability.

5.2 DQSS Encryption Modes

Encryption may be used in any mode and can be implemented such that there is little, if any affect, as to how each Association Mode operates. There are two different types of encryption used within DQWA:

Encrypted Private Key Mode.

Encrypted Public Key Mode.

Both of these encryption methodologies will now be discussed in relation to their effects on operating modes.

5.2.1 DQSS Encrypted Private (Shared) Key Mode

A DQSS configured to be in Encrypted Private Key Mode utilizes a symmetric encryption methodology with respect to both encrypting outgoing messages and decrypting incoming messages. Because both sides know what the decryption algorithm is, both sides may transmit the entire message encrypted, including the header.

The clear implication with this mode is that the encryption/decryption algorithms must be done within the PHY in hardware in order for the three operating modes (Static, Semi-Manual, and Promiscuous) to operate oblivious to the effects of encryption performed on the encapsulated data.

5.2.2 DQSS Encrypted Public Key Mode

A DQSS configured to be in Encrypted Public Key Mode utilizes an asymmetric encryption methodology with respect to the encryption of outgoing messages and decrypting incoming messages.

Specifically, the shared (i.e. private) key is used for decrypting messages, but the public key must be utilized for encrypting messages. In this way, the entire message may be encrypted (as is done with Private (Shared) Key Mode), but the public key must be known in order to encrypt an outgoing message.

Thus, nodes wishing to "join" the network, regardless of the configuration must "listen" to the Feedback Packet in order to get the Public Key before they can transmit. The cogent point here is that although the public key is broadcast, it is done so in encrypted form using the "Private" key; thus adding an additional layer of security to this process.

5.3 Dynamic Clustering

DQ supports Dynamic Clustering for the Control Point of DQNetwork Topology. If Dynamic Clustering is disabled, the Cluster Head serves as the static control point. Thus, if the Access Point goes down, so does the DQ Network. However, if Dynamic Clustering is enabled, the Dynamic Cluster Head Designation Order will be included within the DQSS and updated separately on a periodic basis.

There are multiple events that may trigger a Cluster Head Transition including traffic loading, hardware and/or power failures, energy consumption fairness criteria, or simply user discretion are a few of the more prominent events. Therefore, in order to support the various types of event triggers, there are multiple selections for the type of Cluster Topology configuration. The different Cluster Topology configuration types are listed below:

- Clustering Disabled—The network is complete static, with one and only one node designated as the Access Point. Thus, if the Access Point fails, then so does the network connectivity.
- Clustering Enabled for Backup Only—So long as the network is operating normally, the network is completely static; with a single node designated as the Access Point. However, in the event the designated Access Point fails, a succession of backup Access Points has been previously identified within the DQSS Table and thus assume the role of the Access Point according to their priority order and online status (i.e. the node that is both "online" and has the highest designated priority status becomes the Access Point if the current Access Point fails; if the highest designated priority status node is not online then the duty falls to the next lower designated priority status node). In the event there are no nodes that are online and have been designated as a backup Access Point, the network connectivity fails.
- Limited Clustering Enabled—Normal Clustering is enabled for the network with this setting; however, only a limited set of designated nodes may participate as Cluster Heads.
- Clustering Enabled—Normal Clustering is enabled for the network, with all nodes eligible for Cluster Head designation.

As alluded to above, for clustering to occur within a DQSS not only must the overall Cluster Topology be specified, but so must the Clustering Methodology.

5.3.1 Clustering Methodologies

At present there are three distinct Clustering Methodologies:

1. Static Clustering;
2. Traffic Flow Clustering; and,
3. Traffic Flow with Topology Coverage Clustering.

More Clustering Methodologies may be added over time; but these three represent the initial set. Each of the three Clustering Methodologies will now be discussed.

5.3.1.1 Static Clustering

Regardless of the setting of the Cluster Topology for a given DQSS, if the Cluster Methodology is set to "Static Clustering", then Dynamic Cluster is completely disabled. This is the only setting allowed for the "Clustering Disabled" and "Clustering Enabled for Backup Only" Cluster Topologies. If this setting is used for either the "Limited Clustering Enabled" or "Clustering Enabled" topologies, then the net effect is to force the overall network topology into that of "Clustering Enabled for Backup Only".

5.3.1.2 Traffic Flow Clustering

Traffic Flow Clustering enables the Cluster Head to be located at the node providing the most efficiency with respect to being a "gate keeper" of the traffic flow. Because all communication and control is distributed and is not routed through a central spoke in order to communicate with other nodes within the DQSS, the only real advantage to the Cluster Head moving as the flow moves would be if the gateway can move with it. Meaning, the Cluster Head nodes have dual functionality with one port servicing the DQSS and other ports servicing one or more gateways.

5.3.1.3 Traffic Flow with Topology Coverage Clustering

Traffic Flow with Topology Coverage Clustering enables the Cluster Head to be located at the node providing the greatest coverage for the current traffic flow. The distinction between this mode and standard "Traffic Flow Clustering" is that the former does not take into account the overall range of coverage of the client nodes within the DQSS.

Similar to standard "Traffic Flow Clustering", because all communication and control is distributed and is not routed through a central spoke in order to communicate with other nodes within the DQSS, the only real advantage to the Cluster Head moving as the flow moves would be if the gateway can move with it. Thus, as above, in order for this mode to be effective, Cluster Head nodes must have dual functionality with one port servicing the DQSS and other ports servicing one or more gateways.

5.4 Additional DQ Service Set Rules

The Access Point or Cluster Head distributes the DQ Service Set on a periodic basis. No node may communicate with another node unless both nodes are contained within the same service set. Because of the strict adherence to this policy, in order for a node to join and subsequently communicate with other nodes, including the Cluster Head, within the DQSS, the following sequence of events must occur:

a) The Access Point or Cluster Head must explicitly acknowledge and admit a node for inclusion into the DQSS;
b) The Access Point or Cluster Head must then add it to the DQSS and perform either a complete or partial DQSS update of the DQSS Table to the nodes within the DQSS.

When possible, the Cluster Head will update the DQSS Table through update distributions as a means of saving time and bandwidth. There are few instances in which a complete DQSS distribution will occur, with the nominal occurrence being during initialization and start-up of the DQSS.

In short, the Cluster Head must first admit the node in the network and then secondarily inform the other nodes in the DQSS of the joining node's admission into the DQSS. The format of the DQSS Table is defined in section 9.1 on the "Distribute DQ Service Set Table (0x01)" command and includes the following:

- DQSS Configuration Data; providing information specifying the functional and operational makeup of the DQSS. Information included would be the DQSS Mode (i.e. Static, Manual, Promiscuous, Promiscuous-Shared Key), Encryption Indication, DQ Gateway Information, Maximum DQ Frame and DQ Packet Sizes,
- 48-Bit MAC Address of every Node within the DQSS.
- 12-Bit DQSS Address; this address is assigned by the Cluster Head to the individual nodes within the DQSS as a means of reducing the amount of overhead within the transmission stream.
- 20-bit Code Word, assigned by the Cluster Head, and used for Access Requests to the Transmission Queue. This value is coupled with the DQSS Address on all access requests.
- Active or Inactive Indicators for Every DQ Member Given that the primary purpose of the DQSS Table is to maintain the integrity of the network, a DQSS Table should be viewed as an Object Oriented Encapsulation of a specific DQ Network.

6.0. THE ACCESS REQUEST SEQUENCE

The purpose of the Access Request Sequence (ARS) is two-fold:

1. To afford current members of the DQSS with an opportunity to request communication privileges with one or more of the other nodes (including the Cluster Head) within the network.
2. To simultaneously mitigate the potential for MAC & Data Payload collisions and hence, dropped frames resulting from corruption.

The latter is achieved by limiting the contention for access to the channel to a finite and predictable period of time. With the exception of the Cluster Head, all nodes must utilize this mechanism in order to access the MAC & Data Payload segment of the DQ Transmission Sequence.

6.1 ARS Mechanics

Figure 3:
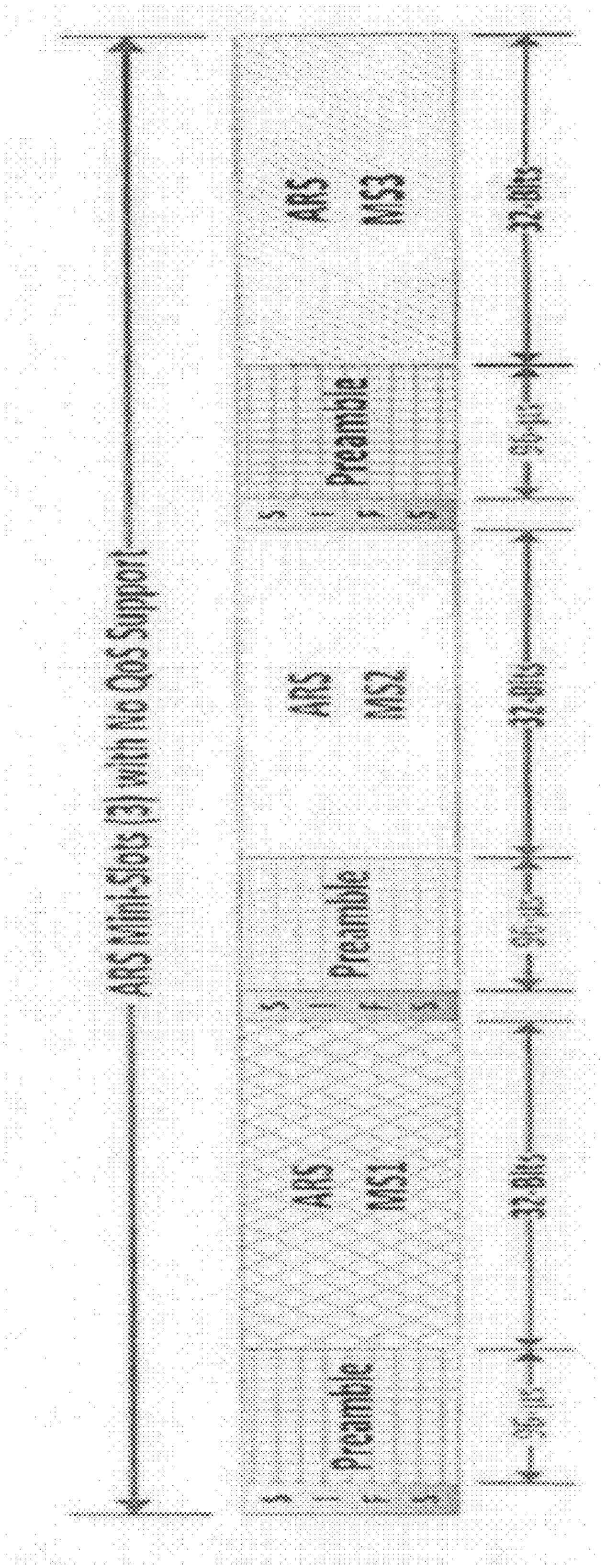
FIG. 3 depicts an exemplary DQ Access Request Sequence Segment Structure.

The ARS Segment is divided into three (3) sub-parts, termed, Mini-Slots (MS) (as shown in FIG. 3). This number was initially chosen based upon research[1] (i.e. Xu & Campbell, 1992) showing that the collision resolution process can be made to work faster than the data transmission process when the number of MS is restricted to three (3). Increasing the number of MS beyond three (3) may introduce additional delay as well as adding increased overhead to the overall protocol resulting from the added delay.

The collision resolution process referenced above utilizes unique patterns transmitted by each soliciting device and a summation of those patterns in the event of a collision as a means for detecting collisions.

The operation of DQWA is based on the m-ternary feedback information on the state of each of the mini-slots. The Cluster Head must be able to distinguish between the three states:

Idle,

Success,

Collision, for each mini-slot; as this information is crucial for the application of the protocol rules at the end of each frame. Adopting a patented technology [2] (i.e. Campbell & Xu, 2001) each node is assigned a unique bit pattern that has the property that when two or more ARS collide, the pattern of the overlapping signal is distinguishable from the original pattern of any single ARS; hence, the Cluster Head can detect the collision.

The preferred example patterns referenced in the paper are binomial coefficients; however, DQWA uses an increased hamming weight of four (4) in order to support a significantly increased number of unique code words than can otherwise be supported with a constant hamming weight of two (2). For instance, within a 32-bit word, there exists only 496-Code Words with a Hamming Weight of two; as compared to 35,960 Code Words having a Hamming Weight of four within the same 32-bits (almost two orders of magnitude more).

Given that DQWA is targeting potential MESH networks much larger than 496 nodes, larger Hamming Weights are necessitated for real-world implementation with (as mentioned above) four (4) being the current selected Hamming Weight.

Figure 4:
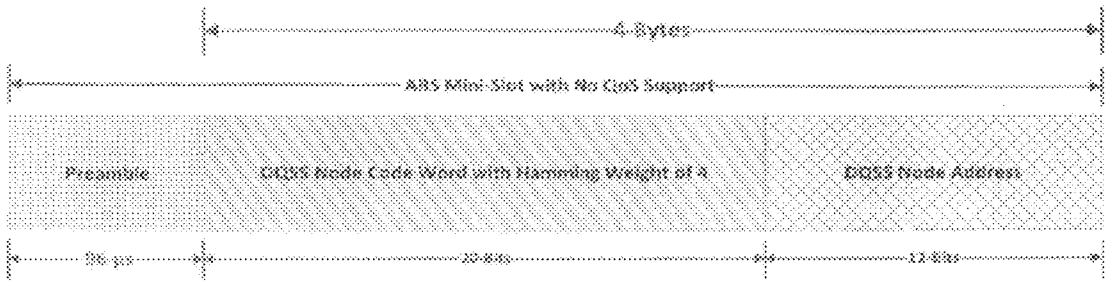
FIG. 4 depicts an exemplary DQ Mini-Slot (MS) Structure.

Each node accepted into the network is assigned both a 12-bit Node Address and a 20-bit Code Word with a Hamming Weight of four (4) (as shown in FIG. 4).

When a collision does occur, it is a relatively straightforward process to determine since the Hamming Weight will be greater than four (4). There are 4,845 4-Bit Code Words within a 20-bit binary string; thus, the worst case probability that a collision could occur and result in a valid Code Word is less than ½ of a percent (0.46%). However, since the Code Word is also coupled with the Node Address, there is an additional safeguard procedure to ensure that any anomalous undetected collision is immediately detected.

The aforementioned ternary decision can be subsequently determined as follows:

Idle (i.e. no signal in ARS Mini-Slot)—Received Signal is below the RSSI (Noise) Threshold.

Success—A demodulation resulting in a precise hamming weight of four (4) and a correlated (i.e. correct) code word value and node address combination.

Collision—Any signal detected above the noise (RSSI) threshold not resulting in a translation into the digital domain of a code word with a hamming weight of four (4) and/or not having a correlated (i.e. correct) code word value and node address combination.

The Cluster Head will respond with the collision results as part of the DQSS Management Segment in order to clarify any potential ambiguities.

6.2 ARS QoS Support

It is presumed that in most cases, DQWA will be utilized with some level of QoS enabled; if so, two additional fields are added to the ARS Mini-Slot structure so that the feedback packet can adequately determine the queuing order for each node:

Requested Message Payload Limit, and

Figure 5:
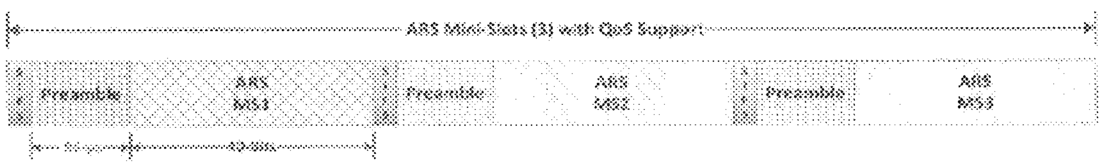
FIG. 5 depicts an exemplary DQ Access Request Sequence Segment Structure with QoS Support.
Figure 6:
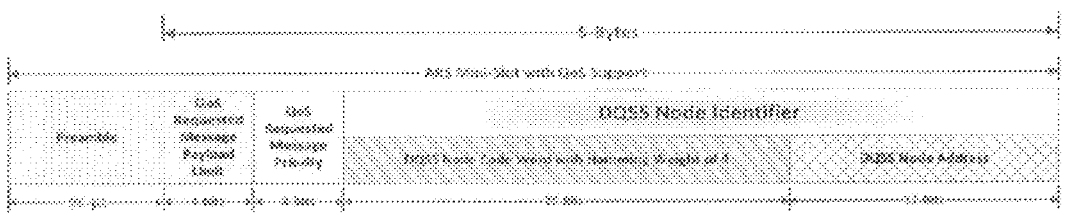
FIG. 6 depicts an exemplary Expanded (QoS Enabled) ARS Mini-Slot (MS) Structure.

Requested Message Priority;

Each field is 4-bits, which in turn expands each ARS Mini-Slot to a Preamble plus 40-bits of information. FIG. 5 depicts the expanded ARS Segment with QoS support. FIG. 6 depicts the expanded version of an individual Mini-Slot.

The contents of each field will now be detailed; although a more complete explanation can be found in section 10 on "The DQSS Management Segment (Feedback Packet (FP))."

6.2.1 QoS Requested Message Payload Limit

Table 1 specifies each setting and corresponding reservation amount:

TABLE 1

ARS QoS Requested Message Payload Limit Settings

| QoS Requested Message Payload Setting (in binary) | QoS Message Payload Value (in bytes) |
|---|---|
| 0000 | 4,096 |
| 0001 | 8,192 |
| 0010 | 12,288 |
| 0011 | 16,384 |
| 0100 | 20,480 |
| 0101 | 24,576 |
| 0110 | 28,672 |
| 0111 | 32,768 |
| 1000 | 36,864 |
| 1001 | 40,960 |
| 1010 | 45,056 |
| 1011 | 49,152 |
| 1100 | 53,248 |
| 1101 | 57,344 |
| 1110 | 61440 |
| 1111 | 65,536 |

The implied value specified by the QoS Requested Message Payload setting is used by the Cluster Head to determine the relative placement in the distribution queue of the requesting station.

6.2.2 QoS Requested Message Priority

The values used for the QoS Requested Message Priority field are the same values used within a frame, as detailed in section 8.1.1.1.9 on "Quality of Service (QoS) Level-111b."

Figure 7:
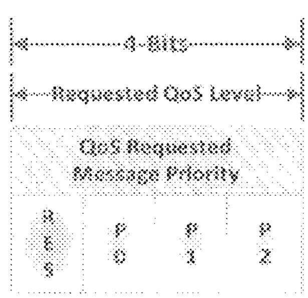
FIG. 7 depicts an exemplary ARS QoS Requested Message Priority Field.

There are eight priority levels, thus only three bits are required, leaving the uppermost bit unused and reserved (as shown in FIG. 7). The priority levels increase linearly, thus a priority level of '0' is of the lowest priority and a priority level of '7' is of the highest priority. DQWA does not define what the individual priority levels mean, leaving that up to the network layer protocols sitting on top of DQWA.

6.3 DQSS Node Addressing within the ARS

Figure 8:
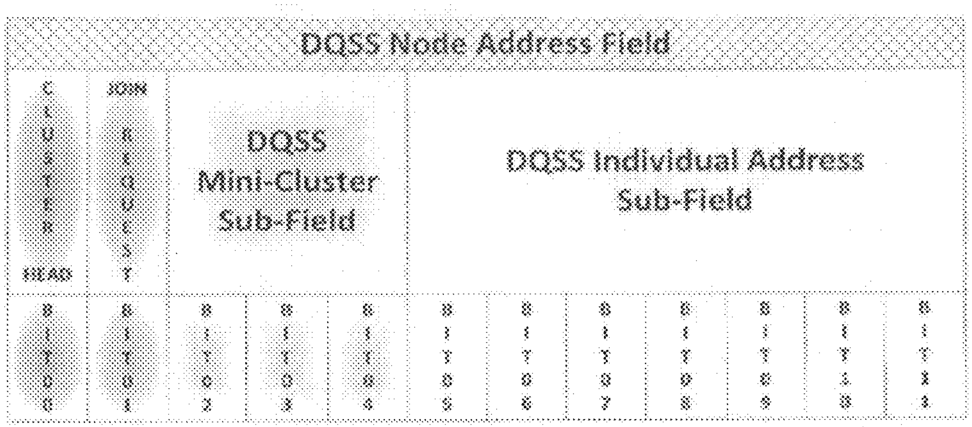
FIG. 8 depicts an exemplary DQ Node Network Address Field.

DQSS Network addresses are 12-bits in length, however, only the lower 10-bits are assignable for the dynamic portion of a valid address; as the upper two bits have special meaning. Both bits along with the rest of the DQSS Network Address are shown in FIG. 8:

The DQSS Node Addressing will now be explained within the context of the ARS; addition detail of the DQSS Node Address field is found in subsequent sections.

6.3.1 DQSS Node Address Field 6.3.1.1 DQSS Node Cluster Bit

NOTE: This bit is NOT used within the ARS; but will be explained here since this bit is part of the DQSS Node Address Field. This bit should ALWAYS be zero during the ARS; as the Cluster Head may preempt the Transmit Queue any time it deems necessary to do so and is not restricted to the transmit request process as the rest of the nodes within the DQSS are.

The MSB of the address is reserved for the Cluster Head. This is particularly helpful if the Network Topology moves and the Cluster Head moves with it. Thus, allowing any node to maintain its original identity both before and after assuming the duties of the Cluster Head. In this way, the DQSS table maintains consistency regardless of which node is currently in charge of the network.

6.3.1.2 DQSS Node Join Request Bit

The next most significant bit (bit 1) is used by nodes wishing to join the network. In order for an unknown node to be considered for admittance to the DQSS, it must satisfy two conditions:

1) The "Join Request" Bit shown in Error! Reference source not found. must be set within the DQSS Node Address Field.
2) The "DQSS Mini-Cluster" Sub-Field must set '7' (i.e. "111b").

The "DQSS Individual Address" Sub-Field may be any value between '0' and "127" (i.e. a span of 128-values). The complete list of predefined Hamming Weights and DQSS Network Addresses may be found in Appendix A.

6.3.1.3 DQSS MiniCluster SubField

These three bits are used to allow the network administrator to organize nodes in accordance to their own internal policies. Assignable values are between '0' ("000b") and '6' ("110b"), with '7' ("111b") reserved for "Join Requests" and "Broadcasts".

6.3.1.4 DQSS Individual Address SubField

These seven bits are used for assigning individual addresses, with any value between '0' and "126" assignable for an individual DQSS Network Address. The only time "127" may be used during the ARS is during a "Join Request." As "127" is otherwise set aside for "Directed Broadcasts" and regular "Broadcasts" for all Mini-Cluster Sub-Field values except for '7' (i.e. "111b").

6.4 ARS Join Requests

As outlined in the prior section, "Join Requests" may choose between any one of 128 values for the DQSS Individual Address Sub-Field and any one of 17-values for the Code Word. So long as predefined values are selected for those fields as well as the "Join Request" bit being set; the Join Request will be considered valid.

7.0 DQ Message

A DQ Message is what is presented as the interface between the MAC and Network layers and consists of the below fields:

1) Address Fields;
2) Frame Length Field;
3) Data Payload area;
4) and a Frame Check Sequence (FCS) Field.

Figure 9:
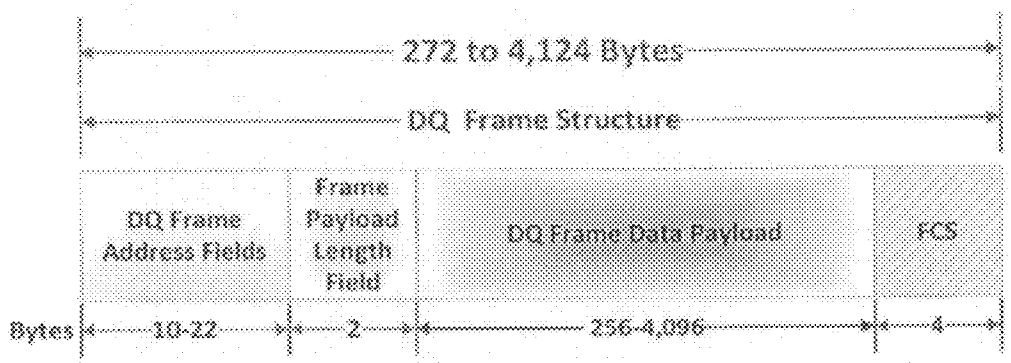
FIG. 9 depicts an exemplary Complete DQ Frame Structure.

FIG. 9 depicts a complete DQ Frame:

Each of the above four logical divisions of the DQ Frame Structure will now be detailed.

7.1 DQ Frame Address Fields

The DQ Frame has two variants for addressing:

Internal DQSS Network Addresses;

External DQ MAC Address.

A DQSS Network address is a 12-bit address that uniquely identifies the DQ Node within a specific DQSS Network and was explained in detail in section 6.3 and depicted in Error! Reference source not found.

A DQ Network Address is at most 12-bits, with the uppermost 4-bits of each DQ Network Address set aside and reserved for future expansion. Thus, the maximum number of nodes potentially supported within a given DQSS is 4,096; minus selected addresses set aside for explicit functionalities. However, as explained in sections 6.3.1.1 and 6.3.1.2, the uppermost two bits have special significance; thus preventing them from being used as normal address bits. Meaning, the number of stations that can actually be delineated is 210 (i.e. 1,024).

The DQ MAC Address adheres to standard IEEE 802 MAC-48/EUI-48 formatting and structure with the intent it eventually be adopted into the overall 802 standard.

7.1.1 The Standard Addressing DQ Frame Header

Figure 10:
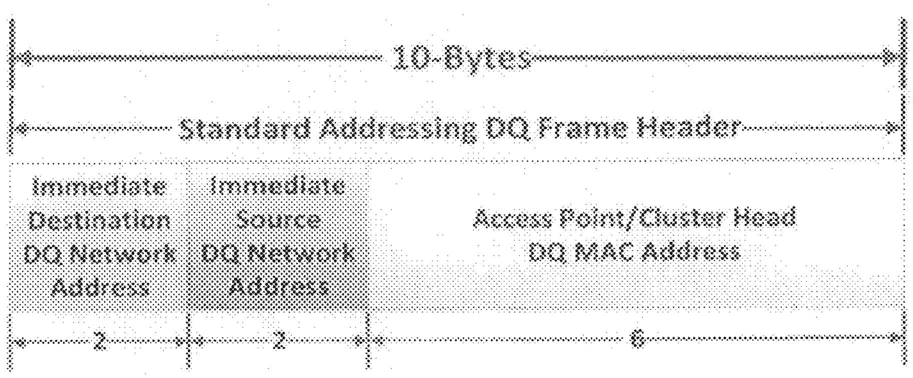
FIG. 10 depicts an exemplary Standard Addressing DQ Frame Header.

With few exceptions (Application Data intermediate frames being noted as the most common exception) most DQ Frames include the DQ Network Address of both the destination and sender along with the DQ MAC Address of the DQ Cluster Head/Access Point. This is known as the "Standard Addressing DQ Frame Header" and is shown in FIG. 10.

The Standard DQ Address Header contains the three Address Fields:

1) The Immediate Destination DQ Network Address;
2) The Immediate Source DQ Network Address;
3) The Cluster Head DQ MAC Address with the first two addresses being internal DQ Network Addresses and the Cluster Head being a standard DQ MAC Address.

7.1.2 The Extended Addressing DQ Frame Header

Figure 11:
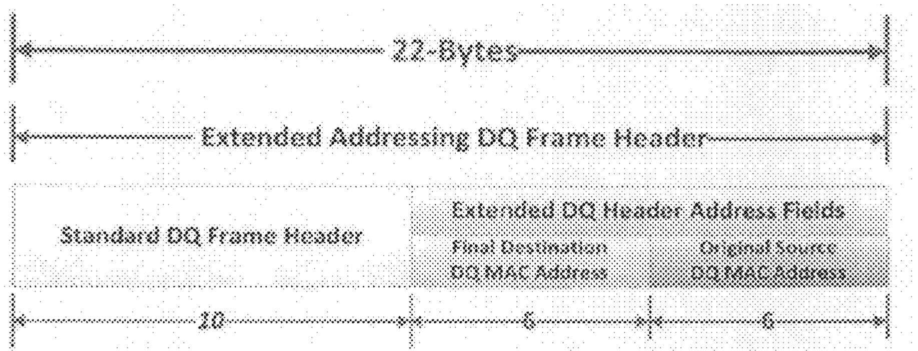
FIG. 11 depicts an exemplary Extended Addressing DQ Frame Header.

The Extended Addressing DQ Frame Header extends the Standard Addressing DQ Frame Header by adding the DQ MAC Addresses of the original sender and final destination nodes (as shown in FIG. 11). This frame is only required if the Final Destination and Original Source Nodes are not part of the same DQSS. In this case, the "Destination DQ Network Address" is set to that of the Access Point or Cluster Head.

Therefore, with one exception, any time the Access Point or Cluster Head is specified as the "Destination DQ Network Address", the Extended Address DQ Frame Header is used. The lone exception is whenever the Access Point or Cluster Head is also the final destination; in which case only the Standard DQ Frame Header is utilized.

7.2 DQ Frame Payload Length Field

As the name implies, the length contained here specifies the number of bytes within the frame payload and must be a number between 256 and 4,096 bytes. Meaning, 256-bytes is the minimum size Frame Payload and 4,096-bytes is the maximum size Frame Payload.

7.3 DQ Payload Field

This field carries the data payload of the frame. Other than length, there are no restrictions to the contents of this field. If there are not sufficient bytes to fill the minimum size DQ Payload field, the missing bytes will be zero filled.

7.4 DQ Frame Check Sequence (FCS) Field

The FCS is a 32-Bit CRC located immediately following the last byte transmitted for a given frame and covers the entire frame contents, including the four bytes of the FCS.

8.0 DQ Data & Control Window

The DQ Data & Control Window is the portion of the Transmission Sequence in which application data is communicated and is the most complex of the three segments comprising the Transmission Sequence. The three segments are: The DQSS ARS Segment, the DQ Control & Payload Segment, and the DQSS Feedback Packet Segment.

All DQ Packet Segments are comprised of:

1) A DQ Packet Segment Pre-Header;
2) An optional Management Information Sub-Header and Directives;
3) An optional Frame Data Payload section;
4) A 4-Byte Packet Check Sequence (PCS).

NOTE: Although both (2) and (3) above are optional, all DQ Packet Segments must contain one or both of them.

The most basic DQ Packet is one in which the entire frame is contained within the packet and has no MI Directives. However, DQ Packet Segments may also contain Management Information Directives, Frame Check Sequence (if the entire frame is not contained within one Packet Segment), and may even exclude a Data Payload portion altogether if only MI Directives are required for a given Packet Segment.

The individual elements of the above Basic DQ Packet Segment will now be detailed in order to provide the framework for the more complex Packet Segments discussed later in this section.

8.1 the Basic DQ Packet Segment with No MI Directive

Figure 12:
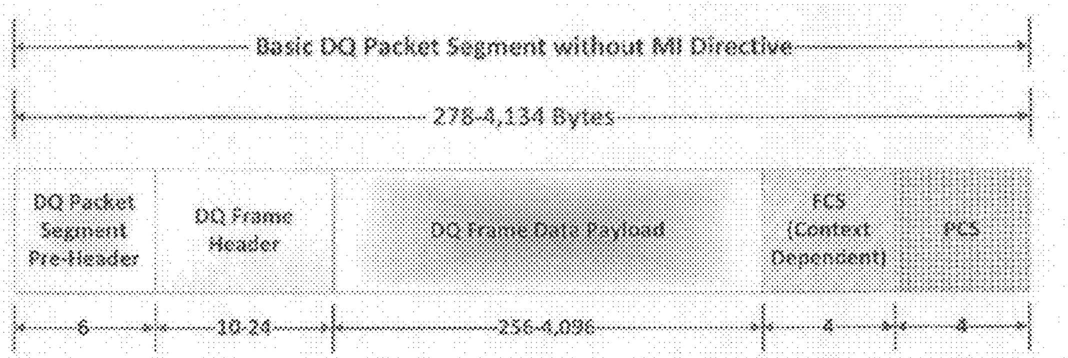
FIG. 12 depicts an exemplary Basic DQ Packet Segment.

The Basic DQ Packet is shown in FIG. 12. The Basic DQ Packet Segment may be between 278 and 4,134 bytes in length and is comprised (at a minimum) of the DQ Packet Segment Pre-header, the DQ Frame Header, the DQ Frame Data Payload, and the Packet Check Sequence (PCS); but also may include a Frame Length Field and Frame Check Sequence (FCS) depending upon the type of packet, as discussed throughout this section.

8.1.1 The DQ Packet Segment PreHeader

Figure 13:
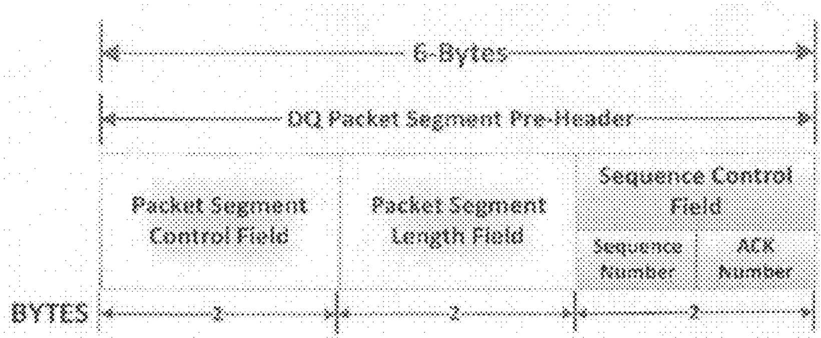
FIG. 13 depicts an exemplary DQ Packet Segment Pre-Header Structure.

FIG. 13 depicts the physical layout of the DQ MAC Basic Pre-Header. All DQ Packets have a DQ Packet Segment Pre-Header and have the following three fields as listed below:

The Packet Segment Control Field,

The Packet Segment Length Field, and

The Sequence Control Field.

These three fields provide the majority of the information required for describing the Packet Segment's content.

The first field, the Packet Segment Control field, provides detailed information about both the packet itself as well as the current configuration of the network. This is most helpful to nodes listening in that may need to adjust their own configuration prior to attempting to enter into the DQSS. The settings within the Packet Segment Control field detail the contents of the packet, including whether or not the DQ Frame portion of the packet is an entire frame or one in a series of fragmented frame segments.

The remaining next two fields, the Packet Segment Length and Sequence Control fields will now be detailed.

8.1.1.1 Packet Segment Control Field

Figure 14:
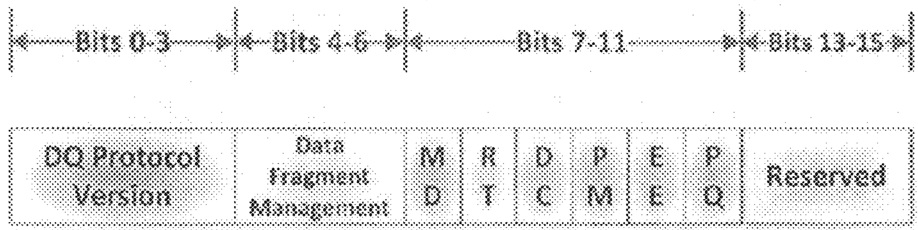
FIG. 14 depicts an exemplary DQ Packet Segment Control Field.

The contents of the Packet Segment Control bits determine the size and content of the rest of the frame and therefore are the most interesting portion of this segment. The fields and meanings are shown in FIG. 14.

8.1.1.1.1 DQ Protocol Version

The DQ Protocol Version is initially set to "0000b" and is set aside as a backwards compatibility measure in anticipation that future use of DQ will expand beyond what is currently envisioned and hence require structure and format changes.

8.1.1.1.2 Data Fragment Management

The Data Fragment Management field provides information to the recipient node enabling the receiving station to discern if this frame is part of a larger fragmented frame or not. If so, these settings directly determine whether or not the packet contains a Frame Length field as is the case with completely encapsulated frames, the initial segment of a fragmented frame, and the initial segment of a fragmented resumed frame. Additionally, the settings contained within determine if the DQ Packet contains Application Data and/or if the packet simply contains DQSS Management Information. The settings and associated meanings are provided in Table 2.

TABLE 2

Data Fragment Management Field Settings

| Bits | | | |
|---|---|---|---|
| 4 | 5 | 6 | Description |
| 0 | 0 | 0 | Management Packet with no Application Data |
| 0 | 0 | 1 | First Data Packet of Frame |
| 0 | 1 | 0 | First Resumed Data Packet of Frame |
| 0 | 1 | 1 | Resumed Frame with Final Data Packet of Frame |
| 1 | 0 | 0 | Final Data Packet of Frame |
| 1 | 0 | 1 | Intermediate Data Packet of Frame |
| 1 | 1 | 0 | Complete Frame within Data Packet |
| 1 | 1 | 1 | Reserved |

8.1.1.1.2.1 Management Frame—000b

This field indicates that there is no Application Data within this packet. Therefore, the packet is strictly for management and control purposes.

8.1.1.1.2.2 First Data Packet of Frame—001b

This value indicates the frame is fragmented and that the packet is the initial packet in a sequence of packets comprising the overall frame. All necessary address fields for the frame are included with this packet as well as a frame length field.

Figure 15:
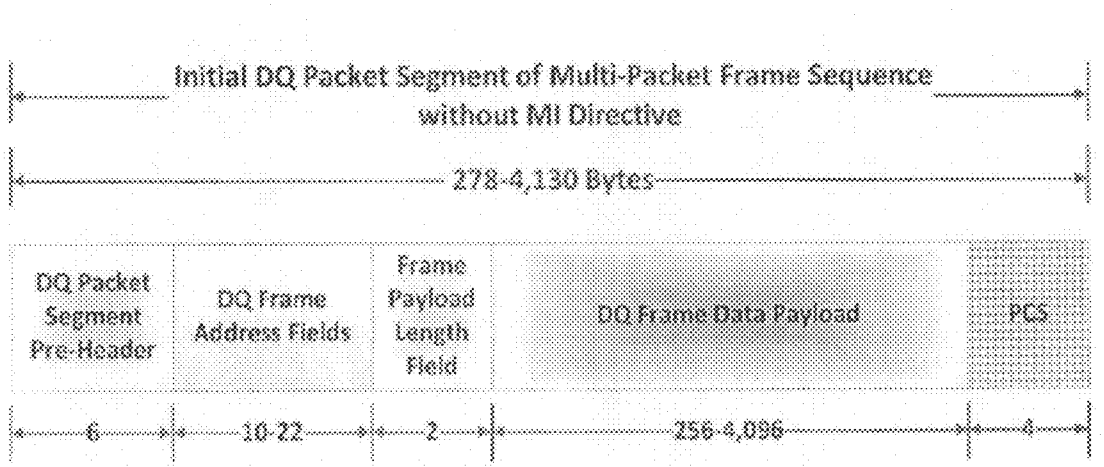
FIG. 15 depicts an exemplary DQ Fragmented Frame Header for the Initial Packet.

FIG. 15 depicts the header part of this frame, including the DQ Packet Segment Pre-Header. NOTE: There is no FCS within this packet since the FCS does not occur until the final Packet representing the Frame.

8.1.1.1.2.3 First Resumed Data Packet of Frame—010b

This value indicates the frame transmission sequence was previously preempted by higher priority traffic and that the packet is the first packet in the resumption of the frame transmission sequence; but is NOT the last packet within the sequence. There is a separate delineation for an occurrence of the latter (see section 8.1.1.1.2.4 below).

All necessary address fields for the frame are repeated within this packet including the frame length field with one minor exception, the length contained with the frame length field specifies the number of bytes left within the resumed frame including the bytes within the current packet.

Figure 16:
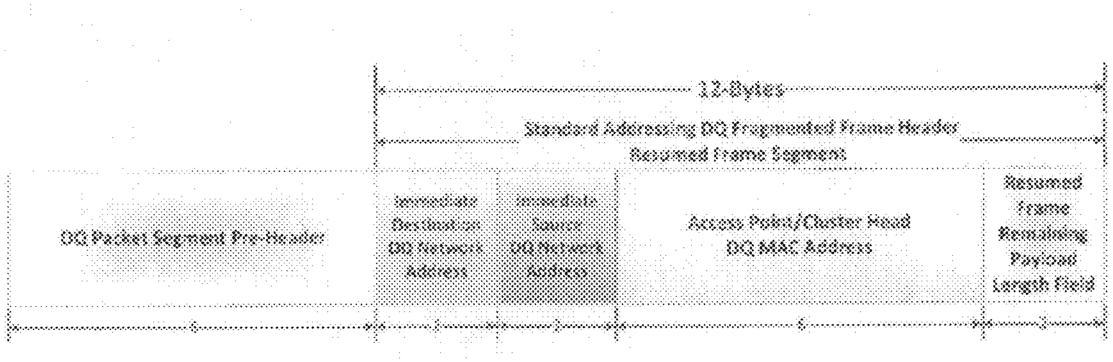
FIG. 16 depicts an exemplary DQ Frame Header for the Initial Packet of a Resumed Frame Packet Sequence.

The DQ Packet Segment Pre-Header and the Resumed DQ Fragmented Frame Header showing all of the DQ Frame fields repeated are shown in FIG. 16. NOTE: The figure is an example of a Standard Addressing DQ Frame.

8.1.1.1.2.4 Resumed Frame with Final Data Packet of Frame—011b

This value indicates the frame is fragmented and that this is the first packet following a pause in the packet sequence transmissions for that frame, as the transmission sequence was previously preempted by a higher priority form of traffic. It also indicates that this is the final fragment within the sequence.

The Frame Address fields are again repeated for this final packet; however, the frame length field is not included since it is superfluous given that the DQ Packet Segment Pre-Header contains the length of the entire packet and hence the payload length can be easily calculated from it.

Figure 17:
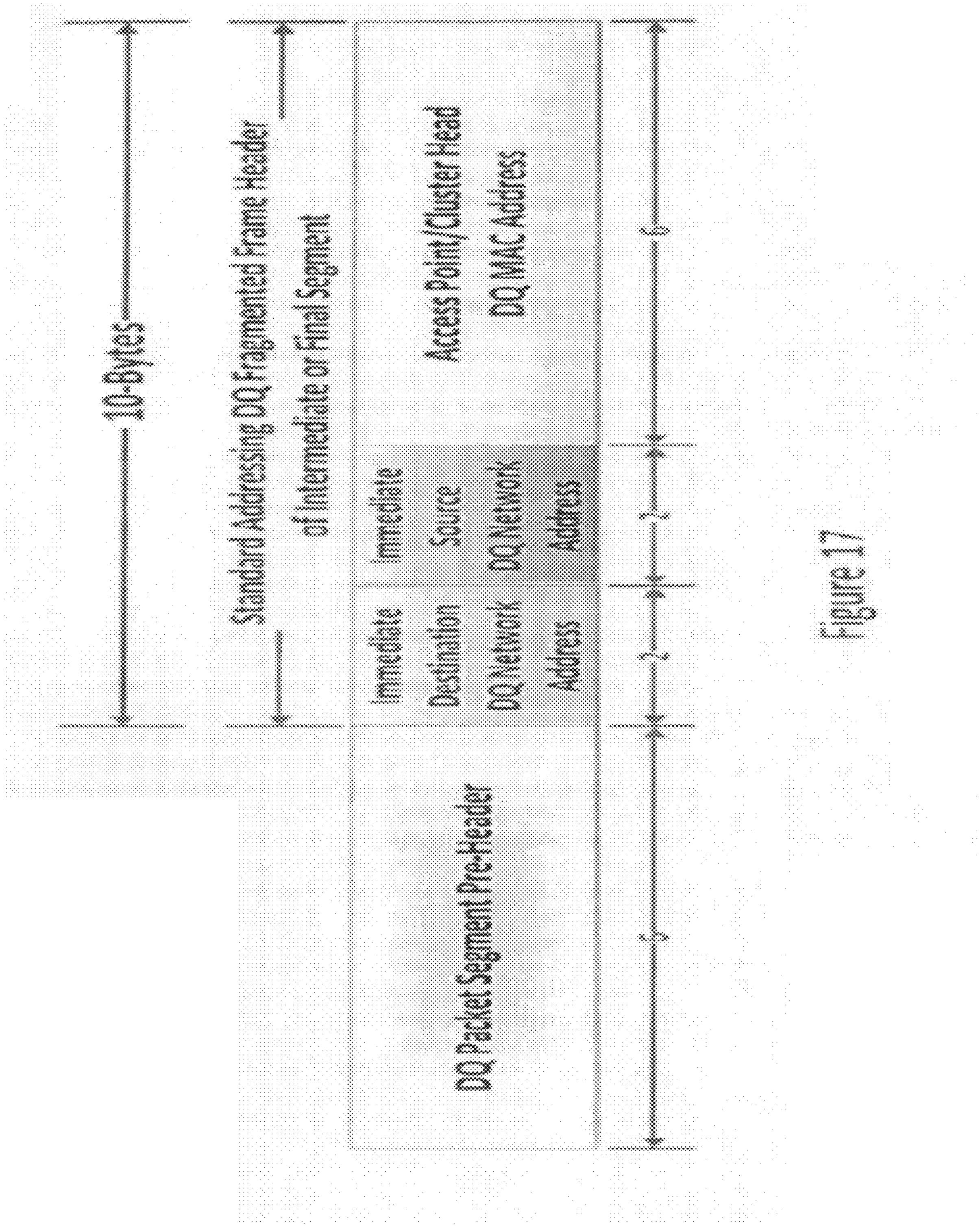
FIG. 17 depicts an exemplary DQ Frame Header for a Resumed & Final Packet of a Frame.

FIG. 17 depicts the DQ Packet Segment Pre-Header and DQ Frame header of a Resumed Frame that occurs as the Final Data Packet of the Frame: NOTE: The figure is an example of a Standard Addressing DQ Frame. An Extended Addressing DQ Frame would have additional addresses, as detailed in section 7.1.2, "The Extended Addressing DQ Frame Header".

Another consequence of a multi-packet frames is that in addition to an Packet Control Sequence (PCS) validating the contents of the overall packet; there is a Frame Check Sequence, validating the contents of the overall frame.

Figure 18:
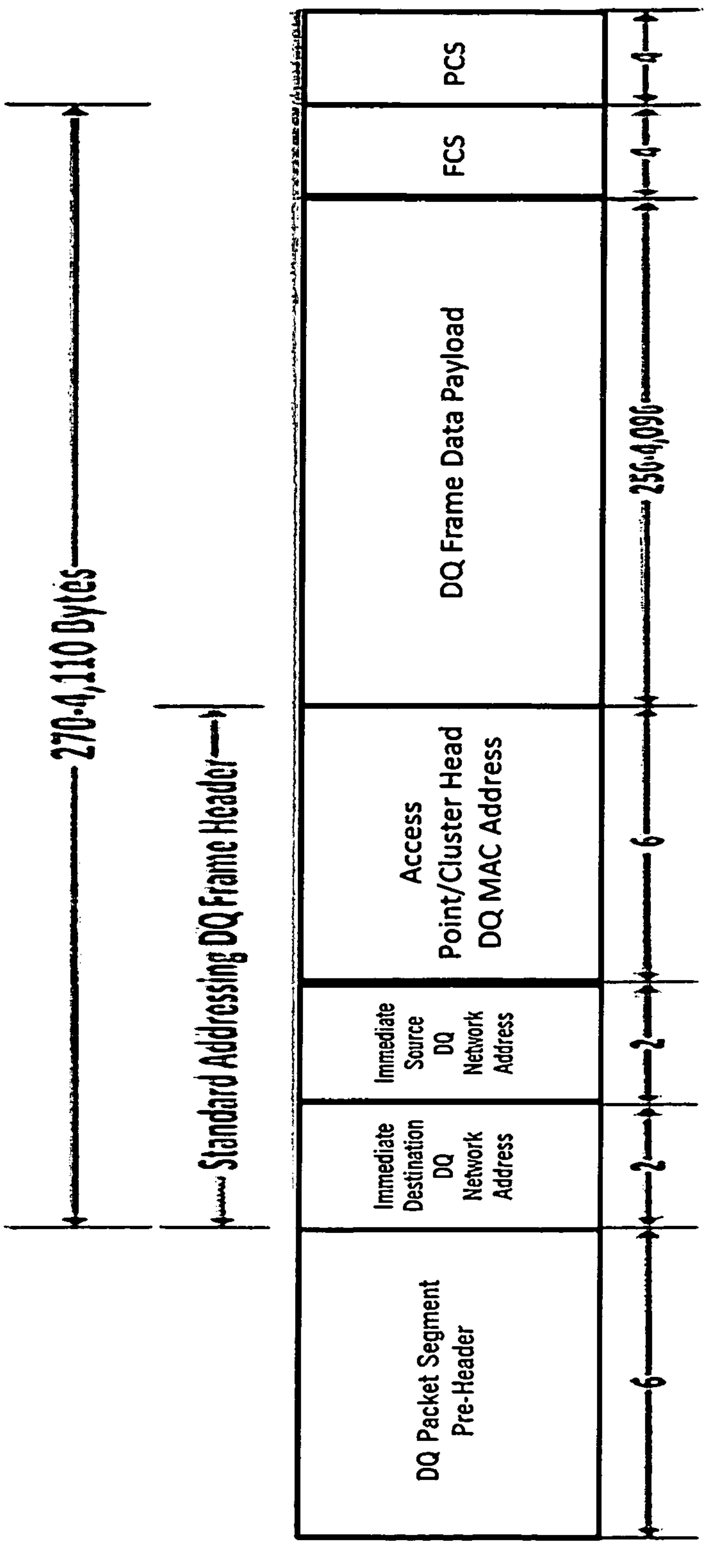
FIG. 18 depicts an exemplary Complete DQ Packet Overview of a Resumed & Final Packet of a Frame.

FIG. 18 depicts the complete structure of this type of packet, including the FCS and PCS. NOTE: The figure is an example of a Standard Addressing DQ Frame. An Extended Addressing DQ Frame would have additional addresses, as detailed in section 7.1.2, "The Extended Addressing DQ Frame Header".

8.1.1.1.2.5 Last Data Packet of Frame—100b

This value indicates that the data segment contains the last segment of a larger message. There are no Frame Address fields following the DQ Packet Segment Pre-Header for this case; but there is an FCS as well as PCS (see Error! Reference source not found.).

Figure 19:
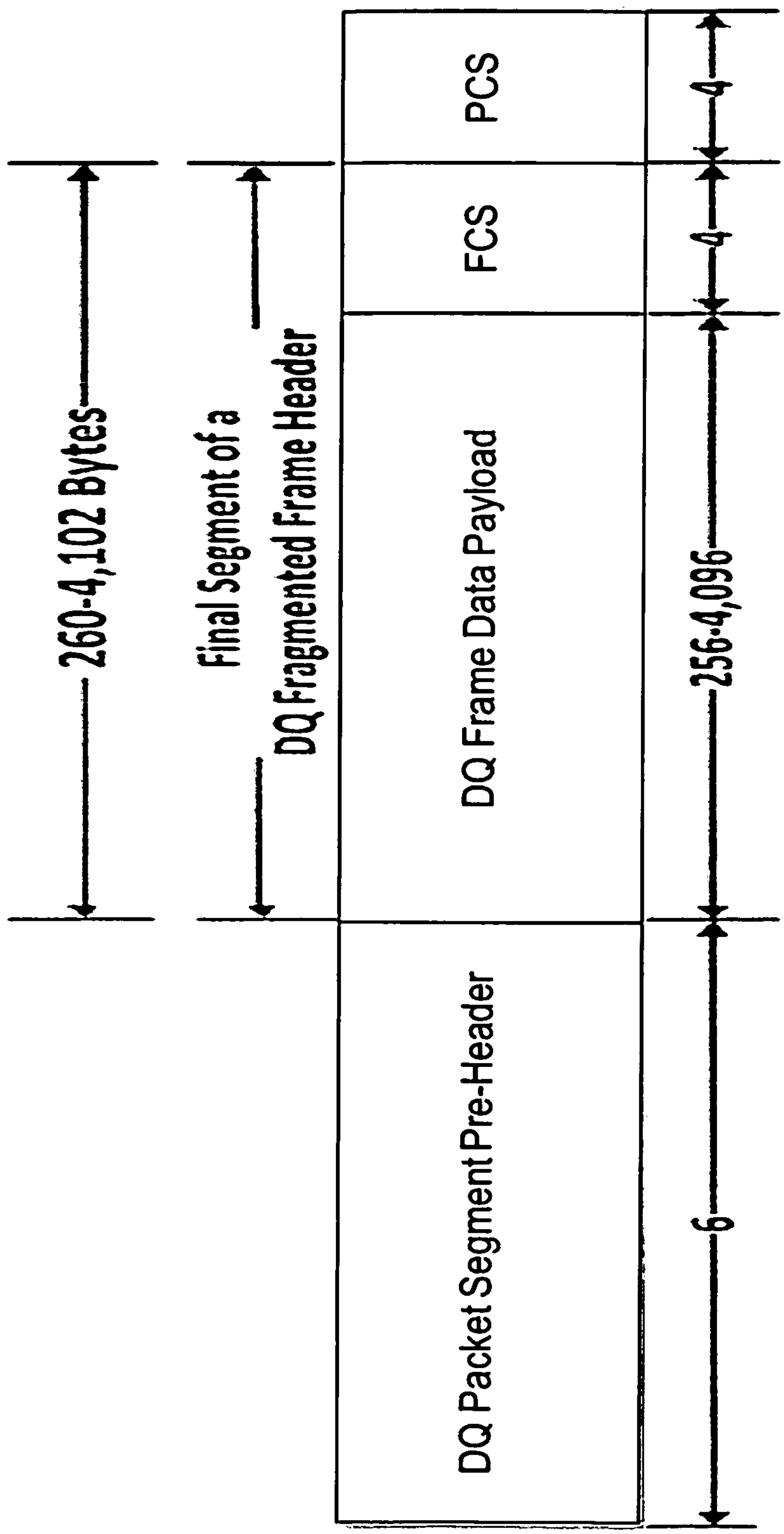
FIG. 19 depicts an exemplary Complete DQ Packet Overview of the Final Packet of a Frame.

FIG. 19 depicts the complete structure of this type of packet, including the FCS and PCS. NOTE: There are NO address fields within this packet.

8.1.1.1.2.6 Intermediate Data Packet of Frame—110b

This value indicates that the data segment contains an intermediate segment of a larger message. There are noFrame Address fields following the DQ Packet Segment Pre-Header for this case; nor is there an FCS.

Figure 20:
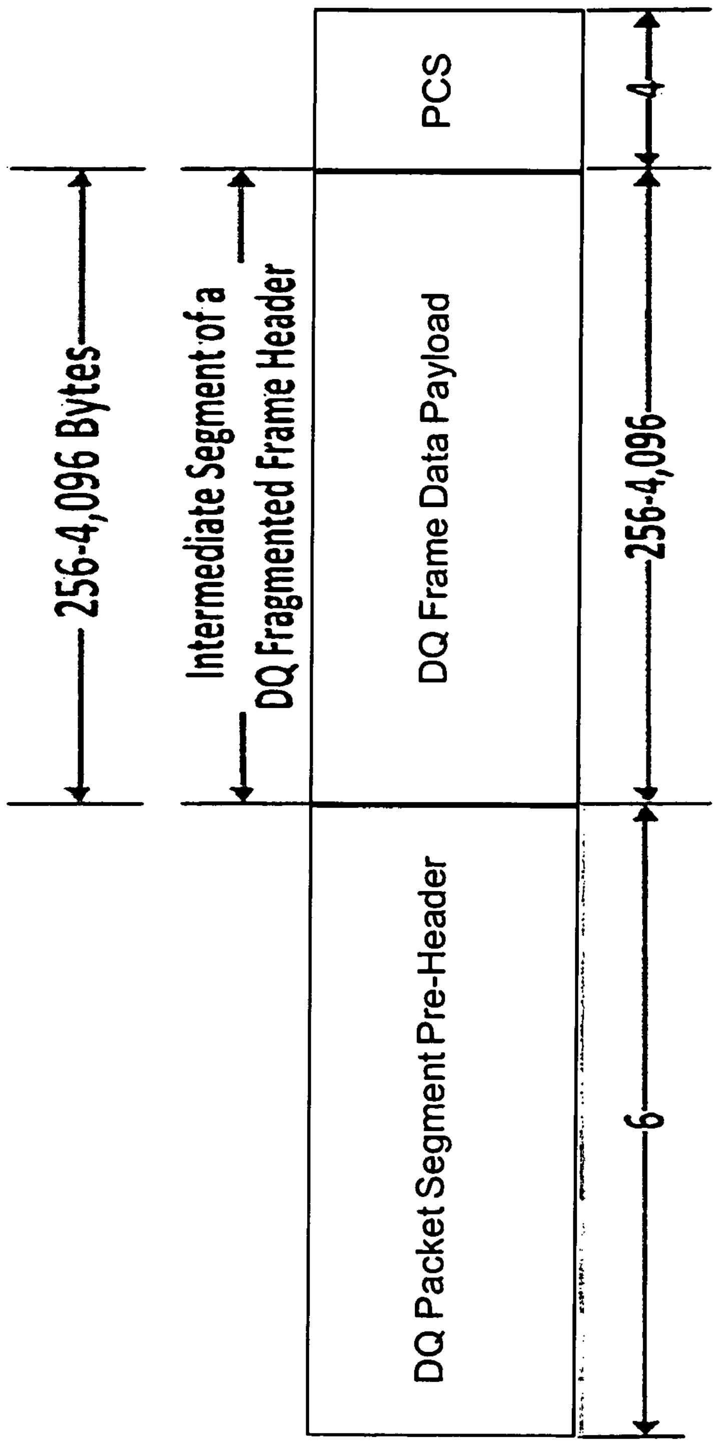
FIG. 20 depicts an exemplary Complete DQ Packet & DQ Frame Overview of an Intermediate Packet of a Frame.

FIG. 20 depicts the complete packet of this type of packet, including the FCS and PCS. NOTE: There are NO address fields within this packet.

8.1.1.1.2.7 Complete Frame within Data Packet—011b

This value indicates that the DQ Packet contains the entire DQ Frame. The Frame address fields immediately follow the DQ Packet Segment Pre-Header; however, there is neither a Frame Length field nor a Frame Check Sequence (FCS) field, as both would be redundant if included.

Figure 21:
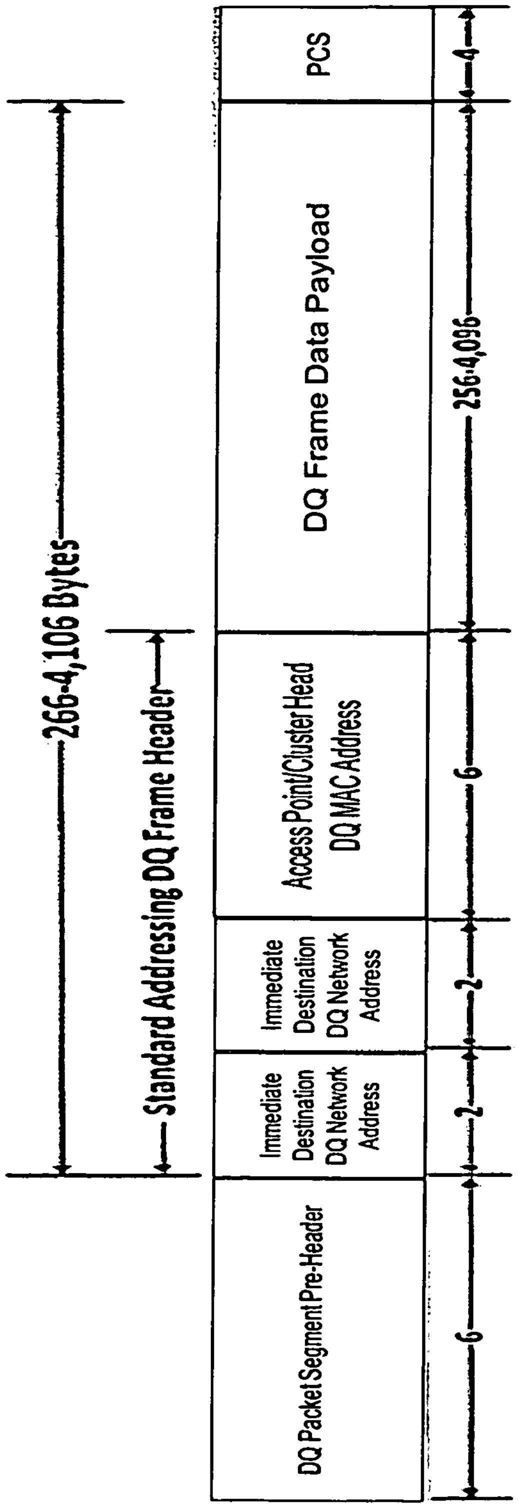
FIG. 21 depicts an exemplary Overview of a Single DQ Packet containing a complete DQ Frame.

FIG. 21 depicts the complete structure of this type of packet, including the FCS and PCS. NOTE: FIG. 21 is an example of a Standard Addressing DQ Frame. An Extended Addressing DQ Frame would have additional addresses, as detailed in section 7.1.2, "The Extended Addressing DQ Frame Header".

8.1.1.1.2.8 Reserved—111b

This field is reserved for future use.

8.1.1.1.3 Management Directive (MD) Bit (Bit 7)

If set, this bit indicates that there is Management Information (MI) Header within the packet and that the MI Sub-Header is located immediately following the DQ Packet Segment Pre-Header and before the Address and/or Payload fields if any.

8.1.1.1.4 Retransmission Bit (Bit 8), RB

If set, this bit indicates that the packet is a retransmission of a previously transmitted packet. This can be used by the receiver station to determine that this may be a duplicate transmission of prior frames as result of an Acknowledgement being lost.

8.1.1.1.5 Dynamic Clustering Enable Bit, DC

If set, this bit indicates that the Cluster Head is Dynamic; thus the Cluster Head will change in real time according to predefined rules.

8.1.1.1.6 Power Management Bit, PM

If set, this bit indicates the Power Management mode that the station will be in after the transmission of the frame; this bit is used by stations that are changing state from Power Save to Active or vice-versa.

8.1.1.1.7 Encryption Bit, EE

This bit indicates encryption is enabled.

8.1.1.1.8 Priority Queuing Enable Bit, PQ

If set, this bit indicates priority queuing is enabled 8.1.1.1.9 Quality of Service (QoS) Level—111b This field only has meaning if the Priority Queuing Enable Bit is set and there is Application Data within the payload; otherwise these bits are unused. There are eight levels of priority, with the level of priority increasing linearly with the value of the QoS bits:

Lowest Priority: "000b"

□

□

□

Highest Priority: "111b"

8.1.1.2 DQ Frame Length Field

The Frame Length field provides the length of the entire DQ Frame, including the FCS.

8.1.1.3 DQ Sequence Control Fields

The Sequence Control Fields keep maintain control of the application data exchanged between two DQSS nodes.

8.1.1.3.1 DQ Sequence Number Field

The Sequence Number identifies the last packet the sending station sent to the destination station. The Sequence Number is checked at the receiver for missing or duplicated packet. A station receiving numbered information packet advances its Nr count if the packet received is in sequence and does not have errors. The receiving station's Nr count will be equal to the Ns in the next expected information packet or one greater than the Ns in the last packet received. The receiver confirms accepted numbered information packet by returning its Nr count to the transmitting station.

If the incoming Ns does not agree with the receiving station's Nr count, the packet is out of sequence and Nr does not advance. The Nr in the out-of-sequence packet is still valid for confirming transmitted packets.

The count range for Ns and Nr is 256, using the digits 0 through 255. Once the sequence number 255 is reached, the count wraps back around to 0. The Nr and Ns counts are initialized to 0.

8.1.1.3.2 DQ Acknowledgment Number Field

The Acknowledgement Number identifies the last packet the sending station has received from the destination station.

The Acknowledgment Number is checked at the destination for missing or duplicated packets. If the incoming Nr does not agree with the receiving stations Ns, the receiving station must reset its Ns to match the incoming Nr and resend any missing packets not received by the sending station the next time it gains control of the queue.

The count range for Ns and Nr is 256, using the digits 0 through 255. Once the sequence number 255 is reached, the count wraps back around to 0. The Nr and Ns counts are initialized to 0.

8.1.2 Frame Address Fields

DQ Packets utilize the same addresses as do DQ Frames; however, because DQ Packets can and often are much smaller; these frames are NOT repeated for multi-packet frames unless otherwise explicitly noted (such as in the case of a "resumed" frame packet sequence).

8.1.3 Frame Length Field

As mentioned in section 4, 8, 8.1.1, and subsections within 8.1.1.1.2, a DQ Frame can be encapsulated either within one single DQ Packet (as detailed in section 8.1.1.1.2.7 above) or divided across multiple packets.

If the frame is to be divided across multiple packets, it will always contain a length field prior to the data payload area within the initial packet of the frame sequence and will also contain a Frame Check Sequence following the data payload area within the last packet of the frame sequence. Otherwise, if the entire frame is encapsulated within a single DQ Packet, neither of these fields is required since both can be deduced from similar fields within the DQ Packet structure (i.e. the Packet Length Field in lieu of the Frame Length Field and Packet Check Sequence in lieu of the Frame Check Sequence).

8.1.4 Packet Data Payload

This segment contains the actual data or body data that is the intended communication.

8.1.5 Frame Check Sequence (FCS)

The FCS is a 32-Bit CRC located immediately following the last byte transmitted for a given frame. The only time the FCS is included within an actual DQ Packet is immediately following the last packet of a multi-packet Frame sequence (see Error! Reference source not found. for an example).

8.1.6 Packet Check Sequence (PCS)

Figure 22:
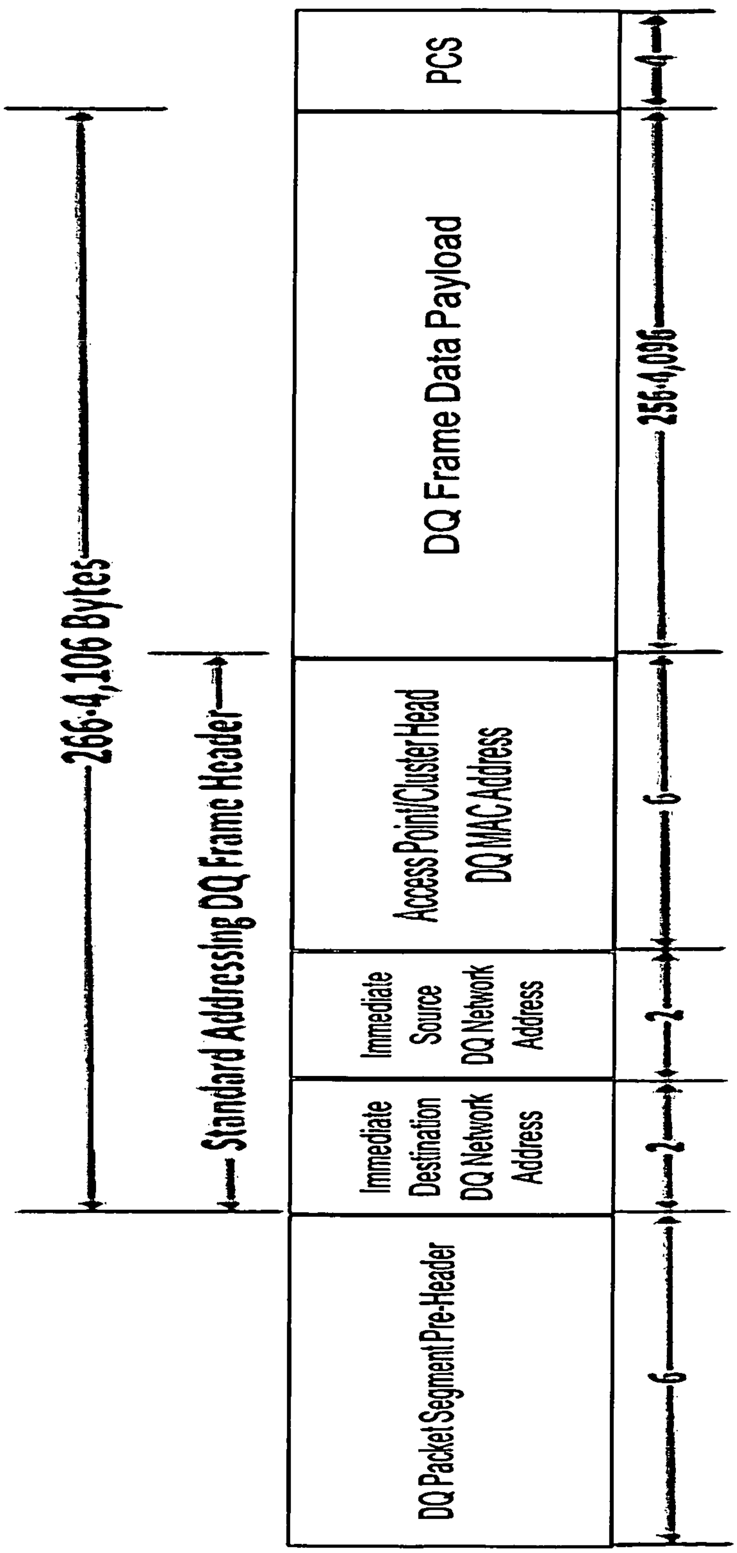
FIG. 22 depicts an exemplary Packet Check Sequence (ONLY) within Packet Segment.

The PCS is a 32-Bit CRC located immediately following the last byte transmitted for a given packet and occurs in every single packet. The structure of a typical packet and PCS is shown in FIG. 22. NOTE: The PCS is applied to the entire packet plus the four bytes of the PCS.

8.2 The Basic DQ Packet Segment with MI Directive

Figure 23:
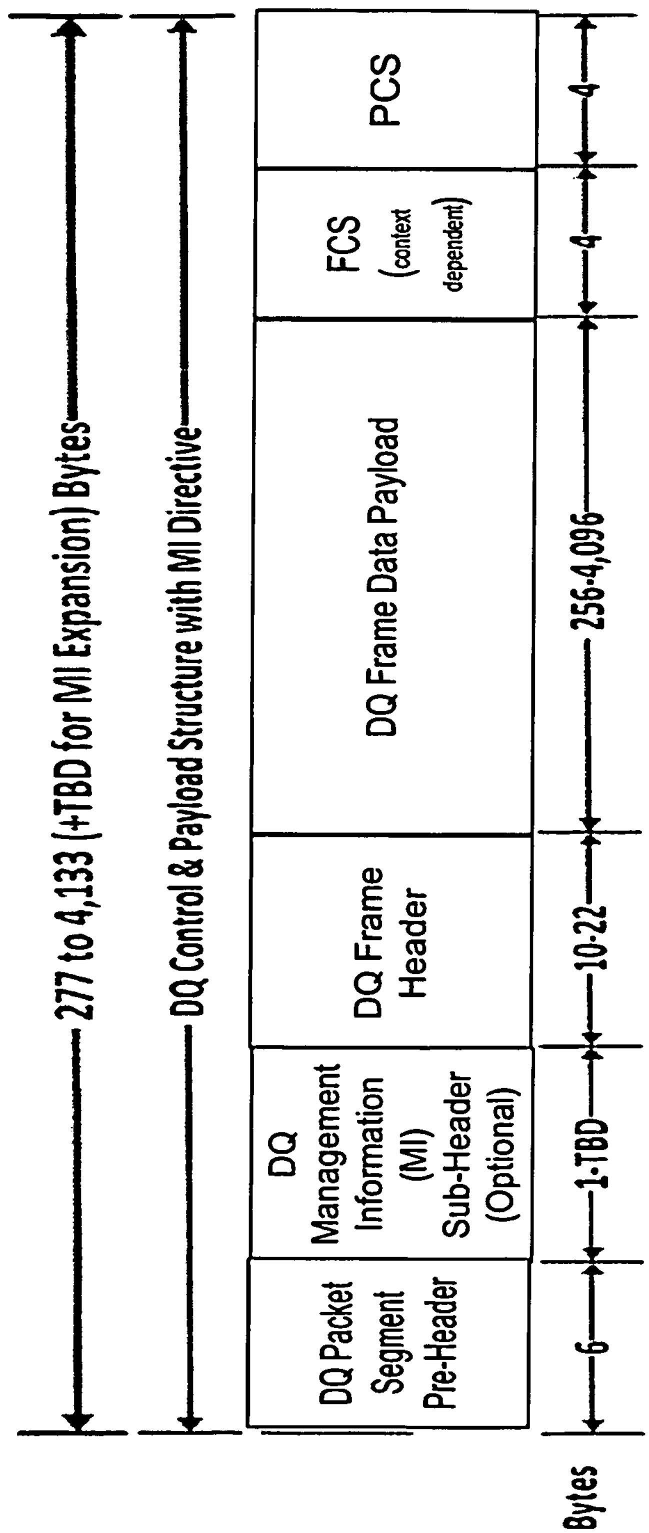
FIG. 23 depicts an exemplary Basic DQ Packet Segment.

The basic DQ Packet with an MI Directive area is shown in FIG. 23. The basic DQ Packet is between 276 and 4,130 bytes in length and is comprised of the DQ Packet Segment Pre-header, the DQ Frame Header, the DQ Management Information Sub-Header and Associated MI Payload (if any), the DQ Frame Data Payload, and the Packet Check Sequence (PCS).

8.2.1 The Management Information (MI) Directive Sub-Header

Figure 24:
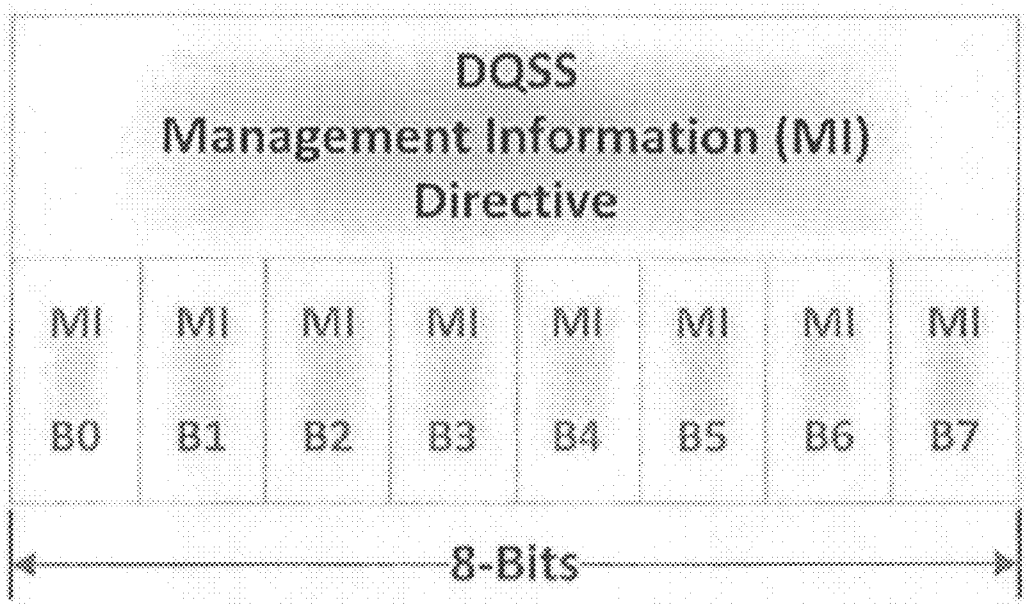
FIG. 24 depicts an exemplary Management Information Command Field.

The MI Sub-Header provides a mechanism for Communication and Control Directives and associated data between DQSS Nodes and has only one mandatory field, the DQSS Management Information Directive Field (as shown in FIG. 24).

Any additional fields within the MI Sub-Header are MI Directive dependent. The below list details the current list and associated values of all the DQSS MI Directives:

0x00: Reserved
0x01: Distribute DQ Service Set Table Command (no acknowledgement. See details in Section 8.2.2.1)
0x02: Mandatory Disconnect Command (no acknowledgement)
0x03: Disconnect Request (from Station to Cluster Head)
0x04: Disconnect Confirmed Response (from Cluster Head to Station)
0x05: Join Request (from Station to Cluster Head)
0x06: Join Accepted Response (from Cluster Head to Station)
0x07: Re-cluster Command (from NEW Cluster Head)
0x08: Re-cluster Acknowledge Response (from each individual station within cluster)
0x09: Link Quality SNR Exchange Request (from Cluster Head to Station)
0x0A: Link Quality SNR Exchange Response (from Station to Cluster Head)
0x0B: Bandwidth Management Command (from Cluster Head to Station)
0x0C: Bandwidth Management Acknowledge Response (from Station to Cluster Head)
0x0D: Maximum Frame Size Command (no acknowledgement) (from Cluster Head to Stations)
0x0E: Switch Queue Command (no response)
0x0F: Pause Queue Command (no response)
0x10: Pause Queue, Enable Join Request for Mini-Slot 1
0x11: Pause Queue, Enable Join Request for Mini-Slot 2
0x12: Pause Queue, Enable Join Request for Mini-Slot 3
0x13: Resume Queue Command However, while the above list enumerates all of the possible Directives; those directives are divided between ones that are can be transmitted during the Feedback Packet segment and those that can be transmitted during the DQ Packet Segment.

8.2.2 Management Information (MI) Directive Used within DQ Packet Segment

The Directives discussed within this section can only occur within the DQ Packet Segment.

8.2.2.1 Distribute DQ Service Set Table (0x01)

Figure 25:
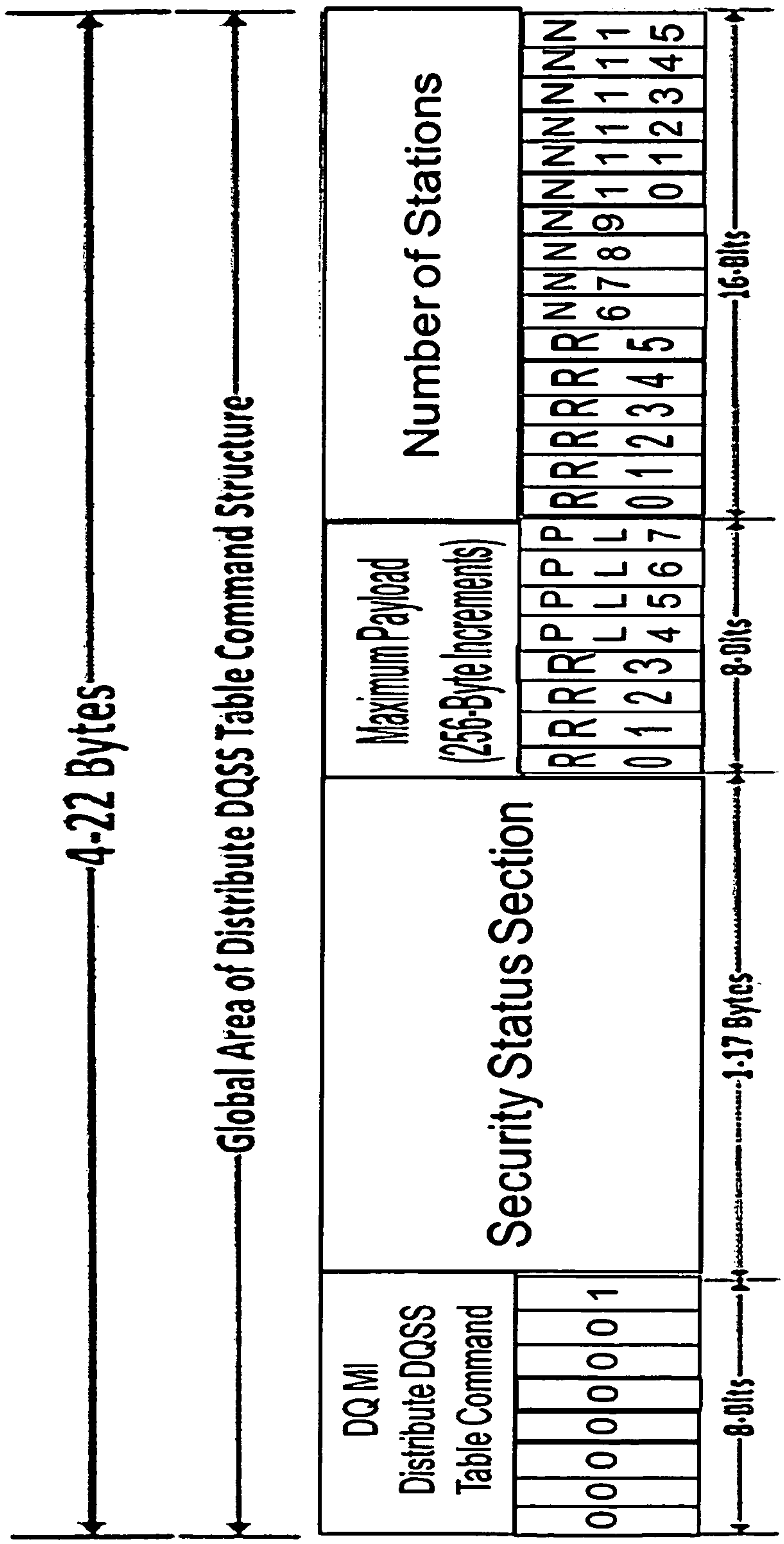
FIG. 25 depicts an exemplary Message Check Sequence within Frame Segment.

This command is a minimum of bytes in length and can only be sent by the Access Point/Cluster. FIG. 25 depicts the global parameter area of the Distribute DQSS Table Command. NOTE: all Bits labeled as 'R' are unused and hence reserved. The DQ Service Set Table is divided into two sets of parameters:

1) The first set of parameters are applicable to the entire table and shown below:
   a. The Security Status of the DQSS:
      i. No Encryption (1-Byte);
      ii. Public Key Encryption (1-Byte);
      iii. Private (Shared) Key Encryption (1-Byte).
   b. Public Encryption Key (16-Bytes: this field only exists when Security Status is set to "Public Key Encryption"; otherwise, this field is not part of the DQSS Table).
   c. Maximum Packet Payload Limitation of the DQSS (1-Byte).
   d. Number of Configured DQSS Nodes (2-Bytes).
2) The remaining parameters are applicable for all DQSS Nodes with one entry per Node within the DQSS including the Access Point or Cluster Head:
   DQSS MAC Address.
   Assigned DQSS Network Address.
   Assigned DQSS Hamming Weight.
   Assigned Cluster Head Priority.
   Assigned QoS Node Priority. This field should be zero (0) for most networks and should only be used if there are specific nodes that need higher priority than others nodes. In those cases in which QoS is on and two nodes are in the queue with the same QoS priority traffic waiting to be sent, the one with the higher priority (if any) moves to the top of the queue for that specific priority setting. NOTE: This only effects traffic of equivalent QoS priorities. It does NOT affect higher priority traffic from a lower priority node. Higher priority traffic is always serviced before lower priority traffic regardless of the priority of the node.
   Assigned Bandwidth Status:
      No Bandwidth Guarantee;
      Limited/Restricted bandwidth;
      Guaranteed bandwidth.
   Assigned Bandwidth Setting of each station (i.e. limit or minimum guaranteed value) when applicable.

8.2.2.1.1 DQSS Security Status & Public Encryption Key Fields

In order to provide the maximum degree of security within the network, the encryption switch is found within the first byte following the DQSS Table Command byte. Only the least significant lower two bits are valid. The remaining upper six bits are unused and hence reserved.

8.2.2.1.1.1 DQSS No Encryption ("00b")

Figure 26:
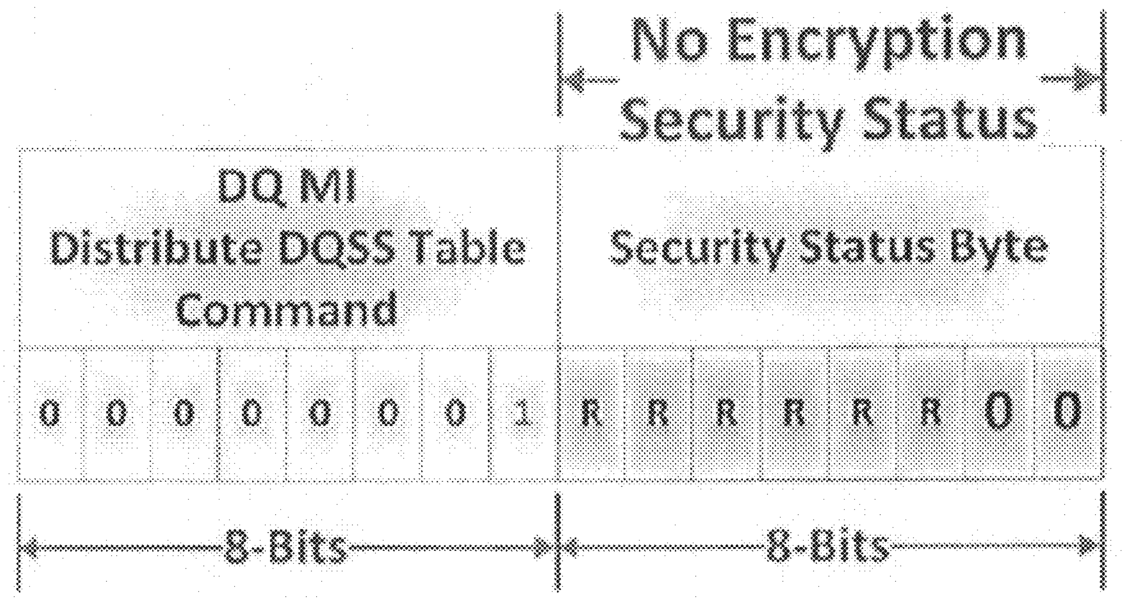
FIG. 26 depicts an exemplary Distribute DQSS Table Command Global Parameters.

Whenever the Security Status field is set to No Encryption, then there are no additional fields; thus the first two bytes of DQSS table are simply the command and security status fields as shown in FIG. 26. In this case, the remaining bytes within the DQSS Table are encrypted using the Shared Encrypted Key possessed by all of the DQSS member stations.

8.2.2.1.1.2 DQSS Public KeyEncryption ("01b")

Figure 27:
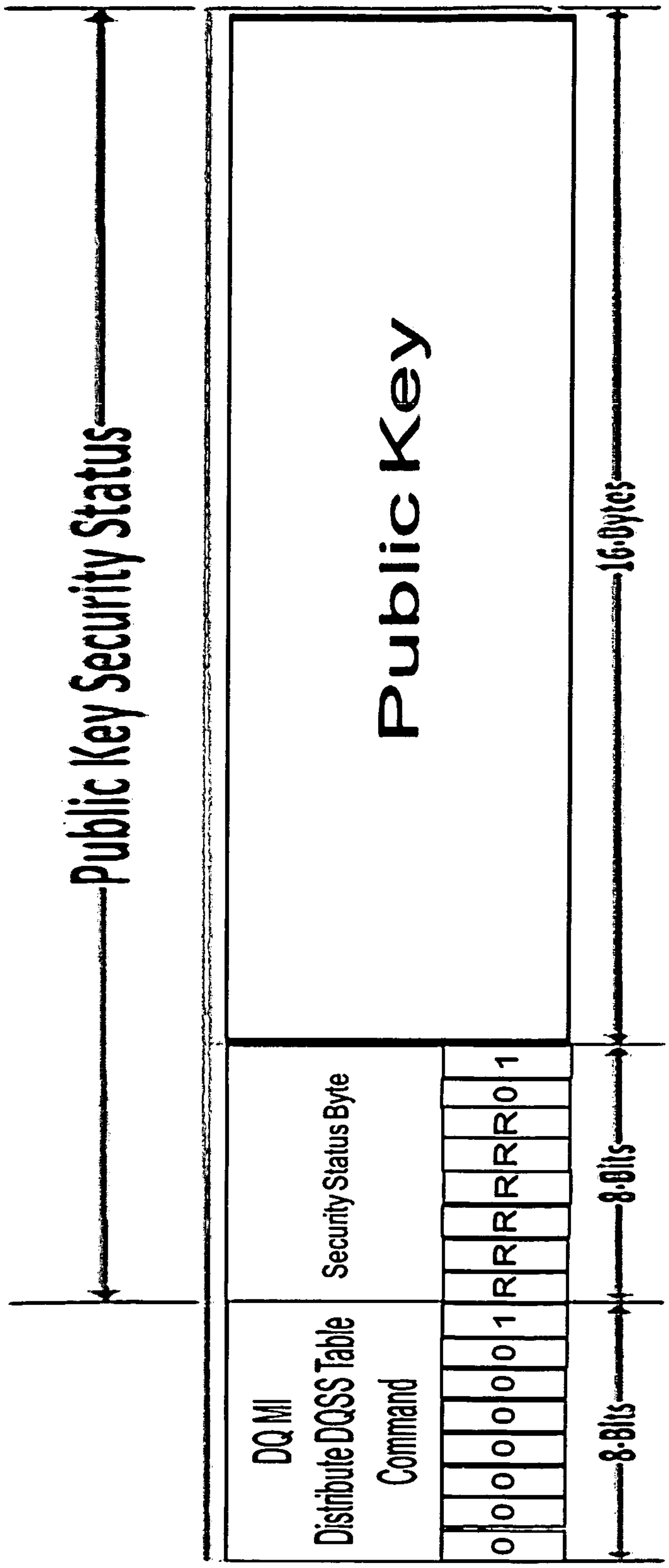
FIG. 27 depicts an exemplary Distribute DQSS Table Command Structure with Public Key Encryption.

Whenever the Security Status field is set to Public Key Encryption, then the immediate subsequent field is the Public Key field as shown in FIG. 27. In this case, the remaining bytes within the DQSS Table are encrypted using the Public Key.

8.2.2.1.1.3 DQSS Shared KeyEncryption ("10b")

Figure 28:
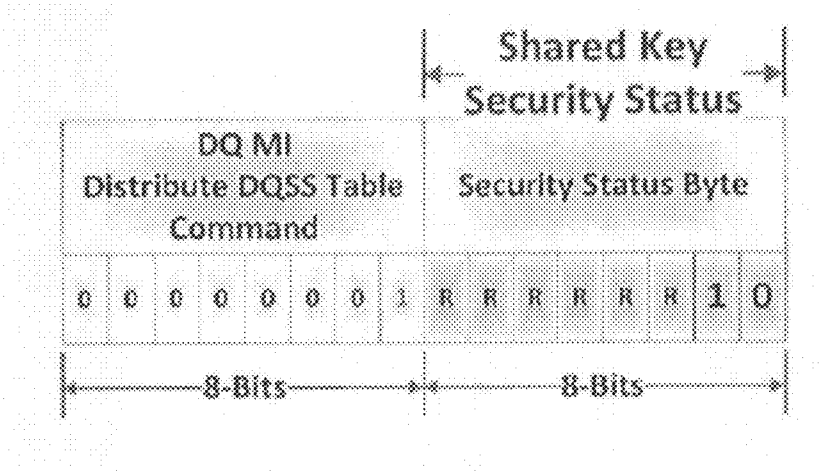
FIG. 28 depicts an exemplary Distribute DQSS Table Command Structure with Shared Key Encryption.

Whenever the Security Status field is set to Shared Key Encryption, then there is no public key field. The DQSS Table Command and Security Status fields are shown in FIG. 28. In this case, the remaining bytes within the DQSS Table are encrypted using the Shared Encrypted Key possessed by all of the DQSS member stations.

8.2.2.2 Maximum Payload

The Maximum Payload field enables specifies the maximum number of bytes allowed within the payload portion of a DQSS Information Frame. The minimum allowed payload is 256-bytes and the maximum allowed payload is 4,096-bytes.

Only the lower four bits of this field are used with the remaining upper four bits being reserved. All payload specifications are given in 256-byte increments with "0000b" representing 256-bytes and "1111 b" representing 4,096-bytes.

8.2.2.3 Number of Configured DQSS Nodes

This field can never be zero, since the Access Point or Cluster Head always counts as part of the network. Hence, zero a setting of "00000000b" is considered invalid.

8.2.2.4 DQSS Table Entries per Node

The remaining fields within the DQSS Table are on a per node basis and in the following order for each entry:

Bytes: 0-5—DQSS MAC Address.
Bytes: 6-9:
  Assigned DQSS Hamming Weight.
  Assigned DQSS Network Address.
Bytes: 10-11—Assigned Cluster Head Priority.
Byte: 12—Assigned QoS Node Priority.
Byte: 13—Assigned Bandwidth Status:
  No Bandwidth Guarantee;
  Limited/Restricted bandwidth;
  Guaranteed bandwidth.
Bytes: 14-15—Assigned Bandwidth Setting of each station.

Figure 29:
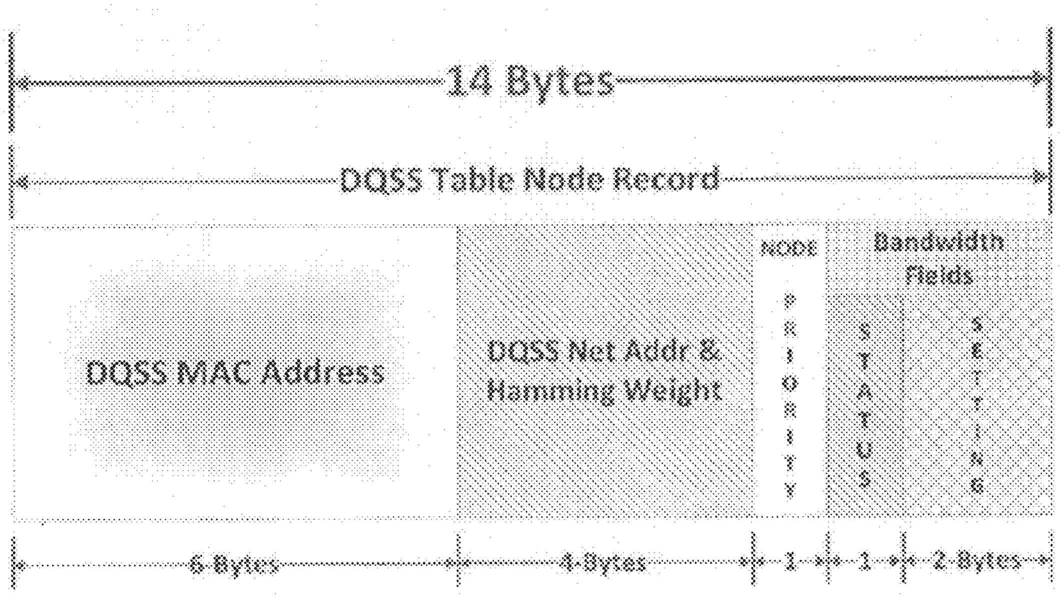
FIG. 29 depicts an exemplary Distribute DQSS Table Command Structure with Encryption Disabled.

FIG. 29 depicts a Single Table Record within the Distribute DQSS Table Command.

8.2.2.5 Mandatory Disconnect Command

Figure 30:
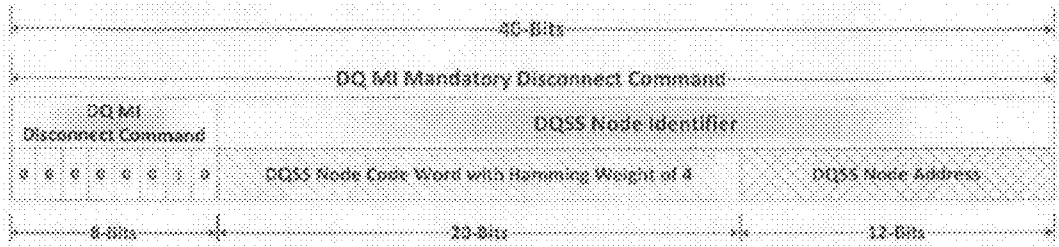
FIG. 30 depicts an exemplary Distribute DQSS Table Command Node Record Parameters.

This command is 5-bytes in length and can only be sent by the Cluster Head to a DQSS Client Node. It cannot be ignored by the DQSS Client Node. The format of the Mandatory Disconnect is shown in FIG. 30.

No response is expected or desired from the affected DQ Client Node. If the DQ Client Node attempts any further communication other than a request to "Join the DQSS", the Cluster Head will in turn respond with another MD command.

Distribute DQ Service Set Table—
0x14: Mandatory Disconnect (no acknowledgement)
0x15: Disconnect Request (from Station to Cluster Head)
0x16: Disconnect Confirmed (from Cluster Head to Station)
0x17: Join Request (from Station to Cluster Head)
0x18: Join Accepted (from Cluster Head to Station)
0x19: Re-cluster Command (from NEW Cluster Head)
0x20: Re-cluster Acknowledge (from each individual station within cluster)
0x21: Link Quality SNR Exchange Request (from Cluster Head to Station)
0x0G: Link Quality SNR Exchange Response (from Station to Cluster Head)
0x0H: Bandwidth Management Command (from Cluster Head to Station)
0x0I: Bandwidth Management Acknowledge (from Station to Cluster Head)
0x0J: Maximum Frame Size Command (no acknowledgement) (from Cluster Head to Stations)
0x0K: Switch Queue
0x0L: Pause Queue
0x22: Pause Queue, Enable Join Request for Mini-Slot 1
0x23: Pause Queue, Enable Join Request for Mini-Slot 2
0x24: Pause Queue, Enable Join Request for Mini-Slot 3
0x25: Resume Queue The MI Sub-Header provides a mechanism for Communication and Control Directives and associated data between DQSS Nodes and has only one mandatory field, the DQSS.

8.3 Frame Control Sequence (FCS)

The MCS is a 32-Bit CRC located immediately following the last byte transmitted for a given message. This field is not part of a frame whose payload comprises a complete message. There are only two instances where this field would appear:

When the Data Fragment Management field is set to "011 b"—Indicating the frame is a "Resumed Message with Final Data Segment" frame. Meaning, it is the last frame of previously interrupted sequence of frames for the associated message.

When the Data Fragment Management field is set to "100b"—Indicating the frame is a "Final Data Segment" frame. Meaning, it is the last frame of sequence of frames for the associated message.

Figure 31:
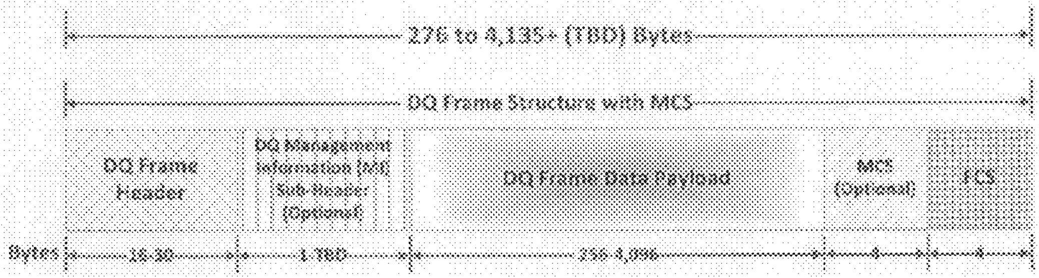
FIG. 31 depicts an exemplary MI Disconnect Command Structure.

In these two instances, the format of the MAC & Data Payload Segment are shown in FIG. 31. NOTE: The MCS is only applied to the payload portion of the message plus the four bytes of the MCS.

9.0 Management Information (MI) Directives

The MI Directives are used to maintain and control the network. Directives initiated by the Access Point or Cluster Head are usually intended to maintain the order and integrity of the overall DQSS network. While directives initiated by DQSS Client Nodes are generally used for a specific service or action for that particular DQSS Client Node. Each MI Directive will now be individually detailed, including a complete description of its use, its structure, and intended actions resulting whenever it is used.

9.1 Distribute DQ Service Set Table (0x01)
9.2 Mandatory Disconnect (0x02)
9.3 Disconnect Request (0x03)
9.4 Disconnect Confirmed (0x04)
9.5 DQSS Join Request (0x05)

9.6 DQSS Join Confirmed (0x06)

9.7 Re-Cluster Command (0x07)

9.8 Re-Cluster Acknowledge (0x08)

9.9 Link Quality SNR Exchange Request (0x09)

9.10 Link Quality SNR Exchange Response (0x0A)

9.11 Bandwidth Management Command (0x0B)

9.12 Bandwidth Management Acknowledge (0x0C)

9.13 Maximum Frame Size Command (0x0D)

9.14 Maximum Frame Size Command (0x0E)

9.15 Switch Queue Command (0x0F)

9.16 Pause Queue Command (0x10)

This command can only occur within the Feedback Packet and causes the immediate cessation of application data for all subsequent transmission sequences pending further notice. This includes the case of the command being issued during the transmission of a multi-frame message.

If the command occurs within the sequence of a multi-frame message; the continuation of that message is paused effectively immediately and is not resumed until a “Resume Queue” command is later issued by the Cluster Head.

9.17 Pause Queue, Enable Join Request for ARS MiniSlot One (1) Command (0x11)

This command has the same effect as the Pause Queue Command (0x10), but with two additional side-effects:

1) The ARS is eliminated during the immediate transmission sequence; thus this is the notification to all stations so that they may abide by it.
2) The Station making the join request within ARS Mini-Slot One (1) of the prior ARS segment is directed to issue a Join Request Directive within the DQ Control & Data Payload Segment of the next transmission sequence.

Assuming successful transmission of this directive, the subsequent feedback packet will contain feedback as to the determination and resultant actions of the Join Request for ARS Mini-Slot One (1).

9.18 Pause Queue, Enable Join Request for ARS Mini-Slot Two (2) Command (0x12)

This command has the same effect as the Pause Queue Command (0x10), but with two additional side-effects:

1) The ARS is eliminated during the immediate transmission sequence; thus this is the notification to all stations so that they may abide by it.
2) The Station making the prior join request within ARS Mini-Slot Two (2) of the prior ARS segment is directed to issue a Join Request Directive within the DQ Control & Data Payload Segment of the next transmission sequence.

Assuming successful transmission of this directive, the subsequent feedback packet will contain feedback as to the determination and resultant actions of the Join Request for ARS Mini-Slot Two (2).

9.19 Pause Queue, Enable Join Request for ARS Mini-Slot Three (3) Command (0x13)

This command has the same effect as the Pause Queue Command (0x10), but with two additional side-effects:

1) The ARS is eliminated during the immediate transmission sequence; thus this is the notification to all stations so that they may abide by it.
2) The Station making the prior join request within ARS Mini-Slot Three (3) of the prior ARS segment is directed to issue a Join Request Directive within the DQ Control & Data Payload Segment of the next transmission sequence.

Assuming successful transmission of this directive, the subsequent feedback packet will contain feedback as to the determination and resultant actions of the Join Request for ARS Mini-Slot Three (3).

9.20 Resume Queue Command (0x0E)

10.0 the DQSS Management Segment (Feedback Packet (FP))

The DQSS Management Segment has three primary functions:

1) To provide the Cluster Head a means in which to manage the DQSS and associated nodes from the perspective of membership, Quality of Service (QoS), and both queues (i.e. Data Queue and Request Queue).
2) To provide feedback to the other nodes in the system for both data and control information.
3) To signify and thus mark the end of a single transmission sequence, therefore providing a beacon to all stations for synchronizations purposes.

Figure 32:
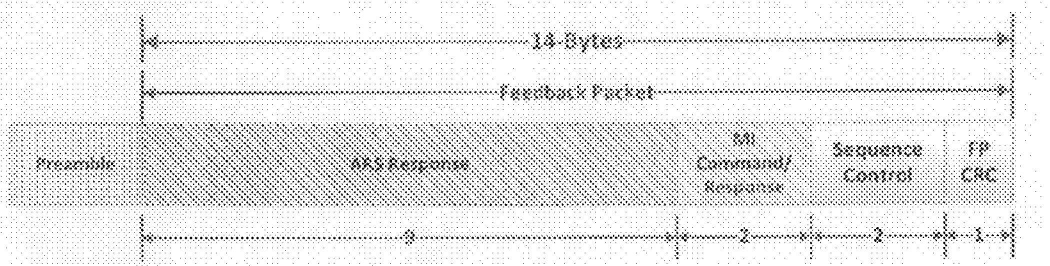
FIG. 32 depicts an exemplary DQSS Management Segment Structure.

FIG. 32 represents the structure of the FP and fulfills the above three requirements.

As shown above, the DQSS Management Segment or FP consists of five sections:

Preamble

ARS Response

MI Command or Response

Sequence Control

Feedback Packet 8-Bit CRC.

Other than the “Preamble,” which is self-explanatory; each one will now be described in detail.

10.1 ARS Response

Figure 33:
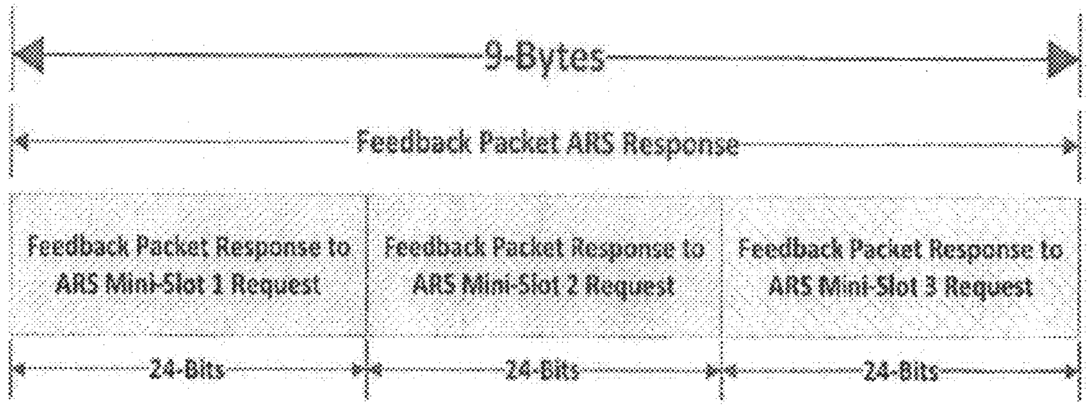
FIG. 33 depicts an exemplary ARS Response from Cluster Head.
Figure 34:
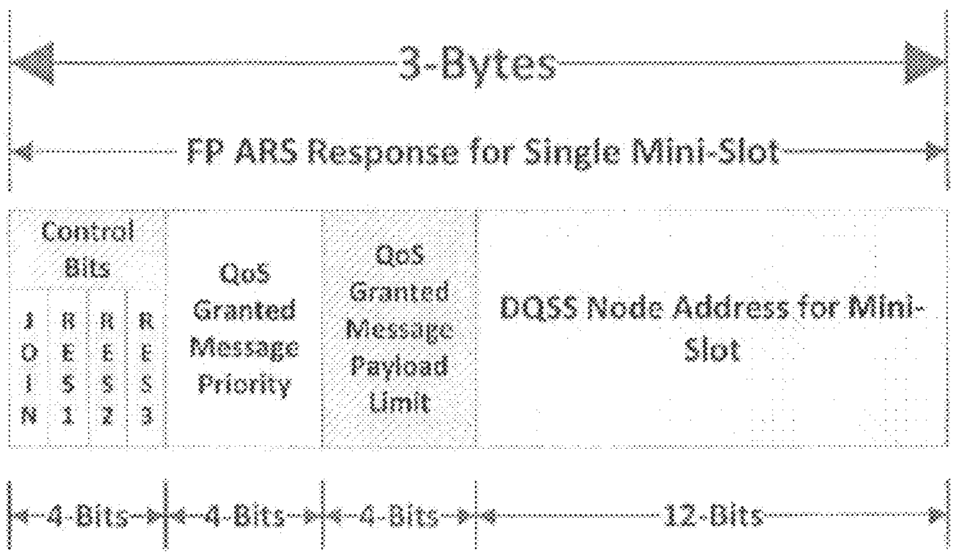
FIG. 34 depicts an exemplary AP/CH ARS Mini-Slot Response Format.

Similar to the actual ARS, which has three Mini-Slots, the response to the ARS contains a one-to-one correlation as shown in FIG. 33. With the precise contents for each ARS Mini-Slot Response divided into three separate sections as shown in FIG. 34.

10.2 FP MI Command/Response 10.3 Sequence Control 10.4 Feedback Packet CRC 11.1 Basic Distributed Queuing Wireless Arbiter (DQWA)—Wireless LAN Implementation This would be for a basic proof of concept.

Features:

Static Access Point

Fixed Sub-stations

No Hidden Nodes

Target: Replacement for Wi-Fi 11.2 Full DQWA—Wireless LAN Implementation

Introduce mobility with the client stations, which by default also adds in hidden nodes.

Features:

Static Access Point

Fixed or Mobile Client Stations

Hidden Nodes

Relay Feature for Hidden Nodes, with 2-hop limit for relay

Target: Replacement for Wi-Fi 11.3 Full Distributed Queuing Wireless Arbiter (DQWA) with QoS—Wireless LAN Implementation Features:

Static Access Point

Fixed or Mobile Client Stations

Hidden Nodes

Relay Feature for Hidden Nodes, with 2-hop limit for relay

Priority Queuing for supporting QoS

Target: Replacement for Wi-Fi 11.4 Basic Distributed Queuing Wireless Arbiter (DQWA) with QoS and Guaranteed Bandwidth—Wireless LAN Implementation Features:

Static Access Point

Fixed or Mobile Client Stations

Hidden Nodes

Relay Feature for Hidden Nodes, with 2-hop limit for relay

Priority Queuing for supporting QoS

Guaranteed Bandwidth

Target: Replacement for Wi-Fi 11.5 Distributed Queuing Mac Protocol for Adhoc Networks (DQMAN)—Wireless LAN Implementation Features StaticAccess Point or Dynamic Cluster Head (i.e. ad-hoc clustering)

Fixed or Mobile Client Stations

Hidden Nodes

Relay Feature for Hidden Nodes, with 2-hop limit for relay

Target: Replacement for Wi-Fi.

11.6 Distributed Queuing Mac Protocol for Adhoc Networks (DQMAN) with QoS—Wireless LAN Implementation Features Static Access Point or Dynamic Cluster Head (i.e. ad-hoc clustering)

Fixed or Mobile Client Stations

Hidden Nodes

Relay Feature for Hidden Nodes, with 2-hop limit for relay

Priority Queuing for supporting QoS

Target: Replacement for Wi-Fi.

11.7 Distributed Queuing Mac Protocol for Adhoc Networks (DQMAN) with QoS and Guaranteed Bandwidth—Wireless LAN Implementation Features Static Access Point or Dynamic Cluster Head (i.e. ad-hoc clustering)

Fixed or Mobile Client Stations

Hidden Nodes

Relay Feature for Hidden Nodes, with 2-hop limit for relay

Priority Queuing for supporting QoS

Guaranteed Bandwidth

Target: Replacement for Wi-Fi.

11.8 Full DQWA with Routing Support with QoS and Guaranteed Bandwidth—Wireless Corporate Area Network (CAN) Implementation (Introduce Routing Connectivity between DQWA Wireless LANs).

Features:

Static CAN Base Station

Fixed CAN Router Sub-stations

No Hidden CAN Nodes

Routing Support of QoS

Routing Support of Guaranteed Bandwidth

Target: Replacement for Fiber or Copper based Ethernet Corporate Backbone.

Two additional comments here:

1) Trying to route Ad-Hoc Networks would be very difficult without a centralized conduit so having the Router Sub-Stations be fixed seems to be the logical choice in this instance.

2) Assuming the Router Sub-Station is fixed; then it could be part of a Static Access Point, providing of course the RF issues can be worked out because of the dual antennas. The dual functionality would be very similar to a DSL Wireless Router within people's homes.

APPENDIX A

Predefined Network Addresses and Code Words Used for Joining DQSS

When requesting to join the network; a requesting node must transmit that request during the ARS by using a combination of a predefined set of Network Addresses and Code Words as well as enabling the "Join" bit.

A.1 Predefined

Network Addresses Used for Join Requests

The below list enumerate the 128-different DQ Network Addresses that can be used when requesting to join a DQSS network (NOTE: these values cover both the Mini-Cluster and Individual Address Sub-Fields within the DQSS Network Address):

| |
|---|
| 0x0380 (896) |
| 0x0381 (897) |
| 0x0382 (898) |
| 0x0383 (899) |
| 0x0384 (900) |
| 0x0385 (901) |
| 0x0386 (902) |
| 0x0387 (903) |
| 0x0388 (904) |
| 0x0389 (905) |
| 0x038A (906) |
| 0x038B (907) |
| 0x038C (908) |
| 0x038D (909) |
| 0x038E (910) |
| 0x038F (911) |
| 0x0390 (912) |
| 0x0391 (913) |
| 0x0392 (914) |
| 0x0393 (915) |
| 0x0394 (916) |
| 0x0395 (917) |
| 0x0396 (918) |
| 0x0397 (919) |
| 0x0398 (920) |
| 0x0399 (921) |
| 0x039A (922) |
| 0x039B (923) |
| 0x03C1 (961) |
| 0x03C2 (962) |
| 0x03C3 (963) |
| 0x03C4 (964) |
| 0x03C5 (965) |
| 0x03C6 (966) |
| 0x03C7 (967) |
| 0x03C8 (968) |
| 0x03C9 (969) |
| 0x03CA (970) |
| 0x03CB (971) |
| 0x03CC (972) |
| 0x03CD (973) |
| 0x03CE (974) |
| 0x03CF (975) |
| 0x03D0 (976) |
| 0x03D1 (977) |
| 0x03D2 (978) |
| 0x03D3 (979) |
| 0x03D4 (980) |
| 0x03D5 (981) |
| 0x03D6 (982) |
| 0x03D7 (983) |
| 0x03D8 (984) |
| 0x03D9 (985) |
| 0x03DA (986) |
| 0x03DB (987) |
| 0x03DC (988) |
| 0x03DD (989) |
| 0x03DE (990) |
| 0x03DF (991) |
| 0x03E0 (992) |

-continued

| |
|---|
| 0x03E1 (993) |
| 0x03E2 (994) |
| 0x03E3 (995) |
| 0x03E4 (996) |
| 0x03E5 (997) |
| 0x03E6 (998) |
| 0x03E7 (999) |
| 0x03E8 (1000) |
| 0x03E9 (1001) |
| 0x03EA (1002) |
| 0x03EB (1003) |
| 0x03EC (1004) |
| 0x03ED (1005) |
| 0x03EE (1006) |
| 0x03EF (1007) |
| 0x03F0 (1008) |
| 0x03F1 (1009) |
| 0x03F2 (1010) |
| 0x03F3 (1011) |
| 0x03F4 (1012) |
| 0x03F5 (1013) |
| 0x03F6 (1014) |
| 0x03F7 (1015) |
| 0x03F8 (1016) |
| 0x03F9 (1017) |
| 0x03FA (1018) |
| 0x03FB (1019) |
| 0x03FC (1020) |
| 0x03FD (1021) |
| 0x03FE (1022) |
| 0x03FF (1023) |

A.2 Predefined Code Words Used for Join Requests

The below list represents 17-different Code Words that can be used when requesting to join a DQSS network:

| |
|---|
| 00000000000000001111 |
| 00000000000000011110 |
| 00000000000000111100 |
| 00000000000001111000 |
| 00000000000011110000 |
| 00000000000111100000 |
| 00000000001111000000 |
| 00000000011110000000 |
| 00000000111100000000 |
| 00000001111000000000 |
| 00000011110000000000 |
| 00000111100000000000 |
| 00001111000000000000 |
| 00011110000000000000 |
| 00111100000000000000 |
| 01111000000000000000 |
| 11110000000000000000 |

NOTE: Even if the "Join Bit" within the requesting ARS Mini-Slot is set, but either the Code Word and/or the Network Address are NOT from these lists, the request will be ignored.

APPENDIX B

List of Allowed 20 Bit Code Words with Hamming Weight of 4

There are a total of 4,845 Code Words with a Hamming Weight of 4 in a 20-bit string. With the exception of those shown in BOLD RED (which are reserved and not usable as a regular DQ Node Network Address), the below list represents all of the aforementioned 20-Bit Code Words with a Hamming Weight of 4:

| |
|---|
| **0x0000F ==> 00000000000000001111** |
| 0x00017 ==> 00000000000000010111 |
| 0x0001B ==> 00000000000000011011 |
| 0x0001D ==> 00000000000000011101 |
| **0x0001E ==> 00000000000000011110** |
| 0x00027 ==> 00000000000000100111 |
| 0x0002B ==> 00000000000000101011 |
| 0x0002D ==> 00000000000000101101 |
| 0x0002E ==> 00000000000000101110 |
| 0x00033 ==> 00000000000000110011 |
| 0x00035 ==> 00000000000000110101 |
| 0x00036 ==> 00000000000000110110 |
| 0x00039 ==> 00000000000000111001 |
| 0x0003A ==> 00000000000000111010 |
| **0x0003C ==> 00000000000000111100** |
| 0x00047 ==> 00000000000001000111 |
| 0x0004B ==> 00000000000001001011 |
| 0x0004D ==> 00000000000001001101 |
| 0x0004E ==> 00000000000001001110 |
| 0x00053 ==> 00000000000001010011 |
| 0x00055 ==> 00000000000001010101 |
| 0x00056 ==> 00000000000001010110 |
| 0x00059 ==> 00000000000001011001 |
| 0x0005A ==> 00000000000001011010 |
| 0x0005C ==> 00000000000001011100 |
| 0x00063 ==> 00000000000001100011 |
| 0x00065 ==> 00000000000001100101 |
| 0x00066 ==> 00000000000001100110 |
| 0x00069 ==> 00000000000001101001 |
| 0x0006A ==> 00000000000001101010 |
| 0x0006C ==> 00000000000001101100 |
| 0x00071 ==> 00000000000001110001 |
| 0x00072 ==> 00000000000001110010 |
| 0x00074 ==> 00000000000001110100 |
| **0x00078 ==> 00000000000001111000** |
| 0x00087 ==> 00000000000010000111 |
| 0x0008B ==> 00000000000010001011 |
| 0x0008D ==> 00000000000010001101 |
| 0x0008E ==> 00000000000010001110 |
| 0x00093 ==> 00000000000010010011 |
| 0x00095 ==> 00000000000010010101 |
| 0x00096 ==> 00000000000010010110 |
| 0x00099 ==> 00000000000010011001 |
| 0x0009A ==> 00000000000010011010 |
| 0x0009C ==> 00000000000010011100 |
| 0x000A3 ==> 00000000000010100011 |
| 0x000A5 ==> 00000000000010100101 |
| 0x000A6 ==> 00000000000010100110 |
| 0x000A9 ==> 00000000000010101001 |
| 0x000AA ==> 00000000000010101010 |
| 0x000AC ==> 00000000000010101100 |
| 0x000B1 ==> 00000000000010110001 |
| 0x000B2 ==> 00000000000010110010 |
| 0x000B4 ==> 00000000000010110100 |
| 0x000B8 ==> 00000000000010111000 |
| 0x000C3 ==> 00000000000011000011 |
| 0x000C5 ==> 00000000000011000101 |
| 0x000C6 ==> 00000000000011000110 |
| 0x000C9 ==> 00000000000011001001 |
| 0x000CA ==> 00000000000011001010 |
| 0x000CC ==> 00000000000011001100 |
| 0x000D1 ==> 00000000000011010001 |
| 0x000D2 ==> 00000000000011010010 |
| 0x000D4 ==> 00000000000011010100 |
| 0x000D8 ==> 00000000000011011000 |
| 0x000E1 ==> 00000000000011100001 |
| 0x000E2 ==> 00000000000011100010 |
| 0x000E4 ==> 00000000000011100100 |
| 0x000E8 ==> 00000000000011101000 |
| **0x000F0 ==> 00000000000011110000** |
| 0x00107 ==> 00000000000100000111 |
| 0x0010B ==> 00000000000100001011 |
| 0x0010D ==> 00000000000100001101 |
| 0x0010E ==> 00000000000100001110 |
| 0x00113 ==> 00000000000100010011 |
| 0x00115 ==> 00000000000100010101 |
| 0x00116 ==> 00000000000100010110 |
| 0x00119 ==> 00000000000100011001 |
| 0x0011A ==> 00000000000100011010 |
| 0x0011C ==> 00000000000100011100 |
| 0x00123 ==> 00000000000100100011 |

-continued

0x00125 ==> 00000000000100100101
0x00126 ==> 00000000000100100110
0x00129 ==> 00000000000100101001
0x0012A ==> 00000000000100101010
0x0012C ==> 00000000000100101100
0x00131 ==> 00000000000100110001
0x00132 ==> 00000000000100110010
0x00134 ==> 00000000000100110100
0x00138 ==> 00000000000100111000
0x00143 ==> 00000000000101000011
0x00145 ==> 00000000000101000101
0x00146 ==> 00000000000101000110
0x00149 ==> 00000000000101001001
0x0014A ==> 00000000000101001010
0x0014C ==> 00000000000101001100
0x00151 ==> 00000000000101010001
0x00152 ==> 00000000000101010010
0x00154 ==> 00000000000101010100
0x00158 ==> 00000000000101011000
0x00161 ==> 00000000000101100001
0x00162 ==> 00000000000101100010
0x00164 ==> 00000000000101100100
0x00168 ==> 00000000000101101000
0x00170 ==> 00000000000101110000
0x00183 ==> 00000000000110000011
0x00185 ==> 00000000000110000101
0x00186 ==> 00000000000110000110
0x00189 ==> 00000000000110001001
0x0018A ==> 00000000000110001010
0x0018C ==> 00000000000110001100
0x00191 ==> 00000000000110010001
0x00192 ==> 00000000000110010010
0x00194 ==> 00000000000110010100
0x00198 ==> 00000000000110011000
0x001A1 ==> 00000000000110100001
0x001A2 ==> 00000000000110100010
0x001A4 ==> 00000000000110100100
0x001A8 ==> 00000000000110101000
0x001B0 ==> 00000000000110110000
0x001C1 ==> 00000000000111000001
0x001C2 ==> 00000000000111000010
0x001C4 ==> 00000000000111000100
0x001C8 ==> 00000000000111001000
0x001D0 ==> 00000000000111010000
0x001E0 ==> 00000000000111100000
0x00207 ==> 00000000001000000111
0x0020B ==> 00000000001000001011
0x0020D ==> 00000000001000001101
0x0020E ==> 00000000001000001110
0x00213 ==> 00000000001000010011
0x00215 ==> 00000000001000010101
0x00216 ==> 00000000001000010110
0x00219 ==> 00000000001000011001
0x0021A ==> 00000000001000011010
0x0021C ==> 00000000001000011100
0x00223 ==> 00000000001000100011
0x00225 ==> 00000000001000100101
0x00226 ==> 00000000001000100110
0x00229 ==> 00000000001000101001
0x0022A ==> 00000000001000101010
0x0022C ==> 00000000001000101100
0x00231 ==> 00000000001000110001
0x00232 ==> 00000000001000110010
0x00234 ==> 00000000001000110100
0x00238 ==> 00000000001000111000
0x00243 ==> 00000000001001000011
0x00245 ==> 00000000001001000101
0x00246 ==> 00000000001001000110
0x00249 ==> 00000000001001001001
0x0024A ==> 00000000001001001010
0x0024C ==> 00000000001001001100
0x00251 ==> 00000000001001010001
0x00252 ==> 00000000001001010010
0x00254 ==> 00000000001001010100
0x00258 ==> 00000000001001011000
0x00261 ==> 00000000001001100001
0x00262 ==> 00000000001001100010
0x00264 ==> 00000000001001100100
0x00268 ==> 00000000001001101000

-continued

0x00270 ==> 00000000001001110000
0x00283 ==> 00000000001010000011
0x00285 ==> 00000000001010000101
0x00286 ==> 00000000001010000110
0x00289 ==> 00000000001010001001
0x0028A ==> 00000000001010001010
0x0028C ==> 00000000001010001100
0x00291 ==> 00000000001010010001
0x00292 ==> 00000000001010010010
0x00294 ==> 00000000001010010100
0x00298 ==> 00000000001010011000
0x002A1 ==> 00000000001010100001
0x002A2 ==> 00000000001010100010
0x002A4 ==> 00000000001010100100
0x002A8 ==> 00000000001010101000
0x002B0 ==> 00000000001010110000
0x002C1 ==> 00000000001011000001
0x002C2 ==> 00000000001011000010
0x002C4 ==> 00000000001011000100
0x002C8 ==> 00000000001011001000
0x002D0 ==> 00000000001011010000
0x002E0 ==> 00000000001011100000
0x00303 ==> 00000000001100000011
0x00305 ==> 00000000001100000101
0x00306 ==> 00000000001100000110
0x00309 ==> 00000000001100001001
0x0030A ==> 00000000001100001010
0x0030C ==> 00000000001100001100
0x00311 ==> 00000000001100010001
0x00312 ==> 00000000001100010010
0x00314 ==> 00000000001100010100
0x00318 ==> 00000000001100011000
0x00321 ==> 00000000001100100001
0x00322 ==> 00000000001100100010
0x00324 ==> 00000000001100100100
0x00328 ==> 00000000001100101000
0x00330 ==> 00000000001100110000
0x00341 ==> 00000000001101000001
0x00342 ==> 00000000001101000010
0x00344 ==> 00000000001101000100
0x00348 ==> 00000000001101001000
0x00350 ==> 00000000001101010000
0x00360 ==> 00000000001101100000
0x00381 ==> 00000000001110000001
0x00382 ==> 00000000001110000010
0x00384 ==> 00000000001110000100
0x00388 ==> 00000000001110001000
0x00390 ==> 00000000001110010000
0x003A0 ==> 00000000001110100000
0x003C0 ==> 00000000001111000000
0x00407 ==> 00000000010000000111
0x0040B ==> 00000000010000001011
0x0040D ==> 00000000010000001101
0x0040E ==> 00000000010000001110
0x00413 ==> 00000000010000010011
0x00415 ==> 00000000010000010101
0x00416 ==> 00000000010000010110
0x00419 ==> 00000000010000011001
0x0041A ==> 00000000010000011010
0x0041C ==> 00000000010000011100
0x00423 ==> 00000000010000100011
0x00425 ==> 00000000010000100101
0x00426 ==> 00000000010000100110
0x00429 ==> 00000000010000101001
0x0042A ==> 00000000010000101010
0x0042C ==> 00000000010000101100
0x00431 ==> 00000000010000110001
0x00432 ==> 00000000010000110010
0x00434 ==> 00000000010000110100
0x00438 ==> 00000000010000111000
0x00443 ==> 00000000010001000011
0x00445 ==> 00000000010001000101
0x00446 ==> 00000000010001000110
0x00449 ==> 00000000010001001001
0x0044A ==> 00000000010001001010
0x0044C ==> 00000000010001001100
0x00451 ==> 00000000010001010001
0x00452 ==> 00000000010001010010
0x00454 ==> 00000000010001010100

-continued

0x00458 ==> 0000000010001011000
0x00461 ==> 0000000010001100001
0x00462 ==> 0000000010001100010
0x00464 ==> 0000000010001100100
0x00468 ==> 0000000010001101000
0x00470 ==> 0000000010001110000
0x00483 ==> 0000000010010000011
0x00485 ==> 0000000010010000101
0x00486 ==> 0000000010010000110
0x00489 ==> 0000000010010001001
0x0048A ==> 0000000010010001010
0x0048C ==> 0000000010010001100
0x00491 ==> 0000000010010010001
0x00492 ==> 0000000010010010010
0x00494 ==> 0000000010010010100
0x00498 ==> 0000000010010011000
0x004A1 ==> 0000000010010100001
0x004A2 ==> 0000000010010100010
0x004A4 ==> 0000000010010100100
0x004A8 ==> 0000000010010101000
0x004B0 ==> 0000000010010110000
0x004C1 ==> 0000000010011000001
0x004C2 ==> 0000000010011000010
0x004C4 ==> 0000000010011000100
0x004C8 ==> 0000000010011001000
0x004D0 ==> 0000000010011010000
0x004E0 ==> 0000000010011100000
0x00503 ==> 0000000010100000011
0x00505 ==> 0000000010100000101
0x00506 ==> 0000000010100000110
0x00509 ==> 0000000010100001001
0x0050A ==> 0000000010100001010
0x0050C ==> 0000000010100001100
0x00511 ==> 0000000010100010001
0x00512 ==> 0000000010100010010
0x00514 ==> 0000000010100010100
0x00518 ==> 0000000010100011000
0x00521 ==> 0000000010100100001
0x00522 ==> 0000000010100100010
0x00524 ==> 0000000010100100100
0x00528 ==> 0000000010100101000
0x00530 ==> 0000000010100110000
0x00541 ==> 0000000010101000001
0x00542 ==> 0000000010101000010
0x00544 ==> 0000000010101000100
0x00548 ==> 0000000010101001000
0x00550 ==> 0000000010101010000
0x00560 ==> 0000000010101100000
0x00581 ==> 0000000010110000001
0x00582 ==> 0000000010110000010
0x00584 ==> 0000000010110000100
0x00588 ==> 0000000010110001000
0x00590 ==> 0000000010110010000
0x005A0 ==> 0000000010110100000
0x005C0 ==> 0000000010111000000
0x00603 ==> 0000000011000000011
0x00605 ==> 0000000011000000101
0x00606 ==> 0000000011000000110
0x00609 ==> 0000000011000001001
0x0060A ==> 0000000011000001010
0x0060C ==> 0000000011000001100
0x00611 ==> 0000000011000010001
0x00612 ==> 0000000011000010010
0x00614 ==> 0000000011000010100
0x00618 ==> 0000000011000011000
0x00621 ==> 0000000011000100001
0x00622 ==> 0000000011000100010
0x00624 ==> 0000000011000100100
0x00628 ==> 0000000011000101000
0x00630 ==> 0000000011000110000
0x00641 ==> 0000000011001000001
0x00642 ==> 0000000011001000010
0x00644 ==> 0000000011001000100
0x00648 ==> 0000000011001001000
0x00650 ==> 0000000011001010000
0x00660 ==> 0000000011001100000
0x00681 ==> 0000000011010000001
0x00682 ==> 0000000011010000010
0x00684 ==> 0000000011010000100

-continued

0x00688 ==> 0000000011010001000
0x00690 ==> 0000000011010010000
0x006A0 ==> 0000000011010100000
0x006C0 ==> 0000000011011000000
0x00701 ==> 0000000011100000001
0x00702 ==> 0000000011100000010
0x00704 ==> 0000000011100000100
0x00708 ==> 0000000011100001000
0x00710 ==> 0000000011100010000
0x00720 ==> 0000000011100100000
0x00740 ==> 0000000011101000000
0x00780 ==> 0000000011110000000
0x00807 ==> 0000000100000000111
0x0080B ==> 0000000100000001011
0x0080D ==> 0000000100000001101
0x0080E ==> 0000000100000001110
0x00813 ==> 0000000100000010011
0x00815 ==> 0000000100000010101
0x00816 ==> 0000000100000010110
0x00819 ==> 0000000100000011001
0x0081A ==> 0000000100000011010
0x0081C ==> 0000000100000011100
0x00823 ==> 0000000100000100011
0x00825 ==> 0000000100000100101
0x00826 ==> 0000000100000100110
0x00829 ==> 0000000100000101001
0x0082A ==> 0000000100000101010
0x0082C ==> 0000000100000101100
0x00831 ==> 0000000100000110001
0x00832 ==> 0000000100000110010
0x00834 ==> 0000000100000110100
0x00838 ==> 0000000100000111000
0x00843 ==> 0000000100001000011
0x00845 ==> 0000000100001000101
0x00846 ==> 0000000100001000110
0x00849 ==> 0000000100001001001
0x0084A ==> 0000000100001001010
0x0084C ==> 0000000100001001100
0x00851 ==> 0000000100001010001
0x00852 ==> 0000000100001010010
0x00854 ==> 0000000100001010100
0x00858 ==> 0000000100001011000
0x00861 ==> 0000000100001100001
0x00862 ==> 0000000100001100010
0x00864 ==> 0000000100001100100
0x00868 ==> 0000000100001101000
0x00870 ==> 0000000100001110000
0x00883 ==> 0000000100010000011
0x00885 ==> 0000000100010000101
0x00886 ==> 0000000100010000110
0x00889 ==> 0000000100010001001
0x0088A ==> 0000000100010001010
0x0088C ==> 0000000100010001100
0x00891 ==> 0000000100010010001
0x00892 ==> 0000000100010010010
0x00894 ==> 0000000100010010100
0x00898 ==> 0000000100010011000
0x008A1 ==> 0000000100010100001
0x008A2 ==> 0000000100010100010
0x008A4 ==> 0000000100010100100
0x008A8 ==> 0000000100010101000
0x008B0 ==> 0000000100010110000
0x008C1 ==> 0000000100011000001
0x008C2 ==> 0000000100011000010
0x008C4 ==> 0000000100011000100
0x008C8 ==> 0000000100011001000
0x008D0 ==> 0000000100011010000
0x008E0 ==> 0000000100011100000
0x00903 ==> 0000000100100000011
0x00905 ==> 0000000100100000101
0x00906 ==> 0000000100100000110
0x00909 ==> 0000000100100001001
0x0090A ==> 0000000100100001010
0x0090C ==> 0000000100100001100
0x00911 ==> 0000000100100010001
0x00912 ==> 0000000100100010010
0x00914 ==> 0000000100100010100
0x00918 ==> 0000000100100011000
0x00921 ==> 0000000100100100001

-continued

0x00922 ==> 0000000100100100010
0x00924 ==> 0000000100100100100
0x00928 ==> 0000000100100101000
0x00930 ==> 0000000100100110000
0x00941 ==> 0000000100101000001
0x00942 ==> 0000000100101000010
0x00944 ==> 0000000100101000100
0x00948 ==> 0000000100101001000
0x00950 ==> 0000000100101010000
0x00960 ==> 0000000100101100000
0x00981 ==> 0000000100110000001
0x00982 ==> 0000000100110000010
0x00984 ==> 0000000100110000100
0x00988 ==> 0000000100110001000
0x00990 ==> 0000000100110010000
0x009A0 ==> 0000000100110100000
0x009C0 ==> 0000000100111000000
0x00A03 ==> 0000000101000000011
0x00A05 ==> 0000000101000000101
0x00A06 ==> 0000000101000000110
0x00A09 ==> 0000000101000001001
0x00A0A ==> 0000000101000001010
0x00A0C ==> 0000000101000001100
0x00A11 ==> 0000000101000010001
0x00A12 ==> 0000000101000010010
0x00A14 ==> 0000000101000010100
0x00A18 ==> 0000000101000011000
0x00A21 ==> 0000000101000100001
0x00A22 ==> 0000000101000100010
0x00A24 ==> 0000000101000100100
0x00A28 ==> 0000000101000101000
0x00A30 ==> 0000000101000110000
0x00A41 ==> 0000000101001000001
0x00A42 ==> 0000000101001000010
0x00A44 ==> 0000000101001000100
0x00A48 ==> 0000000101001001000
0x00A50 ==> 0000000101001010000
0x00A60 ==> 0000000101001100000
0x00A81 ==> 0000000101010000001
0x00A82 ==> 0000000101010000010
0x00A84 ==> 0000000101010000100
0x00A88 ==> 0000000101010001000
0x00A90 ==> 0000000101010010000
0x00AA0 ==> 0000000101010100000
0x00AC0 ==> 0000000101011000000
0x00B01 ==> 0000000101100000001
0x00B02 ==> 0000000101100000010
0x00B04 ==> 0000000101100000100
0x00B08 ==> 0000000101100001000
0x00B10 ==> 0000000101100010000
0x00B20 ==> 0000000101100100000
0x00B40 ==> 0000000101101000000
0x00B80 ==> 0000000101110000000
0x00C03 ==> 0000000110000000011
0x00C05 ==> 0000000110000000101
0x00C06 ==> 0000000110000000110
0x00C09 ==> 0000000110000001001
0x00C0A ==> 0000000110000001010
0x00C0C ==> 0000000110000001100
0x00C11 ==> 0000000110000010001
0x00C12 ==> 0000000110000010010
0x00C14 ==> 0000000110000010100
0x00C18 ==> 0000000110000011000
0x00C21 ==> 0000000110000100001
0x00C22 ==> 0000000110000100010
0x00C24 ==> 0000000110000100100
0x00C28 ==> 0000000110000101000
0x00C30 ==> 0000000110000110000
0x00C41 ==> 0000000110001000001
0x00C42 ==> 0000000110001000010
0x00C44 ==> 0000000110001000100
0x00C48 ==> 0000000110001001000
0x00C50 ==> 0000000110001010000
0x00C60 ==> 0000000110001100000
0x00C81 ==> 0000000110010000001
0x00C82 ==> 0000000110010000010
0x00C84 ==> 0000000110010000100
0x00C88 ==> 0000000110010001000
0x00C90 ==> 0000000110010010000

-continued

0x00CA0 ==> 0000000110010100000
0x00CC0 ==> 0000000110011000000
0x00D01 ==> 0000000110100000001
0x00D02 ==> 0000000110100000010
0x00D04 ==> 0000000110100000100
0x00D08 ==> 0000000110100001000
0x00D10 ==> 0000000110100010000
0x00D20 ==> 0000000110100100000
0x00D40 ==> 0000000110101000000
0x00D80 ==> 0000000110110000000
0x00E01 ==> 0000000111000000001
0x00E02 ==> 0000000111000000010
0x00E04 ==> 0000000111000000100
0x00E08 ==> 0000000111000001000
0x00E10 ==> 0000000111000010000
0x00E20 ==> 0000000111000100000
0x00E40 ==> 0000000111001000000
0x00E80 ==> 0000000111010000000
0x00F00 ==> 0000000111100000000
0x01007 ==> 0000001000000000111
0x0100B ==> 0000001000000001011
0x0100D ==> 0000001000000001101
0x0100E ==> 0000001000000001110
0x01013 ==> 0000001000000010011
0x01015 ==> 0000001000000010101
0x01016 ==> 0000001000000010110
0x01019 ==> 0000001000000011001
0x0101A ==> 0000001000000011010
0x0101C ==> 0000001000000011100
0x01023 ==> 0000001000000100011
0x01025 ==> 0000001000000100101
0x01026 ==> 0000001000000100110
0x01029 ==> 0000001000000101001
0x0102A ==> 0000001000000101010
0x0102C ==> 0000001000000101100
0x01031 ==> 0000001000000110001
0x01032 ==> 0000001000000110010
0x01034 ==> 0000001000000110100
0x01038 ==> 0000001000000111000
0x01043 ==> 0000001000001000011
0x01045 ==> 0000001000001000101
0x01046 ==> 0000001000001000110
0x01049 ==> 0000001000001001001
0x0104A ==> 0000001000001001010
0x0104C ==> 0000001000001001100
0x01051 ==> 0000001000001010001
0x01052 ==> 0000001000001010010
0x01054 ==> 0000001000001010100
0x01058 ==> 0000001000001011000
0x01061 ==> 0000001000001100001
0x01062 ==> 0000001000001100010
0x01064 ==> 0000001000001100100
0x01068 ==> 0000001000001101000
0x01070 ==> 0000001000001110000
0x01083 ==> 0000001000010000011
0x01085 ==> 0000001000010000101
0x01086 ==> 0000001000010000110
0x01089 ==> 0000001000010001001
0x0108A ==> 0000001000010001010
0x0108C ==> 0000001000010001100
0x01091 ==> 0000001000010010001
0x01092 ==> 0000001000010010010
0x01094 ==> 0000001000010010100
0x01098 ==> 0000001000010011000
0x010A1 ==> 0000001000010100001
0x010A2 ==> 0000001000010100010
0x010A4 ==> 0000001000010100100
0x010A8 ==> 0000001000010101000
0x010B0 ==> 0000001000010110000
0x010C1 ==> 0000001000011000001
0x010C2 ==> 0000001000011000010
0x010C4 ==> 0000001000011000100
0x010C8 ==> 0000001000011001000
0x010D0 ==> 0000001000011010000
0x010E0 ==> 0000001000011100000
0x01103 ==> 0000001000100000011
0x01105 ==> 0000001000100000101
0x01106 ==> 0000001000100000110
0x01109 ==> 0000001000100001001

-continued

0x0110A ==> 00000001000100001010
0x0110C ==> 00000001000100001100
0x01111 ==> 00000001000100010001
0x01112 ==> 00000001000100010010
0x01114 ==> 00000001000100010100
0x01118 ==> 00000001000100011000
0x01121 ==> 00000001000100100001
0x01122 ==> 00000001000100100010
0x01124 ==> 00000001000100100100
0x01128 ==> 00000001000100101000
0x01130 ==> 00000001000100110000
0x01141 ==> 00000001000101000001
0x01142 ==> 00000001000101000010
0x01144 ==> 00000001000101000100
0x01148 ==> 00000001000101001000
0x01150 ==> 00000001000101010000
0x01160 ==> 00000001000101100000
0x01181 ==> 00000001000110000001
0x01182 ==> 00000001000110000010
0x01184 ==> 00000001000110000100
0x01188 ==> 00000001000110001000
0x01190 ==> 00000001000110010000
0x011A0 ==> 00000001000110100000
0x011C0 ==> 00000001000111000000
0x01203 ==> 00000001001000000011
0x01205 ==> 00000001001000000101
0x01206 ==> 00000001001000000110
0x01209 ==> 00000001001000001001
0x0120A ==> 00000001001000001010
0x0120C ==> 00000001001000001100
0x01211 ==> 00000001001000010001
0x01212 ==> 00000001001000010010
0x01214 ==> 00000001001000010100
0x01218 ==> 00000001001000011000
0x01221 ==> 00000001001000100001
0x01222 ==> 00000001001000100010
0x01224 ==> 00000001001000100100
0x01228 ==> 00000001001000101000
0x01230 ==> 00000001001000110000
0x01241 ==> 00000001001001000001
0x01242 ==> 00000001001001000010
0x01244 ==> 00000001001001000100
0x01248 ==> 00000001001001001000
0x01250 ==> 00000001001001010000
0x01260 ==> 00000001001001100000
0x01281 ==> 00000001001010000001
0x01282 ==> 00000001001010000010
0x01284 ==> 00000001001010000100
0x01288 ==> 00000001001010001000
0x01290 ==> 00000001001010010000
0x012A0 ==> 00000001001010100000
0x012C0 ==> 00000001001011000000
0x01301 ==> 00000001001100000001
0x01302 ==> 00000001001100000010
0x01304 ==> 00000001001100000100
0x01308 ==> 00000001001100001000
0x01310 ==> 00000001001100010000
0x01320 ==> 00000001001100100000
0x01340 ==> 00000001001101000000
0x01380 ==> 00000001001110000000
0x01403 ==> 00000001010000000011
0x01405 ==> 00000001010000000101
0x01406 ==> 00000001010000000110
0x01409 ==> 00000001010000001001
0x0140A ==> 00000001010000001010
0x0140C ==> 00000001010000001100
0x01411 ==> 00000001010000010001
0x01412 ==> 00000001010000010010
0x01414 ==> 00000001010000010100
0x01418 ==> 00000001010000011000
0x01421 ==> 00000001010000100001
0x01422 ==> 00000001010000100010
0x01424 ==> 00000001010000100100
0x01428 ==> 00000001010000101000
0x01430 ==> 00000001010000110000
0x01441 ==> 00000001010001000001
0x01442 ==> 00000001010001000010
0x01444 ==> 00000001010001000100
0x01448 ==> 00000001010001001000

-continued

0x01450 ==> 00000001010001010000
0x01460 ==> 00000001010001100000
0x01481 ==> 00000001010010000001
0x01482 ==> 00000001010010000010
0x01484 ==> 00000001010010000100
0x01488 ==> 00000001010010001000
0x01490 ==> 00000001010010010000
0x014A0 ==> 00000001010010100000
0x014C0 ==> 00000001010011000000
0x01501 ==> 00000001010100000001
0x01502 ==> 00000001010100000010
0x01504 ==> 00000001010100000100
0x01508 ==> 00000001010100001000
0x01510 ==> 00000001010100010000
0x01520 ==> 00000001010100100000
0x01540 ==> 00000001010101000000
0x01580 ==> 00000001010110000000
0x01601 ==> 00000001011000000001
0x01602 ==> 00000001011000000010
0x01604 ==> 00000001011000000100
0x01608 ==> 00000001011000001000
0x01610 ==> 00000001011000010000
0x01620 ==> 00000001011000100000
0x01640 ==> 00000001011001000000
0x01680 ==> 00000001011010000000
0x01700 ==> 00000001011100000000
0x01803 ==> 00000001100000000011
0x01805 ==> 00000001100000000101
0x01806 ==> 00000001100000000110
0x01809 ==> 00000001100000001001
0x0180A ==> 00000001100000001010
0x0180C ==> 00000001100000001100
0x01811 ==> 00000001100000010001
0x01812 ==> 00000001100000010010
0x01814 ==> 00000001100000010100
0x01818 ==> 00000001100000011000
0x01821 ==> 00000001100000100001
0x01822 ==> 00000001100000100010
0x01824 ==> 00000001100000100100
0x01828 ==> 00000001100000101000
0x01830 ==> 00000001100000110000
0x01841 ==> 00000001100001000001
0x01842 ==> 00000001100001000010
0x01844 ==> 00000001100001000100
0x01848 ==> 00000001100001001000
0x01850 ==> 00000001100001010000
0x01860 ==> 00000001100001100000
0x01881 ==> 00000001100010000001
0x01882 ==> 00000001100010000010
0x01884 ==> 00000001100010000100
0x01888 ==> 00000001100010001000
0x01890 ==> 00000001100010010000
0x018A0 ==> 00000001100010100000
0x018C0 ==> 00000001100011000000
0x01901 ==> 00000001100100000001
0x01902 ==> 00000001100100000010
0x01904 ==> 00000001100100000100
0x01908 ==> 00000001100100001000
0x01910 ==> 00000001100100010000
0x01920 ==> 00000001100100100000
0x01940 ==> 00000001100101000000
0x01980 ==> 00000001100110000000
0x01A01 ==> 00000001101000000001
0x01A02 ==> 00000001101000000010
0x01A04 ==> 00000001101000000100
0x01A08 ==> 00000001101000001000
0x01A10 ==> 00000001101000010000
0x01A20 ==> 00000001101000100000
0x01A40 ==> 00000001101001000000
0x01A80 ==> 00000001101010000000
0x01B00 ==> 00000001101100000000
0x01C01 ==> 00000001110000000001
0x01C02 ==> 00000001110000000010
0x01C04 ==> 00000001110000000100
0x01C08 ==> 00000001110000001000
0x01C10 ==> 00000001110000010000
0x01C20 ==> 00000001110000100000
0x01C40 ==> 00000001110001000000
0x01C80 ==> 00000001110010000000

-continued

| |
|---|
| 0x01D00 ==> 00000001110100000000 |
| **0x01E00 ==> 00000001111000000000** |
| 0x02007 ==> 00000010000000000111 |
| 0x0200B ==> 00000010000000001011 |
| 0x0200D ==> 00000010000000001101 |
| 0x0200E ==> 00000010000000001110 |
| 0x02013 ==> 00000010000000010011 |
| 0x02015 ==> 00000010000000010101 |
| 0x02016 ==> 00000010000000010110 |
| 0x02019 ==> 00000010000000011001 |
| 0x0201A ==> 00000010000000011010 |
| 0x0201C ==> 00000010000000011100 |
| 0x02023 ==> 00000010000000100011 |
| 0x02025 ==> 00000010000000100101 |
| 0x02026 ==> 00000010000000100110 |
| 0x02029 ==> 00000010000000101001 |
| 0x0202A ==> 00000010000000101010 |
| 0x0202C ==> 00000010000000101100 |
| 0x02031 ==> 00000010000000110001 |
| 0x02032 ==> 00000010000000110010 |
| 0x02034 ==> 00000010000000110100 |
| 0x02038 ==> 00000010000000111000 |
| 0x02043 ==> 00000010000001000011 |
| 0x02045 ==> 00000010000001000101 |
| 0x02046 ==> 00000010000001000110 |
| 0x02049 ==> 00000010000001001001 |
| 0x0204A ==> 00000010000001001010 |
| 0x0204C ==> 00000010000001001100 |
| 0x02051 ==> 00000010000001010001 |
| 0x02052 ==> 00000010000001010010 |
| 0x02054 ==> 00000010000001010100 |
| 0x02058 ==> 00000010000001011000 |
| 0x02061 ==> 00000010000001100001 |
| 0x02062 ==> 00000010000001100010 |
| 0x02064 ==> 00000010000001100100 |
| 0x02068 ==> 00000010000001101000 |
| 0x02070 ==> 00000010000001110000 |
| 0x02083 ==> 00000010000010000011 |
| 0x02085 ==> 00000010000010000101 |
| 0x02086 ==> 00000010000010000110 |
| 0x02089 ==> 00000010000010001001 |
| 0x0208A ==> 00000010000010001010 |
| 0x0208C ==> 00000010000010001100 |
| 0x02091 ==> 00000010000010010001 |
| 0x02092 ==> 00000010000010010010 |
| 0x02094 ==> 00000010000010010100 |
| 0x02098 ==> 00000010000010011000 |
| 0x020A1 ==> 00000010000010100001 |
| 0x020A2 ==> 00000010000010100010 |
| 0x020A4 ==> 00000010000010100100 |
| 0x020A8 ==> 00000010000010101000 |
| 0x020B0 ==> 00000010000010110000 |
| 0x020C1 ==> 00000010000011000001 |
| 0x020C2 ==> 00000010000011000010 |
| 0x020C4 ==> 00000010000011000100 |
| 0x020C8 ==> 00000010000011001000 |
| 0x020D0 ==> 00000010000011010000 |
| 0x020E0 ==> 00000010000011100000 |
| 0x02103 ==> 00000010000100000011 |
| 0x02105 ==> 00000010000100000101 |
| 0x02106 ==> 00000010000100000110 |
| 0x02109 ==> 00000010000100001001 |
| 0x0210A ==> 00000010000100001010 |
| 0x0210C ==> 00000010000100001100 |
| 0x02111 ==> 00000010000100010001 |
| 0x02112 ==> 00000010000100010010 |
| 0x02114 ==> 00000010000100010100 |
| 0x02118 ==> 00000010000100011000 |
| 0x02121 ==> 00000010000100100001 |
| 0x02122 ==> 00000010000100100010 |
| 0x02124 ==> 00000010000100100100 |
| 0x02128 ==> 00000010000100101000 |
| 0x02130 ==> 00000010000100110000 |
| 0x02141 ==> 00000010000101000001 |
| 0x02142 ==> 00000010000101000010 |
| 0x02144 ==> 00000010000101000100 |
| 0x02148 ==> 00000010000101001000 |
| 0x02150 ==> 00000010000101010000 |
| 0x02160 ==> 00000010000101100000 |

-continued

| |
|---|
| 0x02181 ==> 00000010000110000001 |
| 0x02182 ==> 00000010000110000010 |
| 0x02184 ==> 00000010000110000100 |
| 0x02188 ==> 00000010000110001000 |
| 0x02190 ==> 00000010000110010000 |
| 0x021A0 ==> 00000010000110100000 |
| 0x021C0 ==> 00000010000111000000 |
| 0x02203 ==> 00000010001000000011 |
| 0x02205 ==> 00000010001000000101 |
| 0x02206 ==> 00000010001000000110 |
| 0x02209 ==> 00000010001000001001 |
| 0x0220A ==> 00000010001000001010 |
| 0x0220C ==> 00000010001000001100 |
| 0x02211 ==> 00000010001000010001 |
| 0x02212 ==> 00000010001000010010 |
| 0x02214 ==> 00000010001000010100 |
| 0x02218 ==> 00000010001000011000 |
| 0x02221 ==> 00000010001000100001 |
| 0x02222 ==> 00000010001000100010 |
| 0x02224 ==> 00000010001000100100 |
| 0x02228 ==> 00000010001000101000 |
| 0x02230 ==> 00000010001000110000 |
| 0x02241 ==> 00000010001001000001 |
| 0x02242 ==> 00000010001001000010 |
| 0x02244 ==> 00000010001001000100 |
| 0x02248 ==> 00000010001001001000 |
| 0x02250 ==> 00000010001001010000 |
| 0x02260 ==> 00000010001001100000 |
| 0x02281 ==> 00000010001010000001 |
| 0x02282 ==> 00000010001010000010 |
| 0x02284 ==> 00000010001010000100 |
| 0x02288 ==> 00000010001010001000 |
| 0x02290 ==> 00000010001010010000 |
| 0x022A0 ==> 00000010001010100000 |
| 0x022C0 ==> 00000010001011000000 |
| 0x02301 ==> 00000010001100000001 |
| 0x02302 ==> 00000010001100000010 |
| 0x02304 ==> 00000010001100000100 |
| 0x02308 ==> 00000010001100001000 |
| 0x02310 ==> 00000010001100010000 |
| 0x02320 ==> 00000010001100100000 |
| 0x02340 ==> 00000010001101000000 |
| 0x02380 ==> 00000010001110000000 |
| 0x02403 ==> 00000010010000000011 |
| 0x02405 ==> 00000010010000000101 |
| 0x02406 ==> 00000010010000000110 |
| 0x02409 ==> 00000010010000001001 |
| 0x0240A ==> 00000010010000001010 |
| 0x0240C ==> 00000010010000001100 |
| 0x02411 ==> 00000010010000010001 |
| 0x02412 ==> 00000010010000010010 |
| 0x02414 ==> 00000010010000010100 |
| 0x02418 ==> 00000010010000011000 |
| 0x02421 ==> 00000010010000100001 |
| 0x02422 ==> 00000010010000100010 |
| 0x02424 ==> 00000010010000100100 |
| 0x02428 ==> 00000010010000101000 |
| 0x02430 ==> 00000010010000110000 |
| 0x02441 ==> 00000010010001000001 |
| 0x02442 ==> 00000010010001000010 |
| 0x02444 ==> 00000010010001000100 |
| 0x02448 ==> 00000010010001001000 |
| 0x02450 ==> 00000010010001010000 |
| 0x02460 ==> 00000010010001100000 |
| 0x02481 ==> 00000010010010000001 |
| 0x02482 ==> 00000010010010000010 |
| 0x02484 ==> 00000010010010000100 |
| 0x02488 ==> 00000010010010001000 |
| 0x02490 ==> 00000010010010010000 |
| 0x024A0 ==> 00000010010010100000 |
| 0x024C0 ==> 00000010010011000000 |
| 0x02501 ==> 00000010010100000001 |
| 0x02502 ==> 00000010010100000010 |
| 0x02504 ==> 00000010010100000100 |
| 0x02508 ==> 00000010010100001000 |
| 0x02510 ==> 00000010010100010000 |
| 0x02520 ==> 00000010010100100000 |
| 0x02540 ==> 00000010010101000000 |
| 0x02580 ==> 00000010010110000000 |

-continued

0x02601 ==> 00000010011000000001
0x02602 ==> 00000010011000000010
0x02604 ==> 00000010011000000100
0x02608 ==> 00000010011000001000
0x02610 ==> 00000010011000010000
0x02620 ==> 00000010011000100000
0x02640 ==> 00000010011001000000
0x02680 ==> 00000010011010000000
0x02700 ==> 00000010011100000000
0x02803 ==> 00000010100000000011
0x02805 ==> 00000010100000000101
0x02806 ==> 00000010100000000110
0x02809 ==> 00000010100000001001
0x0280A ==> 00000010100000001010
0x0280C ==> 00000010100000001100
0x02811 ==> 00000010100000010001
0x02812 ==> 00000010100000010010
0x02814 ==> 00000010100000010100
0x02818 ==> 00000010100000011000
0x02821 ==> 00000010100000100001
0x02822 ==> 00000010100000100010
0x02824 ==> 00000010100000100100
0x02828 ==> 00000010100000101000
0x02830 ==> 00000010100000110000
0x02841 ==> 00000010100001000001
0x02842 ==> 00000010100001000010
0x02844 ==> 00000010100001000100
0x02848 ==> 00000010100001001000
0x02850 ==> 00000010100001010000
0x02860 ==> 00000010100001100000
0x02881 ==> 00000010100010000001
0x02882 ==> 00000010100010000010
0x02884 ==> 00000010100010000100
0x02888 ==> 00000010100010001000
0x02890 ==> 00000010100010010000
0x028A0 ==> 00000010100010100000
0x028C0 ==> 00000010100011000000
0x02901 ==> 00000010100100000001
0x02902 ==> 00000010100100000010
0x02904 ==> 00000010100100000100
0x02908 ==> 00000010100100001000
0x02910 ==> 00000010100100010000
0x02920 ==> 00000010100100100000
0x02940 ==> 00000010100101000000
0x02980 ==> 00000010100110000000
0x02A01 ==> 00000010101000000001
0x02A02 ==> 00000010101000000010
0x02A04 ==> 00000010101000000100
0x02A08 ==> 00000010101000001000
0x02A10 ==> 00000010101000010000
0x02A20 ==> 00000010101000100000
0x02A40 ==> 00000010101001000000
0x02A80 ==> 00000010101010000000
0x02B00 ==> 00000010101100000000
0x02C01 ==> 00000010110000000001
0x02C02 ==> 00000010110000000010
0x02C04 ==> 00000010110000000100
0x02C08 ==> 00000010110000001000
0x02C10 ==> 00000010110000010000
0x02C20 ==> 00000010110000100000
0x02C40 ==> 00000010110001000000
0x02C80 ==> 00000010110010000000
0x02D00 ==> 00000010110100000000
0x02E00 ==> 00000010111000000000
0x03003 ==> 00000011000000000011
0x03005 ==> 00000011000000000101
0x03006 ==> 00000011000000000110
0x03009 ==> 00000011000000001001
0x0300A ==> 00000011000000001010
0x0300C ==> 00000011000000001100
0x03011 ==> 00000011000000010001
0x03012 ==> 00000011000000010010
0x03014 ==> 00000011000000010100
0x03018 ==> 00000011000000011000
0x03021 ==> 00000011000000100001
0x03022 ==> 00000011000000100010
0x03024 ==> 00000011000000100100
0x03028 ==> 00000011000000101000
0x03030 ==> 00000011000000110000

-continued

0x03041 ==> 00000011000001000001
0x03042 ==> 00000011000001000010
0x03044 ==> 00000011000001000100
0x03048 ==> 00000011000001001000
0x03050 ==> 00000011000001010000
0x03060 ==> 00000011000001100000
0x03081 ==> 00000011000010000001
0x03082 ==> 00000011000010000010
0x03084 ==> 00000011000010000100
0x03088 ==> 00000011000010001000
0x03090 ==> 00000011000010010000
0x030A0 ==> 00000011000010100000
0x030C0 ==> 00000011000011000000
0x03101 ==> 00000011000100000001
0x03102 ==> 00000011000100000010
0x03104 ==> 00000011000100000100
0x03108 ==> 00000011000100001000
0x03110 ==> 00000011000100010000
0x03120 ==> 00000011000100100000
0x03140 ==> 00000011000101000000
0x03180 ==> 00000011000110000000
0x03201 ==> 00000011001000000001
0x03202 ==> 00000011001000000010
0x03204 ==> 00000011001000000100
0x03208 ==> 00000011001000001000
0x03210 ==> 00000011001000010000
0x03220 ==> 00000011001000100000
0x03240 ==> 00000011001001000000
0x03280 ==> 00000011001010000000
0x03300 ==> 00000011001100000000
0x03401 ==> 00000011010000000001
0x03402 ==> 00000011010000000010
0x03404 ==> 00000011010000000100
0x03408 ==> 00000011010000001000
0x03410 ==> 00000011010000010000
0x03420 ==> 00000011010000100000
0x03440 ==> 00000011010001000000
0x03480 ==> 00000011010010000000
0x03500 ==> 00000011010100000000
0x03600 ==> 00000011011000000000
0x03801 ==> 00000011100000000001
0x03802 ==> 00000011100000000010
0x03804 ==> 00000011100000000100
0x03808 ==> 00000011100000001000
0x03810 ==> 00000011100000010000
0x03820 ==> 00000011100000100000
0x03840 ==> 00000011100001000000
0x03880 ==> 00000011100010000000
0x03900 ==> 00000011100100000000
0x03A00 ==> 00000011101000000000
0x03C00 ==> 00000011110000000000
0x04007 ==> 00000100000000000111
0x0400B ==> 00000100000000001011
0x0400D ==> 00000100000000001101
0x0400E ==> 00000100000000001110
0x04013 ==> 00000100000000010011
0x04015 ==> 00000100000000010101
0x04016 ==> 00000100000000010110
0x04019 ==> 00000100000000011001
0x0401A ==> 00000100000000011010
0x0401C ==> 00000100000000011100
0x04023 ==> 00000100000000100011
0x04025 ==> 00000100000000100101
0x04026 ==> 00000100000000100110
0x04029 ==> 00000100000000101001
0x0402A ==> 00000100000000101010
0x0402C ==> 00000100000000101100
0x04031 ==> 00000100000000110001
0x04032 ==> 00000100000000110010
0x04034 ==> 00000100000000110100
0x04038 ==> 00000100000000111000
0x04043 ==> 00000100000001000011
0x04045 ==> 00000100000001000101
0x04046 ==> 00000100000001000110
0x04049 ==> 00000100000001001001
0x0404A ==> 00000100000001001010
0x0404C ==> 00000100000001001100
0x04051 ==> 00000100000001010001
0x04052 ==> 00000100000001010010

-continued

0x04054 ==> 00000100000001010100
0x04058 ==> 00000100000001011000
0x04061 ==> 00000100000001100001
0x04062 ==> 00000100000001100010
0x04064 ==> 00000100000001100100
0x04068 ==> 00000100000001101000
0x04070 ==> 00000100000001110000
0x04083 ==> 00000100000010000011
0x04085 ==> 00000100000010000101
0x04086 ==> 00000100000010000110
0x04089 ==> 00000100000010001001
0x0408A ==> 00000100000010001010
0x0408C ==> 00000100000010001100
0x04091 ==> 00000100000010010001
0x04092 ==> 00000100000010010010
0x04094 ==> 00000100000010010100
0x04098 ==> 00000100000010011000
0x040A1 ==> 00000100000010100001
0x040A2 ==> 00000100000010100010
0x040A4 ==> 00000100000010100100
0x040A8 ==> 00000100000010101000
0x040B0 ==> 00000100000010110000
0x040C1 ==> 00000100000011000001
0x040C2 ==> 00000100000011000010
0x040C4 ==> 00000100000011000100
0x040C8 ==> 00000100000011001000
0x040D0 ==> 00000100000011010000
0x040E0 ==> 00000100000011100000
0x04103 ==> 00000100000100000011
0x04105 ==> 00000100000100000101
0x04106 ==> 00000100000100000110
0x04109 ==> 00000100000100001001
0x0410A ==> 00000100000100001010
0x0410C ==> 00000100000100001100
0x04111 ==> 00000100000100010001
0x04112 ==> 00000100000100010010
0x04114 ==> 00000100000100010100
0x04118 ==> 00000100000100011000
0x04121 ==> 00000100000100100001
0x04122 ==> 00000100000100100010
0x04124 ==> 00000100000100100100
0x04128 ==> 00000100000100101000
0x04130 ==> 00000100000100110000
0x04141 ==> 00000100000101000001
0x04142 ==> 00000100000101000010
0x04144 ==> 00000100000101000100
0x04148 ==> 00000100000101001000
0x04150 ==> 00000100000101010000
0x04160 ==> 00000100000101100000
0x04181 ==> 00000100000110000001
0x04182 ==> 00000100000110000010
0x04184 ==> 00000100000110000100
0x04188 ==> 00000100000110001000
0x04190 ==> 00000100000110010000
0x041A0 ==> 00000100000110100000
0x041C0 ==> 00000100000111000000
0x04203 ==> 00000100001000000011
0x04205 ==> 00000100001000000101
0x04206 ==> 00000100001000000110
0x04209 ==> 00000100001000001001
0x0420A ==> 00000100001000001010
0x0420C ==> 00000100001000001100
0x04211 ==> 00000100001000010001
0x04212 ==> 00000100001000010010
0x04214 ==> 00000100001000010100
0x04218 ==> 00000100001000011000
0x04221 ==> 00000100001000100001
0x04222 ==> 00000100001000100010
0x04224 ==> 00000100001000100100
0x04228 ==> 00000100001000101000
0x04230 ==> 00000100001000110000
0x04241 ==> 00000100001001000001
0x04242 ==> 00000100001001000010
0x04244 ==> 00000100001001000100
0x04248 ==> 00000100001001001000
0x04250 ==> 00000100001001010000
0x04260 ==> 00000100001001100000
0x04281 ==> 00000100001010000001
0x04282 ==> 00000100001010000010

-continued

0x04284 ==> 00000100001010000100
0x04288 ==> 00000100001010001000
0x04290 ==> 00000100001010010000
0x042A0 ==> 00000100001010100000
0x042C0 ==> 00000100001011000000
0x04301 ==> 00000100001100000001
0x04302 ==> 00000100001100000010
0x04304 ==> 00000100001100000100
0x04308 ==> 00000100001100001000
0x04310 ==> 00000100001100010000
0x04320 ==> 00000100001100100000
0x04340 ==> 00000100001101000000
0x04380 ==> 00000100001110000000
0x04403 ==> 00000100010000000011
0x04405 ==> 00000100010000000101
0x04406 ==> 00000100010000000110
0x04409 ==> 00000100010000001001
0x0440A ==> 00000100010000001010
0x0440C ==> 00000100010000001100
0x04411 ==> 00000100010000010001
0x04412 ==> 00000100010000010010
0x04414 ==> 00000100010000010100
0x04418 ==> 00000100010000011000
0x04421 ==> 00000100010000100001
0x04422 ==> 00000100010000100010
0x04424 ==> 00000100010000100100
0x04428 ==> 00000100010000101000
0x04430 ==> 00000100010000110000
0x04441 ==> 00000100010001000001
0x04442 ==> 00000100010001000010
0x04444 ==> 00000100010001000100
0x04448 ==> 00000100010001001000
0x04450 ==> 00000100010001010000
0x04460 ==> 00000100010001100000
0x04481 ==> 00000100010010000001
0x04482 ==> 00000100010010000010
0x04484 ==> 00000100010010000100
0x04488 ==> 00000100010010001000
0x04490 ==> 00000100010010010000
0x044A0 ==> 00000100010010100000
0x044C0 ==> 00000100010011000000
0x04501 ==> 00000100010100000001
0x04502 ==> 00000100010100000010
0x04504 ==> 00000100010100000100
0x04508 ==> 00000100010100001000
0x04510 ==> 00000100010100010000
0x04520 ==> 00000100010100100000
0x04540 ==> 00000100010101000000
0x04580 ==> 00000100010110000000
0x04601 ==> 00000100011000000001
0x04602 ==> 00000100011000000010
0x04604 ==> 00000100011000000100
0x04608 ==> 00000100011000001000
0x04610 ==> 00000100011000010000
0x04620 ==> 00000100011000100000
0x04640 ==> 00000100011001000000
0x04680 ==> 00000100011010000000
0x04700 ==> 00000100011100000000
0x04803 ==> 00000100100000000011
0x04805 ==> 00000100100000000101
0x04806 ==> 00000100100000000110
0x04809 ==> 00000100100000001001
0x0480A ==> 00000100100000001010
0x0480C ==> 00000100100000001100
0x04811 ==> 00000100100000010001
0x04812 ==> 00000100100000010010
0x04814 ==> 00000100100000010100
0x04818 ==> 00000100100000011000
0x04821 ==> 00000100100000100001
0x04822 ==> 00000100100000100010
0x04824 ==> 00000100100000100100
0x04828 ==> 00000100100000101000
0x04830 ==> 00000100100000110000
0x04841 ==> 00000100100001000001
0x04842 ==> 00000100100001000010
0x04844 ==> 00000100100001000100
0x04848 ==> 00000100100001001000
0x04850 ==> 00000100100001010000
0x04860 ==> 00000100100001100000

-continued

0x04881 ==> 00000100100010000001
0x04882 ==> 00000100100010000010
0x04884 ==> 00000100100010000100
0x04888 ==> 00000100100010001000
0x04890 ==> 00000100100010010000
0x048A0 ==> 00000100100010100000
0x048C0 ==> 00000100100011000000
0x04901 ==> 00000100100100000001
0x04902 ==> 00000100100100000010
0x04904 ==> 00000100100100000100
0x04908 ==> 00000100100100001000
0x04910 ==> 00000100100100010000
0x04920 ==> 00000100100100100000
0x04940 ==> 00000100100101000000
0x04980 ==> 00000100100110000000
0x04A01 ==> 00000100101000000001
0x04A02 ==> 00000100101000000010
0x04A04 ==> 00000100101000000100
0x04A08 ==> 00000100101000001000
0x04A10 ==> 00000100101000010000
0x04A20 ==> 00000100101000100000
0x04A40 ==> 00000100101001000000
0x04A80 ==> 00000100101010000000
0x04B00 ==> 00000100101100000000
0x04C01 ==> 00000100110000000001
0x04C02 ==> 00000100110000000010
0x04C04 ==> 00000100110000000100
0x04C08 ==> 00000100110000001000
0x04C10 ==> 00000100110000010000
0x04C20 ==> 00000100110000100000
0x04C40 ==> 00000100110001000000
0x04C80 ==> 00000100110010000000
0x04D00 ==> 00000100110100000000
0x04E00 ==> 00000100111000000000
0x05003 ==> 00000101000000000011
0x05005 ==> 00000101000000000101
0x05006 ==> 00000101000000000110
0x05009 ==> 00000101000000001001
0x0500A ==> 00000101000000001010
0x0500C ==> 00000101000000001100
0x05011 ==> 00000101000000010001
0x05012 ==> 00000101000000010010
0x05014 ==> 00000101000000010100
0x05018 ==> 00000101000000011000
0x05021 ==> 00000101000000100001
0x05022 ==> 00000101000000100010
0x05024 ==> 00000101000000100100
0x05028 ==> 00000101000000101000
0x05030 ==> 00000101000000110000
0x05041 ==> 00000101000001000001
0x05042 ==> 00000101000001000010
0x05044 ==> 00000101000001000100
0x05048 ==> 00000101000001001000
0x05050 ==> 00000101000001010000
0x05060 ==> 00000101000001100000
0x05081 ==> 00000101000010000001
0x05082 ==> 00000101000010000010
0x05084 ==> 00000101000010000100
0x05088 ==> 00000101000010001000
0x05090 ==> 00000101000010010000
0x050A0 ==> 00000101000010100000
0x050C0 ==> 00000101000011000000
0x05101 ==> 00000101000100000001
0x05102 ==> 00000101000100000010
0x05104 ==> 00000101000100000100
0x05108 ==> 00000101000100001000
0x05110 ==> 00000101000100010000
0x05120 ==> 00000101000100100000
0x05140 ==> 00000101000101000000
0x05180 ==> 00000101000110000000
0x05201 ==> 00000101001000000001
0x05202 ==> 00000101001000000010
0x05204 ==> 00000101001000000100
0x05208 ==> 00000101001000001000
0x05210 ==> 00000101001000010000
0x05220 ==> 00000101001000100000
0x05240 ==> 00000101001001000000
0x05280 ==> 00000101001010000000
0x05300 ==> 00000101001100000000

-continued

0x05401 ==> 00000101010000000001
0x05402 ==> 00000101010000000010
0x05404 ==> 00000101010000000100
0x05408 ==> 00000101010000001000
0x05410 ==> 00000101010000010000
0x05420 ==> 00000101010000100000
0x05440 ==> 00000101010001000000
0x05480 ==> 00000101010010000000
0x05500 ==> 00000101010100000000
0x05600 ==> 00000101011000000000
0x05801 ==> 00000101100000000001
0x05802 ==> 00000101100000000010
0x05804 ==> 00000101100000000100
0x05808 ==> 00000101100000001000
0x05810 ==> 00000101100000010000
0x05820 ==> 00000101100000100000
0x05840 ==> 00000101100001000000
0x05880 ==> 00000101100010000000
0x05900 ==> 00000101100100000000
0x05A00 ==> 00000101101000000000
0x05C00 ==> 00000101110000000000
0x06003 ==> 00000110000000000011
0x06005 ==> 00000110000000000101
0x06006 ==> 00000110000000000110
0x06009 ==> 00000110000000001001
0x0600A ==> 00000110000000001010
0x0600C ==> 00000110000000001100
0x06011 ==> 00000110000000010001
0x06012 ==> 00000110000000010010
0x06014 ==> 00000110000000010100
0x06018 ==> 00000110000000011000
0x06021 ==> 00000110000000100001
0x06022 ==> 00000110000000100010
0x06024 ==> 00000110000000100100
0x06028 ==> 00000110000000101000
0x06030 ==> 00000110000000110000
0x06041 ==> 00000110000001000001
0x06042 ==> 00000110000001000010
0x06044 ==> 00000110000001000100
0x06048 ==> 00000110000001001000
0x06050 ==> 00000110000001010000
0x06060 ==> 00000110000001100000
0x06081 ==> 00000110000010000001
0x06082 ==> 00000110000010000010
0x06084 ==> 00000110000010000100
0x06088 ==> 00000110000010001000
0x06090 ==> 00000110000010010000
0x060A0 ==> 00000110000010100000
0x060C0 ==> 00000110000011000000
0x06101 ==> 00000110000100000001
0x06102 ==> 00000110000100000010
0x06104 ==> 00000110000100000100
0x06108 ==> 00000110000100001000
0x06110 ==> 00000110000100010000
0x06120 ==> 00000110000100100000
0x06140 ==> 00000110000101000000
0x06180 ==> 00000110000110000000
0x06201 ==> 00000110001000000001
0x06202 ==> 00000110001000000010
0x06204 ==> 00000110001000000100
0x06208 ==> 00000110001000001000
0x06210 ==> 00000110001000010000
0x06220 ==> 00000110001000100000
0x06240 ==> 00000110001001000000
0x06280 ==> 00000110001010000000
0x06300 ==> 00000110001100000000
0x06401 ==> 00000110010000000001
0x06402 ==> 00000110010000000010
0x06404 ==> 00000110010000000100
0x06408 ==> 00000110010000001000
0x06410 ==> 00000110010000010000
0x06420 ==> 00000110010000100000
0x06440 ==> 00000110010001000000
0x06480 ==> 00000110010010000000
0x06500 ==> 00000110010100000000
0x06600 ==> 00000110011000000000
0x06801 ==> 00000110100000000001
0x06802 ==> 00000110100000000010
0x06804 ==> 00000110100000000100

0x06808 ==> 00000110100000001000
0x06810 ==> 00000110100000010000
0x06820 ==> 00000110100000100000
0x06840 ==> 00000110100001000000
0x06880 ==> 00000110100010000000
0x06900 ==> 00000110100100000000
0x06A00 ==> 00000110101000000000
0x06C00 ==> 00000110110000000000
0x07001 ==> 00000111000000000001
0x07002 ==> 00000111000000000010
0x07004 ==> 00000111000000000100
0x07008 ==> 00000111000000001000
0x07010 ==> 00000111000000010000
0x07020 ==> 00000111000000100000
0x07040 ==> 00000111000001000000
0x07080 ==> 00000111000010000000
0x07100 ==> 00000111000100000000
0x07200 ==> 00000111001000000000
0x07400 ==> 00000111010000000000
0x07800 ==> 00000111100000000000
0x08007 ==> 00001000000000000111
0x0800B ==> 00001000000000001011
0x0800D ==> 00001000000000001101
0x0800E ==> 00001000000000001110
0x08013 ==> 00001000000000010011
0x08015 ==> 00001000000000010101
0x08016 ==> 00001000000000010110
0x08019 ==> 00001000000000011001
0x0801A ==> 00001000000000011010
0x0801C ==> 00001000000000011100
0x08023 ==> 00001000000000100011
0x08025 ==> 00001000000000100101
0x08026 ==> 00001000000000100110
0x08029 ==> 00001000000000101001
0x0802A ==> 00001000000000101010
0x0802C ==> 00001000000000101100
0x08031 ==> 00001000000000110001
0x08032 ==> 00001000000000110010
0x08034 ==> 00001000000000110100
0x08038 ==> 00001000000000111000
0x08043 ==> 00001000000001000011
0x08045 ==> 00001000000001000101
0x08046 ==> 00001000000001000110
0x08049 ==> 00001000000001001001
0x0804A ==> 00001000000001001010
0x0804C ==> 00001000000001001100
0x08051 ==> 00001000000001010001
0x08052 ==> 00001000000001010010
0x08054 ==> 00001000000001010100
0x08058 ==> 00001000000001011000
0x08061 ==> 00001000000001100001
0x08062 ==> 00001000000001100010
0x08064 ==> 00001000000001100100
0x08068 ==> 00001000000001101000
0x08070 ==> 00001000000001110000
0x08083 ==> 00001000000010000011
0x08085 ==> 00001000000010000101
0x08086 ==> 00001000000010000110
0x08089 ==> 00001000000010001001
0x0808A ==> 00001000000010001010
0x0808C ==> 00001000000010001100
0x08091 ==> 00001000000010010001
0x08092 ==> 00001000000010010010
0x08094 ==> 00001000000010010100
0x08098 ==> 00001000000010011000
0x080A1 ==> 00001000000010100001
0x080A2 ==> 00001000000010100010
0x080A4 ==> 00001000000010100100
0x080A8 ==> 00001000000010101000
0x080B0 ==> 00001000000010110000
0x080C1 ==> 00001000000011000001
0x080C2 ==> 00001000000011000010
0x080C4 ==> 00001000000011000100
0x080C8 ==> 00001000000011001000
0x080D0 ==> 00001000000011010000
0x080E0 ==> 00001000000011100000
0x08103 ==> 00001000000100000011
0x08105 ==> 00001000000100000101
0x08106 ==> 00001000000100000110

0x08109 ==> 00001000000100001001
0x0810A ==> 00001000000100001010
0x0810C ==> 00001000000100001100
0x08111 ==> 00001000000100010001
0x08112 ==> 00001000000100010010
0x08114 ==> 00001000000100010100
0x08118 ==> 00001000000100011000
0x08121 ==> 00001000000100100001
0x08122 ==> 00001000000100100010
0x08124 ==> 00001000000100100100
0x08128 ==> 00001000000100101000
0x08130 ==> 00001000000100110000
0x08141 ==> 00001000000101000001
0x08142 ==> 00001000000101000010
0x08144 ==> 00001000000101000100
0x08148 ==> 00001000000101001000
0x08150 ==> 00001000000101010000
0x08160 ==> 00001000000101100000
0x08181 ==> 00001000000110000001
0x08182 ==> 00001000000110000010
0x08184 ==> 00001000000110000100
0x08188 ==> 00001000000110001000
0x08190 ==> 00001000000110010000
0x081A0 ==> 00001000000110100000
0x081C0 ==> 00001000000111000000
0x08203 ==> 00001000001000000011
0x08205 ==> 00001000001000000101
0x08206 ==> 00001000001000000110
0x08209 ==> 00001000001000001001
0x0820A ==> 00001000001000001010
0x0820C ==> 00001000001000001100
0x08211 ==> 00001000001000010001
0x08212 ==> 00001000001000010010
0x08214 ==> 00001000001000010100
0x08218 ==> 00001000001000011000
0x08221 ==> 00001000001000100001
0x08222 ==> 00001000001000100010
0x08224 ==> 00001000001000100100
0x08228 ==> 00001000001000101000
0x08230 ==> 00001000001000110000
0x08241 ==> 00001000001001000001
0x08242 ==> 00001000001001000010
0x08244 ==> 00001000001001000100
0x08248 ==> 00001000001001001000
0x08250 ==> 00001000001001010000
0x08260 ==> 00001000001001100000
0x08281 ==> 00001000001010000001
0x08282 ==> 00001000001010000010
0x08284 ==> 00001000001010000100
0x08288 ==> 00001000001010001000
0x08290 ==> 00001000001010010000
0x082A0 ==> 00001000001010100000
0x082C0 ==> 00001000001011000000
0x08301 ==> 00001000001100000001
0x08302 ==> 00001000001100000010
0x08304 ==> 00001000001100000100
0x08308 ==> 00001000001100001000
0x08310 ==> 00001000001100010000
0x08320 ==> 00001000001100100000
0x08340 ==> 00001000001101000000
0x08380 ==> 00001000001110000000
0x08403 ==> 00001000010000000011
0x08405 ==> 00001000010000000101
0x08406 ==> 00001000010000000110
0x08409 ==> 00001000010000001001
0x0840A ==> 00001000010000001010
0x0840C ==> 00001000010000001100
0x08411 ==> 00001000010000010001
0x08412 ==> 00001000010000010010
0x08414 ==> 00001000010000010100
0x08418 ==> 00001000010000011000
0x08421 ==> 00001000010000100001
0x08422 ==> 00001000010000100010
0x08424 ==> 00001000010000100100
0x08428 ==> 00001000010000101000
0x08430 ==> 00001000010000110000
0x08441 ==> 00001000010001000001
0x08442 ==> 00001000010001000010
0x08444 ==> 00001000010001000100

-continued

0x08448 ==> 00001000010001001000
0x08450 ==> 00001000010001010000
0x08460 ==> 00001000010001100000
0x08481 ==> 00001000010010000001
0x08482 ==> 00001000010010000010
0x08484 ==> 00001000010010000100
0x08488 ==> 00001000010010001000
0x08490 ==> 00001000010010010000
0x084A0 ==> 00001000010010100000
0x084C0 ==> 00001000010011000000
0x08501 ==> 00001000010100000001
0x08502 ==> 00001000010100000010
0x08504 ==> 00001000010100000100
0x08508 ==> 00001000010100001000
0x08510 ==> 00001000010100010000
0x08520 ==> 00001000010100100000
0x08540 ==> 00001000010101000000
0x08580 ==> 00001000010110000000
0x08601 ==> 00001000011000000001
0x08602 ==> 00001000011000000010
0x08604 ==> 00001000011000000100
0x08608 ==> 00001000011000001000
0x08610 ==> 00001000011000010000
0x08620 ==> 00001000011000100000
0x08640 ==> 00001000011001000000
0x08680 ==> 00001000011010000000
0x08700 ==> 00001000011100000000
0x08803 ==> 00001000100000000011
0x08805 ==> 00001000100000000101
0x08806 ==> 00001000100000000110
0x08809 ==> 00001000100000001001
0x0880A ==> 00001000100000001010
0x0880C ==> 00001000100000001100
0x08811 ==> 00001000100000010001
0x08812 ==> 00001000100000010010
0x08814 ==> 00001000100000010100
0x08818 ==> 00001000100000011000
0x08821 ==> 00001000100000100001
0x08822 ==> 00001000100000100010
0x08824 ==> 00001000100000100100
0x08828 ==> 00001000100000101000
0x08830 ==> 00001000100000110000
0x08841 ==> 00001000100001000001
0x08842 ==> 00001000100001000010
0x08844 ==> 00001000100001000100
0x08848 ==> 00001000100001001000
0x08850 ==> 00001000100001010000
0x08860 ==> 00001000100001100000
0x08881 ==> 00001000100010000001
0x08882 ==> 00001000100010000010
0x08884 ==> 00001000100010000100
0x08888 ==> 00001000100010001000
0x08890 ==> 00001000100010010000
0x088A0 ==> 00001000100010100000
0x088C0 ==> 00001000100011000000
0x08901 ==> 00001000100100000001
0x08902 ==> 00001000100100000010
0x08904 ==> 00001000100100000100
0x08908 ==> 00001000100100001000
0x08910 ==> 00001000100100010000
0x08920 ==> 00001000100100100000
0x08940 ==> 00001000100101000000
0x08980 ==> 00001000100110000000
0x08A01 ==> 00001000101000000001
0x08A02 ==> 00001000101000000010
0x08A04 ==> 00001000101000000100
0x08A08 ==> 00001000101000001000
0x08A10 ==> 00001000101000010000
0x08A20 ==> 00001000101000100000
0x08A40 ==> 00001000101001000000
0x08A80 ==> 00001000101010000000
0x08B00 ==> 00001000101100000000
0x08C01 ==> 00001000110000000001
0x08C02 ==> 00001000110000000010
0x08C04 ==> 00001000110000000100
0x08C08 ==> 00001000110000001000
0x08C10 ==> 00001000110000010000
0x08C20 ==> 00001000110000100000
0x08C40 ==> 00001000110001000000

-continued

0x08C80 ==> 00001000110010000000
0x08D00 ==> 00001000110100000000
0x08E00 ==> 00001000111000000000
0x09003 ==> 00001001000000000011
0x09005 ==> 00001001000000000101
0x09006 ==> 00001001000000000110
0x09009 ==> 00001001000000001001
0x0900A ==> 00001001000000001010
0x0900C ==> 00001001000000001100
0x09011 ==> 00001001000000010001
0x09012 ==> 00001001000000010010
0x09014 ==> 00001001000000010100
0x09018 ==> 00001001000000011000
0x09021 ==> 00001001000000100001
0x09022 ==> 00001001000000100010
0x09024 ==> 00001001000000100100
0x09028 ==> 00001001000000101000
0x09030 ==> 00001001000000110000
0x09041 ==> 00001001000001000001
0x09042 ==> 00001001000001000010
0x09044 ==> 00001001000001000100
0x09048 ==> 00001001000001001000
0x09050 ==> 00001001000001010000
0x09060 ==> 00001001000001100000
0x09081 ==> 00001001000010000001
0x09082 ==> 00001001000010000010
0x09084 ==> 00001001000010000100
0x09088 ==> 00001001000010001000
0x09090 ==> 00001001000010010000
0x090A0 ==> 00001001000010100000
0x090C0 ==> 00001001000011000000
0x09101 ==> 00001001000100000001
0x09102 ==> 00001001000100000010
0x09104 ==> 00001001000100000100
0x09108 ==> 00001001000100001000
0x09110 ==> 00001001000100010000
0x09120 ==> 00001001000100100000
0x09140 ==> 00001001000101000000
0x09180 ==> 00001001000110000000
0x09201 ==> 00001001001000000001
0x09202 ==> 00001001001000000010
0x09204 ==> 00001001001000000100
0x09208 ==> 00001001001000001000
0x09210 ==> 00001001001000010000
0x09220 ==> 00001001001000100000
0x09240 ==> 00001001001001000000
0x09280 ==> 00001001001010000000
0x09300 ==> 00001001001100000000
0x09401 ==> 00001001010000000001
0x09402 ==> 00001001010000000010
0x09404 ==> 00001001010000000100
0x09408 ==> 00001001010000001000
0x09410 ==> 00001001010000010000
0x09420 ==> 00001001010000100000
0x09440 ==> 00001001010001000000
0x09480 ==> 00001001010010000000
0x09500 ==> 00001001010100000000
0x09600 ==> 00001001011000000000
0x09801 ==> 00001001100000000001
0x09802 ==> 00001001100000000010
0x09804 ==> 00001001100000000100
0x09808 ==> 00001001100000001000
0x09810 ==> 00001001100000010000
0x09820 ==> 00001001100000100000
0x09840 ==> 00001001100001000000
0x09880 ==> 00001001100010000000
0x09900 ==> 00001001100100000000
0x09A00 ==> 00001001101000000000
0x09C00 ==> 00001001110000000000
0x0A003 ==> 00001010000000000011
0x0A005 ==> 00001010000000000101
0x0A006 ==> 00001010000000000110
0x0A009 ==> 00001010000000001001
0x0A00A ==> 00001010000000001010
0x0A00C ==> 00001010000000001100
0x0A011 ==> 00001010000000010001
0x0A012 ==> 00001010000000010010
0x0A014 ==> 00001010000000010100
0x0A018 ==> 00001010000000011000

-continued

0x0A021 ==> 00001010000000100001
0x0A022 ==> 00001010000000100010
0x0A024 ==> 00001010000000100100
0x0A028 ==> 00001010000000101000
0x0A030 ==> 00001010000000110000
0x0A041 ==> 00001010000001000001
0x0A042 ==> 00001010000001000010
0x0A044 ==> 00001010000001000100
0x0A048 ==> 00001010000001001000
0x0A050 ==> 00001010000001010000
0x0A060 ==> 00001010000001100000
0x0A081 ==> 00001010000010000001
0x0A082 ==> 00001010000010000010
0x0A084 ==> 00001010000010000100
0x0A088 ==> 00001010000010001000
0x0A090 ==> 00001010000010010000
0x0A0A0 ==> 00001010000010100000
0x0A0C0 ==> 00001010000011000000
0x0A101 ==> 00001010000100000001
0x0A102 ==> 00001010000100000010
0x0A104 ==> 00001010000100000100
0x0A108 ==> 00001010000100001000
0x0A110 ==> 00001010000100010000
0x0A120 ==> 00001010000100100000
0x0A140 ==> 00001010000101000000
0x0A180 ==> 00001010000110000000
0x0A201 ==> 00001010001000000001
0x0A202 ==> 00001010001000000010
0x0A204 ==> 00001010001000000100
0x0A208 ==> 00001010001000001000
0x0A210 ==> 00001010001000010000
0x0A220 ==> 00001010001000100000
0x0A240 ==> 00001010001001000000
0x0A280 ==> 00001010001010000000
0x0A300 ==> 00001010001100000000
0x0A401 ==> 00001010010000000001
0x0A402 ==> 00001010010000000010
0x0A404 ==> 00001010010000000100
0x0A408 ==> 00001010010000001000
0x0A410 ==> 00001010010000010000
0x0A420 ==> 00001010010000100000
0x0A440 ==> 00001010010001000000
0x0A480 ==> 00001010010010000000
0x0A500 ==> 00001010010100000000
0x0A600 ==> 00001010011000000000
0x0A801 ==> 00001010100000000001
0x0A802 ==> 00001010100000000010
0x0A804 ==> 00001010100000000100
0x0A808 ==> 00001010100000001000
0x0A810 ==> 00001010100000010000
0x0A820 ==> 00001010100000100000
0x0A840 ==> 00001010100001000000
0x0A880 ==> 00001010100010000000
0x0A900 ==> 00001010100100000000
0x0AA00 ==> 00001010101000000000
0x0AC00 ==> 00001010110000000000
0x0B001 ==> 00001011000000000001
0x0B002 ==> 00001011000000000010
0x0B004 ==> 00001011000000000100
0x0B008 ==> 00001011000000001000
0x0B010 ==> 00001011000000010000
0x0B020 ==> 00001011000000100000
0x0B040 ==> 00001011000001000000
0x0B080 ==> 00001011000010000000
0x0B100 ==> 00001011000100000000
0x0B200 ==> 00001011001000000000
0x0B400 ==> 00001011010000000000
0x0B800 ==> 00001011100000000000
0x0C003 ==> 00001100000000000011
0x0C005 ==> 00001100000000000101
0x0C006 ==> 00001100000000000110
0x0C009 ==> 00001100000000001001
0x0C00A ==> 00001100000000001010
0x0C00C ==> 00001100000000001100
0x0C011 ==> 00001100000000010001
0x0C012 ==> 00001100000000010010
0x0C014 ==> 00001100000000010100
0x0C018 ==> 00001100000000011000
0x0C021 ==> 00001100000000100001

-continued

0x0C022 ==> 00001100000000100010
0x0C024 ==> 00001100000000100100
0x0C028 ==> 00001100000000101000
0x0C030 ==> 00001100000000110000
0x0C041 ==> 00001100000001000001
0x0C042 ==> 00001100000001000010
0x0C044 ==> 00001100000001000100
0x0C048 ==> 00001100000001001000
0x0C050 ==> 00001100000001010000
0x0C060 ==> 00001100000001100000
0x0C081 ==> 00001100000010000001
0x0C082 ==> 00001100000010000010
0x0C084 ==> 00001100000010000100
0x0C088 ==> 00001100000010001000
0x0C090 ==> 00001100000010010000
0x0C0A0 ==> 00001100000010100000
0x0C0C0 ==> 00001100000011000000
0x0C101 ==> 00001100000100000001
0x0C102 ==> 00001100000100000010
0x0C104 ==> 00001100000100000100
0x0C108 ==> 00001100000100001000
0x0C110 ==> 00001100000100010000
0x0C120 ==> 00001100000100100000
0x0C140 ==> 00001100000101000000
0x0C180 ==> 00001100000110000000
0x0C201 ==> 00001100001000000001
0x0C202 ==> 00001100001000000010
0x0C204 ==> 00001100001000000100
0x0C208 ==> 00001100001000001000
0x0C210 ==> 00001100001000010000
0x0C220 ==> 00001100001000100000
0x0C240 ==> 00001100001001000000
0x0C280 ==> 00001100001010000000
0x0C300 ==> 00001100001100000000
0x0C401 ==> 00001100010000000001
0x0C402 ==> 00001100010000000010
0x0C404 ==> 00001100010000000100
0x0C408 ==> 00001100010000001000
0x0C410 ==> 00001100010000010000
0x0C420 ==> 00001100010000100000
0x0C440 ==> 00001100010001000000
0x0C480 ==> 00001100010010000000
0x0C500 ==> 00001100010100000000
0x0C600 ==> 00001100011000000000
0x0C801 ==> 00001100100000000001
0x0C802 ==> 00001100100000000010
0x0C804 ==> 00001100100000000100
0x0C808 ==> 00001100100000001000
0x0C810 ==> 00001100100000010000
0x0C820 ==> 00001100100000100000
0x0C840 ==> 00001100100001000000
0x0C880 ==> 00001100100010000000
0x0C900 ==> 00001100100100000000
0x0CA00 ==> 00001100101000000000
0x0CC00 ==> 00001100110000000000
0x0D001 ==> 00001101000000000001
0x0D002 ==> 00001101000000000010
0x0D004 ==> 00001101000000000100
0x0D008 ==> 00001101000000001000
0x0D010 ==> 00001101000000010000
0x0D020 ==> 00001101000000100000
0x0D040 ==> 00001101000001000000
0x0D080 ==> 00001101000010000000
0x0D100 ==> 00001101000100000000
0x0D200 ==> 00001101001000000000
0x0D400 ==> 00001101010000000000
0x0D800 ==> 00001101100000000000
0x0E001 ==> 00001110000000000001
0x0E002 ==> 00001110000000000010
0x0E004 ==> 00001110000000000100
0x0E008 ==> 00001110000000001000
0x0E010 ==> 00001110000000010000
0x0E020 ==> 00001110000000100000
0x0E040 ==> 00001110000001000000
0x0E080 ==> 00001110000010000000
0x0E100 ==> 00001110000100000000
0x0E200 ==> 00001110001000000000
0x0E400 ==> 00001110010000000000
0x0E800 ==> 00001110100000000000

-continued

0x0F000 ==> 00001111000000000000
0x10007 ==> 00010000000000000111
0x1000B ==> 00010000000000001011
0x1000D ==> 00010000000000001101
0x1000E ==> 00010000000000001110
0x10013 ==> 00010000000000010011
0x10015 ==> 00010000000000010101
0x10016 ==> 00010000000000010110
0x10019 ==> 00010000000000011001
0x1001A ==> 00010000000000011010
0x1001C ==> 00010000000000011100
0x10023 ==> 00010000000000100011
0x10025 ==> 00010000000000100101
0x10026 ==> 00010000000000100110
0x10029 ==> 00010000000000101001
0x1002A ==> 00010000000000101010
0x1002C ==> 00010000000000101100
0x10031 ==> 00010000000000110001
0x10032 ==> 00010000000000110010
0x10034 ==> 00010000000000110100
0x10038 ==> 00010000000000111000
0x10043 ==> 00010000000001000011
0x10045 ==> 00010000000001000101
0x10046 ==> 00010000000001000110
0x10049 ==> 00010000000001001001
0x1004A ==> 00010000000001001010
0x1004C ==> 00010000000001001100
0x10051 ==> 00010000000001010001
0x10052 ==> 00010000000001010010
0x10054 ==> 00010000000001010100
0x10058 ==> 00010000000001011000
0x10061 ==> 00010000000001100001
0x10062 ==> 00010000000001100010
0x10064 ==> 00010000000001100100
0x10068 ==> 00010000000001101000
0x10070 ==> 00010000000001110000
0x10083 ==> 00010000000010000011
0x10085 ==> 00010000000010000101
0x10086 ==> 00010000000010000110
0x10089 ==> 00010000000010001001
0x1008A ==> 00010000000010001010
0x1008C ==> 00010000000010001100
0x10091 ==> 00010000000010010001
0x10092 ==> 00010000000010010010
0x10094 ==> 00010000000010010100
0x10098 ==> 00010000000010011000
0x100A1 ==> 00010000000010100001
0x100A2 ==> 00010000000010100010
0x100A4 ==> 00010000000010100100
0x100A8 ==> 00010000000010101000
0x100B0 ==> 00010000000010110000
0x100C1 ==> 00010000000011000001
0x100C2 ==> 00010000000011000010
0x100C4 ==> 00010000000011000100
0x100C8 ==> 00010000000011001000
0x100D0 ==> 00010000000011010000
0x100E0 ==> 00010000000011100000
0x10103 ==> 00010000000100000011
0x10105 ==> 00010000000100000101
0x10106 ==> 00010000000100000110
0x10109 ==> 00010000000100001001
0x1010A ==> 00010000000100001010
0x1010C ==> 00010000000100001100
0x10111 ==> 00010000000100010001
0x10112 ==> 00010000000100010010
0x10114 ==> 00010000000100010100
0x10118 ==> 00010000000100011000
0x10121 ==> 00010000000100100001
0x10122 ==> 00010000000100100010
0x10124 ==> 00010000000100100100
0x10128 ==> 00010000000100101000
0x10130 ==> 00010000000100110000
0x10141 ==> 00010000000101000001
0x10142 ==> 00010000000101000010
0x10144 ==> 00010000000101000100
0x10148 ==> 00010000000101001000
0x10150 ==> 00010000000101010000
0x10160 ==> 00010000000101100000
0x10181 ==> 00010000000110000001

-continued

0x10182 ==> 00010000000110000010
0x10184 ==> 00010000000110000100
0x10188 ==> 00010000000110001000
0x10190 ==> 00010000000110010000
0x101A0 ==> 00010000000110100000
0x101C0 ==> 00010000000111000000
0x10203 ==> 00010000001000000011
0x10205 ==> 00010000001000000101
0x10206 ==> 00010000001000000110
0x10209 ==> 00010000001000001001
0x1020A ==> 00010000001000001010
0x1020C ==> 00010000001000001100
0x10211 ==> 00010000001000010001
0x10212 ==> 00010000001000010010
0x10214 ==> 00010000001000010100
0x10218 ==> 00010000001000011000
0x10221 ==> 00010000001000100001
0x10222 ==> 00010000001000100010
0x10224 ==> 00010000001000100100
0x10228 ==> 00010000001000101000
0x10230 ==> 00010000001000110000
0x10241 ==> 00010000001001000001
0x10242 ==> 00010000001001000010
0x10244 ==> 00010000001001000100
0x10248 ==> 00010000001001001000
0x10250 ==> 00010000001001010000
0x10260 ==> 00010000001001100000
0x10281 ==> 00010000001010000001
0x10282 ==> 00010000001010000010
0x10284 ==> 00010000001010000100
0x10288 ==> 00010000001010001000
0x10290 ==> 00010000001010010000
0x102A0 ==> 00010000001010100000
0x102C0 ==> 00010000001011000000
0x10301 ==> 00010000001100000001
0x10302 ==> 00010000001100000010
0x10304 ==> 00010000001100000100
0x10308 ==> 00010000001100001000
0x10310 ==> 00010000001100010000
0x10320 ==> 00010000001100100000
0x10340 ==> 00010000001101000000
0x10380 ==> 00010000001110000000
0x10403 ==> 00010000010000000011
0x10405 ==> 00010000010000000101
0x10406 ==> 00010000010000000110
0x10409 ==> 00010000010000001001
0x1040A ==> 00010000010000001010
0x1040C ==> 00010000010000001100
0x10411 ==> 00010000010000010001
0x10412 ==> 00010000010000010010
0x10414 ==> 00010000010000010100
0x10418 ==> 00010000010000011000
0x10421 ==> 00010000010000100001
0x10422 ==> 00010000010000100010
0x10424 ==> 00010000010000100100
0x10428 ==> 00010000010000101000
0x10430 ==> 00010000010000110000
0x10441 ==> 00010000010001000001
0x10442 ==> 00010000010001000010
0x10444 ==> 00010000010001000100
0x10448 ==> 00010000010001001000
0x10450 ==> 00010000010001010000
0x10460 ==> 00010000010001100000
0x10481 ==> 00010000010010000001
0x10482 ==> 00010000010010000010
0x10484 ==> 00010000010010000100
0x10488 ==> 00010000010010001000
0x10490 ==> 00010000010010010000
0x104A0 ==> 00010000010010100000
0x104C0 ==> 00010000010011000000
0x10501 ==> 00010000010100000001
0x10502 ==> 00010000010100000010
0x10504 ==> 00010000010100000100
0x10508 ==> 00010000010100001000
0x10510 ==> 00010000010100010000
0x10520 ==> 00010000010100100000
0x10540 ==> 00010000010101000000
0x10580 ==> 00010000010110000000
0x10601 ==> 00010000011000000001

-continued

0x10602 ==> 00010000011000000010
0x10604 ==> 00010000011000000100
0x10608 ==> 00010000011000001000
0x10610 ==> 00010000011000010000
0x10620 ==> 00010000011000100000
0x10640 ==> 00010000011001000000
0x10680 ==> 00010000011010000000
0x10700 ==> 00010000011100000000
0x10803 ==> 00010000100000000011
0x10805 ==> 00010000100000000101
0x10806 ==> 00010000100000000110
0x10809 ==> 00010000100000001001
0x1080A ==> 00010000100000001010
0x1080C ==> 00010000100000001100
0x10811 ==> 00010000100000010001
0x10812 ==> 00010000100000010010
0x10814 ==> 00010000100000010100
0x10818 ==> 00010000100000011000
0x10821 ==> 00010000100000100001
0x10822 ==> 00010000100000100010
0x10824 ==> 00010000100000100100
0x10828 ==> 00010000100000101000
0x10830 ==> 00010000100000110000
0x10841 ==> 00010000100001000001
0x10842 ==> 00010000100001000010
0x10844 ==> 00010000100001000100
0x10848 ==> 00010000100001001000
0x10850 ==> 00010000100001010000
0x10860 ==> 00010000100001100000
0x10881 ==> 00010000100010000001
0x10882 ==> 00010000100010000010
0x10884 ==> 00010000100010000100
0x10888 ==> 00010000100010001000
0x10890 ==> 00010000100010010000
0x108A0 ==> 00010000100010100000
0x108C0 ==> 00010000100011000000
0x10901 ==> 00010000100100000001
0x10902 ==> 00010000100100000010
0x10904 ==> 00010000100100000100
0x10908 ==> 00010000100100001000
0x10910 ==> 00010000100100010000
0x10920 ==> 00010000100100100000
0x10940 ==> 00010000100101000000
0x10980 ==> 00010000100110000000
0x10A01 ==> 00010000101000000001
0x10A02 ==> 00010000101000000010
0x10A04 ==> 00010000101000000100
0x10A08 ==> 00010000101000001000
0x10A10 ==> 00010000101000010000
0x10A20 ==> 00010000101000100000
0x10A40 ==> 00010000101001000000
0x10A80 ==> 00010000101010000000
0x10B00 ==> 00010000101100000000
0x10C01 ==> 00010000110000000001
0x10C02 ==> 00010000110000000010
0x10C04 ==> 00010000110000000100
0x10C08 ==> 00010000110000001000
0x10C10 ==> 00010000110000010000
0x10C20 ==> 00010000110000100000
0x10C40 ==> 00010000110001000000
0x10C80 ==> 00010000110010000000
0x10D00 ==> 00010000110100000000
0x10E00 ==> 00010000111000000000
0x11003 ==> 00010001000000000011
0x11005 ==> 00010001000000000101
0x11006 ==> 00010001000000000110
0x11009 ==> 00010001000000001001
0x1100A ==> 00010001000000001010
0x1100C ==> 00010001000000001100
0x11011 ==> 00010001000000010001
0x11012 ==> 00010001000000010010
0x11014 ==> 00010001000000010100
0x11018 ==> 00010001000000011000
0x11021 ==> 00010001000000100001
0x11022 ==> 00010001000000100010
0x11024 ==> 00010001000000100100
0x11028 ==> 00010001000000101000
0x11030 ==> 00010001000000110000
0x11041 ==> 00010001000001000001

-continued

0x11042 ==> 00010001000001000010
0x11044 ==> 00010001000001000100
0x11048 ==> 00010001000001001000
0x11050 ==> 00010001000001010000
0x11060 ==> 00010001000001100000
0x11081 ==> 00010001000010000001
0x11082 ==> 00010001000010000010
0x11084 ==> 00010001000010000100
0x11088 ==> 00010001000010001000
0x11090 ==> 00010001000010010000
0x110A0 ==> 00010001000010100000
0x110C0 ==> 00010001000011000000
0x11101 ==> 00010001000100000001
0x11102 ==> 00010001000100000010
0x11104 ==> 00010001000100000100
0x11108 ==> 00010001000100001000
0x11110 ==> 00010001000100010000
0x11120 ==> 00010001000100100000
0x11140 ==> 00010001000101000000
0x11180 ==> 00010001000110000000
0x11201 ==> 00010001001000000001
0x11202 ==> 00010001001000000010
0x11204 ==> 00010001001000000100
0x11208 ==> 00010001001000001000
0x11210 ==> 00010001001000010000
0x11220 ==> 00010001001000100000
0x11240 ==> 00010001001001000000
0x11280 ==> 00010001001010000000
0x11300 ==> 00010001001100000000
0x11401 ==> 00010001010000000001
0x11402 ==> 00010001010000000010
0x11404 ==> 00010001010000000100
0x11408 ==> 00010001010000001000
0x11410 ==> 00010001010000010000
0x11420 ==> 00010001010000100000
0x11440 ==> 00010001010001000000
0x11480 ==> 00010001010010000000
0x11500 ==> 00010001010100000000
0x11600 ==> 00010001011000000000
0x11801 ==> 00010001100000000001
0x11802 ==> 00010001100000000010
0x11804 ==> 00010001100000000100
0x11808 ==> 00010001100000001000
0x11810 ==> 00010001100000010000
0x11820 ==> 00010001100000100000
0x11840 ==> 00010001100001000000
0x11880 ==> 00010001100010000000
0x11900 ==> 00010001100100000000
0x11A00 ==> 00010001101000000000
0x11C00 ==> 00010001110000000000
0x12003 ==> 00010010000000000011
0x12005 ==> 00010010000000000101
0x12006 ==> 00010010000000000110
0x12009 ==> 00010010000000001001
0x1200A ==> 00010010000000001010
0x1200C ==> 00010010000000001100
0x12011 ==> 00010010000000010001
0x12012 ==> 00010010000000010010
0x12014 ==> 00010010000000010100
0x12018 ==> 00010010000000011000
0x12021 ==> 00010010000000100001
0x12022 ==> 00010010000000100010
0x12024 ==> 00010010000000100100
0x12028 ==> 00010010000000101000
0x12030 ==> 00010010000000110000
0x12041 ==> 00010010000001000001
0x12042 ==> 00010010000001000010
0x12044 ==> 00010010000001000100
0x12048 ==> 00010010000001001000
0x12050 ==> 00010010000001010000
0x12060 ==> 00010010000001100000
0x12081 ==> 00010010000010000001
0x12082 ==> 00010010000010000010
0x12084 ==> 00010010000010000100
0x12088 ==> 00010010000010001000
0x12090 ==> 00010010000010010000
0x120A0 ==> 00010010000010100000
0x120C0 ==> 00010010000011000000
0x12101 ==> 00010010000100000001

-continued

| |
|---|
| 0x12102 ==> 00010010000100000010 |
| 0x12104 ==> 00010010000100000100 |
| 0x12108 ==> 00010010000100001000 |
| 0x12110 ==> 00010010000100010000 |
| 0x12120 ==> 00010010000100100000 |
| 0x12140 ==> 00010010000101000000 |
| 0x12180 ==> 00010010000110000000 |
| 0x12201 ==> 00010010001000000001 |
| 0x12202 ==> 00010010001000000010 |
| 0x12204 ==> 00010010001000000100 |
| 0x12208 ==> 00010010001000001000 |
| 0x12210 ==> 00010010001000010000 |
| 0x12220 ==> 00010010001000100000 |
| 0x12240 ==> 00010010001001000000 |
| 0x12280 ==> 00010010001010000000 |
| 0x12300 ==> 00010010001100000000 |
| 0x12401 ==> 00010010010000000001 |
| 0x12402 ==> 00010010010000000010 |
| 0x12404 ==> 00010010010000000100 |
| 0x12408 ==> 00010010010000001000 |
| 0x12410 ==> 00010010010000010000 |
| 0x12420 ==> 00010010010000100000 |
| 0x12440 ==> 00010010010001000000 |
| 0x12480 ==> 00010010010010000000 |
| 0x12500 ==> 00010010010100000000 |
| 0x12600 ==> 00010010011000000000 |
| 0x12801 ==> 00010010100000000001 |
| 0x12802 ==> 00010010100000000010 |
| 0x12804 ==> 00010010100000000100 |
| 0x12808 ==> 00010010100000001000 |
| 0x12810 ==> 00010010100000010000 |
| 0x12820 ==> 00010010100000100000 |
| 0x12840 ==> 00010010100001000000 |
| 0x12880 ==> 00010010100010000000 |
| 0x12900 ==> 00010010100100000000 |
| 0x12A00 ==> 00010010101000000000 |
| 0x12C00 ==> 00010010110000000000 |
| 0x13001 ==> 00010011000000000001 |
| 0x13002 ==> 00010011000000000010 |
| 0x13004 ==> 00010011000000000100 |
| 0x13008 ==> 00010011000000001000 |
| 0x13010 ==> 00010011000000010000 |
| 0x13020 ==> 00010011000000100000 |
| 0x13040 ==> 00010011000001000000 |
| 0x13080 ==> 00010011000010000000 |
| 0x13100 ==> 00010011000100000000 |
| 0x13200 ==> 00010011001000000000 |
| 0x13400 ==> 00010011010000000000 |
| 0x13800 ==> 00010011100000000000 |
| 0x14003 ==> 00010100000000000011 |
| 0x14005 ==> 00010100000000000101 |
| 0x14006 ==> 00010100000000000110 |
| 0x14009 ==> 00010100000000001001 |
| 0x1400A ==> 00010100000000001010 |
| 0x1400C ==> 00010100000000001100 |
| 0x14011 ==> 00010100000000010001 |
| 0x14012 ==> 00010100000000010010 |
| 0x14014 ==> 00010100000000010100 |
| 0x14018 ==> 00010100000000011000 |
| 0x14021 ==> 00010100000000100001 |
| 0x14022 ==> 00010100000000100010 |
| 0x14024 ==> 00010100000000100100 |
| 0x14028 ==> 00010100000000101000 |
| 0x14030 ==> 00010100000000110000 |
| 0x14041 ==> 00010100000001000001 |
| 0x14042 ==> 00010100000001000010 |
| 0x14044 ==> 00010100000001000100 |
| 0x14048 ==> 00010100000001001000 |
| 0x14050 ==> 00010100000001010000 |
| 0x14060 ==> 00010100000001100000 |
| 0x14081 ==> 00010100000010000001 |
| 0x14082 ==> 00010100000010000010 |
| 0x14084 ==> 00010100000010000100 |
| 0x14088 ==> 00010100000010001000 |
| 0x14090 ==> 00010100000010010000 |
| 0x140A0 ==> 00010100000010100000 |
| 0x140C0 ==> 00010100000011000000 |
| 0x14101 ==> 00010100000100000001 |
| 0x14102 ==> 00010100000100000010 |

-continued

| |
|---|
| 0x14104 ==> 00010100000100000100 |
| 0x14108 ==> 00010100000100001000 |
| 0x14110 ==> 00010100000100010000 |
| 0x14120 ==> 00010100000100100000 |
| 0x14140 ==> 00010100000101000000 |
| 0x14180 ==> 00010100000110000000 |
| 0x14201 ==> 00010100001000000001 |
| 0x14202 ==> 00010100001000000010 |
| 0x14204 ==> 00010100001000000100 |
| 0x14208 ==> 00010100001000001000 |
| 0x14210 ==> 00010100001000010000 |
| 0x14220 ==> 00010100001000100000 |
| 0x14240 ==> 00010100001001000000 |
| 0x14280 ==> 00010100001010000000 |
| 0x14300 ==> 00010100001100000000 |
| 0x14401 ==> 00010100010000000001 |
| 0x14402 ==> 00010100010000000010 |
| 0x14404 ==> 00010100010000000100 |
| 0x14408 ==> 00010100010000001000 |
| 0x14410 ==> 00010100010000010000 |
| 0x14420 ==> 00010100010000100000 |
| 0x14440 ==> 00010100010001000000 |
| 0x14480 ==> 00010100010010000000 |
| 0x14500 ==> 00010100010100000000 |
| 0x14600 ==> 00010100011000000000 |
| 0x14801 ==> 00010100100000000001 |
| 0x14802 ==> 00010100100000000010 |
| 0x14804 ==> 00010100100000000100 |
| 0x14808 ==> 00010100100000001000 |
| 0x14810 ==> 00010100100000010000 |
| 0x14820 ==> 00010100100000100000 |
| 0x14840 ==> 00010100100001000000 |
| 0x14880 ==> 00010100100010000000 |
| 0x14900 ==> 00010100100100000000 |
| 0x14A00 ==> 00010100101000000000 |
| 0x14C00 ==> 00010100110000000000 |
| 0x15001 ==> 00010101000000000001 |
| 0x15002 ==> 00010101000000000010 |
| 0x15004 ==> 00010101000000000100 |
| 0x15008 ==> 00010101000000001000 |
| 0x15010 ==> 00010101000000010000 |
| 0x15020 ==> 00010101000000100000 |
| 0x15040 ==> 00010101000001000000 |
| 0x15080 ==> 00010101000010000000 |
| 0x15100 ==> 00010101000100000000 |
| 0x15200 ==> 00010101001000000000 |
| 0x15400 ==> 00010101010000000000 |
| 0x15800 ==> 00010101100000000000 |
| 0x16001 ==> 00010110000000000001 |
| 0x16002 ==> 00010110000000000010 |
| 0x16004 ==> 00010110000000000100 |
| 0x16008 ==> 00010110000000001000 |
| 0x16010 ==> 00010110000000010000 |
| 0x16020 ==> 00010110000000100000 |
| 0x16040 ==> 00010110000001000000 |
| 0x16080 ==> 00010110000010000000 |
| 0x16100 ==> 00010110000100000000 |
| 0x16200 ==> 00010110001000000000 |
| 0x16400 ==> 00010110010000000000 |
| 0x16800 ==> 00010110100000000000 |
| 0x17000 ==> 00010111000000000000 |
| 0x18003 ==> 00011000000000000011 |
| 0x18005 ==> 00011000000000000101 |
| 0x18006 ==> 00011000000000000110 |
| 0x18009 ==> 00011000000000001001 |
| 0x1800A ==> 00011000000000001010 |
| 0x1800C ==> 00011000000000001100 |
| 0x18011 ==> 00011000000000010001 |
| 0x18012 ==> 00011000000000010010 |
| 0x18014 ==> 00011000000000010100 |
| 0x18018 ==> 00011000000000011000 |
| 0x18021 ==> 00011000000000100001 |
| 0x18022 ==> 00011000000000100010 |
| 0x18024 ==> 00011000000000100100 |
| 0x18028 ==> 00011000000000101000 |
| 0x18030 ==> 00011000000000110000 |
| 0x18041 ==> 00011000000001000001 |
| 0x18042 ==> 00011000000001000010 |
| 0x18044 ==> 00011000000001000100 |

-continued

0x18048 ==> 00011000000001001000
0x18050 ==> 00011000000001010000
0x18060 ==> 00011000000001100000
0x18081 ==> 00011000000010000001
0x18082 ==> 00011000000010000010
0x18084 ==> 00011000000010000100
0x18088 ==> 00011000000010001000
0x18090 ==> 00011000000010010000
0x180A0 ==> 00011000000010100000
0x180C0 ==> 00011000000011000000
0x18101 ==> 00011000000100000001
0x18102 ==> 00011000000100000010
0x18104 ==> 00011000000100000100
0x18108 ==> 00011000000100001000
0x18110 ==> 00011000000100010000
0x18120 ==> 00011000000100100000
0x18140 ==> 00011000000101000000
0x18180 ==> 00011000000110000000
0x18201 ==> 00011000001000000001
0x18202 ==> 00011000001000000010
0x18204 ==> 00011000001000000100
0x18208 ==> 00011000001000001000
0x18210 ==> 00011000001000010000
0x18220 ==> 00011000001000100000
0x18240 ==> 00011000001001000000
0x18280 ==> 00011000001010000000
0x18300 ==> 00011000001100000000
0x18401 ==> 00011000010000000001
0x18402 ==> 00011000010000000010
0x18404 ==> 00011000010000000100
0x18408 ==> 00011000010000001000
0x18410 ==> 00011000010000010000
0x18420 ==> 00011000010000100000
0x18440 ==> 00011000010001000000
0x18480 ==> 00011000010010000000
0x18500 ==> 00011000010100000000
0x18600 ==> 00011000011000000000
0x18801 ==> 00011000100000000001
0x18802 ==> 00011000100000000010
0x18804 ==> 00011000100000000100
0x18808 ==> 00011000100000001000
0x18810 ==> 00011000100000010000
0x18820 ==> 00011000100000100000
0x18840 ==> 00011000100001000000
0x18880 ==> 00011000100010000000
0x18900 ==> 00011000100100000000
0x18A00 ==> 00011000101000000000
0x18C00 ==> 00011000110000000000
0x19001 ==> 00011001000000000001
0x19002 ==> 00011001000000000010
0x19004 ==> 00011001000000000100
0x19008 ==> 00011001000000001000
0x19010 ==> 00011001000000010000
0x19020 ==> 00011001000000100000
0x19040 ==> 00011001000001000000
0x19080 ==> 00011001000010000000
0x19100 ==> 00011001000100000000
0x19200 ==> 00011001001000000000
0x19400 ==> 00011001010000000000
0x19800 ==> 00011001100000000000
0x1A001 ==> 00011010000000000001
0x1A002 ==> 00011010000000000010
0x1A004 ==> 00011010000000000100
0x1A008 ==> 00011010000000001000
0x1A010 ==> 00011010000000010000
0x1A020 ==> 00011010000000100000
0x1A040 ==> 00011010000001000000
0x1A080 ==> 00011010000010000000
0x1A100 ==> 00011010000100000000
0x1A200 ==> 00011010001000000000
0x1A400 ==> 00011010010000000000
0x1A800 ==> 00011010100000000000
0x1B000 ==> 00011011000000000000
0x1C001 ==> 00011100000000000001
0x1C002 ==> 00011100000000000010
0x1C004 ==> 00011100000000000100
0x1C008 ==> 00011100000000001000
0x1C010 ==> 00011100000000010000
0x1C020 ==> 00011100000000100000

-continued

0x1C040 ==> 00011100000001000000
0x1C080 ==> 00011100000010000000
0x1C100 ==> 00011100000100000000
0x1C200 ==> 00011100001000000000
0x1C400 ==> 00011100010000000000
0x1C800 ==> 00011100100000000000
0x1D000 ==> 00011101000000000000
0x1E000 ==> 00011110000000000000
0x20007 ==> 00100000000000000111
0x2000B ==> 00100000000000001011
0x2000D ==> 00100000000000001101
0x2000E ==> 00100000000000001110
0x20013 ==> 00100000000000010011
0x20015 ==> 00100000000000010101
0x20016 ==> 00100000000000010110
0x20019 ==> 00100000000000011001
0x2001A ==> 00100000000000011010
0x2001C ==> 00100000000000011100
0x20023 ==> 00100000000000100011
0x20025 ==> 00100000000000100101
0x20026 ==> 00100000000000100110
0x20029 ==> 00100000000000101001
0x2002A ==> 00100000000000101010
0x2002C ==> 00100000000000101100
0x20031 ==> 00100000000000110001
0x20032 ==> 00100000000000110010
0x20034 ==> 00100000000000110100
0x20038 ==> 00100000000000111000
0x20043 ==> 00100000000001000011
0x20045 ==> 00100000000001000101
0x20046 ==> 00100000000001000110
0x20049 ==> 00100000000001001001
0x2004A ==> 00100000000001001010
0x2004C ==> 00100000000001001100
0x20051 ==> 00100000000001010001
0x20052 ==> 00100000000001010010
0x20054 ==> 00100000000001010100
0x20058 ==> 00100000000001011000
0x20061 ==> 00100000000001100001
0x20062 ==> 00100000000001100010
0x20064 ==> 00100000000001100100
0x20068 ==> 00100000000001101000
0x20070 ==> 00100000000001110000
0x20083 ==> 00100000000010000011
0x20085 ==> 00100000000010000101
0x20086 ==> 00100000000010000110
0x20089 ==> 00100000000010001001
0x2008A ==> 00100000000010001010
0x2008C ==> 00100000000010001100
0x20091 ==> 00100000000010010001
0x20092 ==> 00100000000010010010
0x20094 ==> 00100000000010010100
0x20098 ==> 00100000000010011000
0x200A1 ==> 00100000000010100001
0x200A2 ==> 00100000000010100010
0x200A4 ==> 00100000000010100100
0x200A8 ==> 00100000000010101000
0x200B0 ==> 00100000000010110000
0x200C1 ==> 00100000000011000001
0x200C2 ==> 00100000000011000010
0x200C4 ==> 00100000000011000100
0x200C8 ==> 00100000000011001000
0x200D0 ==> 00100000000011010000
0x200E0 ==> 00100000000011100000
0x20103 ==> 00100000000100000011
0x20105 ==> 00100000000100000101
0x20106 ==> 00100000000100000110
0x20109 ==> 00100000000100001001
0x2010A ==> 00100000000100001010
0x2010C ==> 00100000000100001100
0x20111 ==> 00100000000100010001
0x20112 ==> 00100000000100010010
0x20114 ==> 00100000000100010100
0x20118 ==> 00100000000100011000
0x20121 ==> 00100000000100100001
0x20122 ==> 00100000000100100010
0x20124 ==> 00100000000100100100
0x20128 ==> 00100000000100101000
0x20130 ==> 00100000000100110000

-continued

0x20141 ==> 00100000000101000001
0x20142 ==> 00100000000101000010
0x20144 ==> 00100000000101000100
0x20148 ==> 00100000000101001000
0x20150 ==> 00100000000101010000
0x20160 ==> 00100000000101100000
0x20181 ==> 00100000000110000001
0x20182 ==> 00100000000110000010
0x20184 ==> 00100000000110000100
0x20188 ==> 00100000000110001000
0x20190 ==> 00100000000110010000
0x201A0 ==> 00100000000110100000
0x201C0 ==> 00100000000111000000
0x20203 ==> 00100000001000000011
0x20205 ==> 00100000001000000101
0x20206 ==> 00100000001000000110
0x20209 ==> 00100000001000001001
0x2020A ==> 00100000001000001010
0x2020C ==> 00100000001000001100
0x20211 ==> 00100000001000010001
0x20212 ==> 00100000001000010010
0x20214 ==> 00100000001000010100
0x20218 ==> 00100000001000011000
0x20221 ==> 00100000001000100001
0x20222 ==> 00100000001000100010
0x20224 ==> 00100000001000100100
0x20228 ==> 00100000001000101000
0x20230 ==> 00100000001000110000
0x20241 ==> 00100000001001000001
0x20242 ==> 00100000001001000010
0x20244 ==> 00100000001001000100
0x20248 ==> 00100000001001001000
0x20250 ==> 00100000001001010000
0x20260 ==> 00100000001001100000
0x20281 ==> 00100000001010000001
0x20282 ==> 00100000001010000010
0x20284 ==> 00100000001010000100
0x20288 ==> 00100000001010001000
0x20290 ==> 00100000001010010000
0x202A0 ==> 00100000001010100000
0x202C0 ==> 00100000001011000000
0x20301 ==> 00100000001100000001
0x20302 ==> 00100000001100000010
0x20304 ==> 00100000001100000100
0x20308 ==> 00100000001100001000
0x20310 ==> 00100000001100010000
0x20320 ==> 00100000001100100000
0x20340 ==> 00100000001101000000
0x20380 ==> 00100000001110000000
0x20403 ==> 00100000010000000011
0x20405 ==> 00100000010000000101
0x20406 ==> 00100000010000000110
0x20409 ==> 00100000010000001001
0x2040A ==> 00100000010000001010
0x2040C ==> 00100000010000001100
0x20411 ==> 00100000010000010001
0x20412 ==> 00100000010000010010
0x20414 ==> 00100000010000010100
0x20418 ==> 00100000010000011000
0x20421 ==> 00100000010000100001
0x20422 ==> 00100000010000100010
0x20424 ==> 00100000010000100100
0x20428 ==> 00100000010000101000
0x20430 ==> 00100000010000110000
0x20441 ==> 00100000010001000001
0x20442 ==> 00100000010001000010
0x20444 ==> 00100000010001000100
0x20448 ==> 00100000010001001000
0x20450 ==> 00100000010001010000
0x20460 ==> 00100000010001100000
0x20481 ==> 00100000010010000001
0x20482 ==> 00100000010010000010
0x20484 ==> 00100000010010000100
0x20488 ==> 00100000010010001000
0x20490 ==> 00100000010010010000
0x204A0 ==> 00100000010010100000
0x204C0 ==> 00100000010011000000
0x20501 ==> 00100000010100000001
0x20502 ==> 00100000010100000010

-continued

0x20504 ==> 00100000010100000100
0x20508 ==> 00100000010100001000
0x20510 ==> 00100000010100010000
0x20520 ==> 00100000010100100000
0x20540 ==> 00100000010101000000
0x20580 ==> 00100000010110000000
0x20601 ==> 00100000011000000001
0x20602 ==> 00100000011000000010
0x20604 ==> 00100000011000000100
0x20608 ==> 00100000011000001000
0x20610 ==> 00100000011000010000
0x20620 ==> 00100000011000100000
0x20640 ==> 00100000011001000000
0x20680 ==> 00100000011010000000
0x20700 ==> 00100000011100000000
0x20803 ==> 00100000100000000011
0x20805 ==> 00100000100000000101
0x20806 ==> 00100000100000000110
0x20809 ==> 00100000100000001001
0x2080A ==> 00100000100000001010
0x2080C ==> 00100000100000001100
0x20811 ==> 00100000100000010001
0x20812 ==> 00100000100000010010
0x20814 ==> 00100000100000010100
0x20818 ==> 00100000100000011000
0x20821 ==> 00100000100000100001
0x20822 ==> 00100000100000100010
0x20824 ==> 00100000100000100100
0x20828 ==> 00100000100000101000
0x20830 ==> 00100000100000110000
0x20841 ==> 00100000100001000001
0x20842 ==> 00100000100001000010
0x20844 ==> 00100000100001000100
0x20848 ==> 00100000100001001000
0x20850 ==> 00100000100001010000
0x20860 ==> 00100000100001100000
0x20881 ==> 00100000100010000001
0x20882 ==> 00100000100010000010
0x20884 ==> 00100000100010000100
0x20888 ==> 00100000100010001000
0x20890 ==> 00100000100010010000
0x208A0 ==> 00100000100010100000
0x208C0 ==> 00100000100011000000
0x20901 ==> 00100000100100000001
0x20902 ==> 00100000100100000010
0x20904 ==> 00100000100100000100
0x20908 ==> 00100000100100001000
0x20910 ==> 00100000100100010000
0x20920 ==> 00100000100100100000
0x20940 ==> 00100000100101000000
0x20980 ==> 00100000100110000000
0x20A01 ==> 00100000101000000001
0x20A02 ==> 00100000101000000010
0x20A04 ==> 00100000101000000100
0x20A08 ==> 00100000101000001000
0x20A10 ==> 00100000101000010000
0x20A20 ==> 00100000101000100000
0x20A40 ==> 00100000101001000000
0x20A80 ==> 00100000101010000000
0x20B00 ==> 00100000101100000000
0x20C01 ==> 00100000110000000001
0x20C02 ==> 00100000110000000010
0x20C04 ==> 00100000110000000100
0x20C08 ==> 00100000110000001000
0x20C10 ==> 00100000110000010000
0x20C20 ==> 00100000110000100000
0x20C40 ==> 00100000110001000000
0x20C80 ==> 00100000110010000000
0x20D00 ==> 00100000110100000000
0x20E00 ==> 00100000111000000000
0x21003 ==> 00100001000000000011
0x21005 ==> 00100001000000000101
0x21006 ==> 00100001000000000110
0x21009 ==> 00100001000000001001
0x2100A ==> 00100001000000001010
0x2100C ==> 00100001000000001100
0x21011 ==> 00100001000000010001
0x21012 ==> 00100001000000010010
0x21014 ==> 00100001000000010100

-continued

0x21018 ==> 00100001000000011000
0x21021 ==> 00100001000000100001
0x21022 ==> 00100001000000100010
0x21024 ==> 00100001000000100100
0x21028 ==> 00100001000000101000
0x21030 ==> 00100001000000110000
0x21041 ==> 00100001000001000001
0x21042 ==> 00100001000001000010
0x21044 ==> 00100001000001000100
0x21048 ==> 00100001000001001000
0x21050 ==> 00100001000001010000
0x21060 ==> 00100001000001100000
0x21081 ==> 00100001000010000001
0x21082 ==> 00100001000010000010
0x21084 ==> 00100001000010000100
0x21088 ==> 00100001000010001000
0x21090 ==> 00100001000010010000
0x210A0 ==> 00100001000010100000
0x210C0 ==> 00100001000011000000
0x21101 ==> 00100001000100000001
0x21102 ==> 00100001000100000010
0x21104 ==> 00100001000100000100
0x21108 ==> 00100001000100001000
0x21110 ==> 00100001000100010000
0x21120 ==> 00100001000100100000
0x21140 ==> 00100001000101000000
0x21180 ==> 00100001000110000000
0x21201 ==> 00100001001000000001
0x21202 ==> 00100001001000000010
0x21204 ==> 00100001001000000100
0x21208 ==> 00100001001000001000
0x21210 ==> 00100001001000010000
0x21220 ==> 00100001001000100000
0x21240 ==> 00100001001001000000
0x21280 ==> 00100001001010000000
0x21300 ==> 00100001001100000000
0x21401 ==> 00100001010000000001
0x21402 ==> 00100001010000000010
0x21404 ==> 00100001010000000100
0x21408 ==> 00100001010000001000
0x21410 ==> 00100001010000010000
0x21420 ==> 00100001010000100000
0x21440 ==> 00100001010001000000
0x21480 ==> 00100001010010000000
0x21500 ==> 00100001010100000000
0x21600 ==> 00100001011000000000
0x21801 ==> 00100001100000000001
0x21802 ==> 00100001100000000010
0x21804 ==> 00100001100000000100
0x21808 ==> 00100001100000001000
0x21810 ==> 00100001100000010000
0x21820 ==> 00100001100000100000
0x21840 ==> 00100001100001000000
0x21880 ==> 00100001100010000000
0x21900 ==> 00100001100100000000
0x21A00 ==> 00100001101000000000
0x21C00 ==> 00100001110000000000
0x22003 ==> 00100010000000000011
0x22005 ==> 00100010000000000101
0x22006 ==> 00100010000000000110
0x22009 ==> 00100010000000001001
0x2200A ==> 00100010000000001010
0x2200C ==> 00100010000000001100
0x22011 ==> 00100010000000010001
0x22012 ==> 00100010000000010010
0x22014 ==> 00100010000000010100
0x22018 ==> 00100010000000011000
0x22021 ==> 00100010000000100001
0x22022 ==> 00100010000000100010
0x22024 ==> 00100010000000100100
0x22028 ==> 00100010000000101000
0x22030 ==> 00100010000000110000
0x22041 ==> 00100010000001000001
0x22042 ==> 00100010000001000010
0x22044 ==> 00100010000001000100
0x22048 ==> 00100010000001001000
0x22050 ==> 00100010000001010000
0x22060 ==> 00100010000001100000
0x22081 ==> 00100010000010000001

-continued

0x22082 ==> 00100010000010000010
0x22084 ==> 00100010000010000100
0x22088 ==> 00100010000010001000
0x22090 ==> 00100010000010010000
0x220A0 ==> 00100010000010100000
0x220C0 ==> 00100010000011000000
0x22101 ==> 00100010000100000001
0x22102 ==> 00100010000100000010
0x22104 ==> 00100010000100000100
0x22108 ==> 00100010000100001000
0x22110 ==> 00100010000100010000
0x22120 ==> 00100010000100100000
0x22140 ==> 00100010000101000000
0x22180 ==> 00100010000110000000
0x22201 ==> 00100010001000000001
0x22202 ==> 00100010001000000010
0x22204 ==> 00100010001000000100
0x22208 ==> 00100010001000001000
0x22210 ==> 00100010001000010000
0x22220 ==> 00100010001000100000
0x22240 ==> 00100010001001000000
0x22280 ==> 00100010001010000000
0x22300 ==> 00100010001100000000
0x22401 ==> 00100010010000000001
0x22402 ==> 00100010010000000010
0x22404 ==> 00100010010000000100
0x22408 ==> 00100010010000001000
0x22410 ==> 00100010010000010000
0x22420 ==> 00100010010000100000
0x22440 ==> 00100010010001000000
0x22480 ==> 00100010010010000000
0x22500 ==> 00100010010100000000
0x22600 ==> 00100010011000000000
0x22801 ==> 00100010100000000001
0x22802 ==> 00100010100000000010
0x22804 ==> 00100010100000000100
0x22808 ==> 00100010100000001000
0x22810 ==> 00100010100000010000
0x22820 ==> 00100010100000100000
0x22840 ==> 00100010100001000000
0x22880 ==> 00100010100010000000
0x22900 ==> 00100010100100000000
0x22A00 ==> 00100010101000000000
0x22C00 ==> 00100010110000000000
0x23001 ==> 00100011000000000001
0x23002 ==> 00100011000000000010
0x23004 ==> 00100011000000000100
0x23008 ==> 00100011000000001000
0x23010 ==> 00100011000000010000
0x23020 ==> 00100011000000100000
0x23040 ==> 00100011000001000000
0x23080 ==> 00100011000010000000
0x23100 ==> 00100011000100000000
0x23200 ==> 00100011001000000000
0x23400 ==> 00100011010000000000
0x23800 ==> 00100011100000000000
0x24003 ==> 00100100000000000011
0x24005 ==> 00100100000000000101
0x24006 ==> 00100100000000000110
0x24009 ==> 00100100000000001001
0x2400A ==> 00100100000000001010
0x2400C ==> 00100100000000001100
0x24011 ==> 00100100000000010001
0x24012 ==> 00100100000000010010
0x24014 ==> 00100100000000010100
0x24018 ==> 00100100000000011000
0x24021 ==> 00100100000000100001
0x24022 ==> 00100100000000100010
0x24024 ==> 00100100000000100100
0x24028 ==> 00100100000000101000
0x24030 ==> 00100100000000110000
0x24041 ==> 00100100000001000001
0x24042 ==> 00100100000001000010
0x24044 ==> 00100100000001000100
0x24048 ==> 00100100000001001000
0x24050 ==> 00100100000001010000
0x24060 ==> 00100100000001100000
0x24081 ==> 00100100000010000001
0x24082 ==> 00100100000010000010

-continued

0x24084 ==> 00100100000010000100
0x24088 ==> 00100100000010001000
0x24090 ==> 00100100000010010000
0x240A0 ==> 00100100000010100000
0x240C0 ==> 00100100000011000000
0x24101 ==> 00100100000100000001
0x24102 ==> 00100100000100000010
0x24104 ==> 00100100000100000100
0x24108 ==> 00100100000100001000
0x24110 ==> 00100100000100010000
0x24120 ==> 00100100000100100000
0x24140 ==> 00100100000101000000
0x24180 ==> 00100100000110000000
0x24201 ==> 00100100001000000001
0x24202 ==> 00100100001000000010
0x24204 ==> 00100100001000000100
0x24208 ==> 00100100001000001000
0x24210 ==> 00100100001000010000
0x24220 ==> 00100100001000100000
0x24240 ==> 00100100001001000000
0x24280 ==> 00100100001010000000
0x24300 ==> 00100100001100000000
0x24401 ==> 00100100010000000001
0x24402 ==> 00100100010000000010
0x24404 ==> 00100100010000000100
0x24408 ==> 00100100010000001000
0x24410 ==> 00100100010000010000
0x24420 ==> 00100100010000100000
0x24440 ==> 00100100010001000000
0x24480 ==> 00100100010010000000
0x24500 ==> 00100100010100000000
0x24600 ==> 00100100011000000000
0x24801 ==> 00100100100000000001
0x24802 ==> 00100100100000000010
0x24804 ==> 00100100100000000100
0x24808 ==> 00100100100000001000
0x24810 ==> 00100100100000010000
0x24820 ==> 00100100100000100000
0x24840 ==> 00100100100001000000
0x24880 ==> 00100100100010000000
0x24900 ==> 00100100100100000000
0x24A00 ==> 00100100101000000000
0x24C00 ==> 00100100110000000000
0x25001 ==> 00100101000000000001
0x25002 ==> 00100101000000000010
0x25004 ==> 00100101000000000100
0x25008 ==> 00100101000000001000
0x25010 ==> 00100101000000010000
0x25020 ==> 00100101000000100000
0x25040 ==> 00100101000001000000
0x25080 ==> 00100101000010000000
0x25100 ==> 00100101000100000000
0x25200 ==> 00100101001000000000
0x25400 ==> 00100101010000000000
0x25800 ==> 00100101100000000000
0x26001 ==> 00100110000000000001
0x26002 ==> 00100110000000000010
0x26004 ==> 00100110000000000100
0x26008 ==> 00100110000000001000
0x26010 ==> 00100110000000010000
0x26020 ==> 00100110000000100000
0x26040 ==> 00100110000001000000
0x26080 ==> 00100110000010000000
0x26100 ==> 00100110000100000000
0x26200 ==> 00100110001000000000
0x26400 ==> 00100110010000000000
0x26800 ==> 00100110100000000000
0x27000 ==> 00100111000000000000
0x28003 ==> 00101000000000000011
0x28005 ==> 00101000000000000101
0x28006 ==> 00101000000000000110
0x28009 ==> 00101000000000001001
0x2800A ==> 00101000000000001010
0x2800C ==> 00101000000000001100
0x28011 ==> 00101000000000010001
0x28012 ==> 00101000000000010010
0x28014 ==> 00101000000000010100
0x28018 ==> 00101000000000011000
0x28021 ==> 00101000000000100001

-continued

0x28022 ==> 00101000000000100010
0x28024 ==> 00101000000000100100
0x28028 ==> 00101000000000101000
0x28030 ==> 00101000000000110000
0x28041 ==> 00101000000001000001
0x28042 ==> 00101000000001000010
0x28044 ==> 00101000000001000100
0x28048 ==> 00101000000001001000
0x28050 ==> 00101000000001010000
0x28060 ==> 00101000000001100000
0x28081 ==> 00101000000010000001
0x28082 ==> 00101000000010000010
0x28084 ==> 00101000000010000100
0x28088 ==> 00101000000010001000
0x28090 ==> 00101000000010010000
0x280A0 ==> 00101000000010100000
0x280C0 ==> 00101000000011000000
0x28101 ==> 00101000000100000001
0x28102 ==> 00101000000100000010
0x28104 ==> 00101000000100000100
0x28108 ==> 00101000000100001000
0x28110 ==> 00101000000100010000
0x28120 ==> 00101000000100100000
0x28140 ==> 00101000000101000000
0x28180 ==> 00101000000110000000
0x28201 ==> 00101000001000000001
0x28202 ==> 00101000001000000010
0x28204 ==> 00101000001000000100
0x28208 ==> 00101000001000001000
0x28210 ==> 00101000001000010000
0x28220 ==> 00101000001000100000
0x28240 ==> 00101000001001000000
0x28280 ==> 00101000001010000000
0x28300 ==> 00101000001100000000
0x28401 ==> 00101000010000000001
0x28402 ==> 00101000010000000010
0x28404 ==> 00101000010000000100
0x28408 ==> 00101000010000001000
0x28410 ==> 00101000010000010000
0x28420 ==> 00101000010000100000
0x28440 ==> 00101000010001000000
0x28480 ==> 00101000010010000000
0x28500 ==> 00101000010100000000
0x28600 ==> 00101000011000000000
0x28801 ==> 00101000100000000001
0x28802 ==> 00101000100000000010
0x28804 ==> 00101000100000000100
0x28808 ==> 00101000100000001000
0x28810 ==> 00101000100000010000
0x28820 ==> 00101000100000100000
0x28840 ==> 00101000100001000000
0x28880 ==> 00101000100010000000
0x28900 ==> 00101000100100000000
0x28A00 ==> 00101000101000000000
0x28C00 ==> 00101000110000000000
0x29001 ==> 00101001000000000001
0x29002 ==> 00101001000000000010
0x29004 ==> 00101001000000000100
0x29008 ==> 00101001000000001000
0x29010 ==> 00101001000000010000
0x29020 ==> 00101001000000100000
0x29040 ==> 00101001000001000000
0x29080 ==> 00101001000010000000
0x29100 ==> 00101001000100000000
0x29200 ==> 00101001001000000000
0x29400 ==> 00101001010000000000
0x29800 ==> 00101001100000000000
0x2A001 ==> 00101010000000000001
0x2A002 ==> 00101010000000000010
0x2A004 ==> 00101010000000000100
0x2A008 ==> 00101010000000001000
0x2A010 ==> 00101010000000010000
0x2A020 ==> 00101010000000100000
0x2A040 ==> 00101010000001000000
0x2A080 ==> 00101010000010000000
0x2A100 ==> 00101010000100000000
0x2A200 ==> 00101010001000000000
0x2A400 ==> 00101010010000000000
0x2A800 ==> 00101010100000000000

-continued

0x2B000 ==> 00101011000000000000
0x2C001 ==> 00101100000000000001
0x2C002 ==> 00101100000000000010
0x2C004 ==> 00101100000000000100
0x2C008 ==> 00101100000000001000
0x2C010 ==> 00101100000000010000
0x2C020 ==> 00101100000000100000
0x2C040 ==> 00101100000001000000
0x2C080 ==> 00101100000010000000
0x2C100 ==> 00101100000100000000
0x2C200 ==> 00101100001000000000
0x2C400 ==> 00101100010000000000
0x2C800 ==> 00101100100000000000
0x2D000 ==> 00101101000000000000
0x2E000 ==> 00101110000000000000
0x30003 ==> 00110000000000000011
0x30005 ==> 00110000000000000101
0x30006 ==> 00110000000000000110
0x30009 ==> 00110000000000001001
0x3000A ==> 00110000000000001010
0x3000C ==> 00110000000000001100
0x30011 ==> 00110000000000010001
0x30012 ==> 00110000000000010010
0x30014 ==> 00110000000000010100
0x30018 ==> 00110000000000011000
0x30021 ==> 00110000000000100001
0x30022 ==> 00110000000000100010
0x30024 ==> 00110000000000100100
0x30028 ==> 00110000000000101000
0x30030 ==> 00110000000000110000
0x30041 ==> 00110000000001000001
0x30042 ==> 00110000000001000010
0x30044 ==> 00110000000001000100
0x30048 ==> 00110000000001001000
0x30050 ==> 00110000000001010000
0x30060 ==> 00110000000001100000
0x30081 ==> 00110000000010000001
0x30082 ==> 00110000000010000010
0x30084 ==> 00110000000010000100
0x30088 ==> 00110000000010001000
0x30090 ==> 00110000000010010000
0x300A0 ==> 00110000000010100000
0x300C0 ==> 00110000000011000000
0x30101 ==> 00110000000100000001
0x30102 ==> 00110000000100000010
0x30104 ==> 00110000000100000100
0x30108 ==> 00110000000100001000
0x30110 ==> 00110000000100010000
0x30120 ==> 00110000000100100000
0x30140 ==> 00110000000101000000
0x30180 ==> 00110000000110000000
0x30201 ==> 00110000001000000001
0x30202 ==> 00110000001000000010
0x30204 ==> 00110000001000000100
0x30208 ==> 00110000001000001000
0x30210 ==> 00110000001000010000
0x30220 ==> 00110000001000100000
0x30240 ==> 00110000001001000000
0x30280 ==> 00110000001010000000
0x30300 ==> 00110000001100000000
0x30401 ==> 00110000010000000001
0x30402 ==> 00110000010000000010
0x30404 ==> 00110000010000000100
0x30408 ==> 00110000010000001000
0x30410 ==> 00110000010000010000
0x30420 ==> 00110000010000100000
0x30440 ==> 00110000010001000000
0x30480 ==> 00110000010010000000
0x30500 ==> 00110000010100000000
0x30600 ==> 00110000011000000000
0x30801 ==> 00110000100000000001
0x30802 ==> 00110000100000000010
0x30804 ==> 00110000100000000100
0x30808 ==> 00110000100000001000
0x30810 ==> 00110000100000010000
0x30820 ==> 00110000100000100000
0x30840 ==> 00110000100001000000
0x30880 ==> 00110000100010000000
0x30900 ==> 00110000100100000000

-continued

0x30A00 ==> 00110000101000000000
0x30C00 ==> 00110000110000000000
0x31001 ==> 00110001000000000001
0x31002 ==> 00110001000000000010
0x31004 ==> 00110001000000000100
0x31008 ==> 00110001000000001000
0x31010 ==> 00110001000000010000
0x31020 ==> 00110001000000100000
0x31040 ==> 00110001000001000000
0x31080 ==> 00110001000010000000
0x31100 ==> 00110001000100000000
0x31200 ==> 00110001001000000000
0x31400 ==> 00110001010000000000
0x31800 ==> 00110001100000000000
0x32001 ==> 00110010000000000001
0x32002 ==> 00110010000000000010
0x32004 ==> 00110010000000000100
0x32008 ==> 00110010000000001000
0x32010 ==> 00110010000000010000
0x32020 ==> 00110010000000100000
0x32040 ==> 00110010000001000000
0x32080 ==> 00110010000010000000
0x32100 ==> 00110010000100000000
0x32200 ==> 00110010001000000000
0x32400 ==> 00110010010000000000
0x32800 ==> 00110010100000000000
0x33000 ==> 00110011000000000000
0x34001 ==> 00110100000000000001
0x34002 ==> 00110100000000000010
0x34004 ==> 00110100000000000100
0x34008 ==> 00110100000000001000
0x34010 ==> 00110100000000010000
0x34020 ==> 00110100000000100000
0x34040 ==> 00110100000001000000
0x34080 ==> 00110100000010000000
0x34100 ==> 00110100000100000000
0x34200 ==> 00110100001000000000
0x34400 ==> 00110100010000000000
0x34800 ==> 00110100100000000000
0x35000 ==> 00110101000000000000
0x36000 ==> 00110110000000000000
0x38001 ==> 00111000000000000001
0x38002 ==> 00111000000000000010
0x38004 ==> 00111000000000000100
0x38008 ==> 00111000000000001000
0x38010 ==> 00111000000000010000
0x38020 ==> 00111000000000100000
0x38040 ==> 00111000000001000000
0x38080 ==> 00111000000010000000
0x38100 ==> 00111000000100000000
0x38200 ==> 00111000001000000000
0x38400 ==> 00111000010000000000
0x38800 ==> 00111000100000000000
0x39000 ==> 00111001000000000000
0x3A000 ==> 00111010000000000000
0x3C000 ==> 00111100000000000000
0x40007 ==> 01000000000000000111
0x4000B ==> 01000000000000001011
0x4000D ==> 01000000000000001101
0x4000E ==> 01000000000000001110
0x40013 ==> 01000000000000010011
0x40015 ==> 01000000000000010101
0x40016 ==> 01000000000000010110
0x40019 ==> 01000000000000011001
0x4001A ==> 01000000000000011010
0x4001C ==> 01000000000000011100
0x40023 ==> 01000000000000100011
0x40025 ==> 01000000000000100101
0x40026 ==> 01000000000000100110
0x40029 ==> 01000000000000101001
0x4002A ==> 01000000000000101010
0x4002C ==> 01000000000000101100
0x40031 ==> 01000000000000110001
0x40032 ==> 01000000000000110010
0x40034 ==> 01000000000000110100
0x40038 ==> 01000000000000111000
0x40043 ==> 01000000000001000011
0x40045 ==> 01000000000001000101
0x40046 ==> 01000000000001000110

-continued

```
0x40049 ==> 01000000000001001001
0x4004A ==> 01000000000001001010
0x4004C ==> 01000000000001001100
0x40051 ==> 01000000000001010001
0x40052 ==> 01000000000001010010
0x40054 ==> 01000000000001010100
0x40058 ==> 01000000000001011000
0x40061 ==> 01000000000001100001
0x40062 ==> 01000000000001100010
0x40064 ==> 01000000000001100100
0x40068 ==> 01000000000001101000
0x40070 ==> 01000000000001110000
0x40083 ==> 01000000000010000011
0x40085 ==> 01000000000010000101
0x40086 ==> 01000000000010000110
0x40089 ==> 01000000000010001001
0x4008A ==> 01000000000010001010
0x4008C ==> 01000000000010001100
0x40091 ==> 01000000000010010001
0x40092 ==> 01000000000010010010
0x40094 ==> 01000000000010010100
0x40098 ==> 01000000000010011000
0x400A1 ==> 01000000000010100001
0x400A2 ==> 01000000000010100010
0x400A4 ==> 01000000000010100100
0x400A8 ==> 01000000000010101000
0x400B0 ==> 01000000000010110000
0x400C1 ==> 01000000000011000001
0x400C2 ==> 01000000000011000010
0x400C4 ==> 01000000000011000100
0x400C8 ==> 01000000000011001000
0x400D0 ==> 01000000000011010000
0x400E0 ==> 01000000000011100000
0x40103 ==> 01000000000100000011
0x40105 ==> 01000000000100000101
0x40106 ==> 01000000000100000110
0x40109 ==> 01000000000100001001
0x4010A ==> 01000000000100001010
0x4010C ==> 01000000000100001100
0x40111 ==> 01000000000100010001
0x40112 ==> 01000000000100010010
0x40114 ==> 01000000000100010100
0x40118 ==> 01000000000100011000
0x40121 ==> 01000000000100100001
0x40122 ==> 01000000000100100010
0x40124 ==> 01000000000100100100
0x40128 ==> 01000000000100101000
0x40130 ==> 01000000000100110000
0x40141 ==> 01000000000101000001
0x40142 ==> 01000000000101000010
0x40144 ==> 01000000000101000100
0x40148 ==> 01000000000101001000
0x40150 ==> 01000000000101010000
0x40160 ==> 01000000000101100000
0x40181 ==> 01000000000110000001
0x40182 ==> 01000000000110000010
0x40184 ==> 01000000000110000100
0x40188 ==> 01000000000110001000
0x40190 ==> 01000000000110010000
0x401A0 ==> 01000000000110100000
0x401C0 ==> 01000000000111000000
0x40203 ==> 01000000001000000011
0x40205 ==> 01000000001000000101
0x40206 ==> 01000000001000000110
0x40209 ==> 01000000001000001001
0x4020A ==> 01000000001000001010
0x4020C ==> 01000000001000001100
0x40211 ==> 01000000001000010001
0x40212 ==> 01000000001000010010
0x40214 ==> 01000000001000010100
0x40218 ==> 01000000001000011000
0x40221 ==> 01000000001000100001
0x40222 ==> 01000000001000100010
0x40224 ==> 01000000001000100100
0x40228 ==> 01000000001000101000
0x40230 ==> 01000000001000110000
0x40241 ==> 01000000001001000001
0x40242 ==> 01000000001001000010
0x40244 ==> 01000000001001000100
```

-continued

```
0x40248 ==> 01000000001001001000
0x40250 ==> 01000000001001010000
0x40260 ==> 01000000001001100000
0x40281 ==> 01000000001010000001
0x40282 ==> 01000000001010000010
0x40284 ==> 01000000001010000100
0x40288 ==> 01000000001010001000
0x40290 ==> 01000000001010010000
0x402A0 ==> 01000000001010100000
0x402C0 ==> 01000000001011000000
0x40301 ==> 01000000001100000001
0x40302 ==> 01000000001100000010
0x40304 ==> 01000000001100000100
0x40308 ==> 01000000001100001000
0x40310 ==> 01000000001100010000
0x40320 ==> 01000000001100100000
0x40340 ==> 01000000001101000000
0x40380 ==> 01000000001110000000
0x40403 ==> 01000000010000000011
0x40405 ==> 01000000010000000101
0x40406 ==> 01000000010000000110
0x40409 ==> 01000000010000001001
0x4040A ==> 01000000010000001010
0x4040C ==> 01000000010000001100
0x40411 ==> 01000000010000010001
0x40412 ==> 01000000010000010010
0x40414 ==> 01000000010000010100
0x40418 ==> 01000000010000011000
0x40421 ==> 01000000010000100001
0x40422 ==> 01000000010000100010
0x40424 ==> 01000000010000100100
0x40428 ==> 01000000010000101000
0x40430 ==> 01000000010000110000
0x40441 ==> 01000000010001000001
0x40442 ==> 01000000010001000010
0x40444 ==> 01000000010001000100
0x40448 ==> 01000000010001001000
0x40450 ==> 01000000010001010000
0x40460 ==> 01000000010001100000
0x40481 ==> 01000000010010000001
0x40482 ==> 01000000010010000010
0x40484 ==> 01000000010010000100
0x40488 ==> 01000000010010001000
0x40490 ==> 01000000010010010000
0x404A0 ==> 01000000010010100000
0x404C0 ==> 01000000010011000000
0x40501 ==> 01000000010100000001
0x40502 ==> 01000000010100000010
0x40504 ==> 01000000010100000100
0x40508 ==> 01000000010100001000
0x40510 ==> 01000000010100010000
0x40520 ==> 01000000010100100000
0x40540 ==> 01000000010101000000
0x40580 ==> 01000000010110000000
0x40601 ==> 01000000011000000001
0x40602 ==> 01000000011000000010
0x40604 ==> 01000000011000000100
0x40608 ==> 01000000011000001000
0x40610 ==> 01000000011000010000
0x40620 ==> 01000000011000100000
0x40640 ==> 01000000011001000000
0x40680 ==> 01000000011010000000
0x40700 ==> 01000000011100000000
0x40803 ==> 01000000100000000011
0x40805 ==> 01000000100000000101
0x40806 ==> 01000000100000000110
0x40809 ==> 01000000100000001001
0x4080A ==> 01000000100000001010
0x4080C ==> 01000000100000001100
0x40811 ==> 01000000100000010001
0x40812 ==> 01000000100000010010
0x40814 ==> 01000000100000010100
0x40818 ==> 01000000100000011000
0x40821 ==> 01000000100000100001
0x40822 ==> 01000000100000100010
0x40824 ==> 01000000100000100100
0x40828 ==> 01000000100000101000
0x40830 ==> 01000000100000110000
0x40841 ==> 01000000100001000001
```

-continued

0x40842 ==> 01000000100001000010
0x40844 ==> 01000000100001000100
0x40848 ==> 01000000100001001000
0x40850 ==> 01000000100001010000
0x40860 ==> 01000000100001100000
0x40881 ==> 01000000100010000001
0x40882 ==> 01000000100010000010
0x40884 ==> 01000000100010000100
0x40888 ==> 01000000100010001000
0x40890 ==> 01000000100010010000
0x408A0 ==> 01000000100010100000
0x408C0 ==> 01000000100011000000
0x40901 ==> 01000000100100000001
0x40902 ==> 01000000100100000010
0x40904 ==> 01000000100100000100
0x40908 ==> 01000000100100001000
0x40910 ==> 01000000100100010000
0x40920 ==> 01000000100100100000
0x40940 ==> 01000000100101000000
0x40980 ==> 01000000100110000000
0x40A01 ==> 01000000101000000001
0x40A02 ==> 01000000101000000010
0x40A04 ==> 01000000101000000100
0x40A08 ==> 01000000101000001000
0x40A10 ==> 01000000101000010000
0x40A20 ==> 01000000101000100000
0x40A40 ==> 01000000101001000000
0x40A80 ==> 01000000101010000000
0x40B00 ==> 01000000101100000000
0x40C01 ==> 01000000110000000001
0x40C02 ==> 01000000110000000010
0x40C04 ==> 01000000110000000100
0x40C08 ==> 01000000110000001000
0x40C10 ==> 01000000110000010000
0x40C20 ==> 01000000110000100000
0x40C40 ==> 01000000110001000000
0x40C80 ==> 01000000110010000000
0x40D00 ==> 01000000110100000000
0x40E00 ==> 01000000111000000000
0x41003 ==> 01000001000000000011
0x41005 ==> 01000001000000000101
0x41006 ==> 01000001000000000110
0x41009 ==> 01000001000000001001
0x4100A ==> 01000001000000001010
0x4100C ==> 01000001000000001100
0x41011 ==> 01000001000000010001
0x41012 ==> 01000001000000010010
0x41014 ==> 01000001000000010100
0x41018 ==> 01000001000000011000
0x41021 ==> 01000001000000100001
0x41022 ==> 01000001000000100010
0x41024 ==> 01000001000000100100
0x41028 ==> 01000001000000101000
0x41030 ==> 01000001000000110000
0x41041 ==> 01000001000001000001
0x41042 ==> 01000001000001000010
0x41044 ==> 01000001000001000100
0x41048 ==> 01000001000001001000
0x41050 ==> 01000001000001010000
0x41060 ==> 01000001000001100000
0x41081 ==> 01000001000010000001
0x41082 ==> 01000001000010000010
0x41084 ==> 01000001000010000100
0x41088 ==> 01000001000010001000
0x41090 ==> 01000001000010010000
0x410A0 ==> 01000001000010100000
0x410C0 ==> 01000001000011000000
0x41101 ==> 01000001000100000001
0x41102 ==> 01000001000100000010
0x41104 ==> 01000001000100000100
0x41108 ==> 01000001000100001000
0x41110 ==> 01000001000100010000
0x41120 ==> 01000001000100100000
0x41140 ==> 01000001000101000000
0x41180 ==> 01000001000110000000
0x41201 ==> 01000001001000000001
0x41202 ==> 01000001001000000010
0x41204 ==> 01000001001000000100
0x41208 ==> 01000001001000001000

-continued

0x41210 ==> 01000001001000010000
0x41220 ==> 01000001001000100000
0x41240 ==> 01000001001001000000
0x41280 ==> 01000001001010000000
0x41300 ==> 01000001001100000000
0x41401 ==> 01000001010000000001
0x41402 ==> 01000001010000000010
0x41404 ==> 01000001010000000100
0x41408 ==> 01000001010000001000
0x41410 ==> 01000001010000010000
0x41420 ==> 01000001010000100000
0x41440 ==> 01000001010001000000
0x41480 ==> 01000001010010000000
0x41500 ==> 01000001010100000000
0x41600 ==> 01000001011000000000
0x41801 ==> 01000001100000000001
0x41802 ==> 01000001100000000010
0x41804 ==> 01000001100000000100
0x41808 ==> 01000001100000001000
0x41810 ==> 01000001100000010000
0x41820 ==> 01000001100000100000
0x41840 ==> 01000001100001000000
0x41880 ==> 01000001100010000000
0x41900 ==> 01000001100100000000
0x41A00 ==> 01000001101000000000
0x41C00 ==> 01000001110000000000
0x42003 ==> 01000010000000000011
0x42005 ==> 01000010000000000101
0x42006 ==> 01000010000000000110
0x42009 ==> 01000010000000001001
0x4200A ==> 01000010000000001010
0x4200C ==> 01000010000000001100
0x42011 ==> 01000010000000010001
0x42012 ==> 01000010000000010010
0x42014 ==> 01000010000000010100
0x42018 ==> 01000010000000011000
0x42021 ==> 01000010000000100001
0x42022 ==> 01000010000000100010
0x42024 ==> 01000010000000100100
0x42028 ==> 01000010000000101000
0x42030 ==> 01000010000000110000
0x42041 ==> 01000010000001000001
0x42042 ==> 01000010000001000010
0x42044 ==> 01000010000001000100
0x42048 ==> 01000010000001001000
0x42050 ==> 01000010000001010000
0x42060 ==> 01000010000001100000
0x42081 ==> 01000010000010000001
0x42082 ==> 01000010000010000010
0x42084 ==> 01000010000010000100
0x42088 ==> 01000010000010001000
0x42090 ==> 01000010000010010000
0x420A0 ==> 01000010000010100000
0x420C0 ==> 01000010000011000000
0x42101 ==> 01000010000100000001
0x42102 ==> 01000010000100000010
0x42104 ==> 01000010000100000100
0x42108 ==> 01000010000100001000
0x42110 ==> 01000010000100010000
0x42120 ==> 01000010000100100000
0x42140 ==> 01000010000101000000
0x42180 ==> 01000010000110000000
0x42201 ==> 01000010001000000001
0x42202 ==> 01000010001000000010
0x42204 ==> 01000010001000000100
0x42208 ==> 01000010001000001000
0x42210 ==> 01000010001000010000
0x42220 ==> 01000010001000100000
0x42240 ==> 01000010001001000000
0x42280 ==> 01000010001010000000
0x42300 ==> 01000010001100000000
0x42401 ==> 01000010010000000001
0x42402 ==> 01000010010000000010
0x42404 ==> 01000010010000000100
0x42408 ==> 01000010010000001000
0x42410 ==> 01000010010000010000
0x42420 ==> 01000010010000100000
0x42440 ==> 01000010010001000000
0x42480 ==> 01000010010010000000

-continued

0x42500 ==> 01000010010100000000
0x42600 ==> 01000010011000000000
0x42801 ==> 01000010100000000001
0x42802 ==> 01000010100000000010
0x42804 ==> 01000010100000000100
0x42808 ==> 01000010100000001000
0x42810 ==> 01000010100000010000
0x42820 ==> 01000010100000100000
0x42840 ==> 01000010100001000000
0x42880 ==> 01000010100010000000
0x42900 ==> 01000010100100000000
0x42A00 ==> 01000010101000000000
0x42C00 ==> 01000010110000000000
0x43001 ==> 01000011000000000001
0x43002 ==> 01000011000000000010
0x43004 ==> 01000011000000000100
0x43008 ==> 01000011000000001000
0x43010 ==> 01000011000000010000
0x43020 ==> 01000011000000100000
0x43040 ==> 01000011000001000000
0x43080 ==> 01000011000010000000
0x43100 ==> 01000011000100000000
0x43200 ==> 01000011001000000000
0x43400 ==> 01000011010000000000
0x43800 ==> 01000011100000000000
0x44003 ==> 01000100000000000011
0x44005 ==> 01000100000000000101
0x44006 ==> 01000100000000000110
0x44009 ==> 01000100000000001001
0x4400A ==> 01000100000000001010
0x4400C ==> 01000100000000001100
0x44011 ==> 01000100000000010001
0x44012 ==> 01000100000000010010
0x44014 ==> 01000100000000010100
0x44018 ==> 01000100000000011000
0x44021 ==> 01000100000000100001
0x44022 ==> 01000100000000100010
0x44024 ==> 01000100000000100100
0x44028 ==> 01000100000000101000
0x44030 ==> 01000100000000110000
0x44041 ==> 01000100000001000001
0x44042 ==> 01000100000001000010
0x44044 ==> 01000100000001000100
0x44048 ==> 01000100000001001000
0x44050 ==> 01000100000001010000
0x44060 ==> 01000100000001100000
0x44081 ==> 01000100000010000001
0x44082 ==> 01000100000010000010
0x44084 ==> 01000100000010000100
0x44088 ==> 01000100000010001000
0x44090 ==> 01000100000010010000
0x440A0 ==> 01000100000010100000
0x440C0 ==> 01000100000011000000
0x44101 ==> 01000100000100000001
0x44102 ==> 01000100000100000010
0x44104 ==> 01000100000100000100
0x44108 ==> 01000100000100001000
0x44110 ==> 01000100000100010000
0x44120 ==> 01000100000100100000
0x44140 ==> 01000100000101000000
0x44180 ==> 01000100000110000000
0x44201 ==> 01000100001000000001
0x44202 ==> 01000100001000000010
0x44204 ==> 01000100001000000100
0x44208 ==> 01000100001000001000
0x44210 ==> 01000100001000010000
0x44220 ==> 01000100001000100000
0x44240 ==> 01000100001001000000
0x44280 ==> 01000100001010000000
0x44300 ==> 01000100001100000000
0x44401 ==> 01000100010000000001
0x44402 ==> 01000100010000000010
0x44404 ==> 01000100010000000100
0x44408 ==> 01000100010000001000
0x44410 ==> 01000100010000010000
0x44420 ==> 01000100010000100000
0x44440 ==> 01000100010001000000
0x44480 ==> 01000100010010000000
0x44500 ==> 01000100010100000000

-continued

0x44600 ==> 01000100011000000000
0x44801 ==> 01000100100000000001
0x44802 ==> 01000100100000000010
0x44804 ==> 01000100100000000100
0x44808 ==> 01000100100000001000
0x44810 ==> 01000100100000010000
0x44820 ==> 01000100100000100000
0x44840 ==> 01000100100001000000
0x44880 ==> 01000100100010000000
0x44900 ==> 01000100100100000000
0x44A00 ==> 01000100101000000000
0x44C00 ==> 01000100110000000000
0x45001 ==> 01000101000000000001
0x45002 ==> 01000101000000000010
0x45004 ==> 01000101000000000100
0x45008 ==> 01000101000000001000
0x45010 ==> 01000101000000010000
0x45020 ==> 01000101000000100000
0x45040 ==> 01000101000001000000
0x45080 ==> 01000101000010000000
0x45100 ==> 01000101000100000000
0x45200 ==> 01000101001000000000
0x45400 ==> 01000101010000000000
0x45800 ==> 01000101100000000000
0x46001 ==> 01000110000000000001
0x46002 ==> 01000110000000000010
0x46004 ==> 01000110000000000100
0x46008 ==> 01000110000000001000
0x46010 ==> 01000110000000010000
0x46020 ==> 01000110000000100000
0x46040 ==> 01000110000001000000
0x46080 ==> 01000110000010000000
0x46100 ==> 01000110000100000000
0x46200 ==> 01000110001000000000
0x46400 ==> 01000110010000000000
0x46800 ==> 01000110100000000000
0x47000 ==> 01000111000000000000
0x48003 ==> 01001000000000000011
0x48005 ==> 01001000000000000101
0x48006 ==> 01001000000000000110
0x48009 ==> 01001000000000001001
0x4800A ==> 01001000000000001010
0x4800C ==> 01001000000000001100
0x48011 ==> 01001000000000010001
0x48012 ==> 01001000000000010010
0x48014 ==> 01001000000000010100
0x48018 ==> 01001000000000011000
0x48021 ==> 01001000000000100001
0x48022 ==> 01001000000000100010
0x48024 ==> 01001000000000100100
0x48028 ==> 01001000000000101000
0x48030 ==> 01001000000000110000
0x48041 ==> 01001000000001000001
0x48042 ==> 01001000000001000010
0x48044 ==> 01001000000001000100
0x48048 ==> 01001000000001001000
0x48050 ==> 01001000000001010000
0x48060 ==> 01001000000001100000
0x48081 ==> 01001000000010000001
0x48082 ==> 01001000000010000010
0x48084 ==> 01001000000010000100
0x48088 ==> 01001000000010001000
0x48090 ==> 01001000000010010000
0x480A0 ==> 01001000000010100000
0x480C0 ==> 01001000000011000000
0x48101 ==> 01001000000100000001
0x48102 ==> 01001000000100000010
0x48104 ==> 01001000000100000100
0x48108 ==> 01001000000100001000
0x48110 ==> 01001000000100010000
0x48120 ==> 01001000000100100000
0x48140 ==> 01001000000101000000
0x48180 ==> 01001000000110000000
0x48201 ==> 01001000001000000001
0x48202 ==> 01001000001000000010
0x48204 ==> 01001000001000000100
0x48208 ==> 01001000001000001000
0x48210 ==> 01001000001000010000
0x48220 ==> 01001000001000100000

-continued

0x48240 ==> 01001000001001000000
0x48280 ==> 01001000001010000000
0x48300 ==> 01001000001100000000
0x48401 ==> 01001000010000000001
0x48402 ==> 01001000010000000010
0x48404 ==> 01001000010000000100
0x48408 ==> 01001000010000001000
0x48410 ==> 01001000010000010000
0x48420 ==> 01001000010000100000
0x48440 ==> 01001000010001000000
0x48480 ==> 01001000010010000000
0x48500 ==> 01001000010100000000
0x48600 ==> 01001000011000000000
0x48801 ==> 01001000100000000001
0x48802 ==> 01001000100000000010
0x48804 ==> 01001000100000000100
0x48808 ==> 01001000100000001000
0x48810 ==> 01001000100000010000
0x48820 ==> 01001000100000100000
0x48840 ==> 01001000100001000000
0x48880 ==> 01001000100010000000
0x48900 ==> 01001000100100000000
0x48A00 ==> 01001000101000000000
0x48C00 ==> 01001000110000000000
0x49001 ==> 01001001000000000001
0x49002 ==> 01001001000000000010
0x49004 ==> 01001001000000000100
0x49008 ==> 01001001000000001000
0x49010 ==> 01001001000000010000
0x49020 ==> 01001001000000100000
0x49040 ==> 01001001000001000000
0x49080 ==> 01001001000010000000
0x49100 ==> 01001001000100000000
0x49200 ==> 01001001001000000000
0x49400 ==> 01001001010000000000
0x49800 ==> 01001001100000000000
0x4A001 ==> 01001010000000000001
0x4A002 ==> 01001010000000000010
0x4A004 ==> 01001010000000000100
0x4A008 ==> 01001010000000001000
0x4A010 ==> 01001010000000010000
0x4A020 ==> 01001010000000100000
0x4A040 ==> 01001010000001000000
0x4A080 ==> 01001010000010000000
0x4A100 ==> 01001010000100000000
0x4A200 ==> 01001010001000000000
0x4A400 ==> 01001010010000000000
0x4A800 ==> 01001010100000000000
0x4B000 ==> 01001011000000000000
0x4C001 ==> 01001100000000000001
0x4C002 ==> 01001100000000000010
0x4C004 ==> 01001100000000000100
0x4C008 ==> 01001100000000001000
0x4C010 ==> 01001100000000010000
0x4C020 ==> 01001100000000100000
0x4C040 ==> 01001100000001000000
0x4C080 ==> 01001100000010000000
0x4C100 ==> 01001100000100000000
0x4C200 ==> 01001100001000000000
0x4C400 ==> 01001100010000000000
0x4C800 ==> 01001100100000000000
0x4D000 ==> 01001101000000000000
0x4E000 ==> 01001110000000000000
0x50003 ==> 01010000000000000011
0x50005 ==> 01010000000000000101
0x50006 ==> 01010000000000000110
0x50009 ==> 01010000000000001001
0x5000A ==> 01010000000000001010
0x5000C ==> 01010000000000001100
0x50011 ==> 01010000000000010001
0x50012 ==> 01010000000000010010
0x50014 ==> 01010000000000010100
0x50018 ==> 01010000000000011000
0x50021 ==> 01010000000000100001
0x50022 ==> 01010000000000100010
0x50024 ==> 01010000000000100100
0x50028 ==> 01010000000000101000
0x50030 ==> 01010000000000110000
0x50041 ==> 01010000000001000001

-continued

0x50042 ==> 01010000000001000010
0x50044 ==> 01010000000001000100
0x50048 ==> 01010000000001001000
0x50050 ==> 01010000000001010000
0x50060 ==> 01010000000001100000
0x50081 ==> 01010000000010000001
0x50082 ==> 01010000000010000010
0x50084 ==> 01010000000010000100
0x50088 ==> 01010000000010001000
0x50090 ==> 01010000000010010000
0x500A0 ==> 01010000000010100000
0x500C0 ==> 01010000000011000000
0x50101 ==> 01010000000100000001
0x50102 ==> 01010000000100000010
0x50104 ==> 01010000000100000100
0x50108 ==> 01010000000100001000
0x50110 ==> 01010000000100010000
0x50120 ==> 01010000000100100000
0x50140 ==> 01010000000101000000
0x50180 ==> 01010000000110000000
0x50201 ==> 01010000001000000001
0x50202 ==> 01010000001000000010
0x50204 ==> 01010000001000000100
0x50208 ==> 01010000001000001000
0x50210 ==> 01010000001000010000
0x50220 ==> 01010000001000100000
0x50240 ==> 01010000001001000000
0x50280 ==> 01010000001010000000
0x50300 ==> 01010000001100000000
0x50401 ==> 01010000010000000001
0x50402 ==> 01010000010000000010
0x50404 ==> 01010000010000000100
0x50408 ==> 01010000010000001000
0x50410 ==> 01010000010000010000
0x50420 ==> 01010000010000100000
0x50440 ==> 01010000010001000000
0x50480 ==> 01010000010010000000
0x50500 ==> 01010000010100000000
0x50600 ==> 01010000011000000000
0x50801 ==> 01010000100000000001
0x50802 ==> 01010000100000000010
0x50804 ==> 01010000100000000100
0x50808 ==> 01010000100000001000
0x50810 ==> 01010000100000010000
0x50820 ==> 01010000100000100000
0x50840 ==> 01010000100001000000
0x50880 ==> 01010000100010000000
0x50900 ==> 01010000100100000000
0x50A00 ==> 01010000101000000000
0x50C00 ==> 01010000110000000000
0x51001 ==> 01010001000000000001
0x51002 ==> 01010001000000000010
0x51004 ==> 01010001000000000100
0x51008 ==> 01010001000000001000
0x51010 ==> 01010001000000010000
0x51020 ==> 01010001000000100000
0x51040 ==> 01010001000001000000
0x51080 ==> 01010001000010000000
0x51100 ==> 01010001000100000000
0x51200 ==> 01010001001000000000
0x51400 ==> 01010001010000000000
0x51800 ==> 01010001100000000000
0x52001 ==> 01010010000000000001
0x52002 ==> 01010010000000000010
0x52004 ==> 01010010000000000100
0x52008 ==> 01010010000000001000
0x52010 ==> 01010010000000010000
0x52020 ==> 01010010000000100000
0x52040 ==> 01010010000001000000
0x52080 ==> 01010010000010000000
0x52100 ==> 01010010000100000000
0x52200 ==> 01010010001000000000
0x52400 ==> 01010010010000000000
0x52800 ==> 01010010100000000000
0x53000 ==> 01010011000000000000
0x54001 ==> 01010100000000000001
0x54002 ==> 01010100000000000010
0x54004 ==> 01010100000000000100
0x54008 ==> 01010100000000001000

-continued

0x54010 ==> 01010100000000010000
0x54020 ==> 01010100000000100000
0x54040 ==> 01010100000001000000
0x54080 ==> 01010100000010000000
0x54100 ==> 01010100000100000000
0x54200 ==> 01010100001000000000
0x54400 ==> 01010100010000000000
0x54800 ==> 01010100100000000000
0x55000 ==> 01010101000000000000
0x56000 ==> 01010110000000000000
0x58001 ==> 01011000000000000001
0x58002 ==> 01011000000000000010
0x58004 ==> 01011000000000000100
0x58008 ==> 01011000000000001000
0x58010 ==> 01011000000000010000
0x58020 ==> 01011000000000100000
0x58040 ==> 01011000000001000000
0x58080 ==> 01011000000010000000
0x58100 ==> 01011000000100000000
0x58200 ==> 01011000001000000000
0x58400 ==> 01011000010000000000
0x58800 ==> 01011000100000000000
0x59000 ==> 01011001000000000000
0x5A000 ==> 01011010000000000000
0x5C000 ==> 01011100000000000000
0x60003 ==> 01100000000000000011
0x60005 ==> 01100000000000000101
0x60006 ==> 01100000000000000110
0x60009 ==> 01100000000000001001
0x6000A ==> 01100000000000001010
0x6000C ==> 01100000000000001100
0x60011 ==> 01100000000000010001
0x60012 ==> 01100000000000010010
0x60014 ==> 01100000000000010100
0x60018 ==> 01100000000000011000
0x60021 ==> 01100000000000100001
0x60022 ==> 01100000000000100010
0x60024 ==> 01100000000000100100
0x60028 ==> 01100000000000101000
0x60030 ==> 01100000000000110000
0x60041 ==> 01100000000001000001
0x60042 ==> 01100000000001000010
0x60044 ==> 01100000000001000100
0x60048 ==> 01100000000001001000
0x60050 ==> 01100000000001010000
0x60060 ==> 01100000000001100000
0x60081 ==> 01100000000010000001
0x60082 ==> 01100000000010000010
0x60084 ==> 01100000000010000100
0x60088 ==> 01100000000010001000
0x60090 ==> 01100000000010010000
0x600A0 ==> 01100000000010100000
0x600C0 ==> 01100000000011000000
0x60101 ==> 01100000000100000001
0x60102 ==> 01100000000100000010
0x60104 ==> 01100000000100000100
0x60108 ==> 01100000000100001000
0x60110 ==> 01100000000100010000
0x60120 ==> 01100000000100100000
0x60140 ==> 01100000000101000000
0x60180 ==> 01100000000110000000
0x60201 ==> 01100000001000000001
0x60202 ==> 01100000001000000010
0x60204 ==> 01100000001000000100
0x60208 ==> 01100000001000001000
0x60210 ==> 01100000001000010000
0x60220 ==> 01100000001000100000
0x60240 ==> 01100000001001000000
0x60280 ==> 01100000001010000000
0x60300 ==> 01100000001100000000
0x60401 ==> 01100000010000000001
0x60402 ==> 01100000010000000010
0x60404 ==> 01100000010000000100
0x60408 ==> 01100000010000001000
0x60410 ==> 01100000010000010000
0x60420 ==> 01100000010000100000
0x60440 ==> 01100000010001000000
0x60480 ==> 01100000010010000000
0x60500 ==> 01100000010100000000

-continued

0x60600 ==> 01100000011000000000
0x60801 ==> 01100000100000000001
0x60802 ==> 01100000100000000010
0x60804 ==> 01100000100000000100
0x60808 ==> 01100000100000001000
0x60810 ==> 01100000100000010000
0x60820 ==> 01100000100000100000
0x60840 ==> 01100000100001000000
0x60880 ==> 01100000100010000000
0x60900 ==> 01100000100100000000
0x60A00 ==> 01100000101000000000
0x60C00 ==> 01100000110000000000
0x61001 ==> 01100001000000000001
0x61002 ==> 01100001000000000010
0x61004 ==> 01100001000000000100
0x61008 ==> 01100001000000001000
0x61010 ==> 01100001000000010000
0x61020 ==> 01100001000000100000
0x61040 ==> 01100001000001000000
0x61080 ==> 01100001000010000000
0x61100 ==> 01100001000100000000
0x61200 ==> 01100001001000000000
0x61400 ==> 01100001010000000000
0x61800 ==> 01100001100000000000
0x62001 ==> 01100010000000000001
0x62002 ==> 01100010000000000010
0x62004 ==> 01100010000000000100
0x62008 ==> 01100010000000001000
0x62010 ==> 01100010000000010000
0x62020 ==> 01100010000000100000
0x62040 ==> 01100010000001000000
0x62080 ==> 01100010000010000000
0x62100 ==> 01100010000100000000
0x62200 ==> 01100010001000000000
0x62400 ==> 01100010010000000000
0x62800 ==> 01100010100000000000
0x63000 ==> 01100011000000000000
0x64001 ==> 01100100000000000001
0x64002 ==> 01100100000000000010
0x64004 ==> 01100100000000000100
0x64008 ==> 01100100000000001000
0x64010 ==> 01100100000000010000
0x64020 ==> 01100100000000100000
0x64040 ==> 01100100000001000000
0x64080 ==> 01100100000010000000
0x64100 ==> 01100100000100000000
0x64200 ==> 01100100001000000000
0x64400 ==> 01100100010000000000
0x64800 ==> 01100100100000000000
0x65000 ==> 01100101000000000000
0x66000 ==> 01100110000000000000
0x68001 ==> 01101000000000000001
0x68002 ==> 01101000000000000010
0x68004 ==> 01101000000000000100
0x68008 ==> 01101000000000001000
0x68010 ==> 01101000000000010000
0x68020 ==> 01101000000000100000
0x68040 ==> 01101000000001000000
0x68080 ==> 01101000000010000000
0x68100 ==> 01101000000100000000
0x68200 ==> 01101000001000000000
0x68400 ==> 01101000010000000000
0x68800 ==> 01101000100000000000
0x69000 ==> 01101001000000000000
0x6A000 ==> 01101010000000000000
0x6C000 ==> 01101100000000000000
0x70001 ==> 01110000000000000001
0x70002 ==> 01110000000000000010
0x70004 ==> 01110000000000000100
0x70008 ==> 01110000000000001000
0x70010 ==> 01110000000000010000
0x70020 ==> 01110000000000100000
0x70040 ==> 01110000000001000000
0x70080 ==> 01110000000010000000
0x70100 ==> 01110000000100000000
0x70200 ==> 01110000001000000000
0x70400 ==> 01110000010000000000
0x70800 ==> 01110000100000000000
0x71000 ==> 01110001000000000000

-continued

0x72000 ==> 01110010000000000000
0x74000 ==> 01110100000000000000
0x78000 ==> 01111000000000000000
0x80007 ==> 10000000000000000111
0x8000B ==> 10000000000000001011
0x8000D ==> 10000000000000001101
0x8000E ==> 10000000000000001110
0x80013 ==> 10000000000000010011
0x80015 ==> 10000000000000010101
0x80016 ==> 10000000000000010110
0x80019 ==> 10000000000000011001
0x8001A ==> 10000000000000011010
0x8001C ==> 10000000000000011100
0x80023 ==> 10000000000000100011
0x80025 ==> 10000000000000100101
0x80026 ==> 10000000000000100110
0x80029 ==> 10000000000000101001
0x8002A ==> 10000000000000101010
0x8002C ==> 10000000000000101100
0x80031 ==> 10000000000000110001
0x80032 ==> 10000000000000110010
0x80034 ==> 10000000000000110100
0x80038 ==> 10000000000000111000
0x80043 ==> 10000000000001000011
0x80045 ==> 10000000000001000101
0x80046 ==> 10000000000001000110
0x80049 ==> 10000000000001001001
0x8004A ==> 10000000000001001010
0x8004C ==> 10000000000001001100
0x80051 ==> 10000000000001010001
0x80052 ==> 10000000000001010010
0x80054 ==> 10000000000001010100
0x80058 ==> 10000000000001011000
0x80061 ==> 10000000000001100001
0x80062 ==> 10000000000001100010
0x80064 ==> 10000000000001100100
0x80068 ==> 10000000000001101000
0x80070 ==> 10000000000001110000
0x80083 ==> 10000000000010000011
0x80085 ==> 10000000000010000101
0x80086 ==> 10000000000010000110
0x80089 ==> 10000000000010001001
0x8008A ==> 10000000000010001010
0x8008C ==> 10000000000010001100
0x80091 ==> 10000000000010010001
0x80092 ==> 10000000000010010010
0x80094 ==> 10000000000010010100
0x80098 ==> 10000000000010011000
0x800A1 ==> 10000000000010100001
0x800A2 ==> 10000000000010100010
0x800A4 ==> 10000000000010100100
0x800A8 ==> 10000000000010101000
0x800B0 ==> 10000000000010110000
0x800C1 ==> 10000000000011000001
0x800C2 ==> 10000000000011000010
0x800C4 ==> 10000000000011000100
0x800C8 ==> 10000000000011001000
0x800D0 ==> 10000000000011010000
0x800E0 ==> 10000000000011100000
0x80103 ==> 10000000000100000011
0x80105 ==> 10000000000100000101
0x80106 ==> 10000000000100000110
0x80109 ==> 10000000000100001001
0x8010A ==> 10000000000100001010
0x8010C ==> 10000000000100001100
0x80111 ==> 10000000000100010001
0x80112 ==> 10000000000100010010
0x80114 ==> 10000000000100010100
0x80118 ==> 10000000000100011000
0x80121 ==> 10000000000100100001
0x80122 ==> 10000000000100100010
0x80124 ==> 10000000000100100100
0x80128 ==> 10000000000100101000
0x80130 ==> 10000000000100110000
0x80141 ==> 10000000000101000001
0x80142 ==> 10000000000101000010
0x80144 ==> 10000000000101000100
0x80148 ==> 10000000000101001000
0x80150 ==> 10000000000101010000

-continued

0x80160 ==> 10000000000101100000
0x80181 ==> 10000000000110000001
0x80182 ==> 10000000000110000010
0x80184 ==> 10000000000110000100
0x80188 ==> 10000000000110001000
0x80190 ==> 10000000000110010000
0x801A0 ==> 10000000000110100000
0x801C0 ==> 10000000000111000000
0x80203 ==> 10000000001000000011
0x80205 ==> 10000000001000000101
0x80206 ==> 10000000001000000110
0x80209 ==> 10000000001000001001
0x8020A ==> 10000000001000001010
0x8020C ==> 10000000001000001100
0x80211 ==> 10000000001000010001
0x80212 ==> 10000000001000010010
0x80214 ==> 10000000001000010100
0x80218 ==> 10000000001000011000
0x80221 ==> 10000000001000100001
0x80222 ==> 10000000001000100010
0x80224 ==> 10000000001000100100
0x80228 ==> 10000000001000101000
0x80230 ==> 10000000001000110000
0x80241 ==> 10000000001001000001
0x80242 ==> 10000000001001000010
0x80244 ==> 10000000001001000100
0x80248 ==> 10000000001001001000
0x80250 ==> 10000000001001010000
0x80260 ==> 10000000001001100000
0x80281 ==> 10000000001010000001
0x80282 ==> 10000000001010000010
0x80284 ==> 10000000001010000100
0x80288 ==> 10000000001010001000
0x80290 ==> 10000000001010010000
0x802A0 ==> 10000000001010100000
0x802C0 ==> 10000000001011000000
0x80301 ==> 10000000001100000001
0x80302 ==> 10000000001100000010
0x80304 ==> 10000000001100000100
0x80308 ==> 10000000001100001000
0x80310 ==> 10000000001100010000
0x80320 ==> 10000000001100100000
0x80340 ==> 10000000001101000000
0x80380 ==> 10000000001110000000
0x80403 ==> 10000000010000000011
0x80405 ==> 10000000010000000101
0x80406 ==> 10000000010000000110
0x80409 ==> 10000000010000001001
0x8040A ==> 10000000010000001010
0x8040C ==> 10000000010000001100
0x80411 ==> 10000000010000010001
0x80412 ==> 10000000010000010010
0x80414 ==> 10000000010000010100
0x80418 ==> 10000000010000011000
0x80421 ==> 10000000010000100001
0x80422 ==> 10000000010000100010
0x80424 ==> 10000000010000100100
0x80428 ==> 10000000010000101000
0x80430 ==> 10000000010000110000
0x80441 ==> 10000000010001000001
0x80442 ==> 10000000010001000010
0x80444 ==> 10000000010001000100
0x80448 ==> 10000000010001001000
0x80450 ==> 10000000010001010000
0x80460 ==> 10000000010001100000
0x80481 ==> 10000000010010000001
0x80482 ==> 10000000010010000010
0x80484 ==> 10000000010010000100
0x80488 ==> 10000000010010001000
0x80490 ==> 10000000010010010000
0x804A0 ==> 10000000010010100000
0x804C0 ==> 10000000010011000000
0x80501 ==> 10000000010100000001
0x80502 ==> 10000000010100000010
0x80504 ==> 10000000010100000100
0x80508 ==> 10000000010100001000
0x80510 ==> 10000000010100010000
0x80520 ==> 10000000010100100000
0x80540 ==> 10000000010101000000

-continued

0x80580 ==> 10000000010110000000
0x80601 ==> 10000000011000000001
0x80602 ==> 10000000011000000010
0x80604 ==> 10000000011000000100
0x80608 ==> 10000000011000001000
0x80610 ==> 10000000011000010000
0x80620 ==> 10000000011000100000
0x80640 ==> 10000000011001000000
0x80680 ==> 10000000011010000000
0x80700 ==> 10000000011100000000
0x80803 ==> 10000000100000000011
0x80805 ==> 10000000100000000101
0x80806 ==> 10000000100000000110
0x80809 ==> 10000000100000001001
0x8080A ==> 10000000100000001010
0x8080C ==> 10000000100000001100
0x80811 ==> 10000000100000010001
0x80812 ==> 10000000100000010010
0x80814 ==> 10000000100000010100
0x80818 ==> 10000000100000011000
0x80821 ==> 10000000100000100001
0x80822 ==> 10000000100000100010
0x80824 ==> 10000000100000100100
0x80828 ==> 10000000100000101000
0x80830 ==> 10000000100000110000
0x80841 ==> 10000000100001000001
0x80842 ==> 10000000100001000010
0x80844 ==> 10000000100001000100
0x80848 ==> 10000000100001001000
0x80850 ==> 10000000100001010000
0x80860 ==> 10000000100001100000
0x80881 ==> 10000000100010000001
0x80882 ==> 10000000100010000010
0x80884 ==> 10000000100010000100
0x80888 ==> 10000000100010001000
0x80890 ==> 10000000100010010000
0x808A0 ==> 10000000100010100000
0x808C0 ==> 10000000100011000000
0x80901 ==> 10000000100100000001
0x80902 ==> 10000000100100000010
0x80904 ==> 10000000100100000100
0x80908 ==> 10000000100100001000
0x80910 ==> 10000000100100010000
0x80920 ==> 10000000100100100000
0x80940 ==> 10000000100101000000
0x80980 ==> 10000000100110000000
0x80A01 ==> 10000000101000000001
0x80A02 ==> 10000000101000000010
0x80A04 ==> 10000000101000000100
0x80A08 ==> 10000000101000001000
0x80A10 ==> 10000000101000010000
0x80A20 ==> 10000000101000100000
0x80A40 ==> 10000000101001000000
0x80A80 ==> 10000000101010000000
0x80B00 ==> 10000000101100000000
0x80C01 ==> 10000000110000000001
0x80C02 ==> 10000000110000000010
0x80C04 ==> 10000000110000000100
0x80C08 ==> 10000000110000001000
0x80C10 ==> 10000000110000010000
0x80C20 ==> 10000000110000100000
0x80C40 ==> 10000000110001000000
0x80C80 ==> 10000000110010000000
0x80D00 ==> 10000000110100000000
0x80E00 ==> 10000000111000000000
0x81003 ==> 10000001000000000011
0x81005 ==> 10000001000000000101
0x81006 ==> 10000001000000000110
0x81009 ==> 10000001000000001001
0x8100A ==> 10000001000000001010
0x8100C ==> 10000001000000001100
0x81011 ==> 10000001000000010001
0x81012 ==> 10000001000000010010
0x81014 ==> 10000001000000010100
0x81018 ==> 10000001000000011000
0x81021 ==> 10000001000000100001
0x81022 ==> 10000001000000100010
0x81024 ==> 10000001000000100100
0x81028 ==> 10000001000000101000

-continued

0x81030 ==> 10000001000000110000
0x81041 ==> 10000001000001000001
0x81042 ==> 10000001000001000010
0x81044 ==> 10000001000001000100
0x81048 ==> 10000001000001001000
0x81050 ==> 10000001000001010000
0x81060 ==> 10000001000001100000
0x81081 ==> 10000001000010000001
0x81082 ==> 10000001000010000010
0x81084 ==> 10000001000010000100
0x81088 ==> 10000001000010001000
0x81090 ==> 10000001000010010000
0x810A0 ==> 10000001000010100000
0x810C0 ==> 10000001000011000000
0x81101 ==> 10000001000100000001
0x81102 ==> 10000001000100000010
0x81104 ==> 10000001000100000100
0x81108 ==> 10000001000100001000
0x81110 ==> 10000001000100010000
0x81120 ==> 10000001000100100000
0x81140 ==> 10000001000101000000
0x81180 ==> 10000001000110000000
0x81201 ==> 10000001001000000001
0x81202 ==> 10000001001000000010
0x81204 ==> 10000001001000000100
0x81208 ==> 10000001001000001000
0x81210 ==> 10000001001000010000
0x81220 ==> 10000001001000100000
0x81240 ==> 10000001001001000000
0x81280 ==> 10000001001010000000
0x81300 ==> 10000001001100000000
0x81401 ==> 10000001010000000001
0x81402 ==> 10000001010000000010
0x81404 ==> 10000001010000000100
0x81408 ==> 10000001010000001000
0x81410 ==> 10000001010000010000
0x81420 ==> 10000001010000100000
0x81440 ==> 10000001010001000000
0x81480 ==> 10000001010010000000
0x81500 ==> 10000001010100000000
0x81600 ==> 10000001011000000000
0x81801 ==> 10000001100000000001
0x81802 ==> 10000001100000000010
0x81804 ==> 10000001100000000100
0x81808 ==> 10000001100000001000
0x81810 ==> 10000001100000010000
0x81820 ==> 10000001100000100000
0x81840 ==> 10000001100001000000
0x81880 ==> 10000001100010000000
0x81900 ==> 10000001100100000000
0x81A00 ==> 10000001101000000000
0x81C00 ==> 10000001110000000000
0x82003 ==> 10000010000000000011
0x82005 ==> 10000010000000000101
0x82006 ==> 10000010000000000110
0x82009 ==> 10000010000000001001
0x8200A ==> 10000010000000001010
0x8200C ==> 10000010000000001100
0x82011 ==> 10000010000000010001
0x82012 ==> 10000010000000010010
0x82014 ==> 10000010000000010100
0x82018 ==> 10000010000000011000
0x82021 ==> 10000010000000100001
0x82022 ==> 10000010000000100010
0x82024 ==> 10000010000000100100
0x82028 ==> 10000010000000101000
0x82030 ==> 10000010000000110000
0x82041 ==> 10000010000001000001
0x82042 ==> 10000010000001000010
0x82044 ==> 10000010000001000100
0x82048 ==> 10000010000001001000
0x82050 ==> 10000010000001010000
0x82060 ==> 10000010000001100000
0x82081 ==> 10000010000010000001
0x82082 ==> 10000010000010000010
0x82084 ==> 10000010000010000100
0x82088 ==> 10000010000010001000
0x82090 ==> 10000010000010010000
0x820A0 ==> 10000010000010100000

-continued

0x820C0 ==> 10000010000011000000
0x82101 ==> 10000010000100000001
0x82102 ==> 10000010000100000010
0x82104 ==> 10000010000100000100
0x82108 ==> 10000010000100001000
0x82110 ==> 10000010000100010000
0x82120 ==> 10000010000100100000
0x82140 ==> 10000010000101000000
0x82180 ==> 10000010000110000000
0x82201 ==> 10000010001000000001
0x82202 ==> 10000010001000000010
0x82204 ==> 10000010001000000100
0x82208 ==> 10000010001000001000
0x82210 ==> 10000010001000010000
0x82220 ==> 10000010001000100000
0x82240 ==> 10000010001001000000
0x82280 ==> 10000010001010000000
0x82300 ==> 10000010001100000000
0x82401 ==> 10000010010000000001
0x82402 ==> 10000010010000000010
0x82404 ==> 10000010010000000100
0x82408 ==> 10000010010000001000
0x82410 ==> 10000010010000010000
0x82420 ==> 10000010010000100000
0x82440 ==> 10000010010001000000
0x82480 ==> 10000010010010000000
0x82500 ==> 10000010010100000000
0x82600 ==> 10000010011000000000
0x82801 ==> 10000010100000000001
0x82802 ==> 10000010100000000010
0x82804 ==> 10000010100000000100
0x82808 ==> 10000010100000001000
0x82810 ==> 10000010100000010000
0x82820 ==> 10000010100000100000
0x82840 ==> 10000010100001000000
0x82880 ==> 10000010100010000000
0x82900 ==> 10000010100100000000
0x82A00 ==> 10000010101000000000
0x82C00 ==> 10000010110000000000
0x83001 ==> 10000011000000000001
0x83002 ==> 10000011000000000010
0x83004 ==> 10000011000000000100
0x83008 ==> 10000011000000001000
0x83010 ==> 10000011000000010000
0x83020 ==> 10000011000000100000
0x83040 ==> 10000011000001000000
0x83080 ==> 10000011000010000000
0x83100 ==> 10000011000100000000
0x83200 ==> 10000011001000000000
0x83400 ==> 10000011010000000000
0x83800 ==> 10000011100000000000
0x84003 ==> 10000100000000000011
0x84005 ==> 10000100000000000101
0x84006 ==> 10000100000000000110
0x84009 ==> 10000100000000001001
0x8400A ==> 10000100000000001010
0x8400C ==> 10000100000000001100
0x84011 ==> 10000100000000010001
0x84012 ==> 10000100000000010010
0x84014 ==> 10000100000000010100
0x84018 ==> 10000100000000011000
0x84021 ==> 10000100000000100001
0x84022 ==> 10000100000000100010
0x84024 ==> 10000100000000100100
0x84028 ==> 10000100000000101000
0x84030 ==> 10000100000000110000
0x84041 ==> 10000100000001000001
0x84042 ==> 10000100000001000010
0x84044 ==> 10000100000001000100
0x84048 ==> 10000100000001001000
0x84050 ==> 10000100000001010000
0x84060 ==> 10000100000001100000
0x84081 ==> 10000100000010000001
0x84082 ==> 10000100000010000010
0x84084 ==> 10000100000010000100
0x84088 ==> 10000100000010001000
0x84090 ==> 10000100000010010000
0x840A0 ==> 10000100000010100000
0x840C0 ==> 10000100000011000000

-continued

0x84101 ==> 10000100000100000001
0x84102 ==> 10000100000100000010
0x84104 ==> 10000100000100000100
0x84108 ==> 10000100000100001000
0x84110 ==> 10000100000100010000
0x84120 ==> 10000100000100100000
0x84140 ==> 10000100000101000000
0x84180 ==> 10000100000110000000
0x84201 ==> 10000100001000000001
0x84202 ==> 10000100001000000010
0x84204 ==> 10000100001000000100
0x84208 ==> 10000100001000001000
0x84210 ==> 10000100001000010000
0x84220 ==> 10000100001000100000
0x84240 ==> 10000100001001000000
0x84280 ==> 10000100001010000000
0x84300 ==> 10000100001100000000
0x84401 ==> 10000100010000000001
0x84402 ==> 10000100010000000010
0x84404 ==> 10000100010000000100
0x84408 ==> 10000100010000001000
0x84410 ==> 10000100010000010000
0x84420 ==> 10000100010000100000
0x84440 ==> 10000100010001000000
0x84480 ==> 10000100010010000000
0x84500 ==> 10000100010100000000
0x84600 ==> 10000100011000000000
0x84801 ==> 10000100100000000001
0x84802 ==> 10000100100000000010
0x84804 ==> 10000100100000000100
0x84808 ==> 10000100100000001000
0x84810 ==> 10000100100000010000
0x84820 ==> 10000100100000100000
0x84840 ==> 10000100100001000000
0x84880 ==> 10000100100010000000
0x84900 ==> 10000100100100000000
0x84A00 ==> 10000100101000000000
0x84C00 ==> 10000100110000000000
0x85001 ==> 10000101000000000001
0x85002 ==> 10000101000000000010
0x85004 ==> 10000101000000000100
0x85008 ==> 10000101000000001000
0x85010 ==> 10000101000000010000
0x85020 ==> 10000101000000100000
0x85040 ==> 10000101000001000000
0x85080 ==> 10000101000010000000
0x85100 ==> 10000101000100000000
0x85200 ==> 10000101001000000000
0x85400 ==> 10000101010000000000
0x85800 ==> 10000101100000000000
0x86001 ==> 10000110000000000001
0x86002 ==> 10000110000000000010
0x86004 ==> 10000110000000000100
0x86008 ==> 10000110000000001000
0x86010 ==> 10000110000000010000
0x86020 ==> 10000110000000100000
0x86040 ==> 10000110000001000000
0x86080 ==> 10000110000010000000
0x86100 ==> 10000110000100000000
0x86200 ==> 10000110001000000000
0x86400 ==> 10000110010000000000
0x86800 ==> 10000110100000000000
0x87000 ==> 10000111000000000000
0x88003 ==> 10001000000000000011
0x88005 ==> 10001000000000000101
0x88006 ==> 10001000000000000110
0x88009 ==> 10001000000000001001
0x8800A ==> 10001000000000001010
0x8800C ==> 10001000000000001100
0x88011 ==> 10001000000000010001
0x88012 ==> 10001000000000010010
0x88014 ==> 10001000000000010100
0x88018 ==> 10001000000000011000
0x88021 ==> 10001000000000100001
0x88022 ==> 10001000000000100010
0x88024 ==> 10001000000000100100
0x88028 ==> 10001000000000101000
0x88030 ==> 10001000000000110000
0x88041 ==> 10001000000001000001

-continued

0x88042 ==> 10001000000001000010
0x88044 ==> 10001000000001000100
0x88048 ==> 10001000000001001000
0x88050 ==> 10001000000001010000
0x88060 ==> 10001000000001100000
0x88081 ==> 10001000000010000001
0x88082 ==> 10001000000010000010
0x88084 ==> 10001000000010000100
0x88088 ==> 10001000000010001000
0x88090 ==> 10001000000010010000
0x880A0 ==> 10001000000010100000
0x880C0 ==> 10001000000011000000
0x88101 ==> 10001000000100000001
0x88102 ==> 10001000000100000010
0x88104 ==> 10001000000100000100
0x88108 ==> 10001000000100001000
0x88110 ==> 10001000000100010000
0x88120 ==> 10001000000100100000
0x88140 ==> 10001000000101000000
0x88180 ==> 10001000000110000000
0x88201 ==> 10001000001000000001
0x88202 ==> 10001000001000000010
0x88204 ==> 10001000001000000100
0x88208 ==> 10001000001000001000
0x88210 ==> 10001000001000010000
0x88220 ==> 10001000001000100000
0x88240 ==> 10001000001001000000
0x88280 ==> 10001000001010000000
0x88300 ==> 10001000001100000000
0x88401 ==> 10001000010000000001
0x88402 ==> 10001000010000000010
0x88404 ==> 10001000010000000100
0x88408 ==> 10001000010000001000
0x88410 ==> 10001000010000010000
0x88420 ==> 10001000010000100000
0x88440 ==> 10001000010001000000
0x88480 ==> 10001000010010000000
0x88500 ==> 10001000010100000000
0x88600 ==> 10001000011000000000
0x88801 ==> 10001000100000000001
0x88802 ==> 10001000100000000010
0x88804 ==> 10001000100000000100
0x88808 ==> 10001000100000001000
0x88810 ==> 10001000100000010000
0x88820 ==> 10001000100000100000
0x88840 ==> 10001000100001000000
0x88880 ==> 10001000100010000000
0x88900 ==> 10001000100100000000
0x88A00 ==> 10001000101000000000
0x88C00 ==> 10001000110000000000
0x89001 ==> 10001001000000000001
0x89002 ==> 10001001000000000010
0x89004 ==> 10001001000000000100
0x89008 ==> 10001001000000001000
0x89010 ==> 10001001000000010000
0x89020 ==> 10001001000000100000
0x89040 ==> 10001001000001000000
0x89080 ==> 10001001000010000000
0x89100 ==> 10001001000100000000
0x89200 ==> 10001001001000000000
0x89400 ==> 10001001010000000000
0x89800 ==> 10001001100000000000
0x8A001 ==> 10001010000000000001
0x8A002 ==> 10001010000000000010
0x8A004 ==> 10001010000000000100
0x8A008 ==> 10001010000000001000
0x8A010 ==> 10001010000000010000
0x8A020 ==> 10001010000000100000
0x8A040 ==> 10001010000001000000
0x8A080 ==> 10001010000010000000
0x8A100 ==> 10001010000100000000
0x8A200 ==> 10001010001000000000
0x8A400 ==> 10001010010000000000
0x8A800 ==> 10001010100000000000
0x8B000 ==> 10001011000000000000
0x8C001 ==> 10001100000000000001
0x8C002 ==> 10001100000000000010
0x8C004 ==> 10001100000000000100
0x8C008 ==> 10001100000000001000

-continued

0x8C010 ==> 10001100000000010000
0x8C020 ==> 10001100000000100000
0x8C040 ==> 10001100000001000000
0x8C080 ==> 10001100000010000000
0x8C100 ==> 10001100000100000000
0x8C200 ==> 10001100001000000000
0x8C400 ==> 10001100010000000000
0x8C800 ==> 10001100100000000000
0x8D000 ==> 10001101000000000000
0x8E000 ==> 10001110000000000000
0x90003 ==> 10010000000000000011
0x90005 ==> 10010000000000000101
0x90006 ==> 10010000000000000110
0x90009 ==> 10010000000000001001
0x9000A ==> 10010000000000001010
0x9000C ==> 10010000000000001100
0x90011 ==> 10010000000000010001
0x90012 ==> 10010000000000010010
0x90014 ==> 10010000000000010100
0x90018 ==> 10010000000000011000
0x90021 ==> 10010000000000100001
0x90022 ==> 10010000000000100010
0x90024 ==> 10010000000000100100
0x90028 ==> 10010000000000101000
0x90030 ==> 10010000000000110000
0x90041 ==> 10010000000001000001
0x90042 ==> 10010000000001000010
0x90044 ==> 10010000000001000100
0x90048 ==> 10010000000001001000
0x90050 ==> 10010000000001010000
0x90060 ==> 10010000000001100000
0x90081 ==> 10010000000010000001
0x90082 ==> 10010000000010000010
0x90084 ==> 10010000000010000100
0x90088 ==> 10010000000010001000
0x90090 ==> 10010000000010010000
0x900A0 ==> 10010000000010100000
0x900C0 ==> 10010000000011000000
0x90101 ==> 10010000000100000001
0x90102 ==> 10010000000100000010
0x90104 ==> 10010000000100000100
0x90108 ==> 10010000000100001000
0x90110 ==> 10010000000100010000
0x90120 ==> 10010000000100100000
0x90140 ==> 10010000000101000000
0x90180 ==> 10010000000110000000
0x90201 ==> 10010000001000000001
0x90202 ==> 10010000001000000010
0x90204 ==> 10010000001000000100
0x90208 ==> 10010000001000001000
0x90210 ==> 10010000001000010000
0x90220 ==> 10010000001000100000
0x90240 ==> 10010000001001000000
0x90280 ==> 10010000001010000000
0x90300 ==> 10010000001100000000
0x90401 ==> 10010000010000000001
0x90402 ==> 10010000010000000010
0x90404 ==> 10010000010000000100
0x90408 ==> 10010000010000001000
0x90410 ==> 10010000010000010000
0x90420 ==> 10010000010000100000
0x90440 ==> 10010000010001000000
0x90480 ==> 10010000010010000000
0x90500 ==> 10010000010100000000
0x90600 ==> 10010000011000000000
0x90801 ==> 10010000100000000001
0x90802 ==> 10010000100000000010
0x90804 ==> 10010000100000000100
0x90808 ==> 10010000100000001000
0x90810 ==> 10010000100000010000
0x90820 ==> 10010000100000100000
0x90840 ==> 10010000100001000000
0x90880 ==> 10010000100010000000
0x90900 ==> 10010000100100000000
0x90A00 ==> 10010000101000000000
0x90C00 ==> 10010000110000000000
0x91001 ==> 10010001000000000001
0x91002 ==> 10010001000000000010
0x91004 ==> 10010001000000000100

-continued

| |
|---|
| 0x91008 ==> 10010001000000001000 |
| 0x91010 ==> 10010001000000010000 |
| 0x91020 ==> 10010001000000100000 |
| 0x91040 ==> 10010001000001000000 |
| 0x91080 ==> 10010001000010000000 |
| 0x91100 ==> 10010001000100000000 |
| 0x91200 ==> 10010001001000000000 |
| 0x91400 ==> 10010001010000000000 |
| 0x91800 ==> 10010001100000000000 |
| 0x92001 ==> 10010010000000000001 |
| 0x92002 ==> 10010010000000000010 |
| 0x92004 ==> 10010010000000000100 |
| 0x92008 ==> 10010010000000001000 |
| 0x92010 ==> 10010010000000010000 |
| 0x92020 ==> 10010010000000100000 |
| 0x92040 ==> 10010010000001000000 |
| 0x92080 ==> 10010010000010000000 |
| 0x92100 ==> 10010010000100000000 |
| 0x92200 ==> 10010010001000000000 |
| 0x92400 ==> 10010010010000000000 |
| 0x92800 ==> 10010010100000000000 |
| 0x93000 ==> 10010011000000000000 |
| 0x94001 ==> 10010100000000000001 |
| 0x94002 ==> 10010100000000000010 |
| 0x94004 ==> 10010100000000000100 |
| 0x94008 ==> 10010100000000001000 |
| 0x94010 ==> 10010100000000010000 |
| 0x94020 ==> 10010100000000100000 |
| 0x94040 ==> 10010100000001000000 |
| 0x94080 ==> 10010100000010000000 |
| 0x94100 ==> 10010100000100000000 |
| 0x94200 ==> 10010100001000000000 |
| 0x94400 ==> 10010100010000000000 |
| 0x94800 ==> 10010100100000000000 |
| 0x95000 ==> 10010101000000000000 |
| 0x96000 ==> 10010110000000000000 |
| 0x98001 ==> 10011000000000000001 |
| 0x98002 ==> 10011000000000000010 |
| 0x98004 ==> 10011000000000000100 |
| 0x98008 ==> 10011000000000001000 |
| 0x98010 ==> 10011000000000010000 |
| 0x98020 ==> 10011000000000100000 |
| 0x98040 ==> 10011000000001000000 |
| 0x98080 ==> 10011000000010000000 |
| 0x98100 ==> 10011000000100000000 |
| 0x98200 ==> 10011000001000000000 |
| 0x98400 ==> 10011000010000000000 |
| 0x98800 ==> 10011000100000000000 |
| 0x99000 ==> 10011001000000000000 |
| 0x9A000 ==> 10011010000000000000 |
| 0x9C000 ==> 10011100000000000000 |
| 0xA0003 ==> 10100000000000000011 |
| 0xA0005 ==> 10100000000000000101 |
| 0xA0006 ==> 10100000000000000110 |
| 0xA0009 ==> 10100000000000001001 |
| 0xA000A ==> 10100000000000001010 |
| 0xA000C ==> 10100000000000001100 |
| 0xA0011 ==> 10100000000000010001 |
| 0xA0012 ==> 10100000000000010010 |
| 0xA0014 ==> 10100000000000010100 |
| 0xA0018 ==> 10100000000000011000 |
| 0xA0021 ==> 10100000000000100001 |
| 0xA0022 ==> 10100000000000100010 |
| 0xA0024 ==> 10100000000000100100 |
| 0xA0028 ==> 10100000000000101000 |
| 0xA0030 ==> 10100000000000110000 |
| 0xA0041 ==> 10100000000001000001 |
| 0xA0042 ==> 10100000000001000010 |
| 0xA0044 ==> 10100000000001000100 |
| 0xA0048 ==> 10100000000001001000 |
| 0xA0050 ==> 10100000000001010000 |
| 0xA0060 ==> 10100000000001100000 |
| 0xA0081 ==> 10100000000010000001 |
| 0xA0082 ==> 10100000000010000010 |
| 0xA0084 ==> 10100000000010000100 |
| 0xA0088 ==> 10100000000010001000 |
| 0xA0090 ==> 10100000000010010000 |
| 0xA00A0 ==> 10100000000010100000 |
| 0xA00C0 ==> 10100000000011000000 |
| 0xA0101 ==> 10100000000100000001 |
| 0xA0102 ==> 10100000000100000010 |
| 0xA0104 ==> 10100000000100000100 |
| 0xA0108 ==> 10100000000100001000 |
| 0xA0110 ==> 10100000000100010000 |
| 0xA0120 ==> 10100000000100100000 |
| 0xA0140 ==> 10100000000101000000 |
| 0xA0180 ==> 10100000000110000000 |
| 0xA0201 ==> 10100000001000000001 |
| 0xA0202 ==> 10100000001000000010 |
| 0xA0204 ==> 10100000001000000100 |
| 0xA0208 ==> 10100000001000001000 |
| 0xA0210 ==> 10100000001000010000 |
| 0xA0220 ==> 10100000001000100000 |
| 0xA0240 ==> 10100000001001000000 |
| 0xA0280 ==> 10100000001010000000 |
| 0xA0300 ==> 10100000001100000000 |
| 0xA0401 ==> 10100000010000000001 |
| 0xA0402 ==> 10100000010000000010 |
| 0xA0404 ==> 10100000010000000100 |
| 0xA0408 ==> 10100000010000001000 |
| 0xA0410 ==> 10100000010000010000 |
| 0xA0420 ==> 10100000010000100000 |
| 0xA0440 ==> 10100000010001000000 |
| 0xA0480 ==> 10100000010010000000 |
| 0xA0500 ==> 10100000010100000000 |
| 0xA0600 ==> 10100000011000000000 |
| 0xA0801 ==> 10100000100000000001 |
| 0xA0802 ==> 10100000100000000010 |
| 0xA0804 ==> 10100000100000000100 |
| 0xA0808 ==> 10100000100000001000 |
| 0xA0810 ==> 10100000100000010000 |
| 0xA0820 ==> 10100000100000100000 |
| 0xA0840 ==> 10100000100001000000 |
| 0xA0880 ==> 10100000100010000000 |
| 0xA0900 ==> 10100000100100000000 |
| 0xA0A00 ==> 10100000101000000000 |
| 0xA0C00 ==> 10100000110000000000 |
| 0xA1001 ==> 10100001000000000001 |
| 0xA1002 ==> 10100001000000000010 |
| 0xA1004 ==> 10100001000000000100 |
| 0xA1008 ==> 10100001000000001000 |
| 0xA1010 ==> 10100001000000010000 |
| 0xA1020 ==> 10100001000000100000 |
| 0xA1040 ==> 10100001000001000000 |
| 0xA1080 ==> 10100001000010000000 |
| 0xA1100 ==> 10100001000100000000 |
| 0xA1200 ==> 10100001001000000000 |
| 0xA1400 ==> 10100001010000000000 |
| 0xA1800 ==> 10100001100000000000 |
| 0xA2001 ==> 10100010000000000001 |
| 0xA2002 ==> 10100010000000000010 |
| 0xA2004 ==> 10100010000000000100 |
| 0xA2008 ==> 10100010000000001000 |
| 0xA2010 ==> 10100010000000010000 |
| 0xA2020 ==> 10100010000000100000 |
| 0xA2040 ==> 10100010000001000000 |
| 0xA2080 ==> 10100010000010000000 |
| 0xA2100 ==> 10100010000100000000 |
| 0xA2200 ==> 10100010001000000000 |
| 0xA2400 ==> 10100010010000000000 |
| 0xA2800 ==> 10100010100000000000 |
| 0xA3000 ==> 10100011000000000000 |
| 0xA4001 ==> 10100100000000000001 |
| 0xA4002 ==> 10100100000000000010 |
| 0xA4004 ==> 10100100000000000100 |
| 0xA4008 ==> 10100100000000001000 |
| 0xA4010 ==> 10100100000000010000 |
| 0xA4020 ==> 10100100000000100000 |
| 0xA4040 ==> 10100100000001000000 |
| 0xA4080 ==> 10100100000010000000 |
| 0xA4100 ==> 10100100000100000000 |
| 0xA4200 ==> 10100100001000000000 |
| 0xA4400 ==> 10100100010000000000 |
| 0xA4800 ==> 10100100100000000000 |
| 0xA5000 ==> 10100101000000000000 |
| 0xA6000 ==> 10100110000000000000 |
| 0xA8001 ==> 10101000000000000001 |
| 0xA8002 ==> 10101000000000000010 |

-continued

0xA8004 ==> 10101000000000000100
0xA8008 ==> 10101000000000001000
0xA8010 ==> 10101000000000010000
0xA8020 ==> 10101000000000100000
0xA8040 ==> 10101000000001000000
0xA8080 ==> 10101000000010000000
0xA8100 ==> 10101000000100000000
0xA8200 ==> 10101000001000000000
0xA8400 ==> 10101000010000000000
0xA8800 ==> 10101000100000000000
0xA9000 ==> 10101001000000000000
0xAA000 ==> 10101010000000000000
0xAC000 ==> 10101100000000000000
0xB0001 ==> 10110000000000000001
0xB0002 ==> 10110000000000000010
0xB0004 ==> 10110000000000000100
0xB0008 ==> 10110000000000001000
0xB0010 ==> 10110000000000010000
0xB0020 ==> 10110000000000100000
0xB0040 ==> 10110000000001000000
0xB0080 ==> 10110000000010000000
0xB0100 ==> 10110000000100000000
0xB0200 ==> 10110000001000000000
0xB0400 ==> 10110000010000000000
0xB0800 ==> 10110000100000000000
0xB1000 ==> 10110001000000000000
0xB2000 ==> 10110010000000000000
0xB4000 ==> 10110100000000000000
0xB8000 ==> 10111000000000000000
0xC0003 ==> 11000000000000000011
0xC0005 ==> 11000000000000000101
0xC0006 ==> 11000000000000000110
0xC0009 ==> 11000000000000001001
0xC000A ==> 11000000000000001010
0xC000C ==> 11000000000000001100
0xC0011 ==> 11000000000000010001
0xC0012 ==> 11000000000000010010
0xC0014 ==> 11000000000000010100
0xC0018 ==> 11000000000000011000
0xC0021 ==> 11000000000000100001
0xC0022 ==> 11000000000000100010
0xC0024 ==> 11000000000000100100
0xC0028 ==> 11000000000000101000
0xC0030 ==> 11000000000000110000
0xC0041 ==> 11000000000001000001
0xC0042 ==> 11000000000001000010
0xC0044 ==> 11000000000001000100
0xC0048 ==> 11000000000001001000
0xC0050 ==> 11000000000001010000
0xC0060 ==> 11000000000001100000
0xC0081 ==> 11000000000010000001
0xC0082 ==> 11000000000010000010
0xC0084 ==> 11000000000010000100
0xC0088 ==> 11000000000010001000
0xC0090 ==> 11000000000010010000
0xC00A0 ==> 11000000000010100000
0xC00C0 ==> 11000000000011000000
0xC0101 ==> 11000000000100000001
0xC0102 ==> 11000000000100000010
0xC0104 ==> 11000000000100000100
0xC0108 ==> 11000000000100001000
0xC0110 ==> 11000000000100010000
0xC0120 ==> 11000000000100100000
0xC0140 ==> 11000000000101000000
0xC0180 ==> 11000000000110000000
0xC0201 ==> 11000000001000000001
0xC0202 ==> 11000000001000000010
0xC0204 ==> 11000000001000000100
0xC0208 ==> 11000000001000001000
0xC0210 ==> 11000000001000010000
0xC0220 ==> 11000000001000100000
0xC0240 ==> 11000000001001000000
0xC0280 ==> 11000000001010000000
0xC0300 ==> 11000000001100000000
0xC0401 ==> 11000000010000000001
0xC0402 ==> 11000000010000000010
0xC0404 ==> 11000000010000000100
0xC0408 ==> 11000000010000001000
0xC0410 ==> 11000000010000010000

-continued

0xC0420 ==> 11000000010000100000
0xC0440 ==> 11000000010001000000
0xC0480 ==> 11000000010010000000
0xC0500 ==> 11000000010100000000
0xC0600 ==> 11000000011000000000
0xC0801 ==> 11000000100000000001
0xC0802 ==> 11000000100000000010
0xC0804 ==> 11000000100000000100
0xC0808 ==> 11000000100000001000
0xC0810 ==> 11000000100000010000
0xC0820 ==> 11000000100000100000
0xC0840 ==> 11000000100001000000
0xC0880 ==> 11000000100010000000
0xC0900 ==> 11000000100100000000
0xC0A00 ==> 11000000101000000000
0xC0C00 ==> 11000000110000000000
0xC1001 ==> 11000001000000000001
0xC1002 ==> 11000001000000000010
0xC1004 ==> 11000001000000000100
0xC1008 ==> 11000001000000001000
0xC1010 ==> 11000001000000010000
0xC1020 ==> 11000001000000100000
0xC1040 ==> 11000001000001000000
0xC1080 ==> 11000001000010000000
0xC1100 ==> 11000001000100000000
0xC1200 ==> 11000001001000000000
0xC1400 ==> 11000001010000000000
0xC1800 ==> 11000001100000000000
0xC2001 ==> 11000010000000000001
0xC2002 ==> 11000010000000000010
0xC2004 ==> 11000010000000000100
0xC2008 ==> 11000010000000001000
0xC2010 ==> 11000010000000010000
0xC2020 ==> 11000010000000100000
0xC2040 ==> 11000010000001000000
0xC2080 ==> 11000010000010000000
0xC2100 ==> 11000010000100000000
0xC2200 ==> 11000010001000000000
0xC2400 ==> 11000010010000000000
0xC2800 ==> 11000010100000000000
0xC3000 ==> 11000011000000000000
0xC4001 ==> 11000100000000000001
0xC4002 ==> 11000100000000000010
0xC4004 ==> 11000100000000000100
0xC4008 ==> 11000100000000001000
0xC4010 ==> 11000100000000010000
0xC4020 ==> 11000100000000100000
0xC4040 ==> 11000100000001000000
0xC4080 ==> 11000100000010000000
0xC4100 ==> 11000100000100000000
0xC4200 ==> 11000100001000000000
0xC4400 ==> 11000100010000000000
0xC4800 ==> 11000100100000000000
0xC5000 ==> 11000101000000000000
0xC6000 ==> 11000110000000000000
0xC8001 ==> 11001000000000000001
0xC8002 ==> 11001000000000000010
0xC8004 ==> 11001000000000000100
0xC8008 ==> 11001000000000001000
0xC8010 ==> 11001000000000010000
0xC8020 ==> 11001000000000100000
0xC8040 ==> 11001000000001000000
0xC8080 ==> 11001000000010000000
0xC8100 ==> 11001000000100000000
0xC8200 ==> 11001000001000000000
0xC8400 ==> 11001000010000000000
0xC8800 ==> 11001000100000000000
0xC9000 ==> 11001001000000000000
0xCA000 ==> 11001010000000000000
0xCC000 ==> 11001100000000000000
0xD0001 ==> 11010000000000000001
0xD0002 ==> 11010000000000000010
0xD0004 ==> 11010000000000000100
0xD0008 ==> 11010000000000001000
0xD0010 ==> 11010000000000010000
0xD0020 ==> 11010000000000100000
0xD0040 ==> 11010000000001000000
0xD0080 ==> 11010000000010000000
0xD0100 ==> 11010000000100000000

-continued

```
0xD0200 ==> 11010000001000000000
0xD0400 ==> 11010000010000000000
0xD0800 ==> 11010000100000000000
0xD1000 ==> 11010001000000000000
0xD2000 ==> 11010010000000000000
0xD4000 ==> 11010100000000000000
0xD8000 ==> 11011000000000000000
0xE0001 ==> 11100000000000000001
0xE0002 ==> 11100000000000000010
0xE0004 ==> 11100000000000000100
0xE0008 ==> 11100000000000001000
0xE0010 ==> 11100000000000010000
0xE0020 ==> 11100000000000100000
0xE0040 ==> 11100000000001000000
0xE0080 ==> 11100000000010000000
0xE0100 ==> 11100000000100000000
0xE0200 ==> 11100000001000000000
0xE0400 ==> 11100000010000000000
0xE0800 ==> 11100000100000000000
0xE1000 ==> 11100001000000000000
0xE2000 ==> 11100010000000000000
0xE4000 ==> 11100100000000000000
0xE8000 ==> 11101000000000000000
0xF0000 ==> 11110000000000000000
```

REFERENCES

[1] Xu, Wenxin, & Campbell, Graham (1992). A Near Perfect Stable Random Access Protocol for a Broadcast Channel. In Proc. of the IEEE International Conference on Communications 1992 (ICC'92), (pp. 370-374 Vol. 1).

[2] Campbell, Graham, & Xu, Wenxin. (2001). U.S. Pat. No. 6,292,493. USA.

[3] L. Alonso, R. Agusti, O. Salient "A Near Optimum MAC Protocol based on the Distributed Queueing Random Access Protocol (DQRAP) for a CDMA Mobile Communication System", IEEE Journal on Selected Areas in Communications, Vol. 18, No 9, September 2000, pp 1701-1718.

[4] Alex Cateura Diaz, "Application of the DQCA protocol to the Optimization of wireless communications systems in cellular environment", 16 Apr. 2007, Advisors: Dr. Christos Verikoukis (CTTC) and Dr. Luis Alonso (UPC). Masters Thesis.

[5] J. Alonso-Zárate, "Design and Analysis of Medium Access Control Protocols for Ad hoc and Cooperative Wireless Networks," 25 Feb. 2009. Advisors: Dr. Christos Verikoukis (CTTC) and Dr. Luis Alonso (UPC). PREMI EXTRAORDINARI DE DOCTORAT 2011 awarded by UPC

[6] Begonya Otal, Luis Alonso, Member, IEEE, Christos Verikoukis, Senior Member, IEEE "Highly Reliable Energy-Saving MAC for Wireless Body Sensor Networks in Healthcare Systems" IEEE JOURNAL ON SELECTED AREAS IN COMMUNICATIONS, VOL. 27, NO. 4, May 2009.

[7] Begonya Otal, Christos Verikoukis, Member Senior IEEE, Luis Alonso, Member IEEE "Optimizing MAC Layer Performance based on a Distributed Queuing Protocol for Wireless Sensor Networks" Trans Jour Globecom 170707-39600.

[8] B. Otal*, L. Alonso*, Ch. Verikoukis**, *Department of Signal Theory and Communications, Technical University of Catalonia (UPC), **Telecommunications Technological Center of Catalonia (CTTC) 2010 ICC.

[9] J. Alonso-Zárate, Ch. Verikoukis, E. Kartsakli, L. Alonso "Coexistence of a Novel Medium Access Control Protocol for Wireless Ad Hoc Networks and the IEEE 802.11" IEEE Communications Society subject matter experts for publication in the IEEE ICC 2010 proceedings.

[10] Jesus Alonso-Zárate, Elli Kartsakli, Luis Alonso, and Christos Verikoukis "Performance Analysis of a Cluster-Based MAC Protocol for Wireless Ad Hoc Networks" EURASIP Journal on Wireless Communications and Networking Volume 2010, Article ID 625619, 16 pages.

[11] J. Alonso-Zárate, E. Kartsakli, L. Alonso, M. Katz and Ch. Verikoukis "Multi-Radio Cooperative ARQ in Wireless Cellular Networks: A MAC Layer Perspective.

[12] Jesús Alonso-Zárate, Elli Kartsakli, Luis Alonso and Christos Verikoukis "Cooperative ARQ: A Medium Access Control (MAC) Layer Perspective".

While several illustrative embodiments of the invention have been shown and described, numerous variations and alternative embodiments will occur to those skilled in the art. Such variations and alternative embodiments are contemplated, and can be made without departing from the scope of the invention as defined in the appended claims. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

The foregoing detailed description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable.

Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "step(s) for . . . ".

The invention claimed is:

1. An interconnect system for processing data at the lowest Medium Access Control (MAC) layer in a protocol stack, comprising a Distributed Queue Switch Architecture (DQSA) for application wherein a Distributed Queue Wireless Arbiter (DQWA) specification is processed in a network comprising:

a. a plurality of devices;

b. a first device of the plurality of devices is configured to provide data to a second device of the plurality of devices, and implementing a DQSA Medium Access Control;

c. the first device of the plurality of device further comprising:

i. A DQWA Common Terms;

ii. A Transmission Sequence describing the complete sequence of the standard periodic transmission that occurs within a Distributed Queue Service Set (DQSS);

iii. said DQSS Packet Segments are comprised of:

1. A Packet Segment Pre-header;

2. An optional Management Information Sub-Header and Directives;

3. An optional Frame Data Payload section;

4. A Packet Check Sequence (PCS);

5. A Short inter-frame space (SIFS) between each Packet Segment;

iv. said DQSS operates in one of three operational modes:

1. Static Association Mode;

2. Semi-Manual Association Mode; or

3. Promiscuous Mode;

v. said DQSS, when configured to be in Semi-Manual Mode has all of the capabilities of a Static Association Mode DQSS and the additional ability to add nodes in real time, and where a confirmation of inclusion may require an explicit action from an external source; and vi. said DQSS Semi-Manual Association Mode, wherein no operator intervention is required except for the case of an operator explicitly desiring to exclude a node from the DQSS.

2. A system according to claim 1, wherein the bits in a Management Information Sub-header are processed and indicate values for:

d. Reserved for future use, wherein a preferred embodiment may include directives for interleaving legacy (802.x.x) nodal apparatus, or for handoff or relay functions, or within a cooperative peering network for replacing missing or corrupted packets;

e. Distributing a DQSS Table Command;

f. Mandatory Disconnect Command g. Disconnect Request from Station to Cluster Head;

h. Disconnect Confirmed Response from Cluster Head to Station;

i. Join Request from Station to Cluster Head;

j. Join Accepted Response from Cluster Head to Station;

k. Re-cluster Command from New Cluster Head;

l. Re-cluster Acknowledge Response from each individual station within cluster;

m. Link Quality SNR Exchange Request from Cluster Head to Station;

n. Link Quality SNR Exchange Response from Station to Cluster Head;

o. Bandwidth Management Command from Cluster Head to Station;

p. Bandwidth Management Acknowledge Response from Station to Cluster Head;

q. Maximum Frame Size Command with no acknowledgement from Cluster Head to Stations;

r. Switch Queue Command with no response;

s. Pause Queue Command with no response;

t. Pause Queue with Enable Join Request for Mini-Slot;

u. Resume Queue Command;

v. A security field is defined to indicate a public security key or a shared private key; a payload limit, an optional management information sub-header, or encryption status, wherein a portion or the entire contents within a MAC layer frame may be encrypted;

w. A DQSS Node Join Request Bit may be used by nodes wishing to join the DQSS, wherein a node accepted into the network may be assigned both a Node Address and a constant size Code Word of constant Hamming Weight;

x. A DQSS Management Information sub-segment indicating a detected node state which may include:

i. Idle, wherein there is no signal in ARS Mini-Slot such that the Received Signal is below the RSSI (Noise) Threshold;

ii. Success, wherein the demodulation resulting in the correct hamming weight and correct code word value and node address combination;

iii. Collision, wherein the signal detected above the noise (RSSI) threshold not resulting in a translation into the digital domain of a code word with the correct hamming weight and correct code word value and node address combination wherein a Cluster Head may respond with the collision results as part of the DQSS Management Segment in order to clarify potential ambiguities, and an exemplary embodiment may include a standard DQSS Network address 12-bits in length, with the lower 10-bits assigned for the dynamic portion of a valid address, wherein the upper two bits have special meaning;

y. A DQSS Management Information field defined as the Most Significant Bit (MSB) of the address is reserved for the Cluster Head;

z. A DQSS Individual Address Sub-Field, wherein these bits are used for assigning individual addresses, assignable for an individual DQSS Network Address further comprising special addresses that may set aside for "Directed Broadcasts" and regular "Broadcasts" for all Mini-Cluster Sub-Field values, where a preferred embodiment may trigger a nodal request to any neighbor which may have stored a packet for replacement of a missing or corrupt packet in a cooperative peering broadcast with energy savings over retransmission from a distant node;

aa. A Data Fragment Management field wherein the settings directly determine whether or not the packet contains values for:

i. A Frame Length field;

ii. An initial segment of a fragmented frame iii. An Application Data and DQSS Management Information;

iv. A DQSS Management Information only;

v. A First Data Packet of Frame;

vi. A First Resumed Data Packet of Frame;

vii. A Resumed Frame with Final Data Packet of Frame;

viii. An Intermediate Data Packet of Frame;

ix. A Final Data Packet of the Frame wherein a preferred embodiment may include a Standard Addressing Frame or an Extended Addressing Frame with additional addresses;

x. A Packet Control Sequence (PCS) validating the contents of the overall packet;

xi. A Frame Check Sequence (FCS), validating the contents of the overall frame;

xii. A Complete Frame within Data Packet;

xiii. A Reserved field for future use;

xiv. A Management Directive Bit;

xv. A Retransmission Bit;

xvi. A Dynamic Clustering Enable Bit;

xvii. A Power Management Bit;

xviii. An Encryption Enable Bit;

xix. A Priority Queuing Enable Bit;

xx. A Quality of Service (QoS) Level Bit wherein if a Priority Queuing Bit is enabled then levels of priority can be indicated, with a preferred embodiment increasing linearly with the value of the QoS bits from lowest to highest priority;

xxi. A Frame Length Field;

xxii. A Sequence Control Field containing a Sequence Number;

xxiii. An Acknowledgment Number Field;

xxiv. A Frame Address Field; and xxv. A Frame Length Field.

3. A system according to claim 1, wherein a DQSS Table comprised of:

bb. A DQSS Configuration Data;

cc. A MAC Address of every Node within the DQSS;

dd. A DQSS Address; and ee. An Active or Inactive Indicator for Every DQSS member.

4. A system according to claim 1, wherein a Synchronization Beacon may be transmitted within a feedback frame.

5. A system according to claim 1, wherein a node knowing a decryption algorithm may send an entire message encrypted, including the header, and wherein the encryption is utilizing public and private key encryption.

6. A system according to claim 1, wherein a Version Control indicates the Protocol Version in use by a machine or nodal apparatus, and is initially be set to a value 0000b.

* * * * *